(12) United States Patent
Kondo

(10) Patent No.: US 11,906,880 B2
(45) Date of Patent: Feb. 20, 2024

(54) CAM FOLLOWER AND LENS BARREL

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 763 days.

(21) Appl. No.: 17/026,043

(22) Filed: Sep. 18, 2020

(65) Prior Publication Data
US 2021/0003907 A1    Jan. 7, 2021

Related U.S. Application Data

(63) Continuation of application No. PCT/JP2019/010214, filed on Mar. 13, 2019.

(30) Foreign Application Priority Data

Mar. 23, 2018    (JP) .................................. 2018-056958

(51) Int. Cl.
 *G02B 7/10*    (2021.01)
 *G03B 17/14*   (2021.01)
(52) U.S. Cl.
 CPC ............... *G03B 17/14* (2013.01); *G02B 7/10* (2013.01)
(58) Field of Classification Search
 CPC ............... B25D 11/106; B25D 11/104; B29C 66/82263; F16F 15/043; F01C 1/067
 See application file for complete search history.

(56) References Cited

U.S. PATENT DOCUMENTS

2009/0052069 A1    2/2009  Kaneko et al.
2012/0002301 A1*   1/2012  Nakajima .............. G02B 7/023
                                                359/700
(Continued)

FOREIGN PATENT DOCUMENTS

CN    101373249 A    2/2009
JP    4-125605 A     4/1992
(Continued)

OTHER PUBLICATIONS

Chinese Office Action and Search Report for corresponding Chinese Application No. 201960019413.5, dated Nov. 12, 2021, with English translation.

(Continued)

*Primary Examiner* — Ephrem Z Mebrahtu
(74) *Attorney, Agent, or Firm* — Birch, Stewart, Kolasch & Birch, LLP

(57) ABSTRACT

There are provided a cam follower of which the amount of elastic deformation can be appropriately restricted with simple configuration and which can be easily manufactured and a lens barrel. A cam follower (100) includes a hollow cam follower body (110) of which a distal end is open, a first slit (130) that is cut toward a proximal end from the distal end of the cam follower body (110), and a second slit (140) that is cut toward an inner peripheral portion from an outer peripheral portion of the cam follower body (110) in a direction orthogonal to an axis. Protruding portions (150) are provided on both inner wall surfaces of the first slit (130) at a distal end portion of the first slit. The protruding portions (150) restrict deformation of the cam follower body (110) equal to or larger than a defined amount of deformation in a radial direction.

18 Claims, 107 Drawing Sheets

(56) References Cited

U.S. PATENT DOCUMENTS

| | | | | |
|---|---|---|---|---|
| 2013/0314802 A1* | 11/2013 | Uno | ...................... | G02B 7/102 |
| | | | | 359/700 |
| 2016/0170171 A1* | 6/2016 | Nagao | ...................... | G02B 7/10 |
| | | | | 359/700 |
| 2020/0200240 A1 | 6/2020 | Kondo | | |

FOREIGN PATENT DOCUMENTS

| | | |
|---|---|---|
| JP | 5-96813 U | 12/1993 |
| JP | 7-55527 Y2 | 12/1995 |
| JP | 10-282020 A | 10/1998 |
| JP | 2000-346173 A | 12/2000 |
| JP | 2008-191328 A | 8/2008 |
| JP | 2009-198625 A | 9/2009 |
| JP | 2010-282020 A | 12/2010 |
| JP | 2012-203196 A | 10/2012 |
| WO | WO 2012/132780 A1 | 10/2012 |
| WO | WO 2019/044150 A1 | 3/2019 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2019/010214, dated Oct. 8, 2020, with English translation of the Written Opinion.

International Search Report (Form PCT/ISA/210) for International Application No. PCT/JP2019/010214, dated Jun. 11, 2019, with English translation.

\* cited by examiner

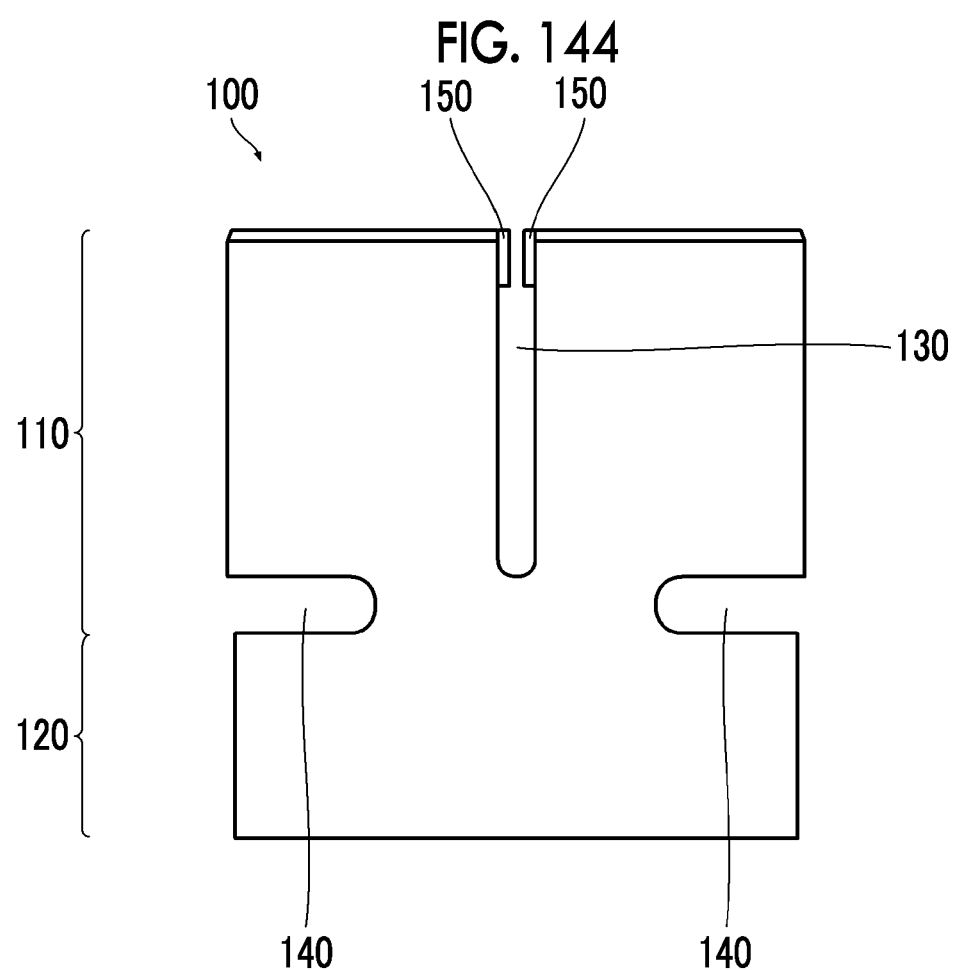

CAM FOLLOWER AND LENS BARREL

CROSS-REFERENCE TO RELATED APPLICATIONS

The present application is a Continuation of PCT International Application No. PCT/JP2019/010214 filed on Mar. 13, 2019 claiming priority under 35 U.S.C § 119(a) to Japanese Patent Application No. 2018-056958 filed on Mar. 23, 2018. Each of the above applications is hereby expressly incorporated by reference, in its entirety, into the present application.

BACKGROUND OF THE INVENTION

1. Field of the Invention

The present invention relates to a cam follower and a lens barrel, and more particularly, to a cam follower that is to be fitted to a straight groove and a cam groove and a lens barrel that uses the cam follower.

2. Description of the Related Art

In a case where there is backlash in the fitting between a cam follower and grooves (a cam groove and a straight groove) in a lens barrel for moving a lens group by a cam mechanism, there is a problem that the shift, tilt, or the like of an optical axis occurs. A method using elastically deformable cam followers is known as a method of solving this problem. Further, a method of allowing the cam follower to comprise slits is known as the method of allowing a cam follower to be elastically deformable (for example, JP2010-282020A, JP2009-198625A, and the like).

However, since the elastically deformable cam follower is excessively deformed in a case where the amount of deformation of an elastically deformable cam follower is not appropriately restricted, there is a problem that the tilt or the like of an optical axis is caused.

JP1995-055527Y (JP-H07-055527Y) proposes a method using a fixing screw provided on the inner peripheral portion of a cam follower as a method of restricting the amount of deformation of a cam follower. In JP1995-055527Y (JP-H07-055527Y), the amount of deformation of the cam follower is restricted through the adjustment of the width of a gap between the head portion of the fixing screw and the inner peripheral portion of the cam follower.

Further, JP2008-191328A proposes a method of restricting the amount of deformation of a cam follower by mounting the cam follower through a washer made of metal.

SUMMARY OF THE INVENTION

However, since a dedicated screw satisfying the condition of the gap should be prepared in the case of JP1995-055527Y (JP-H07-055527Y), there is a disadvantage that cost is increased. Further, since the washer is required in the case of JP2008-191328A, there are disadvantages that the number of parts and assembly man-hours are increased.

Meanwhile, a method of restricting the amount of deformation of a cam follower comprising slits through the adjustment of the widths of the slits is also considered. However, in a case where the amount of deformation to be allowed is very small (for example, 0.1 mm or less), it is difficult to manufacture a cam follower, which satisfies that condition, at a low cost. Particularly, in a case where a cam follower is formed by injection molding with a resin, it is difficult to manufacture a cam follower, which comprises very small slits, as an integrated molding.

The invention has been made in consideration of the above-mentioned circumstances, and an object of the invention is to provide a cam follower of which the amount of elastic deformation can be appropriately restricted with simple configuration and which can be easily manufactured and a lens barrel.

Means for solving the above-mentioned problems are as follows.

(1) A cam follower that is to be fitted into a straight groove and a cam groove, comprising:
    a hollow cam follower body of which a distal end is open;
    a first slit that is cut toward a proximal end from the distal end of the cam follower body; and
    a protruding portion that is provided on at least one inner wall surface of the first slit and restricts deformation of the cam follower body equal to or larger than a defined amount of deformation in a radial direction.

According to this aspect, the cam follower includes a hollow cam follower body of which a distal end is open. The cam follower body includes a first slit that is cut toward a proximal end from the distal end. The cam follower body is adapted to be elastically deformable in the radial direction by the first slit. The first slit includes a protruding portion on at least one inner wall surface thereof. In a case where the cam follower body is deformed in the radial direction by a defined amount of deformation, the protruding portion is in contact with the inner wall surface of the first slit facing itself (In a case where protruding portions are provided on both the inner wall surfaces of the first slit so as to face each other, the protruding portions facing each other are in contact with each other.). Accordingly, subsequent deformation is restricted. According to the cam follower of this aspect, it is possible to appropriately restrict the amount of elastic deformation of the cam follower with simple configuration as described above. Further, since the first slit only needs to have a predetermined width at only the protruding portion, the cam follower can be easily manufactured even in a case where the cam follower is to be formed by injection molding with, for example, a resin.

(2) The cam follower according to (1),
    wherein the protruding portion is provided on one inner wall surface of the first slit.

According to this aspect, the protruding portion is provided on one inner wall surface of the first slit. In this case, in a case where the cam follower body is deformed in the radial direction, the protruding portion is in contact with the inner wall surface of the first slit facing itself.

(3) The cam follower according to (1),
    wherein the protruding portions are provided on both inner wall surfaces of the first slit.

According to this aspect, the protruding portions are provided on both inner wall surfaces of the first slit. In this case, the protruding portions may be arranged so as to face each other or may be arranged to be shifted from each other. In a case where the protruding portions are arranged so as to face each other and the cam follower body is deformed in the radial direction, the protruding portions are in contact with each other. In a case where the protruding portions are arranged so as to be shifted from each other and the cam follower body is deformed in the radial direction, the protruding portions are in contact with the inner wall surfaces of the first slit facing themselves.

(4) The cam follower according to (3),
wherein the protruding portions are provided on both the inner wall surfaces of the first slit so as to face each other.

According to this aspect, the protruding portions are arranged on both the inner wall surfaces of the first slit so as to face each other. In this case, the protruding portions are in contact with each other in a case where cam follower body is deformed in the radial direction.

(5) The cam follower according to any one of (1) to (4), wherein a distal end of the protruding portion has a shape of an arc.

According to this aspect, a distal end of the protruding portion has a shape of an arc. Accordingly, the protruding portions can be in point contact with each other in a case where the protruding portions are in contact with each other.

(6) The cam follower according to any one of (1) to (4), wherein the protruding portion restricts deformation equal to or larger than a sum of a positional tolerance and a width tolerance of the cam groove.

According to this aspect, deformation equal to or larger than the sum of the positional tolerance and the width tolerance of the cam groove is restricted as deformation equal to or larger than a defined amount of deformation to be restricted by the protruding portions. Accordingly, the deformation of the cam follower body is appropriately suppressed.

(7) The cam follower according to (6),
wherein the first slit has a width equal to the sum of the positional tolerance and the width tolerance of the cam groove at a position of the protruding portion.

According to this aspect, the width of the first slit at the position of the protruding portion is set to a width equal to the sum of the positional tolerance and the width tolerance of the cam groove. Accordingly, crush and deformation equal to or larger than the sum of the positional tolerance and the width tolerance of the cam groove can be restricted. Here, "the width of the first slit at the position of the protruding portion" means the width of the first slit at a position where the protruding portion is provided. This width is the width of the narrowest portion in the width of the first slit. In a case where the protruding portion is provided on only one inner wall surface of the first slit, a distance between the distal end of the protruding portion and the inner wall surface facing the protruding portion is the width of the first slit at the position of the protruding portion. In a case where the protruding portions are provided on both the inner wall surfaces of the first slit so as to face each other, a width between the protruding portions is the width of the first slit at the position of the protruding portions. Further, "the positional tolerance of the cam groove" refers to the tolerance of each of the arrangement positions of the cam grooves that are arranged at regular intervals on the peripheral surface of the cam barrel (the positional tolerance is also referred to as an angular tolerance or a difference). Furthermore, "the width tolerance of the cam groove" refers to the tolerance of the width of the cam groove. The range of "an equal width" includes a range that is considered to be substantially equal". That is, the range of "an equal width" includes a substantially equal range.

(8) The cam follower according to (7),
wherein the first slit has a width of 0.06 mm or less at the position of the protruding portion.

According to this aspect, the width of the first slit at the position of the protruding portion is set to 0.06 mm or less. In the case of a lens barrel for a camera, the sum of the positional tolerance and the width tolerance of the cam groove is set to about 0.06 mm or less. Meanwhile, in a case where the cam follower is formed by injection molding with a resin, it is difficult to form a slit of which the width is 0.06 mm or less over the entire length. However, in a case where the slit partially has a width of 0.06 mm or less, the cam follower can be stably manufactured even in a case where the cam follower is formed by injection molding with a resin.

(9) The cam follower according to any one of (1) to (8),
wherein the first slits are provided at a plurality of positions at regular intervals in a circumferential direction of the cam follower body.

According to this aspect, the first slits are provided at a plurality of positions at regular intervals in a circumferential direction of the cam follower body.

(10) The cam follower according to any one of (1) to (9),
wherein a surface of the cam follower body to be in contact with an inner wall surface of the cam groove and a surface of the cam follower body to be in contact with an inner wall surface of the straight groove have a shape of an arc that is convex outward.

According to this aspect, a surface of the cam follower body to be in contact with an inner wall surface of the cam groove and a surface of the cam follower body to be in contact with an inner wall surface of the straight groove have a shape of an arc that is convex outward. Accordingly, since the cam follower body is in point contact with the cam groove and the straight groove, the elasticity of the cam follower can be efficiently used. In addition, since the sliding resistance of the cam follower against the inner wall surfaces of the each groove can be reduced, the cam follower can be smoothly operated.

(11) The cam follower according to any one of (1) to (10), further comprising:
a second slit that is cut toward an inner peripheral portion from an outer peripheral portion of the cam follower body in a direction orthogonal to an axis.

According to this aspect, the cam follower body is provided with a second slit. The second slit is cut toward an inner peripheral portion from an outer peripheral portion of the cam follower body in a direction orthogonal to an axis. Since the second slit is provided, the influence of the deformation of a portion fitted into one groove (the cam groove or the straight groove) on a portion fitted into the other groove (the cam groove or the straight groove) can be reduced. Accordingly, only a necessary portion can be made to be elastically deformed. Therefore, even though there is a variation in the machining accuracy of each groove, the cam follower can be made to appropriately be in pressure contact with each groove. As a result, the occurrence of backlash can be appropriately prevented. Further, in a case where the proximal end portion of the cam follower is mounted by press-fitting, the influence of the deformation of a portion fitted into each groove on the shape of a press-fitting portion can be reduced.

(12) The cam follower according to any one of (1) to (11),
wherein the cam follower is an integrated molding made of a resin.

According to this aspect, the cam follower is formed as an integrated molding made of a resin. That is, the cam follower is formed by injection molding with a resin using a predetermined mold.

(13) A lens barrel comprising:
a first barrel that holds a lens;
a second barrel that includes the cam groove;
a third barrel that includes the straight groove; and the cam follower according to any one of (1) to (12) that is provided on the first barrel and is to be fitted into the straight groove and the cam groove, wherein the first barrel is moved along an optical axis by relative rotation of the second and third barrels.

According to this aspect, the cam follower according to any one of (1) to (12) is used for a cam mechanism for driving a lens. Accordingly, since the shift, tilt, and the like of the optical axis can be prevented, excellent optical performance can be maintained.

(14) The lens barrel according to (13), wherein the cam follower is provided at a position away from a centroid of the first barrel.

According to this aspect, the cam follower is provided at a position away from a centroid of the first barrel. In a case where the cam follower is provided at a position away from the centroid of the first barrel, moment acts on the cam follower. However, in a case where the cam follower according to any one of (1) to (12) is used, the excessive crush and deformation of the cam follower can be prevented even in a case where large moment acts on the cam follower. Accordingly, excellent optical performance can be maintained.

(15) The lens barrel according to (14), wherein the lens is held at one end portion of the first barrel, and the cam follower is provided at the other end portion of the first barrel.

According to this aspect, the lens is held at one end portion of the first barrel and the cam follower is provided at the other end portion of the first barrel. Since the cam follower is disposed at a position significantly away from the centroid of the first barrel in this configuration, large moment acts on the cam follower. However, in a case where the cam follower according to any one of (1) to (12) is used, the excessive crush and deformation of the cam follower can be prevented even in a case where large moment acts on the cam follower. Accordingly, excellent optical performance can be maintained.

According to the invention, the amount of elastic deformation of the cam follower can be appropriately restricted with simple configuration and the cam follower can be easily manufactured.

Figure 3:
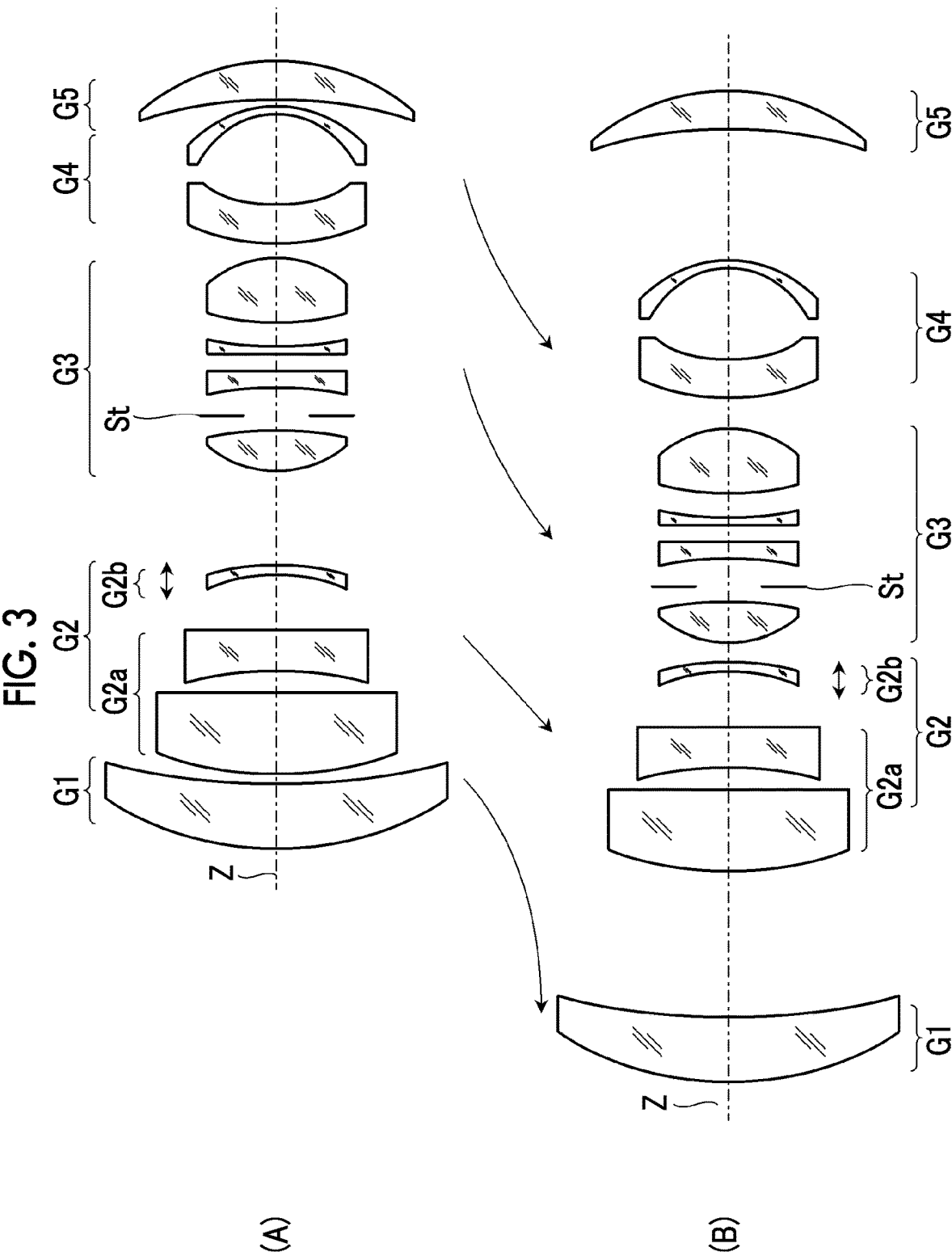

(A) and (B) of FIG. 3 are diagrams showing the movement states of the respective lens groups in a case where an operation for changing a magnification is performed.

Figure 1:
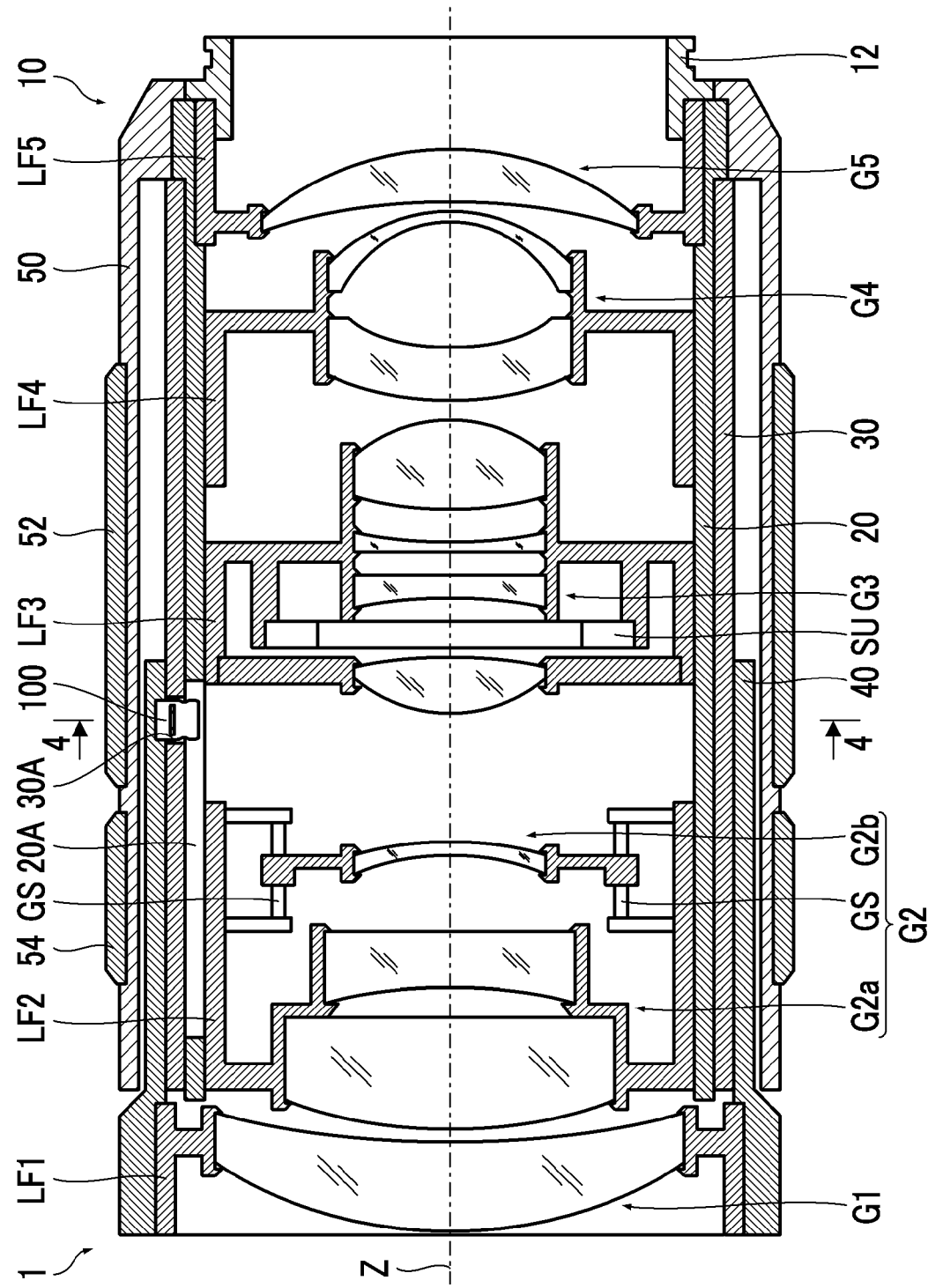
FIG. 1 is a cross-sectional view showing the schematic configuration of an interchangeable lens to which the invention is applied (wide-angle end).
Figure 4:
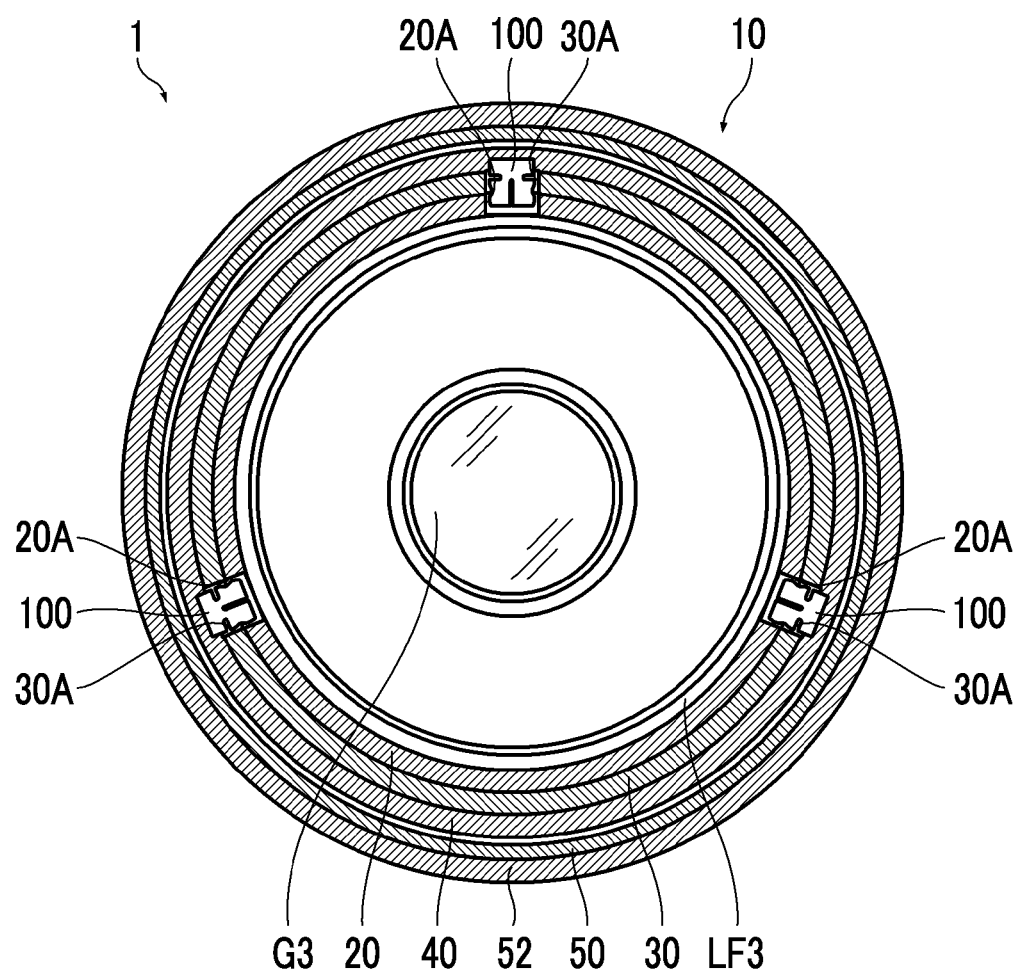

FIG. 4 is a cross-sectional view taken along line 4-4 of FIG. 1.

Figure 5:
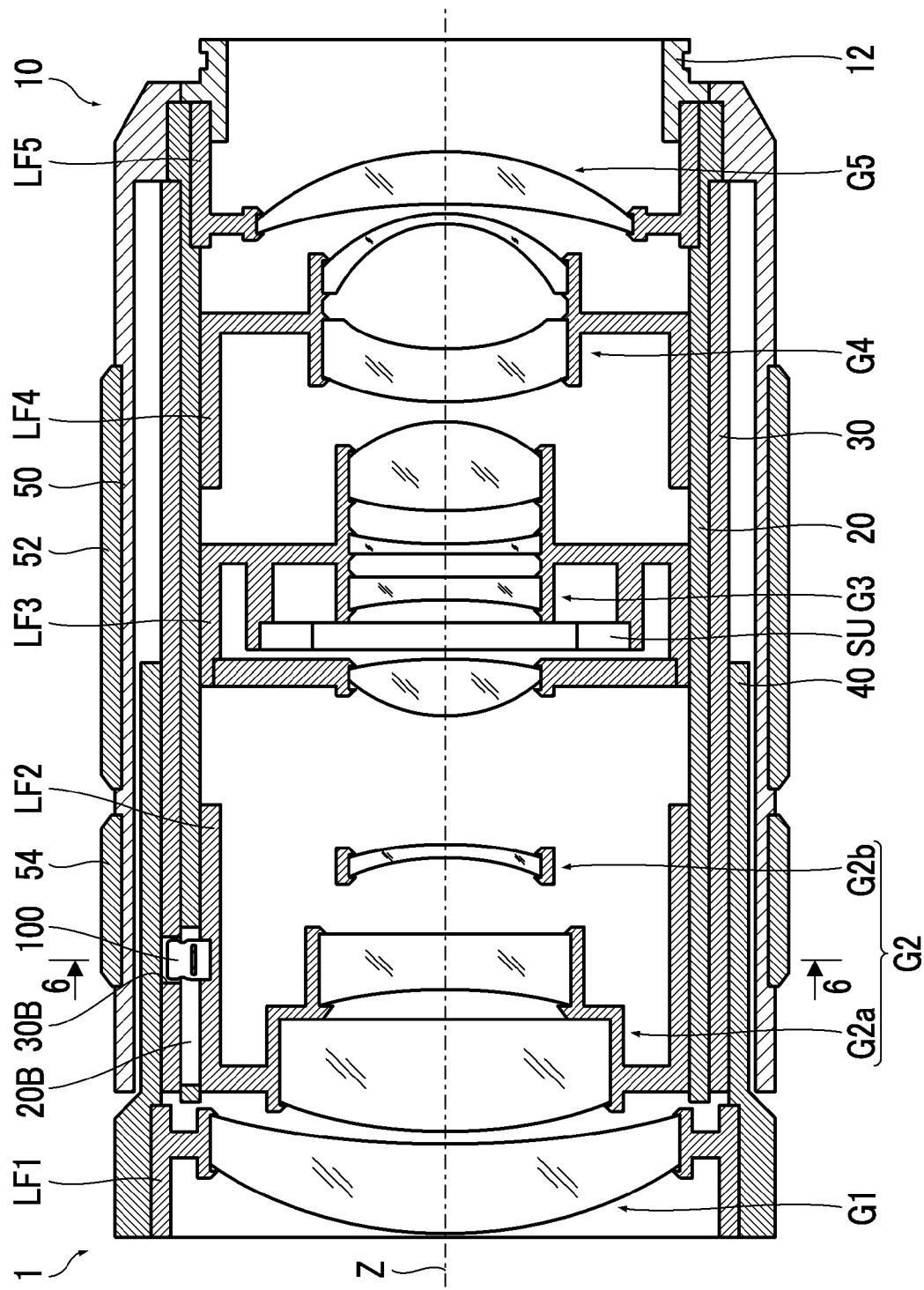

FIG. 5 is a cross-sectional view showing configuration relating to the drive of a second lens holding frame.

Figure 6:
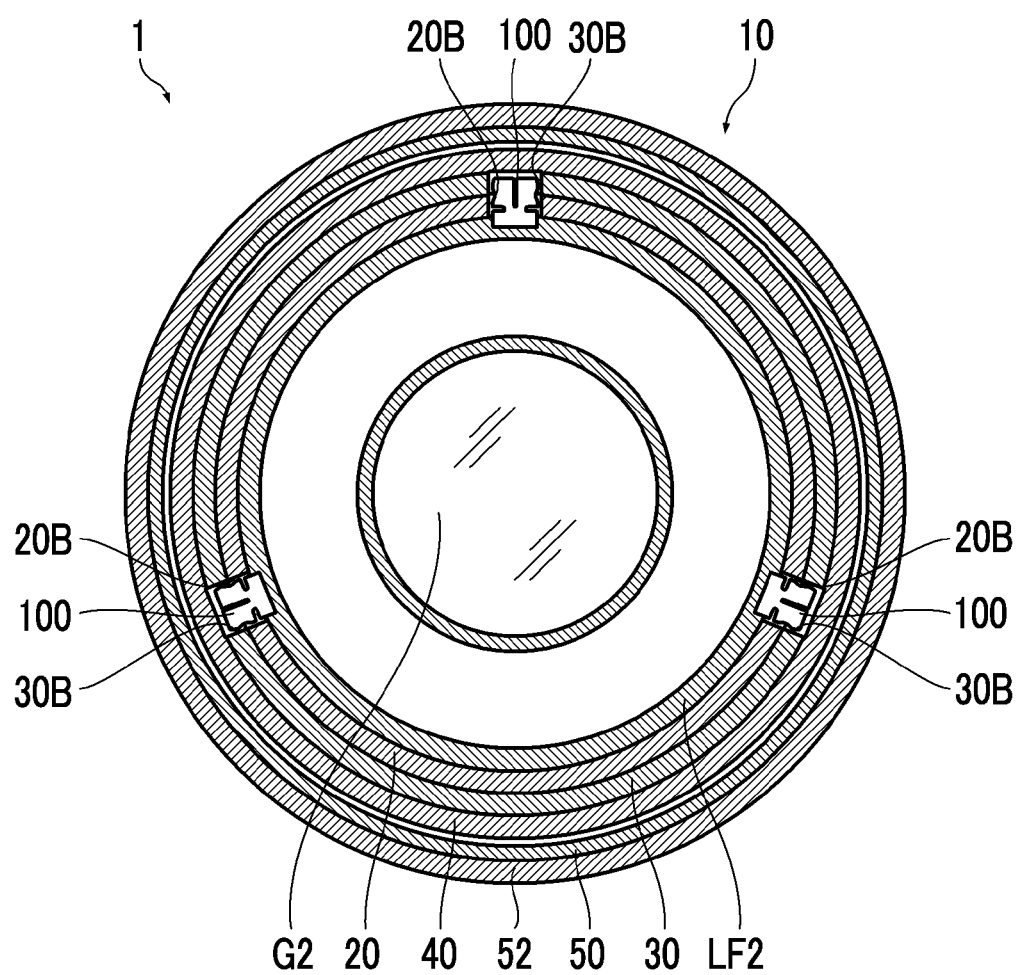

FIG. 6 is a cross-sectional view taken along line 6-6 of FIG. 5.

Figure 7:
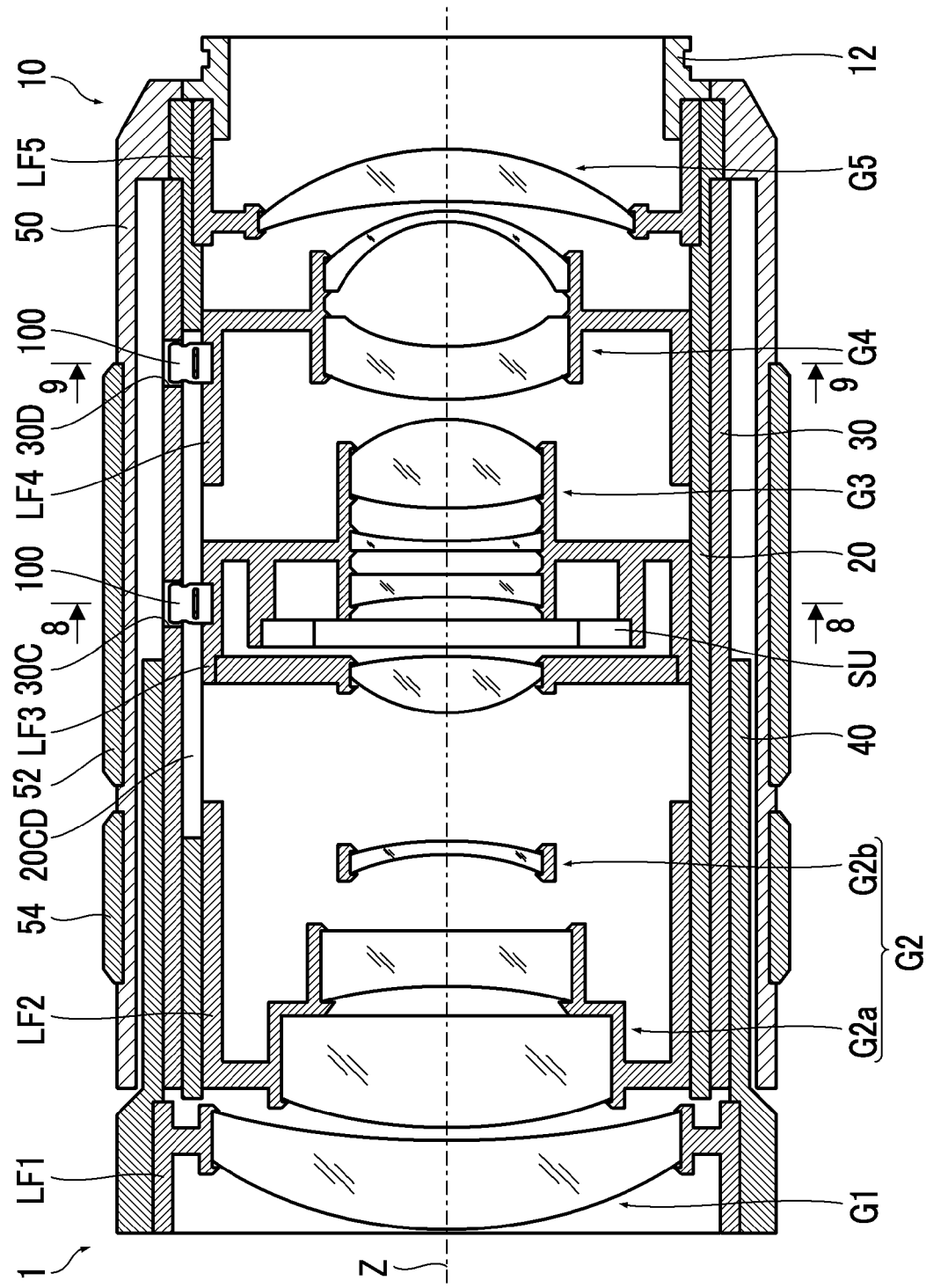

FIG. 7 is a cross-sectional view showing configuration relating to the drive of a third lens holding frame and a fourth lens holding frame.

Figure 8:
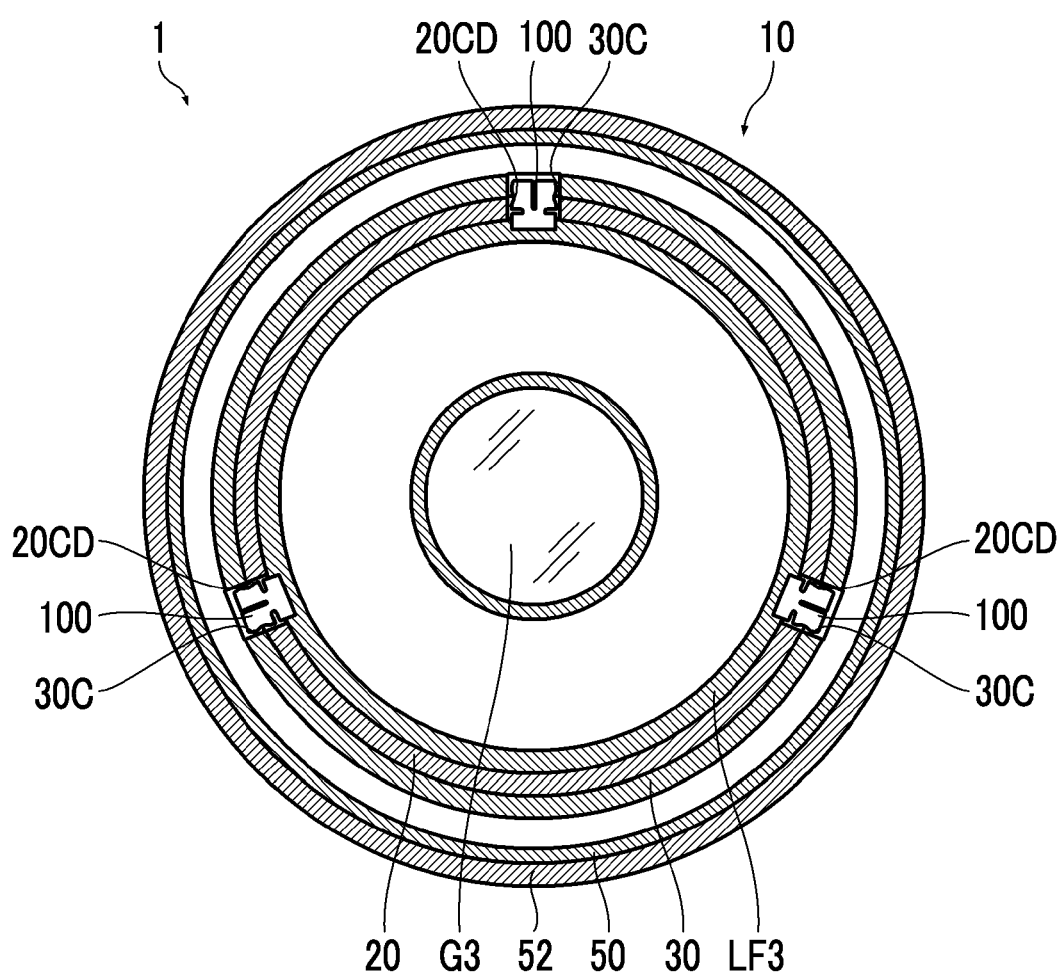

FIG. 8 is a cross-sectional view taken along line 8-8 of FIG. 7.

Figure 9:
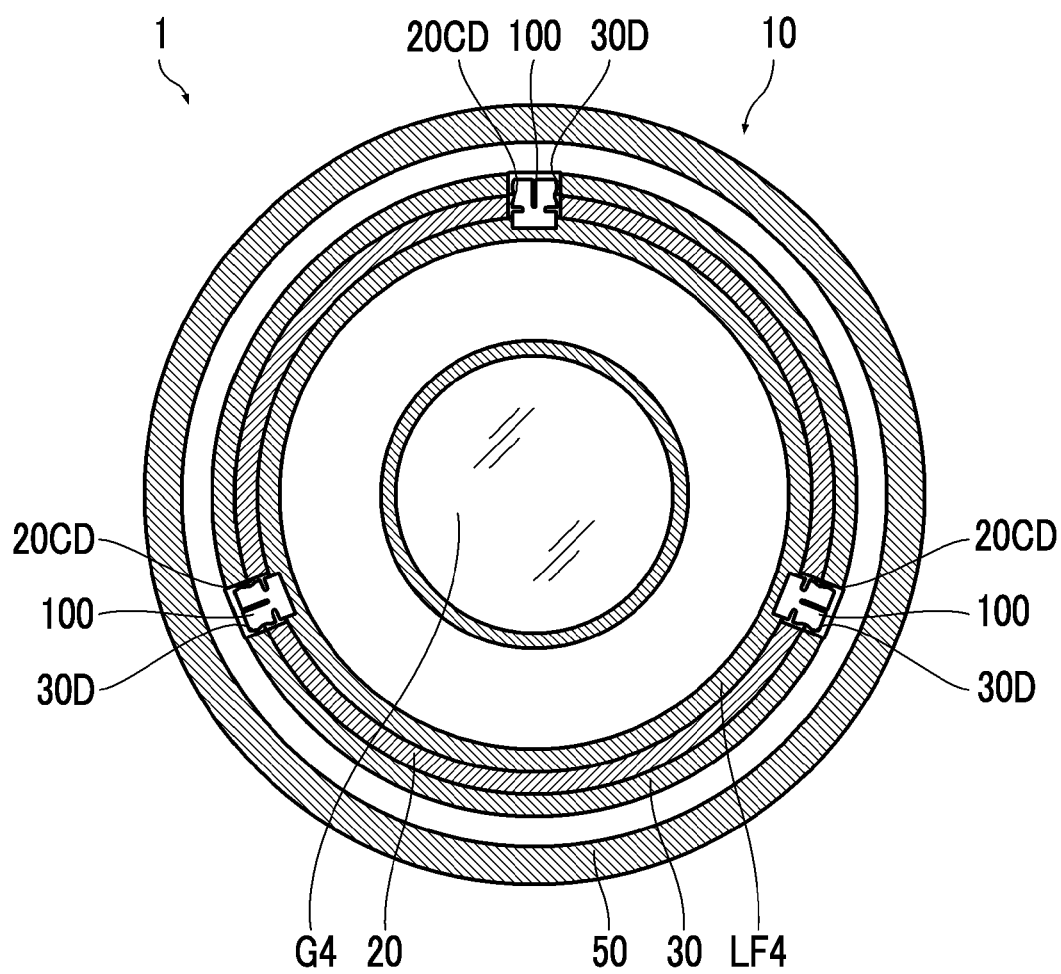

FIG. 9 is a cross-sectional view taken along line 9-9 of FIG. 7.

Figure 10:
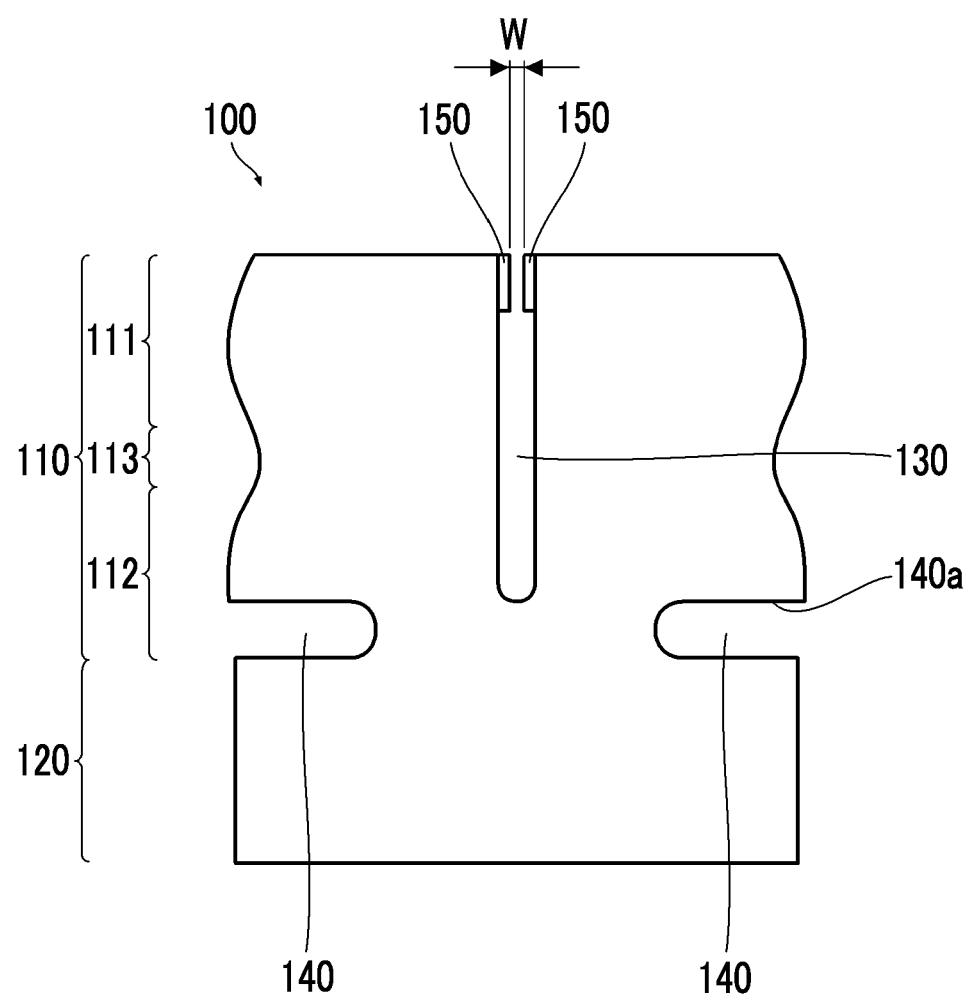

FIG. 10 is a front view of a cam follower.

Figure 11:
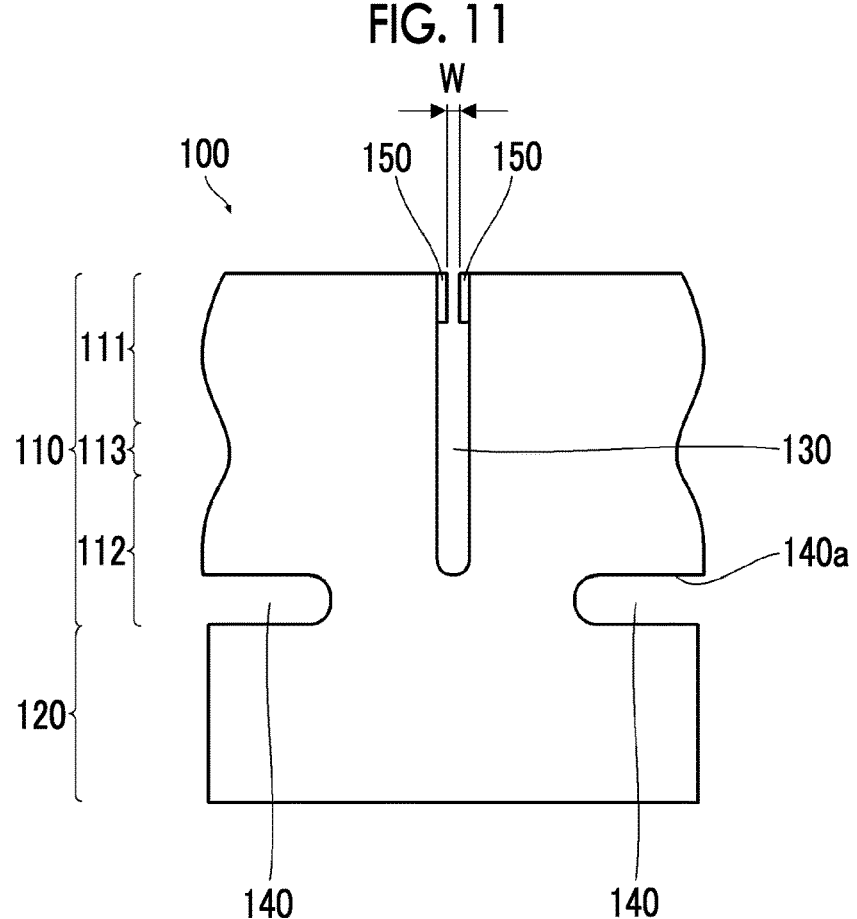

FIG. 11 is a back view of the cam follower.

Figure 12:
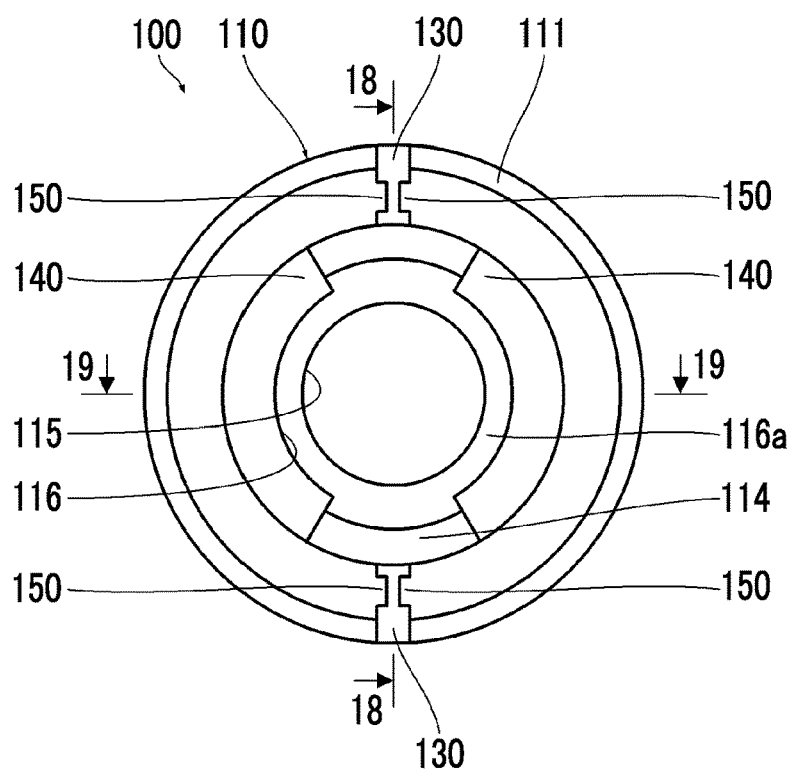

FIG. 12 is a plan view of the cam follower.

Figure 13:
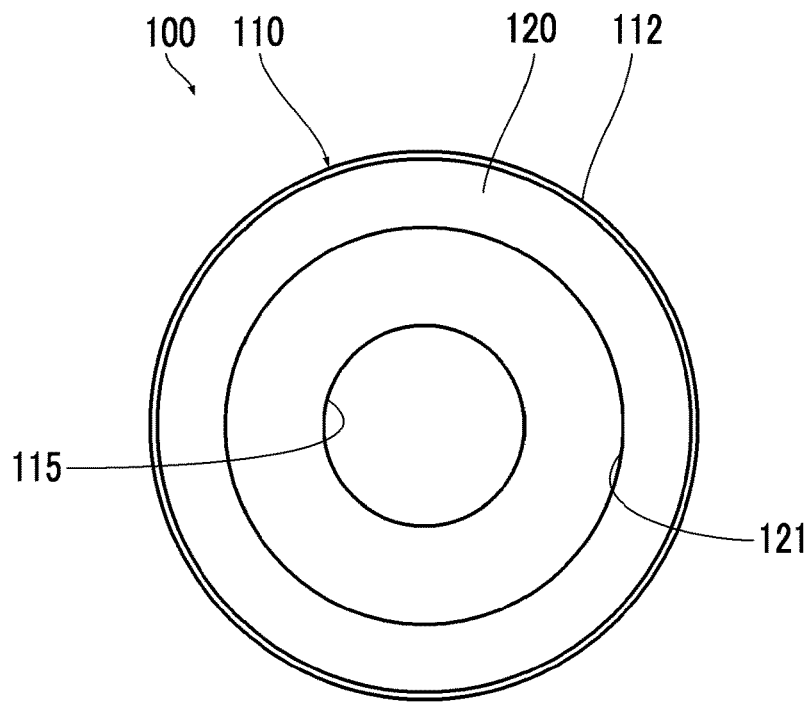

FIG. 13 is a bottom view of the cam follower.

Figure 14:
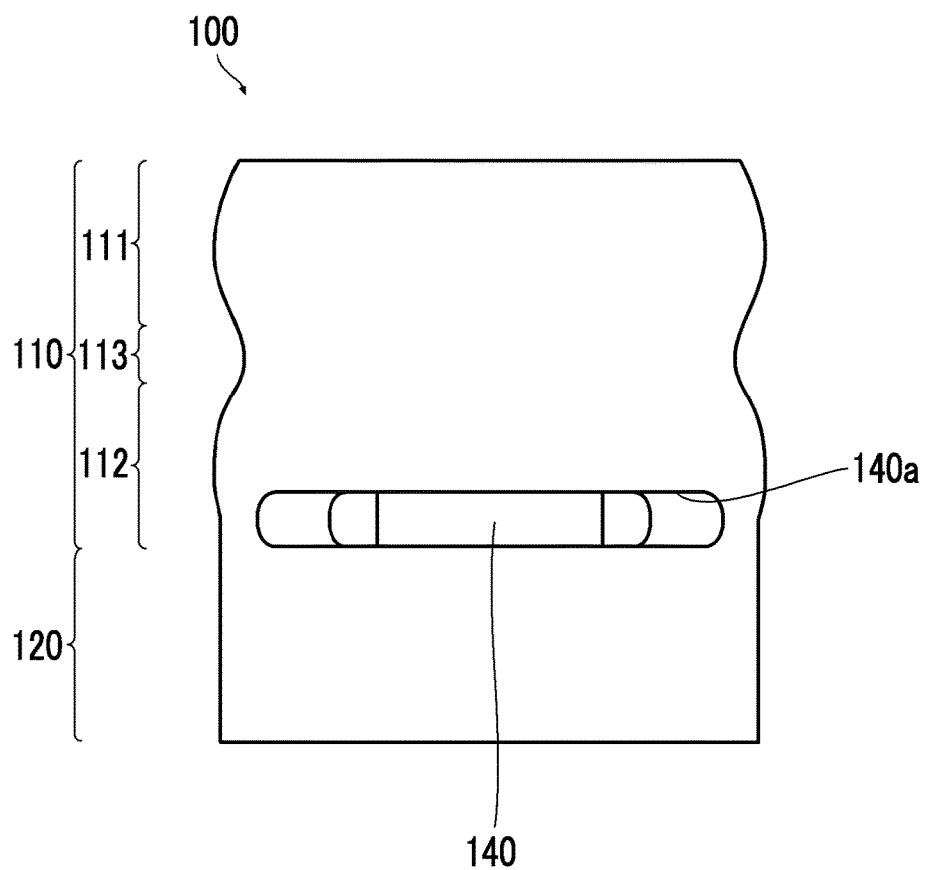

FIG. 14 is a right side view of the cam follower.

Figure 15:
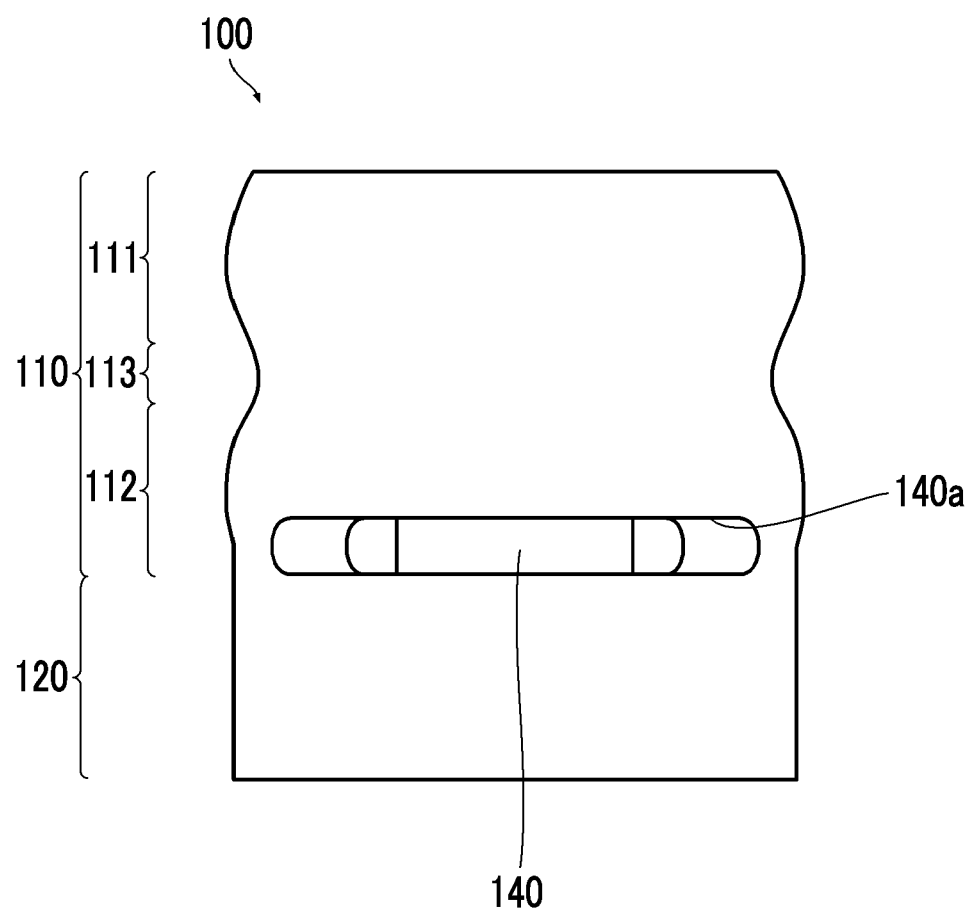

FIG. 15 is a left side view of the cam follower.

Figure 16:
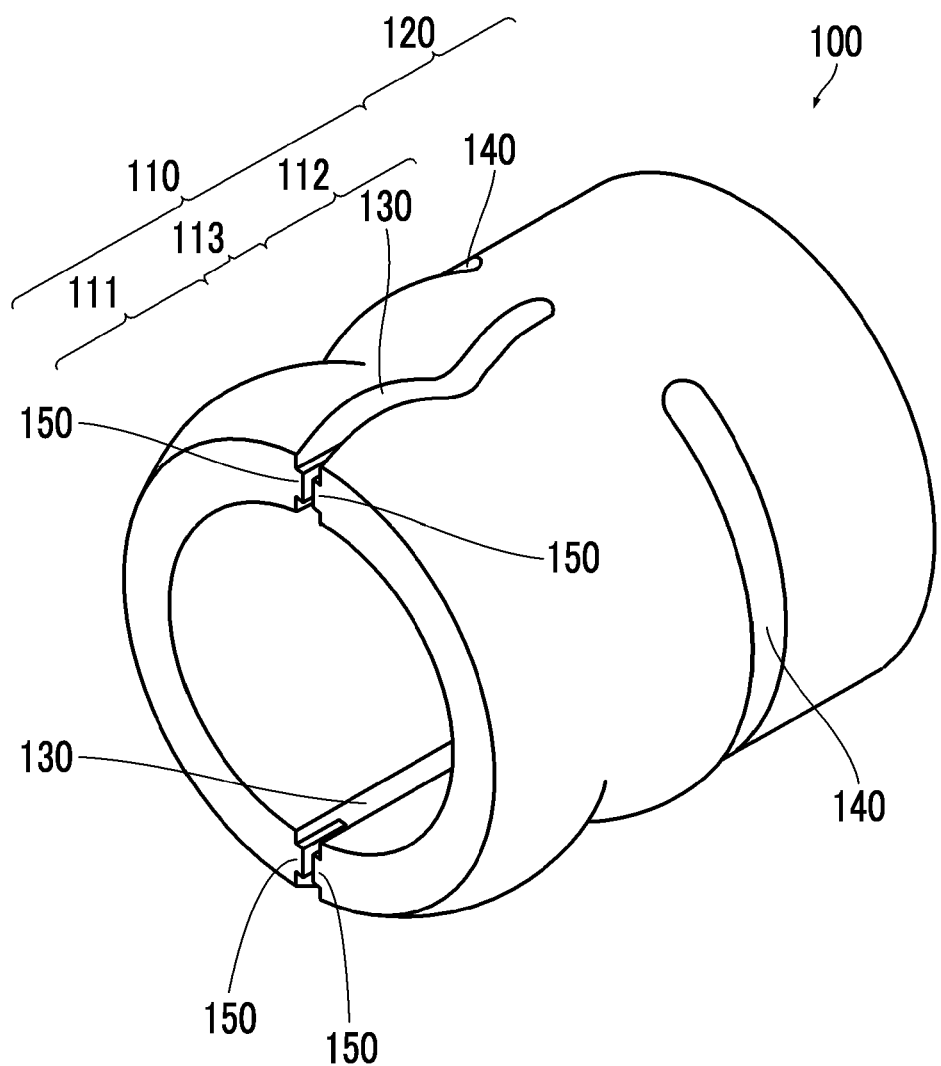

FIG. 16 is a perspective view of the cam follower that is viewed from a surface side.

Figure 17:
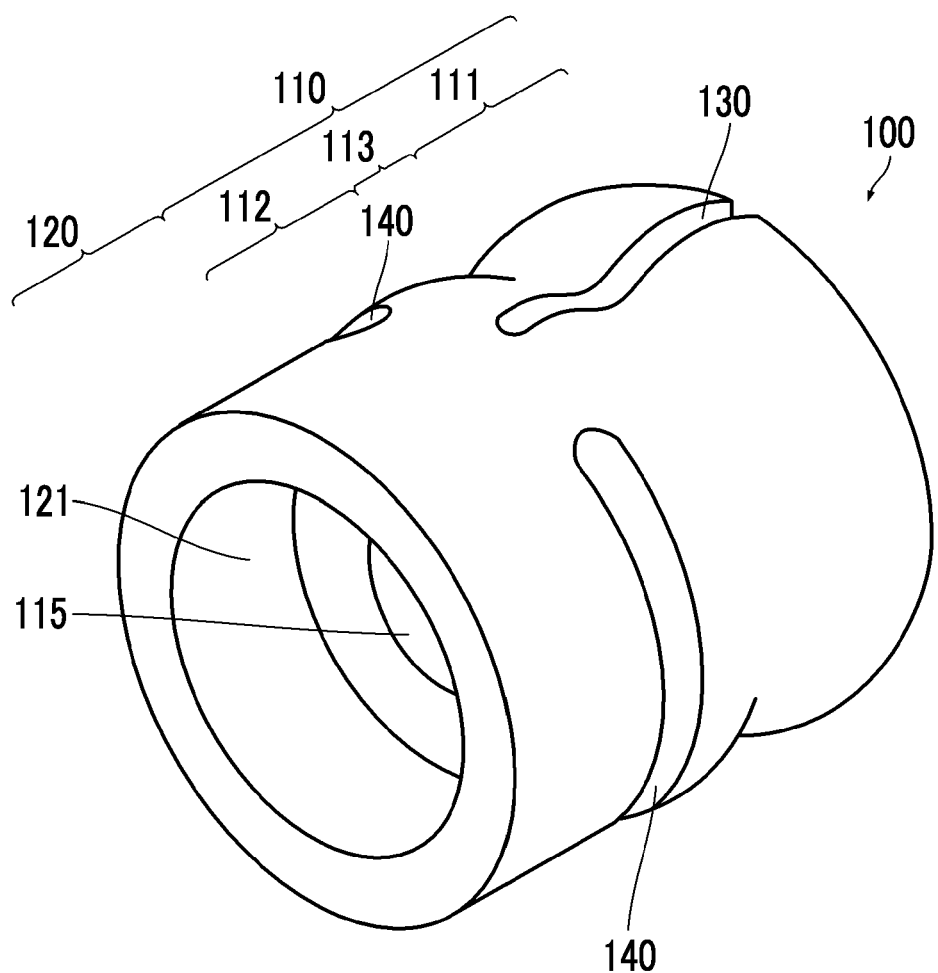

FIG. 17 is a perspective view of the cam follower that is viewed from a bottom side.

Figure 18:
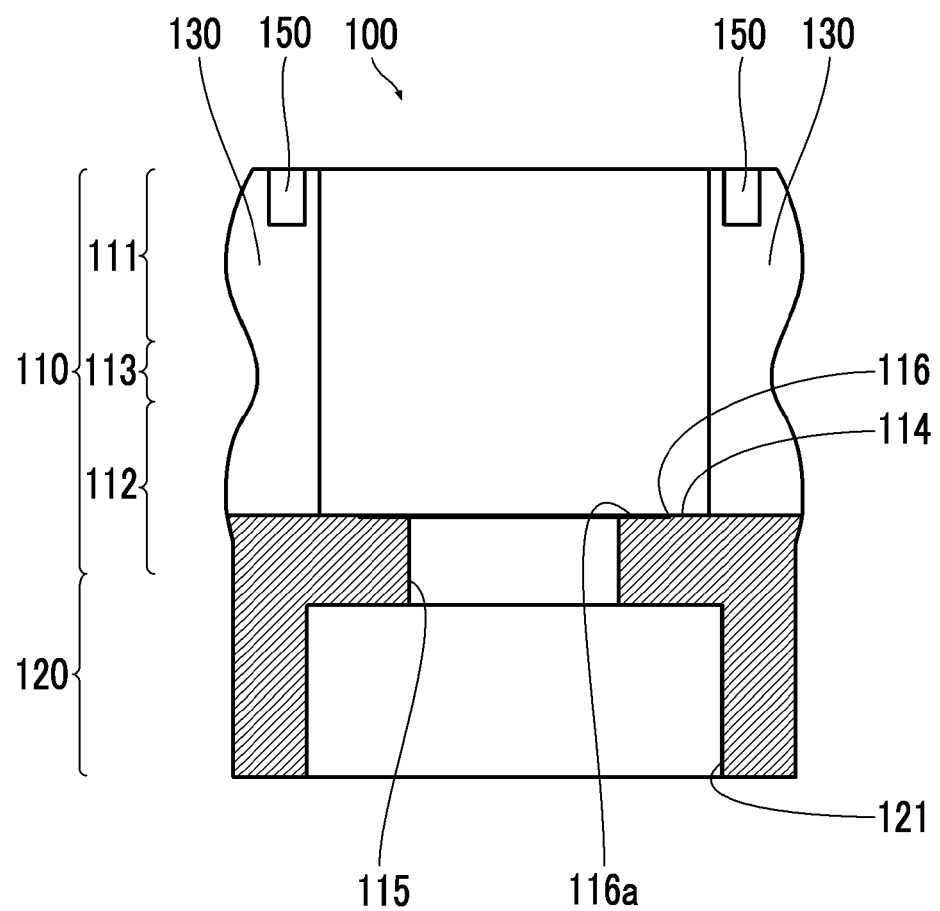

FIG. 18 is a cross-sectional view taken along line 18-18 of FIG. 12.

Figure 19:
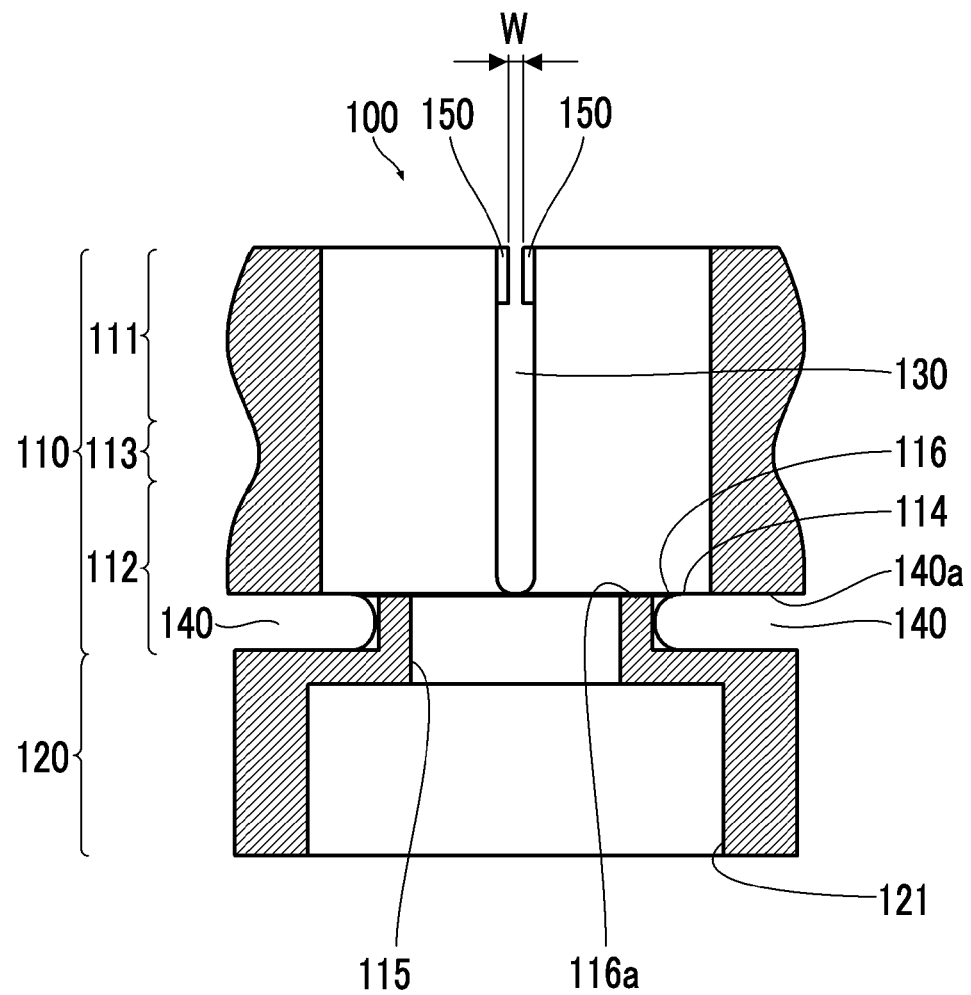

FIG. 19 is a cross-sectional view taken along line 19-19 of FIG. 12.

Figure 20:
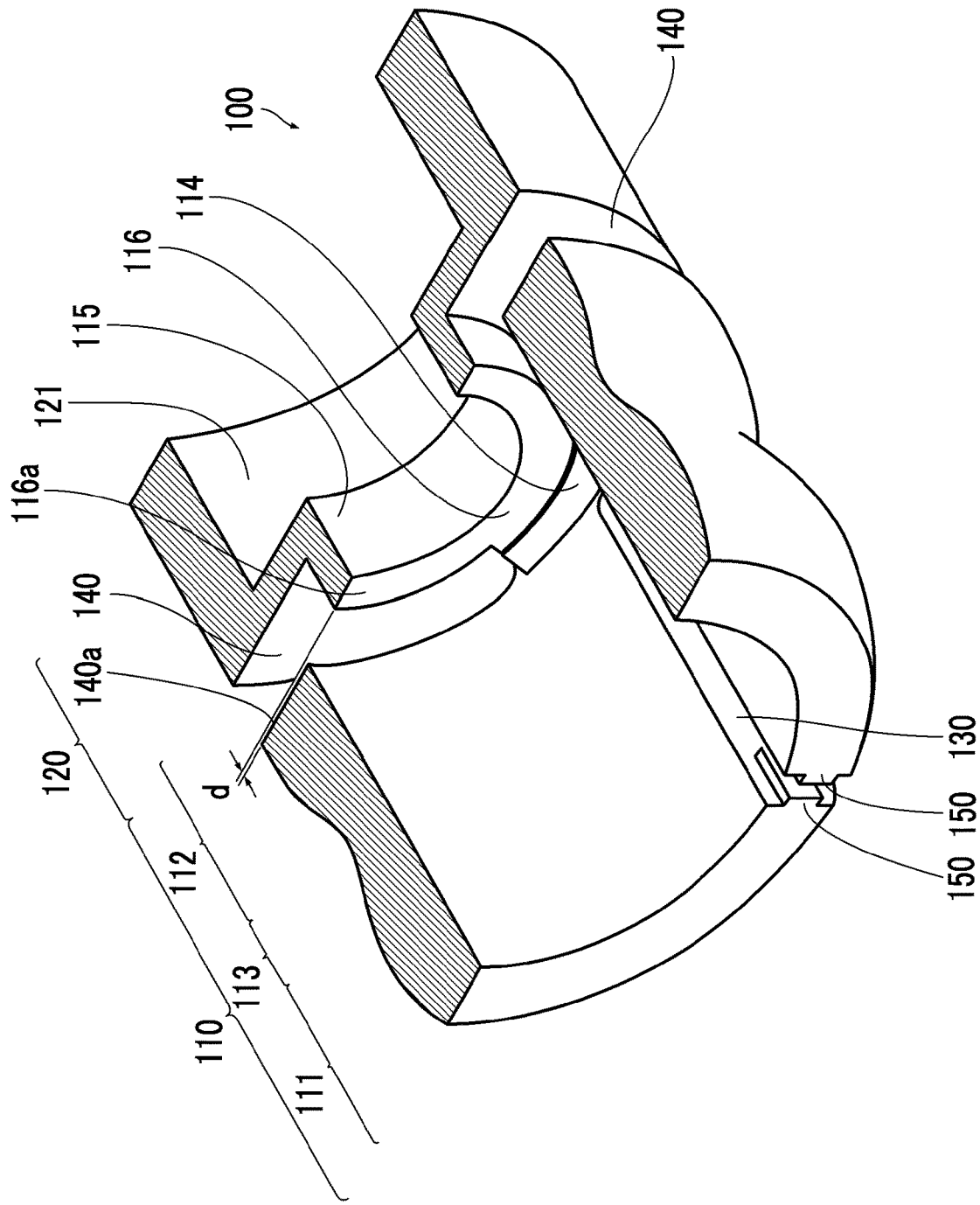

FIG. 20 is a cross-sectional perspective view of the cam follower.

Figure 21:
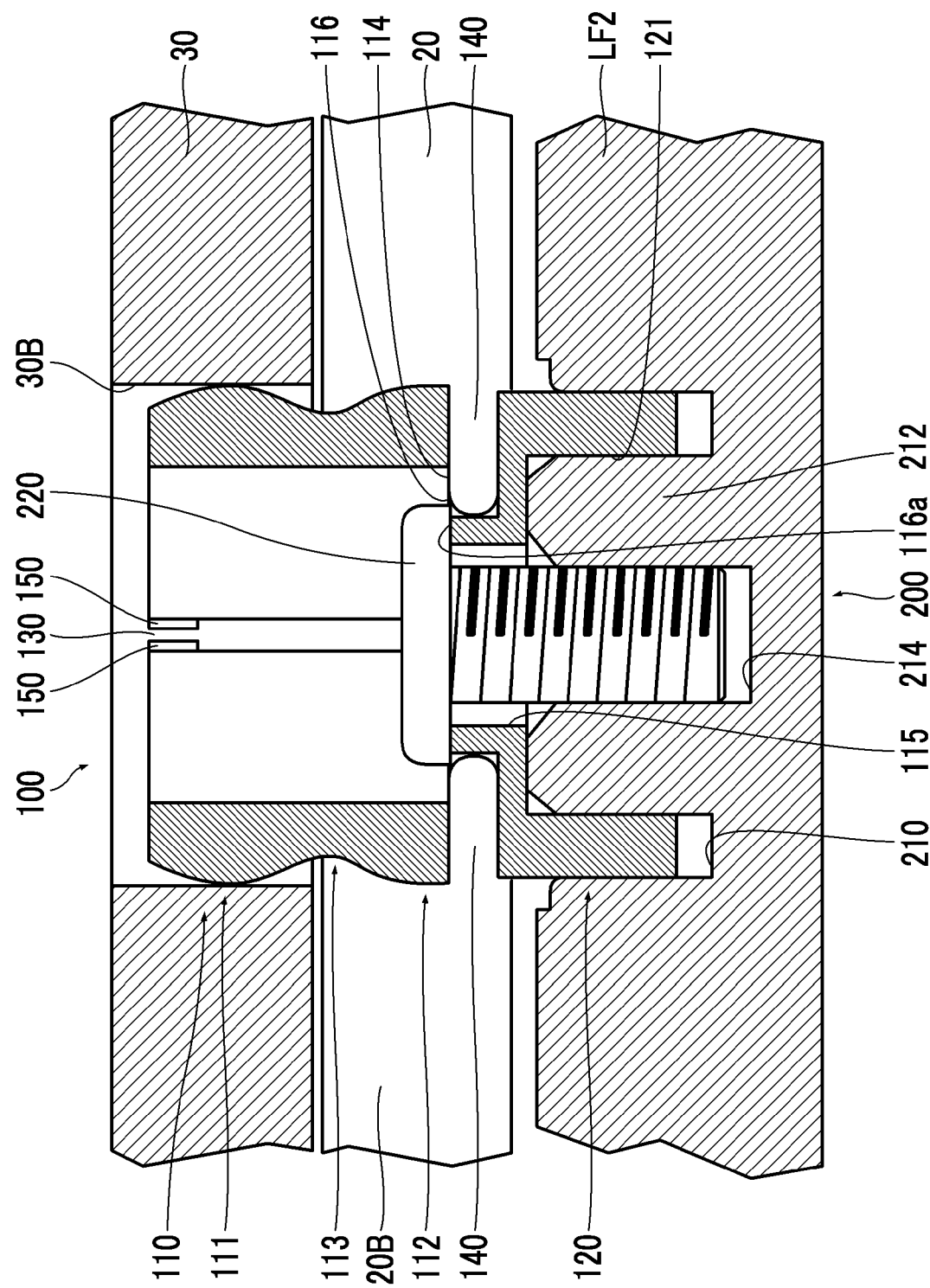

FIG. 21 is a cross-sectional view showing the configuration of a cam follower-mounting portion.

Figure 22:
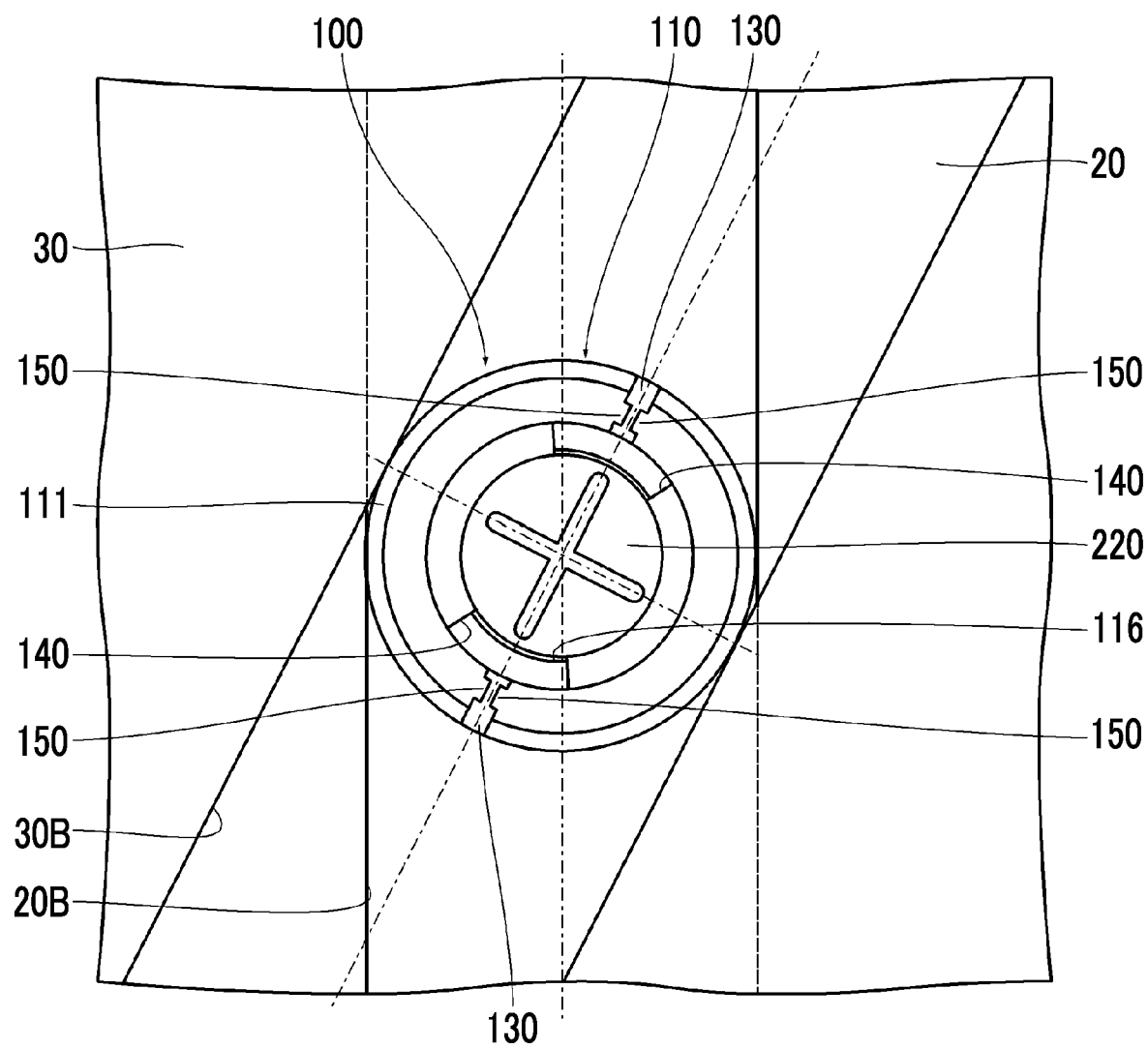

FIG. 22 is a plan view showing the mounting attitude of the cam follower.

Figure 23:
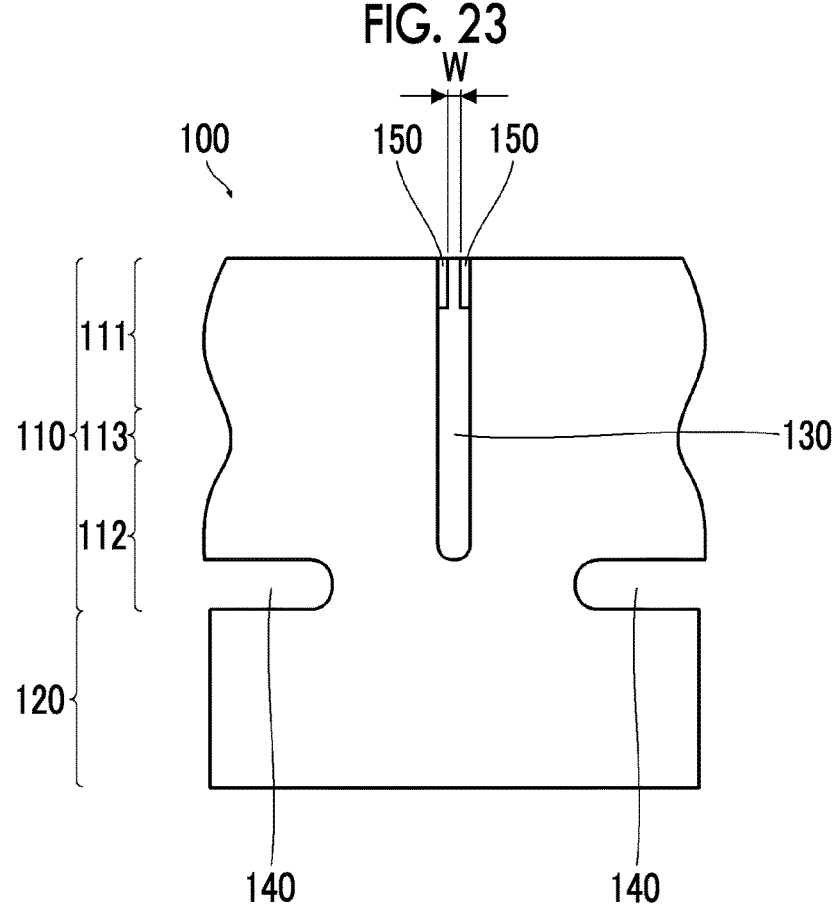

FIG. 23 is a front view of a cam follower that comprises one first slit.

Figure 24:
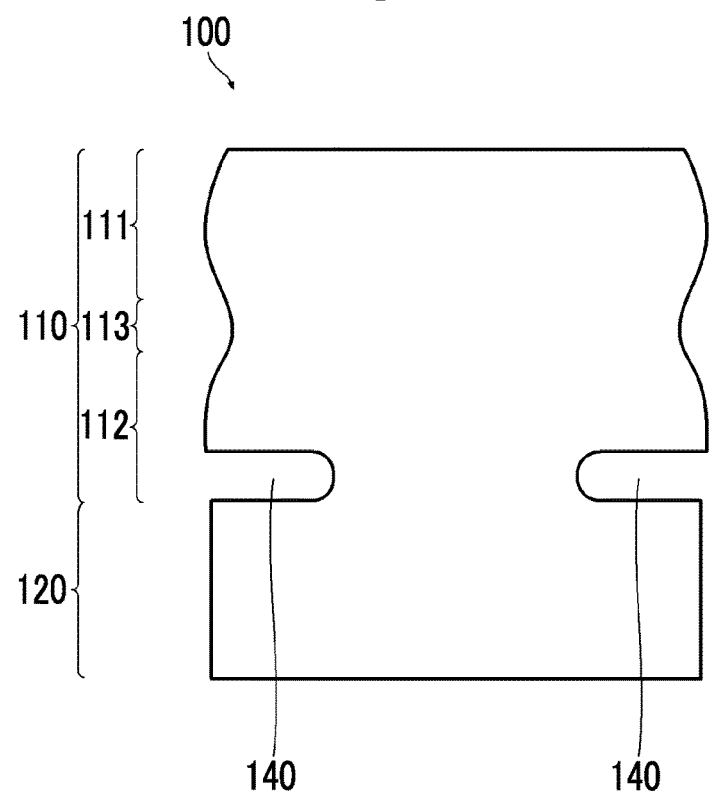

FIG. 24 is a back view of the cam follower shown in FIG. 23.

Figure 25:
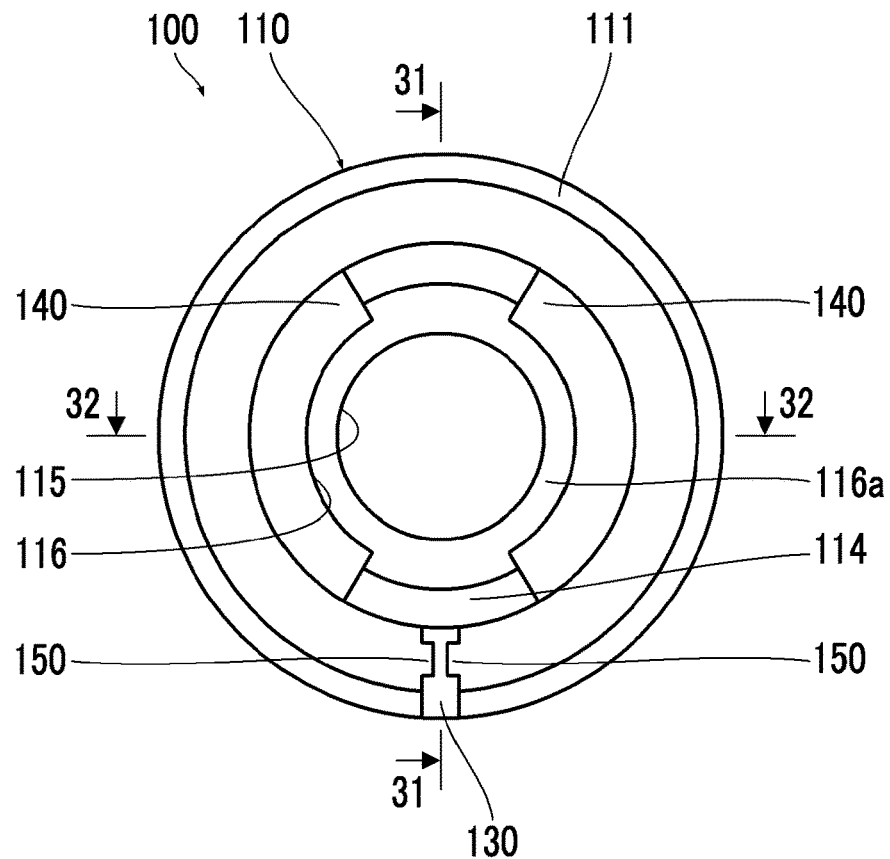

FIG. 25 is a plan view of the cam follower shown in FIG. 23.

Figure 26:
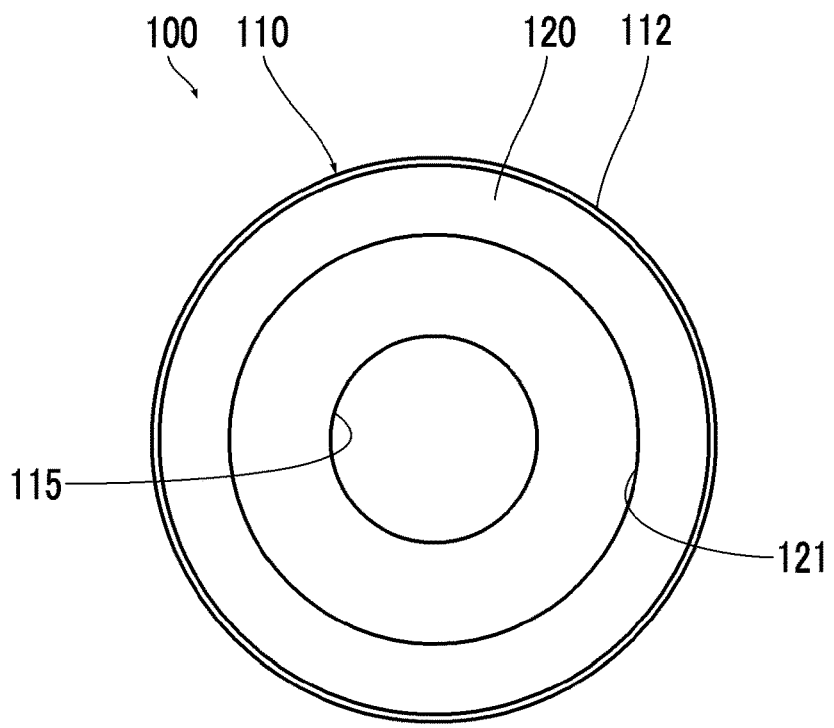

FIG. 26 is a bottom view of the cam follower shown in FIG. 23.

Figure 27:
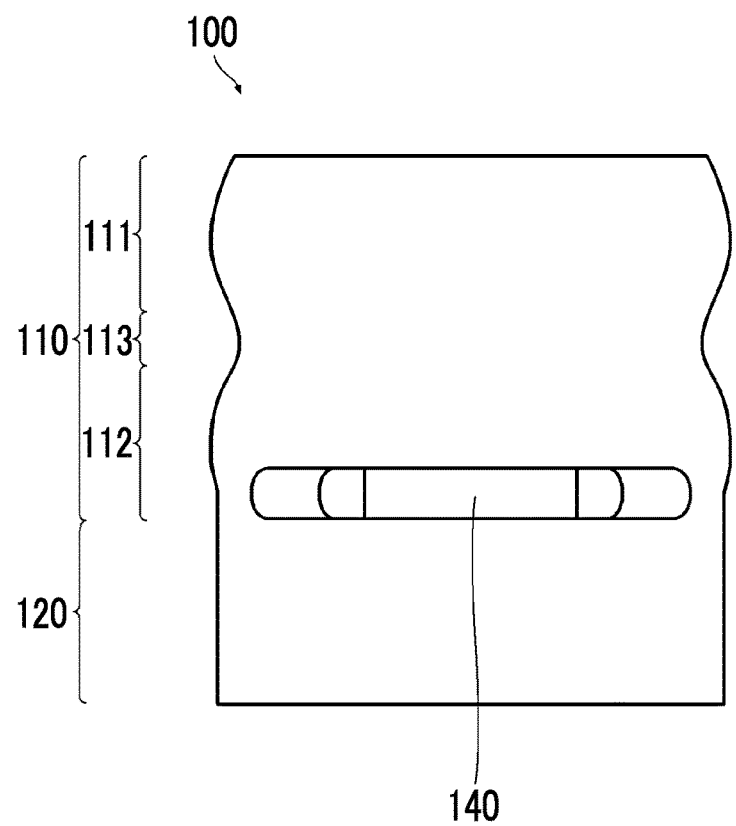

FIG. 27 is a right side view of the cam follower shown in FIG. 23.

Figure 28:
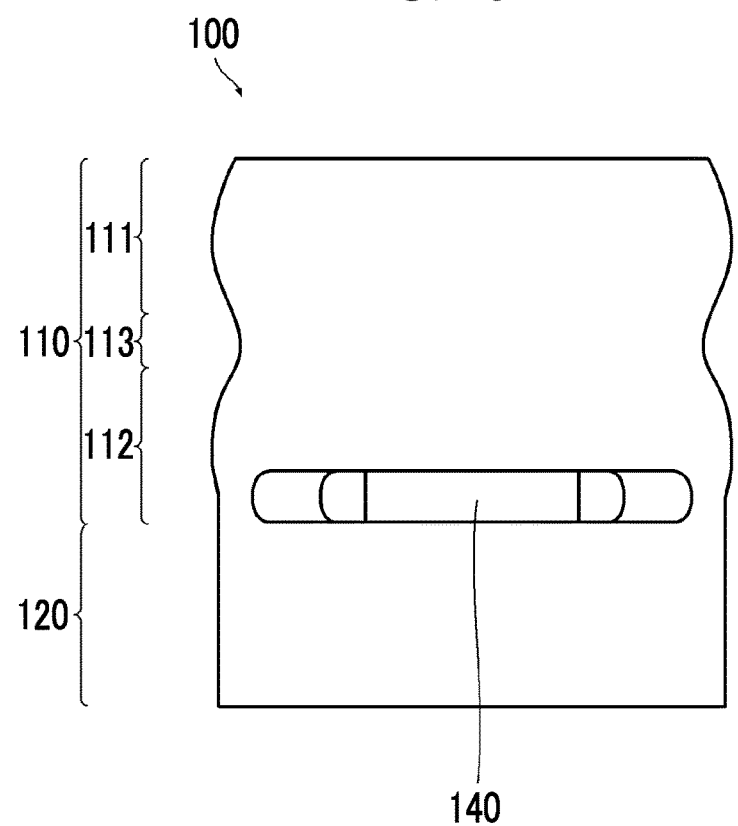

FIG. 28 is a left side view of the cam follower shown in FIG. 23.

Figure 29:
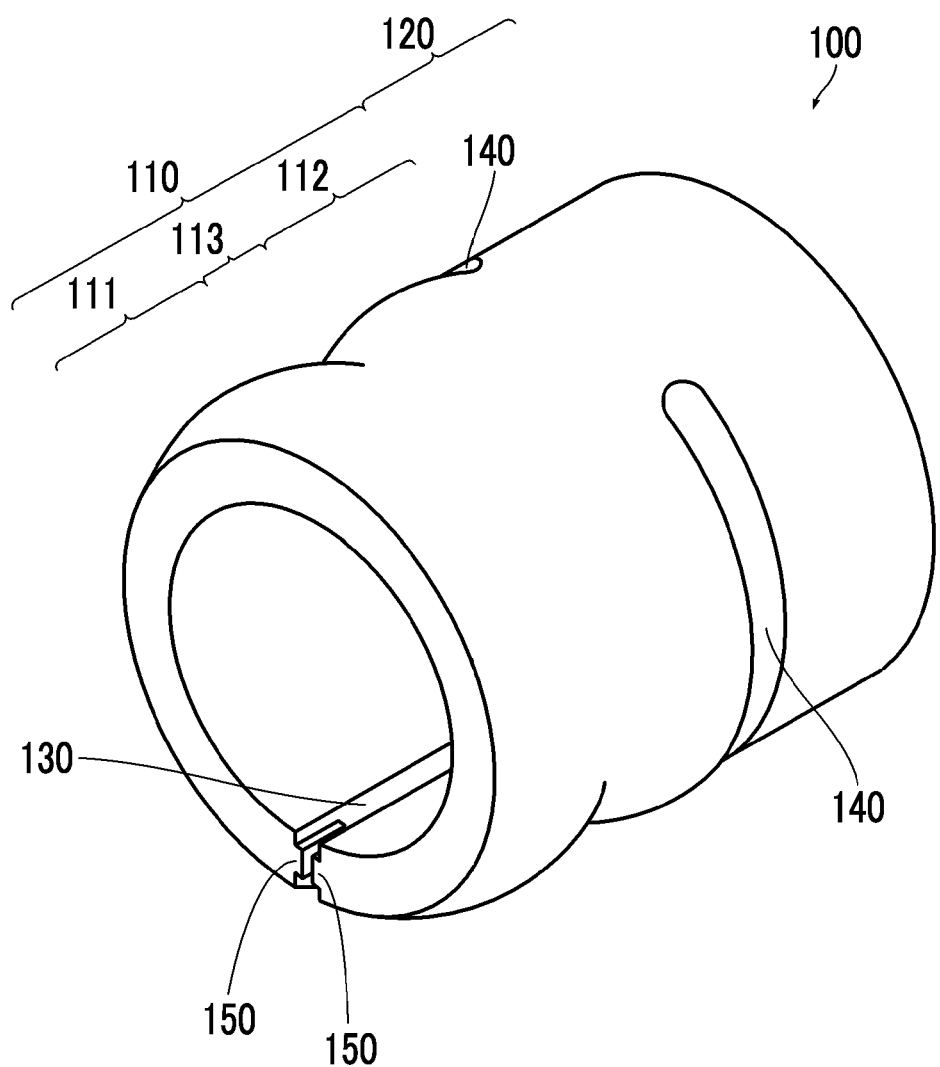

FIG. 29 is a perspective view of the cam follower shown in FIG. 23 that is viewed from a surface side.

Figure 30:
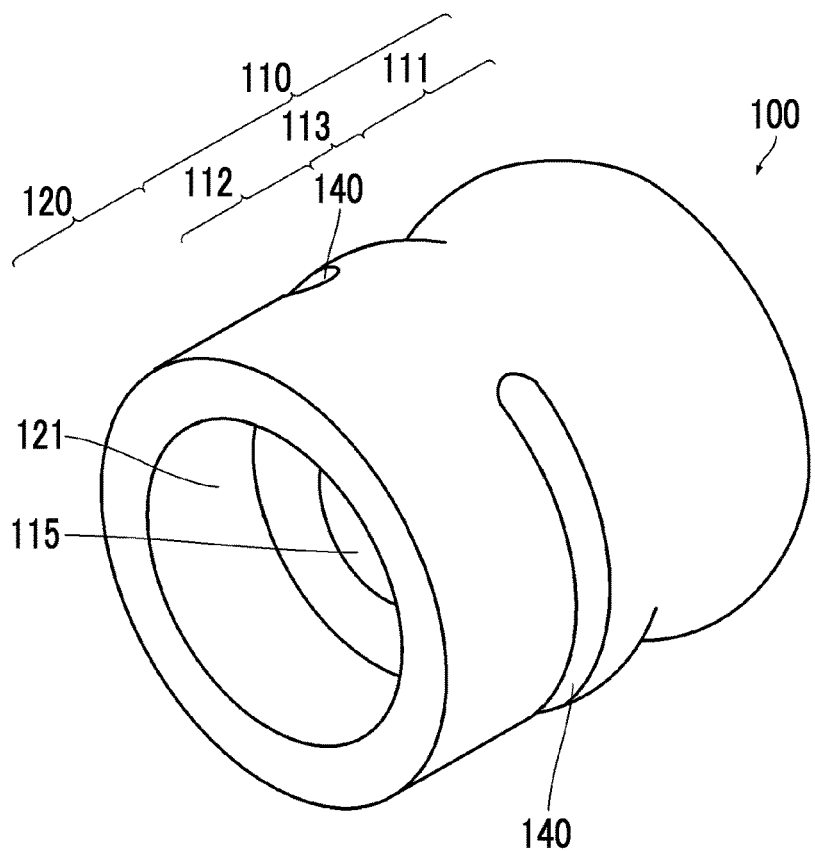

FIG. 30 is a perspective view of the cam follower shown in FIG. 23 that is viewed from a bottom side.

Figure 31:
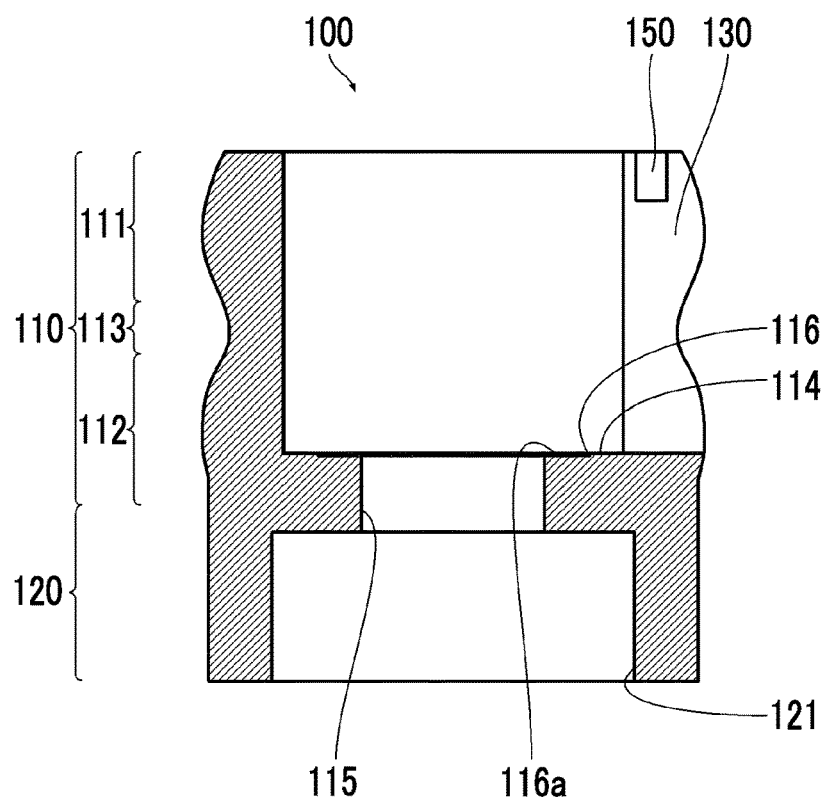

FIG. 31 is a cross-sectional view taken along line 31-31 of FIG. 25.

Figure 32:
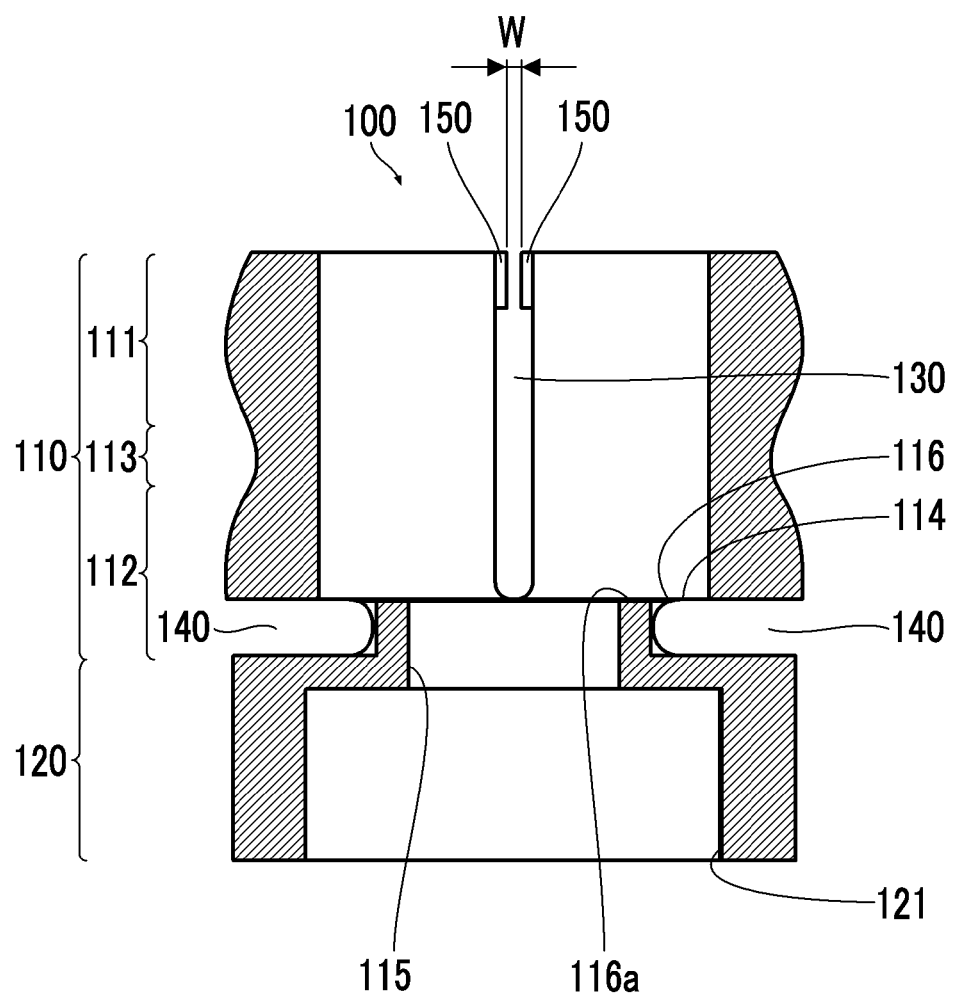

FIG. 32 is a cross-sectional view taken along line 32-32 of FIG. 25.

Figure 33:
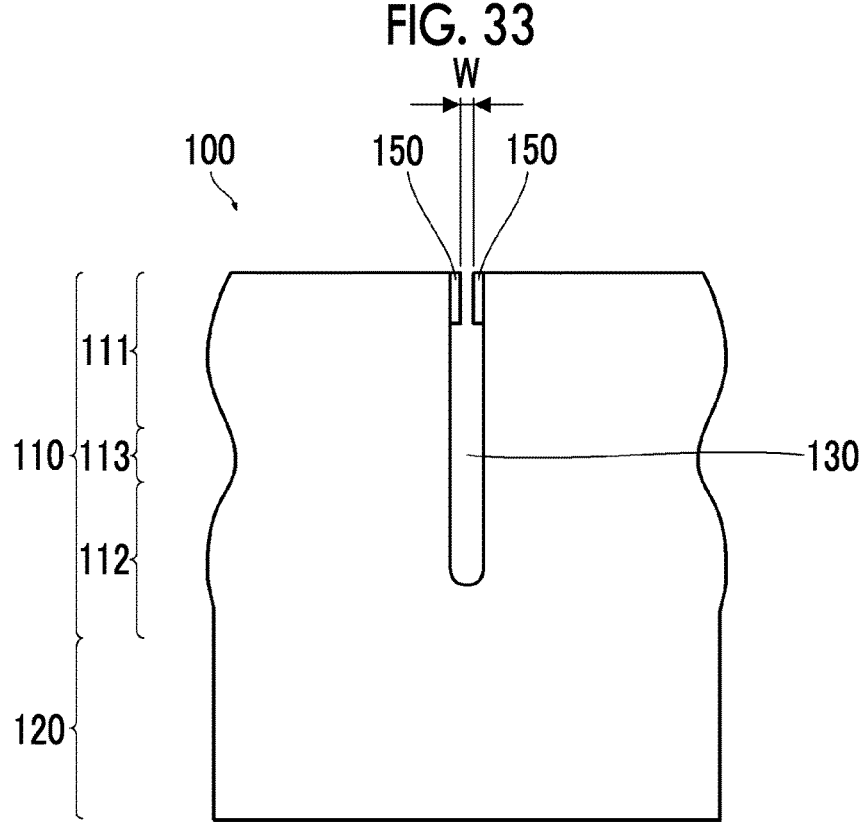

FIG. 33 is a front view of a cam follower that comprises only first slits.

Figure 34:
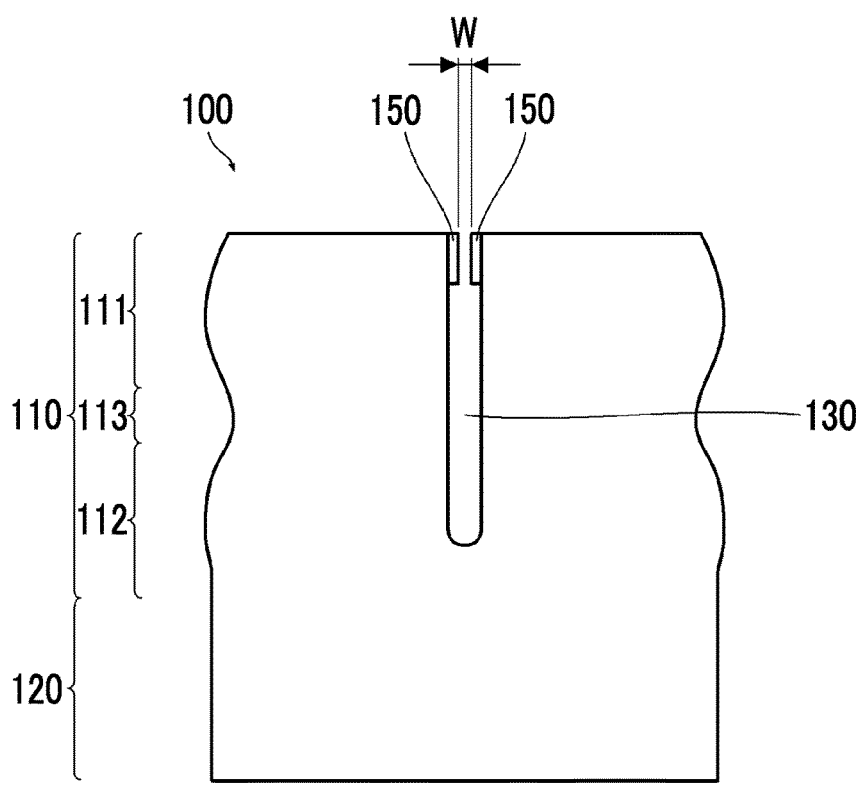

FIG. 34 is a back view of the cam follower shown in FIG. 23.

Figure 35:
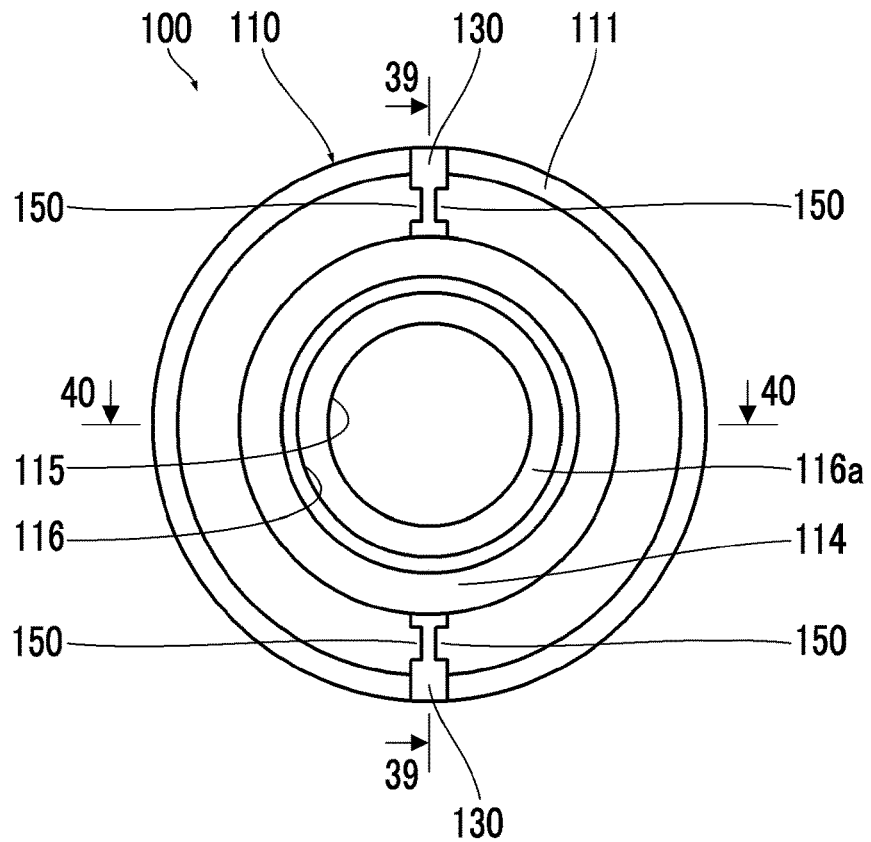

FIG. 35 is a plan view of the cam follower shown in FIG. 23.

Figure 36:
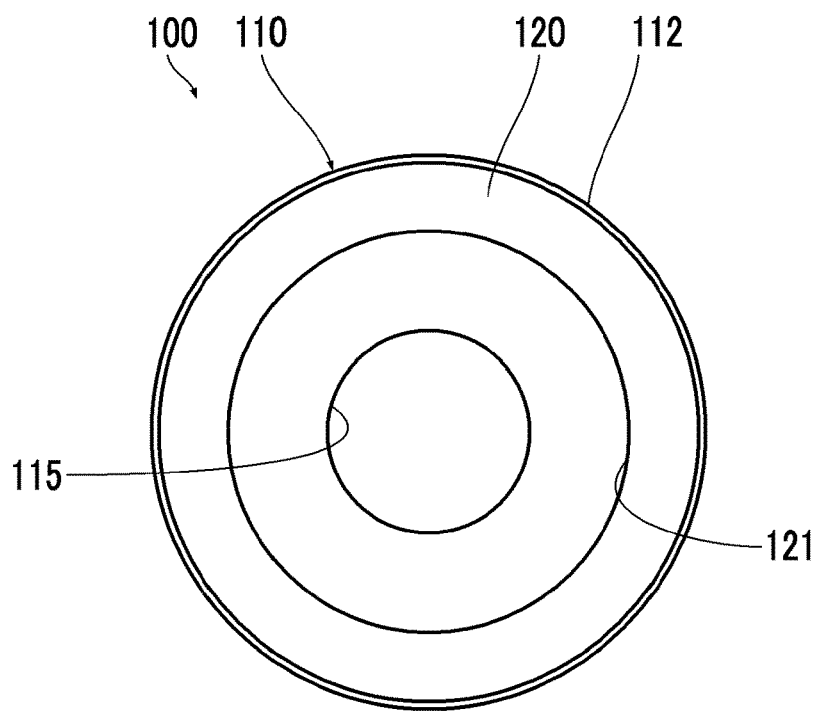

FIG. 36 is a bottom view of the cam follower shown in FIG. 23.

Figure 37:
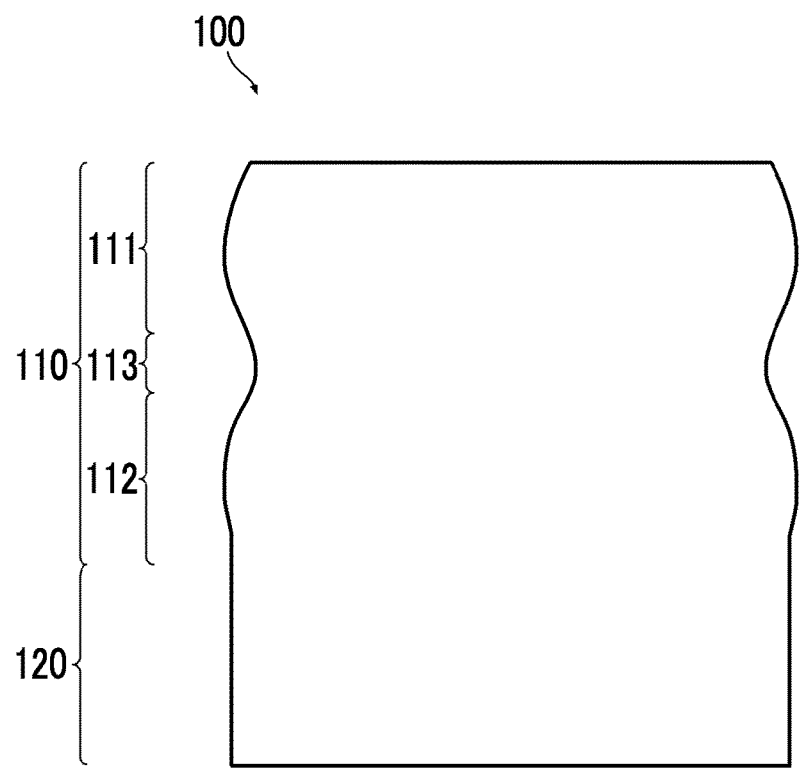

FIG. 37 is a right side view of the cam follower shown in FIG. 23.

Figure 38:
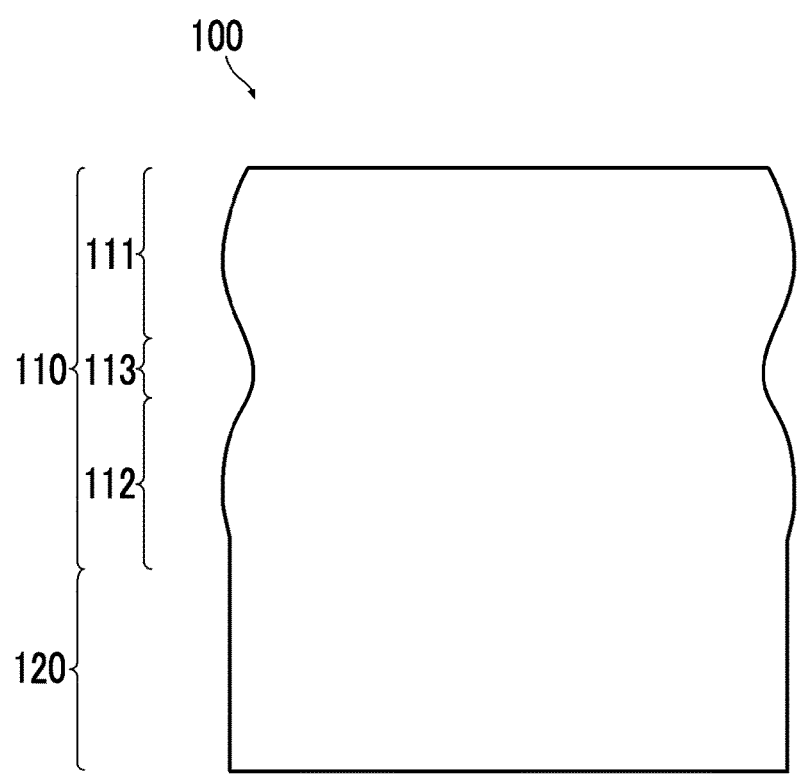

FIG. 38 is a left side view of the cam follower shown in FIG. 23.

Figure 39:
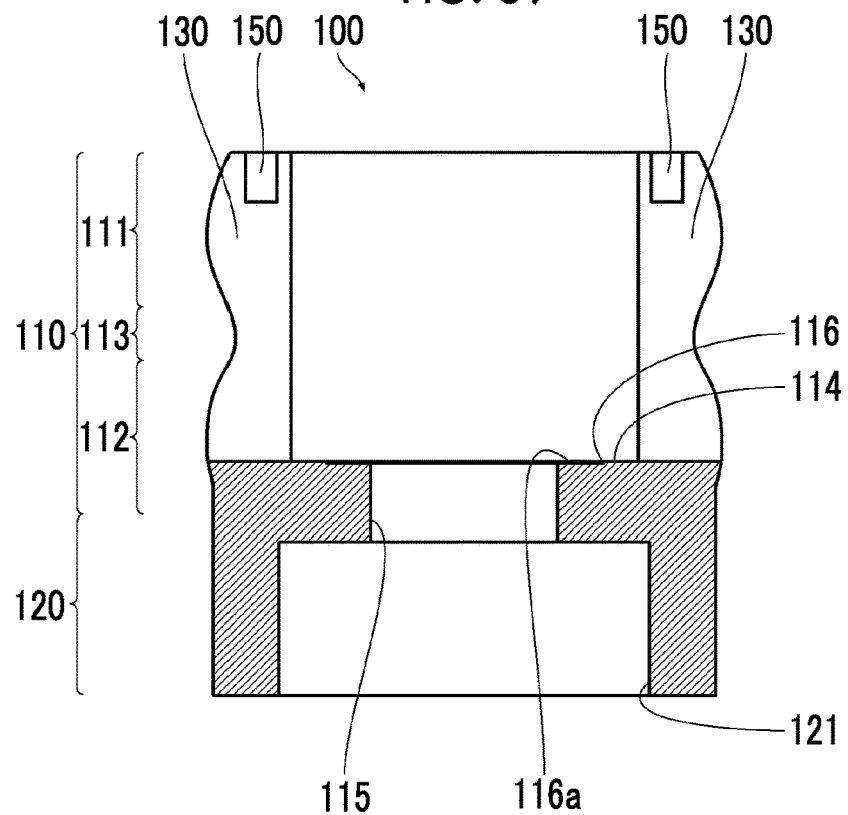

FIG. 39 is a cross-sectional view taken along line 39-39 of FIG. 35.

Figure 40:
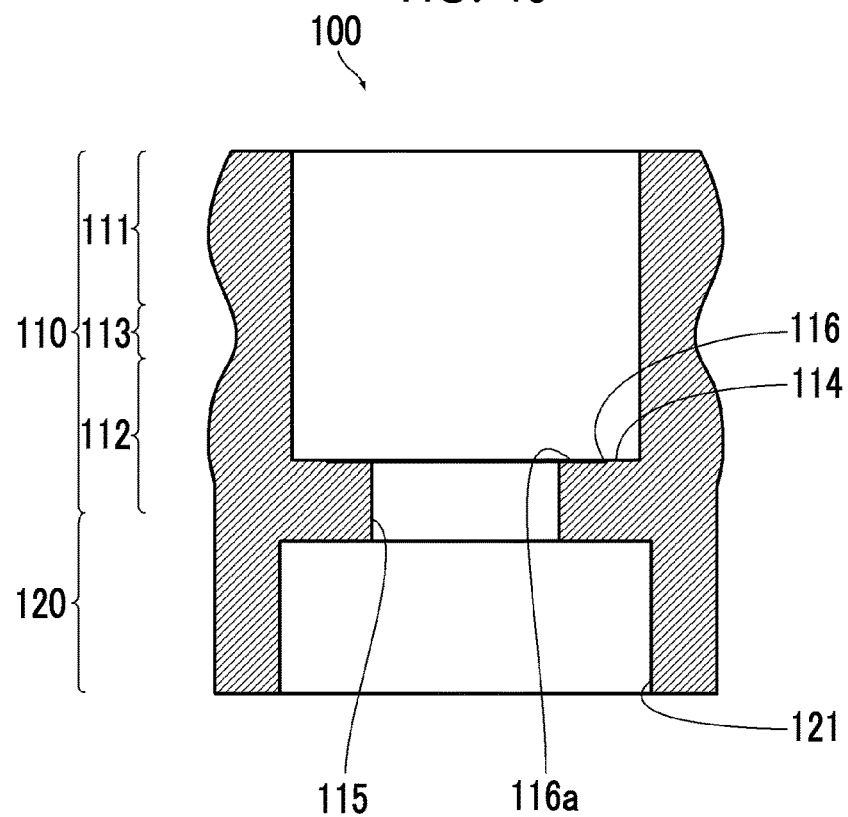

FIG. 40 is a cross-sectional view taken along line 40-40 of FIG. 35.

Figure 41:
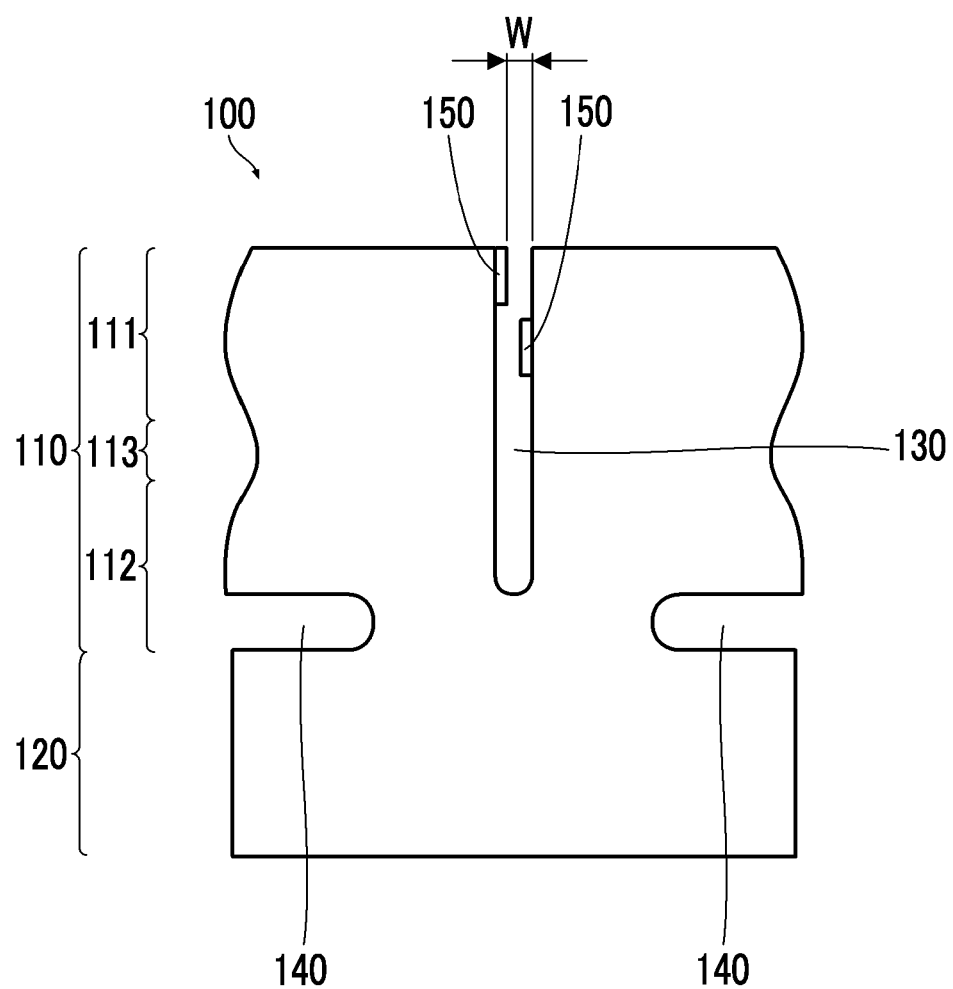

FIG. 41 is a front view of a first modification example of the cam follower.

Figure 42:
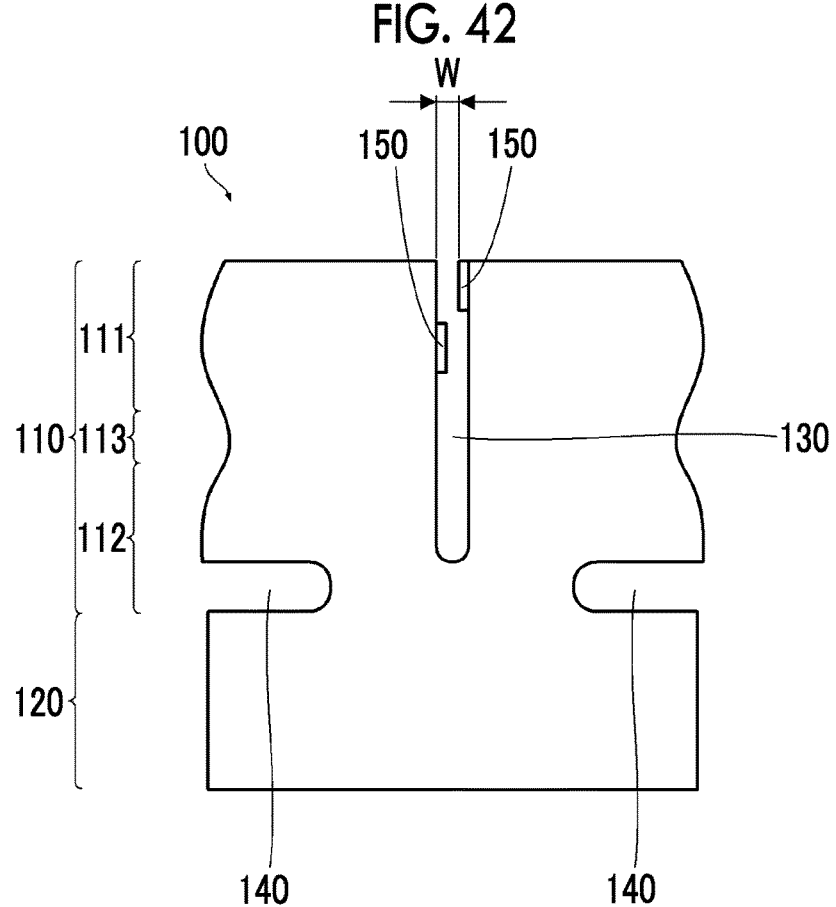

FIG. 42 is a back view of the cam follower shown in FIG. 41.

Figure 43:
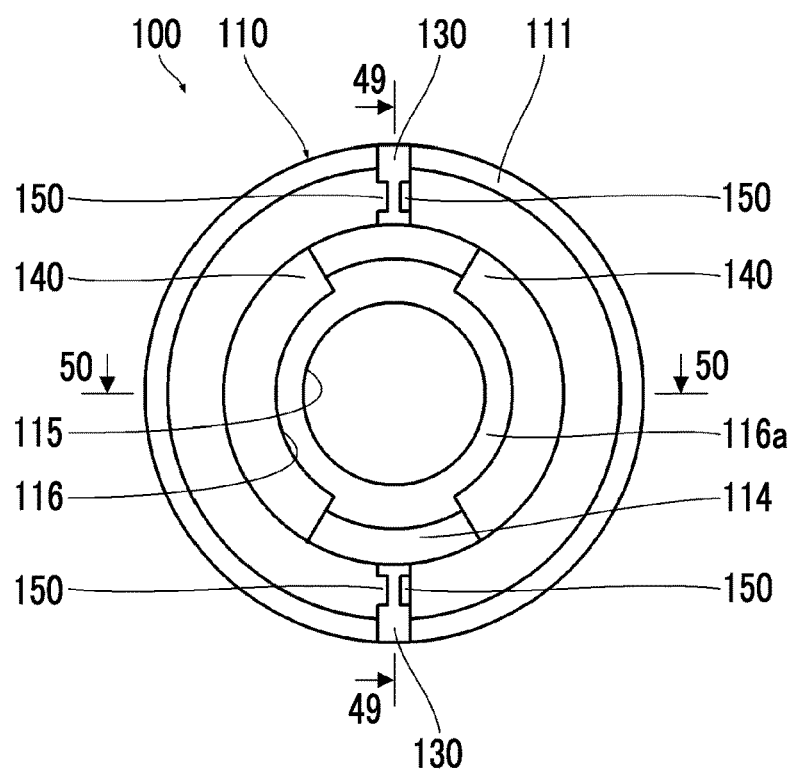

FIG. 43 is a plan view of the cam follower shown in FIG. 41.

Figure 44:
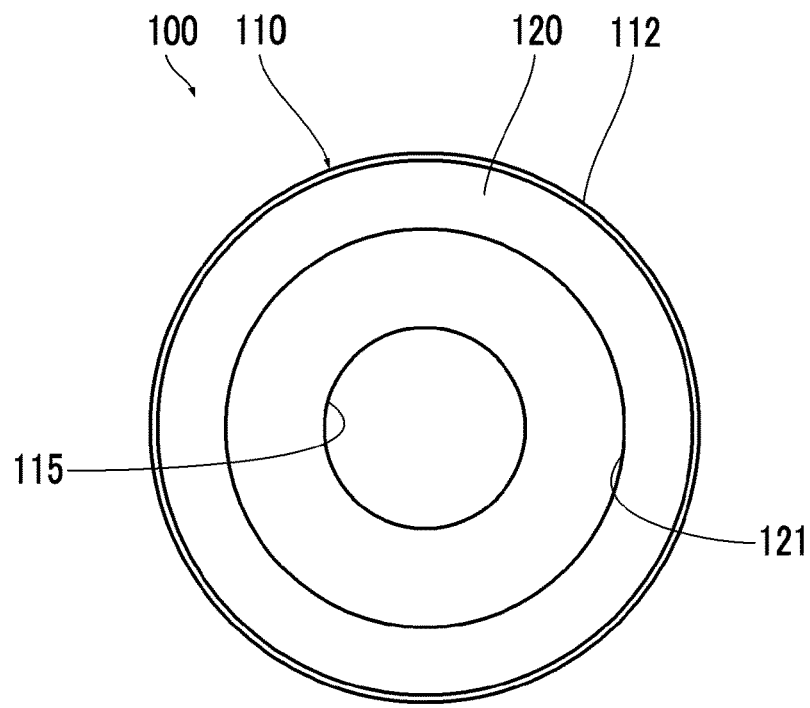

FIG. 44 is a bottom view of the cam follower shown in FIG. 41.

Figure 45:
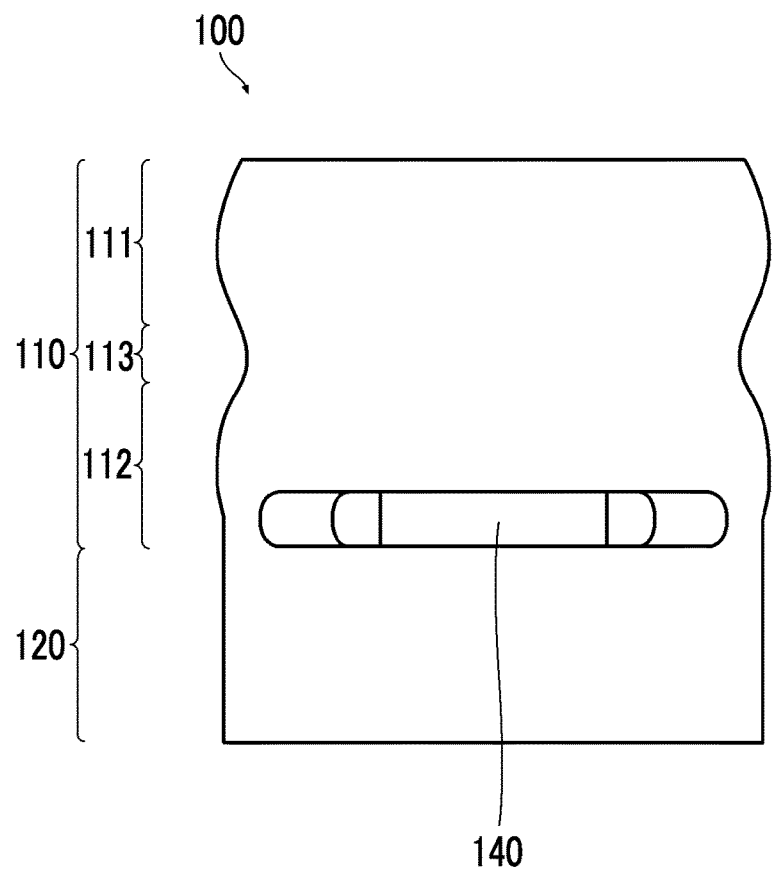

FIG. 45 is a right side view of the cam follower shown in FIG. 41.

Figure 46:
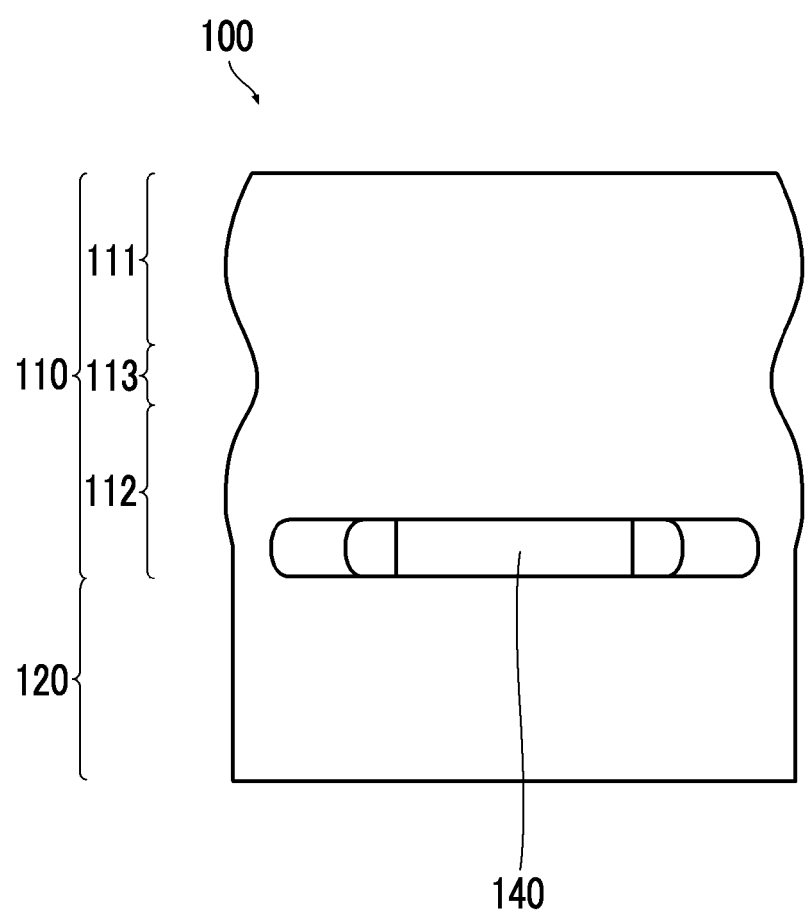

FIG. 46 is a left side view of the cam follower shown in FIG. 41.

Figure 47:
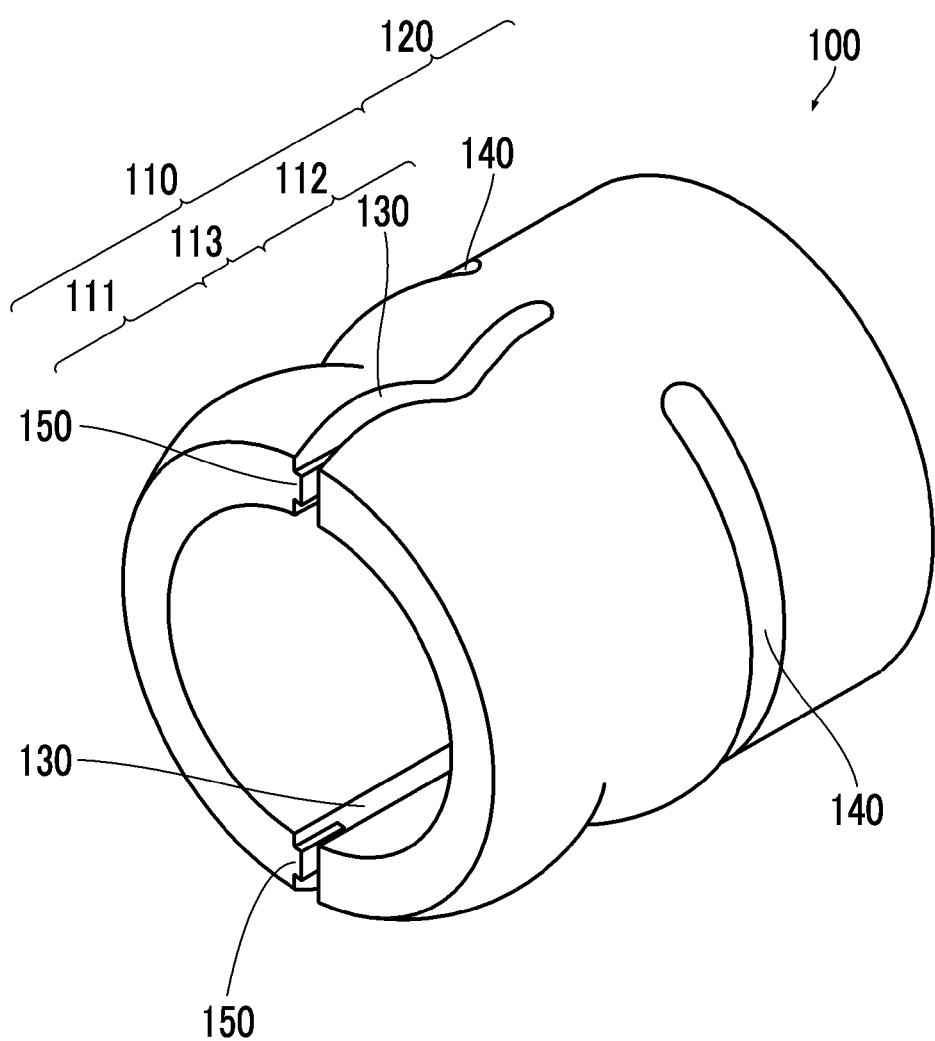

FIG. 47 is a perspective view of the cam follower shown in FIG. 41 that is viewed from a surface side.

Figure 48:
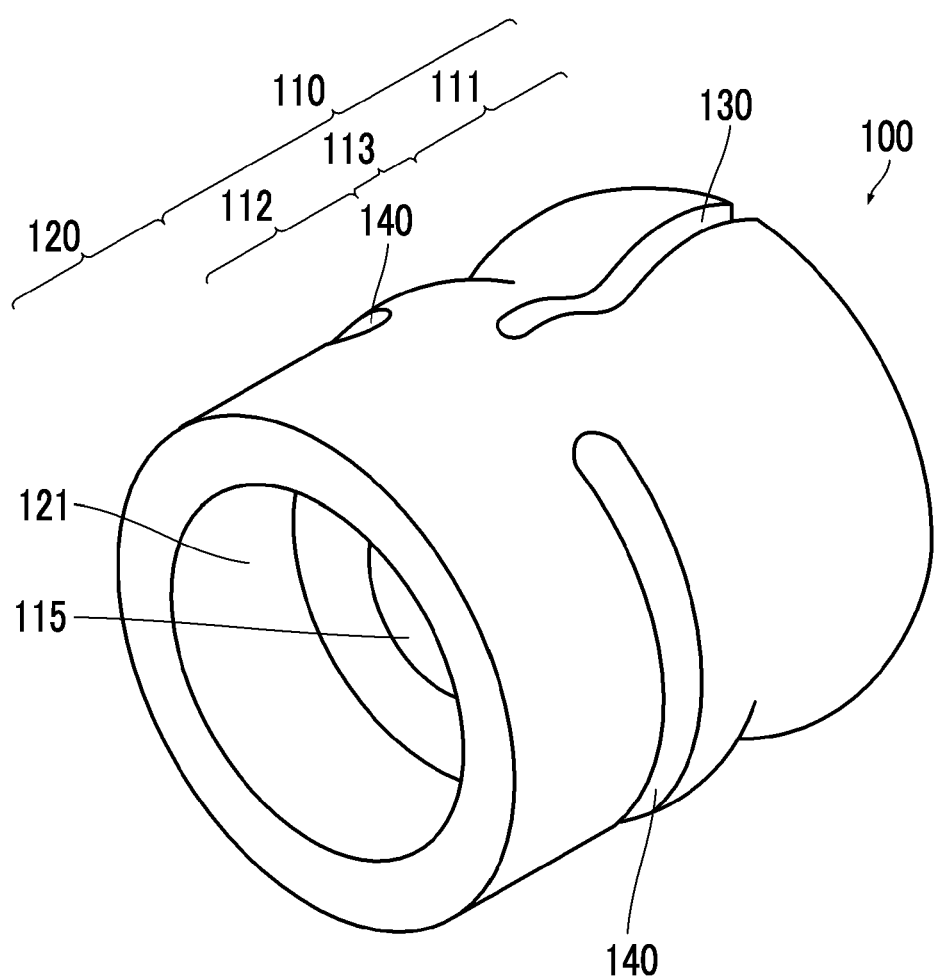

FIG. 48 is a perspective view of the cam follower shown in FIG. 41 that is viewed from a bottom side.

Figure 49:
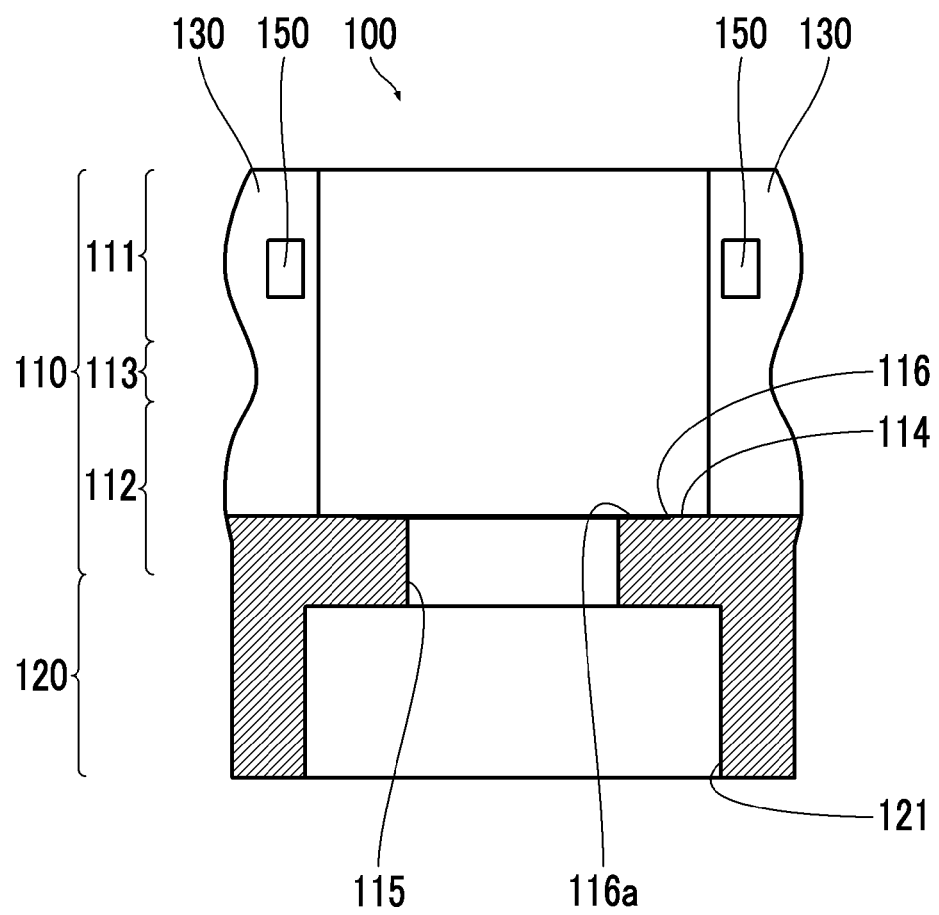

FIG. 49 is a cross-sectional view taken along line 49-49 of FIG. 43.

Figure 50:
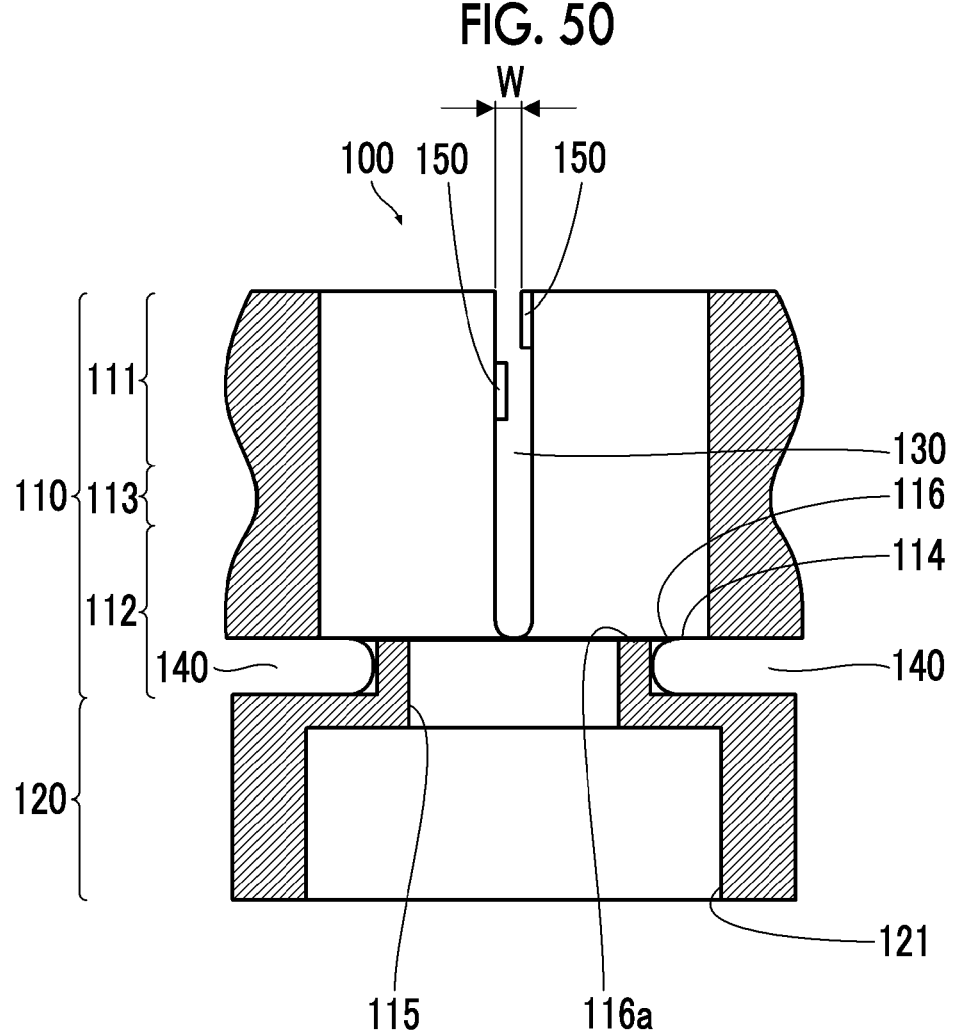

FIG. 50 is a cross-sectional view taken along line 50-50 of FIG. 43.

Figure 51:
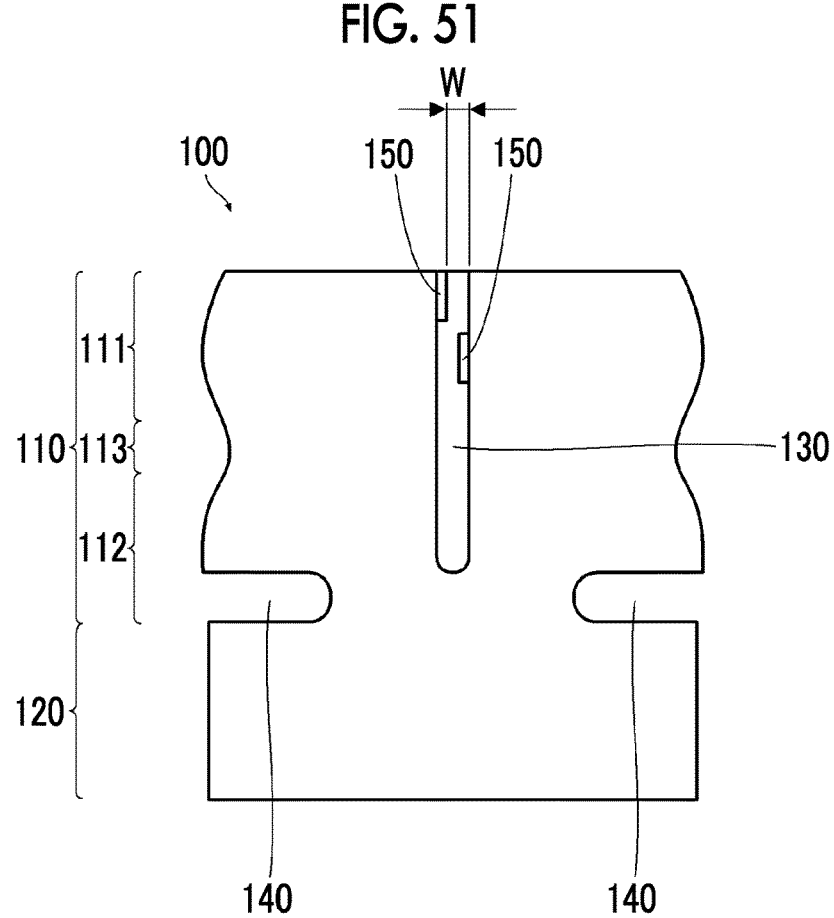

FIG. 51 is a front view of a second modification example of the cam follower.

Figure 52:
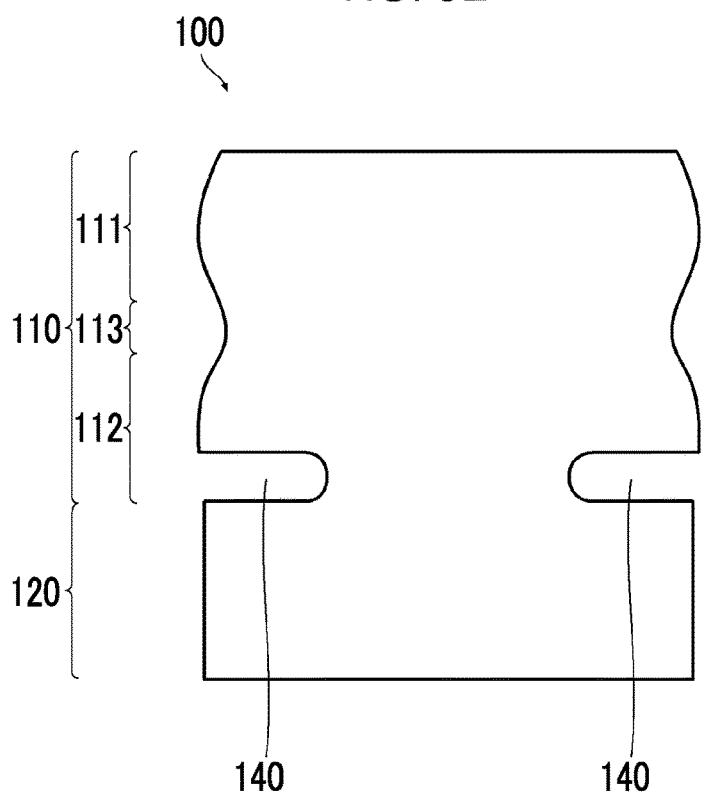

FIG. 52 is a back view of the cam follower shown in FIG. 51.

Figure 53:
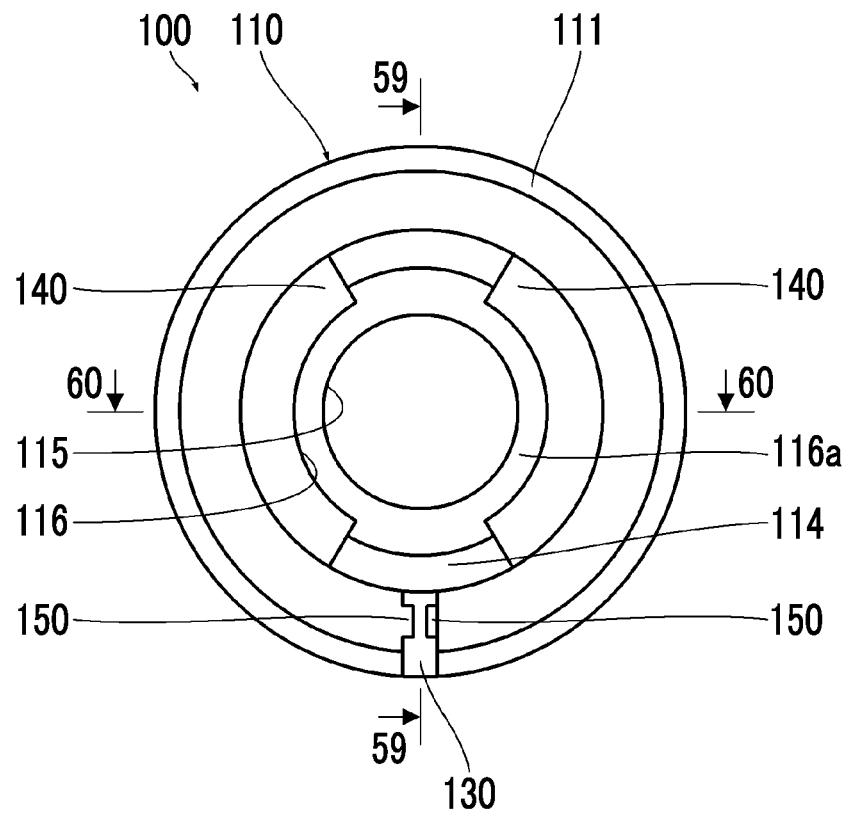

FIG. 53 is a plan view of the cam follower shown in FIG. 51.

Figure 54:
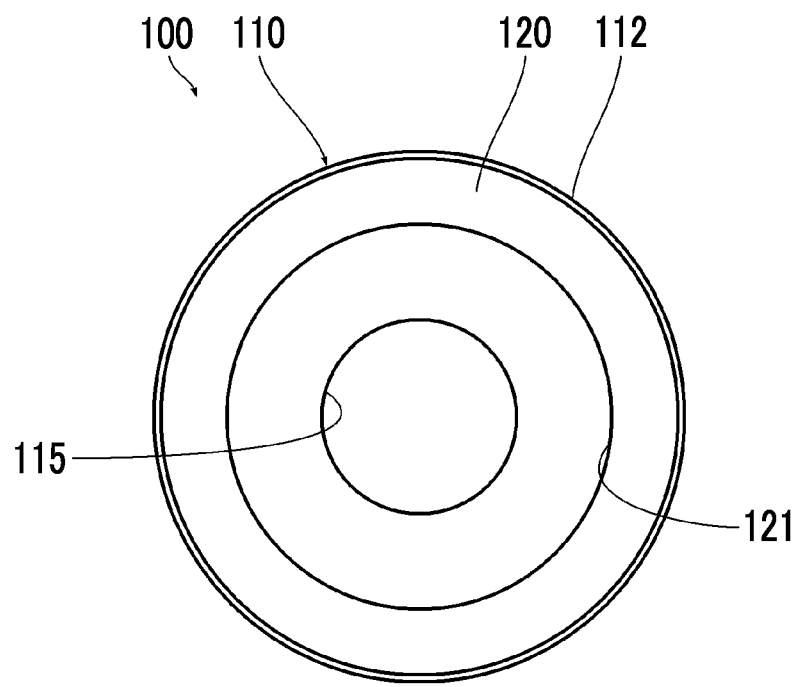

FIG. 54 is a bottom view of the cam follower shown in FIG. 51.

Figure 55:
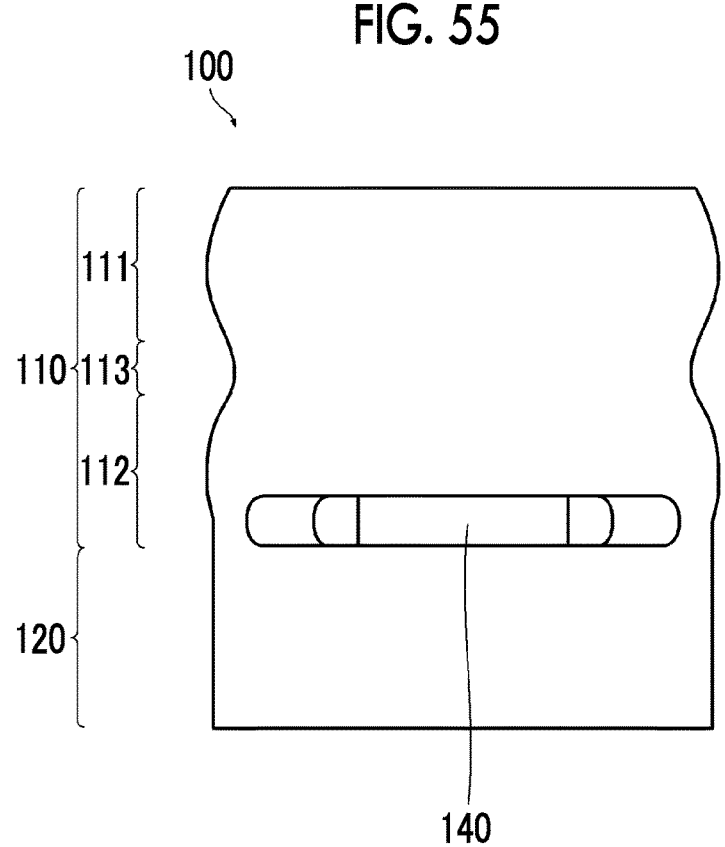

FIG. 55 is a right side view of the cam follower shown in FIG. 51.

Figure 56:
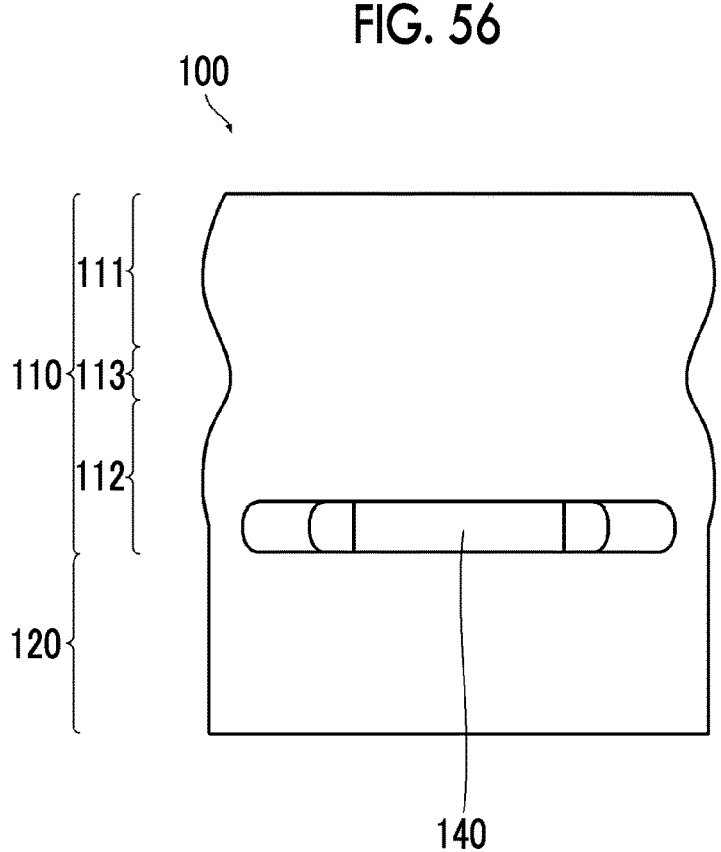

FIG. 56 is a left side view of the cam follower shown in FIG. 51.

Figure 57:
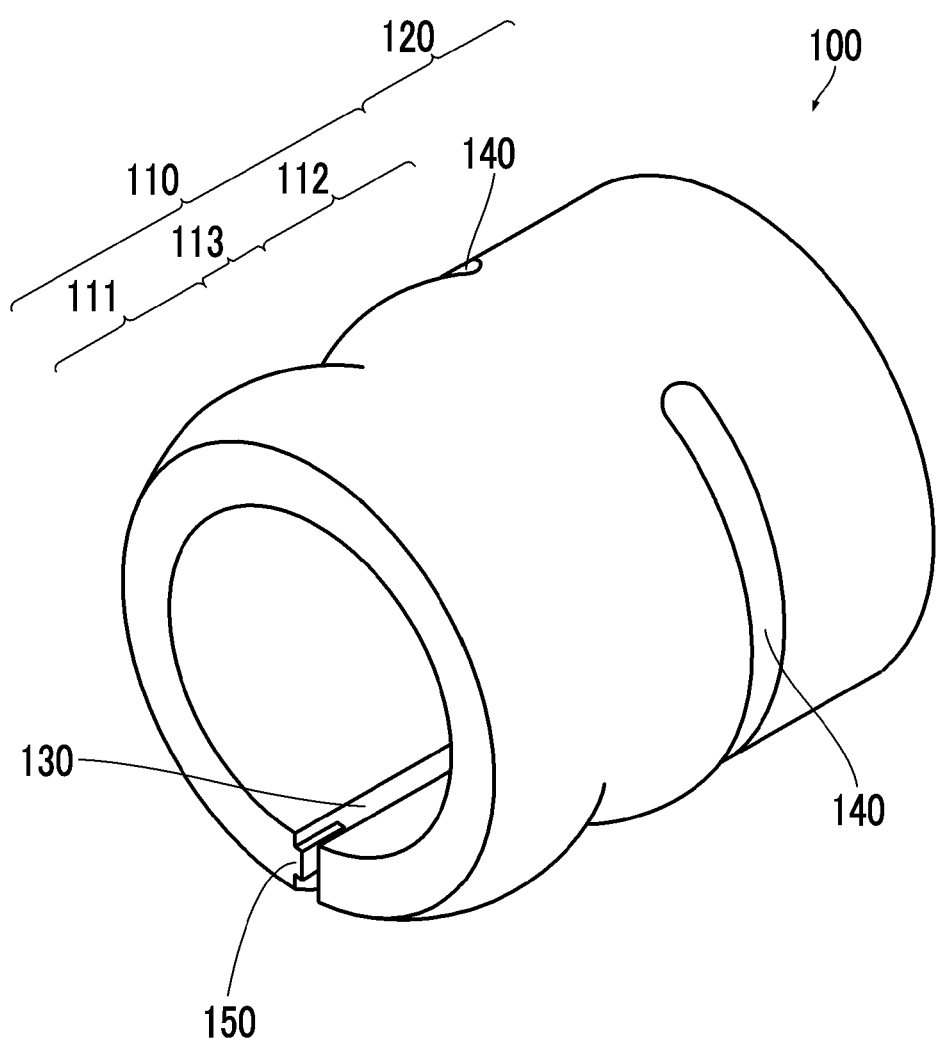

FIG. 57 is a perspective view of the cam follower shown in FIG. 51 that is viewed from a surface side.

Figure 58:
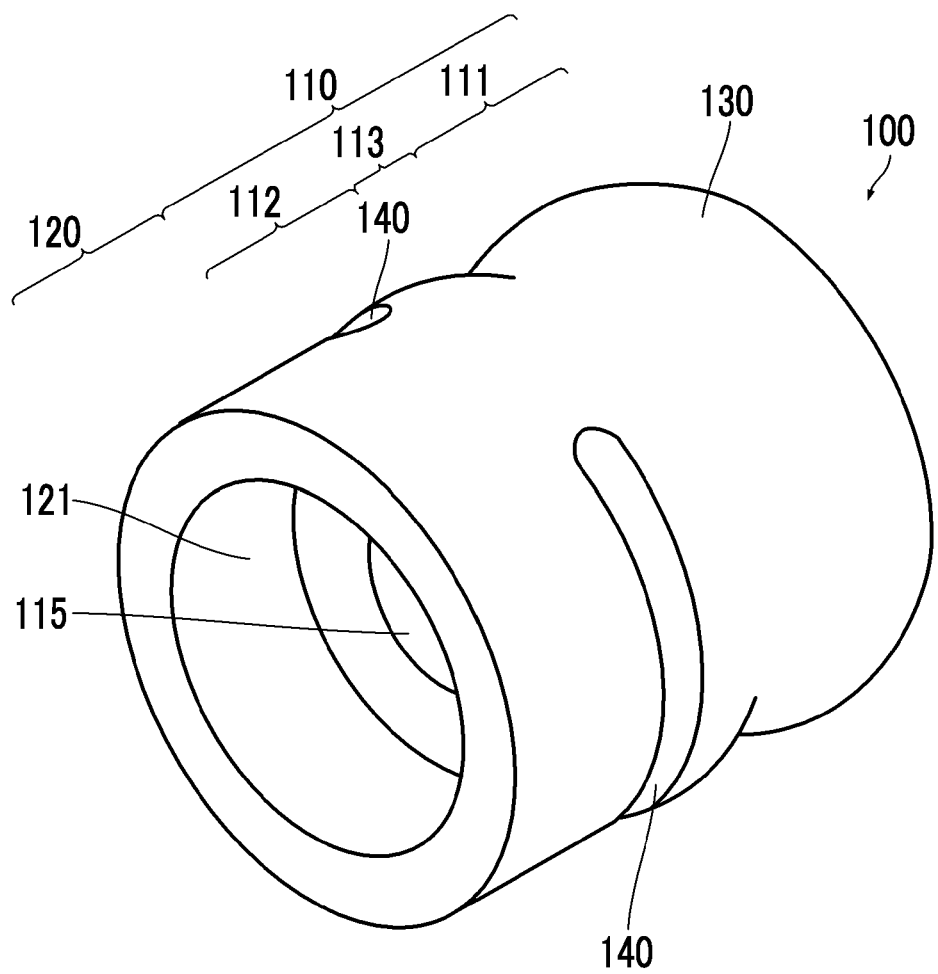

FIG. 58 is a perspective view of the cam follower shown in FIG. 51 that is viewed from a bottom side.

Figure 59:
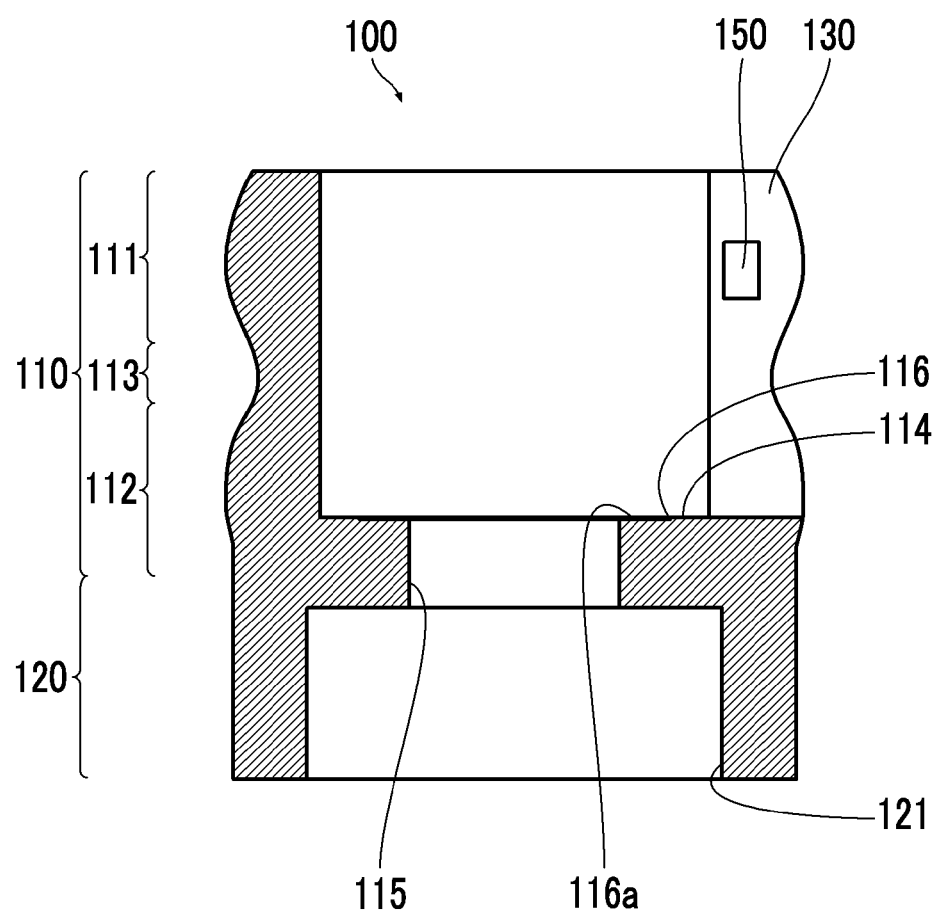

FIG. 59 is a cross-sectional view taken along line 59-59 of FIG. 53.

Figure 60:
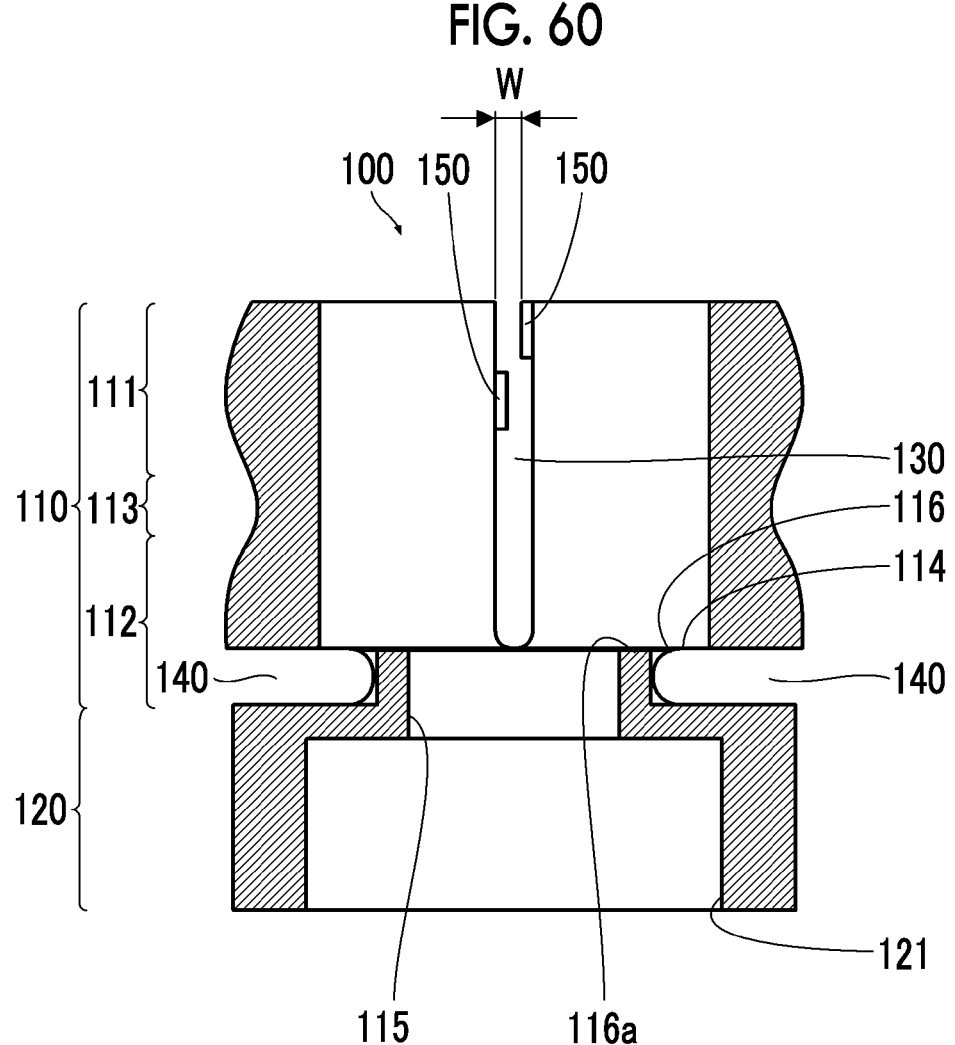

FIG. 60 is a cross-sectional view taken along line 60-60 of FIG. 53.

Figure 61:
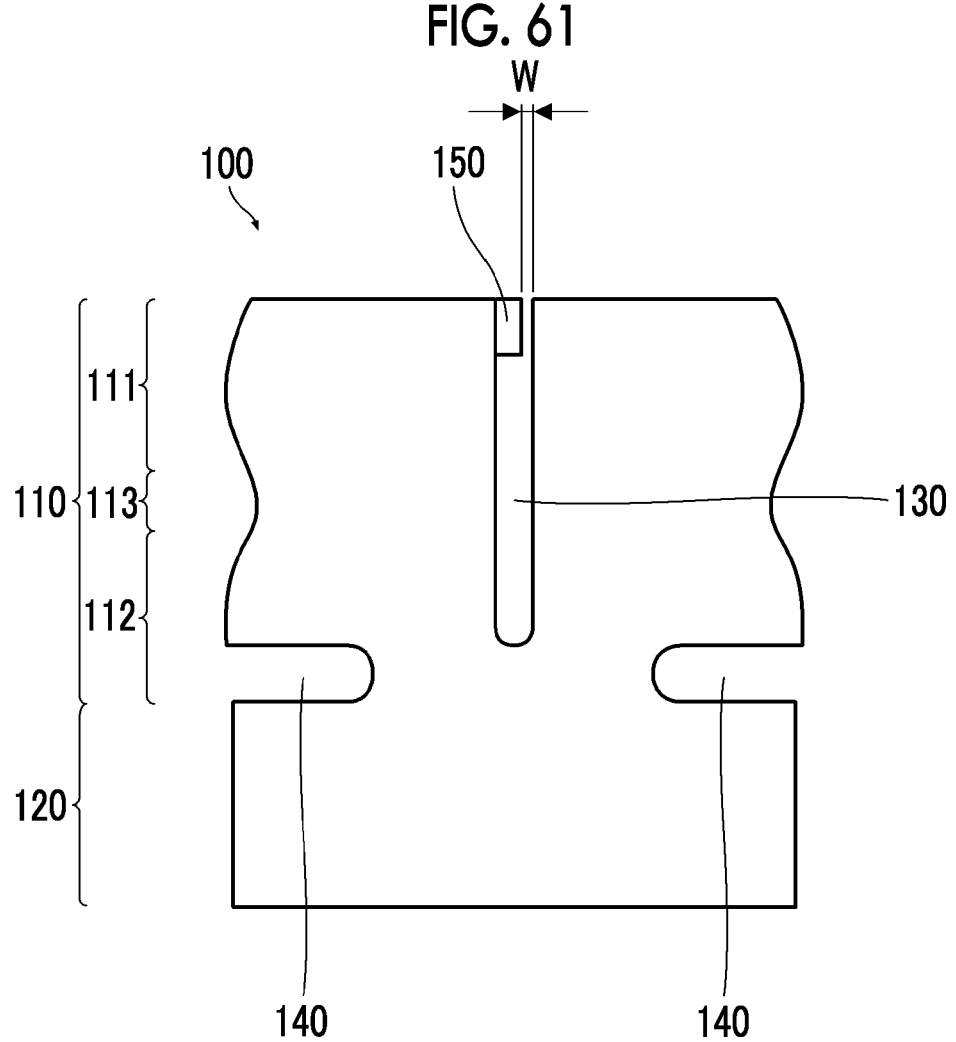

FIG. 61 is a front view of a third modification example of the cam follower.

Figure 62:
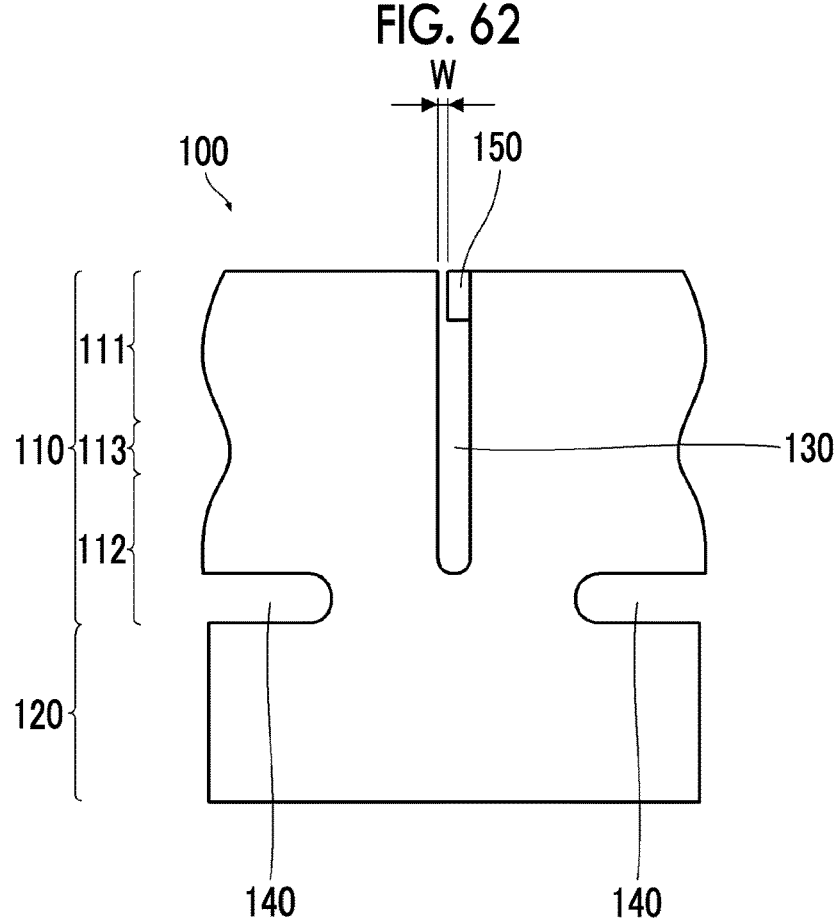

FIG. 62 is a back view of the cam follower shown in FIG. 61.

Figure 63:
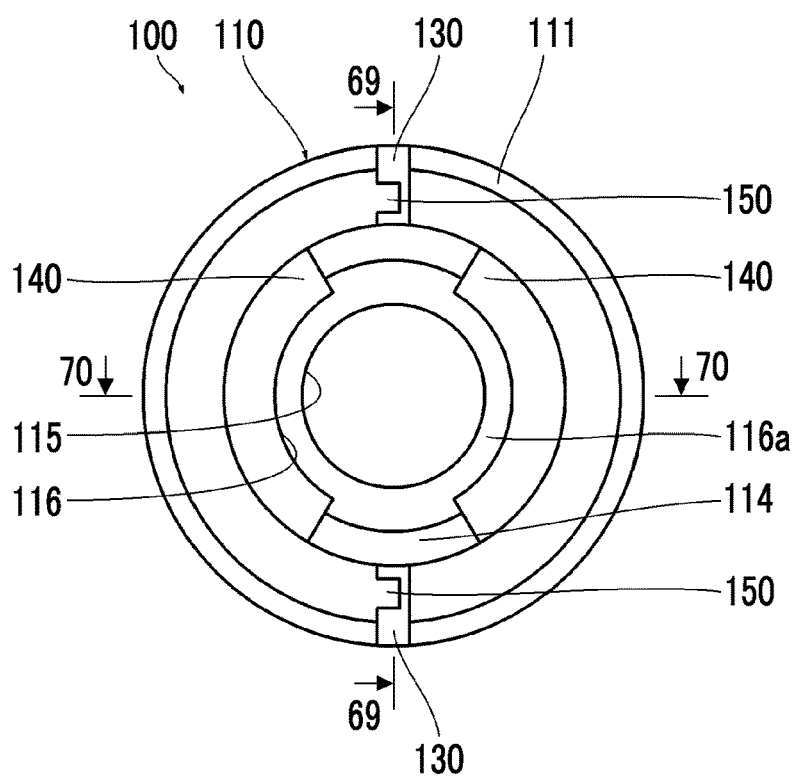

FIG. 63 is a plan view of the cam follower shown in FIG. 61.

Figure 64:
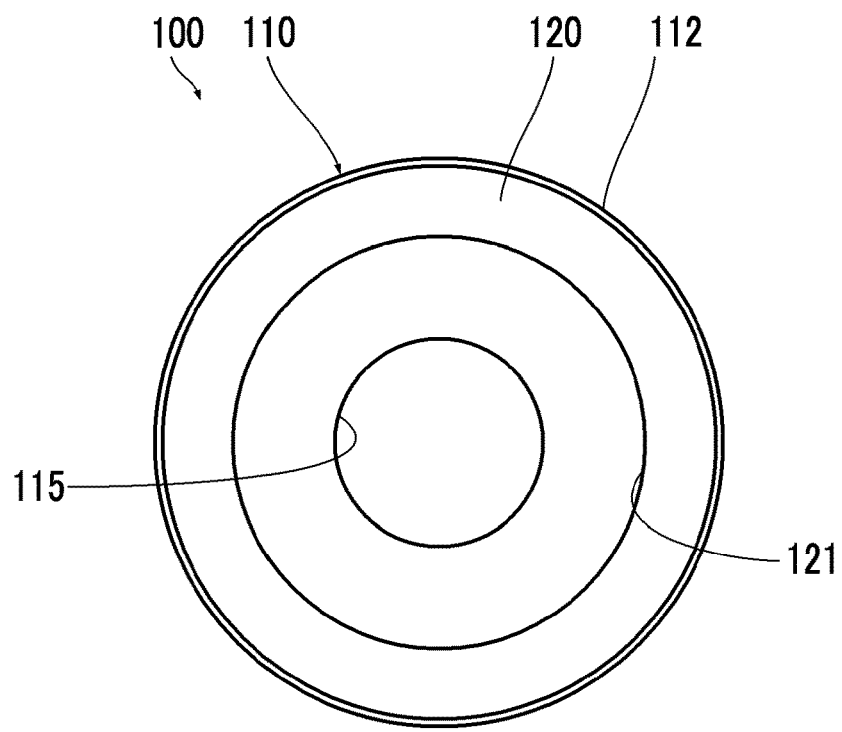

FIG. 64 is a bottom view of the cam follower shown in FIG. 61.

Figure 65:
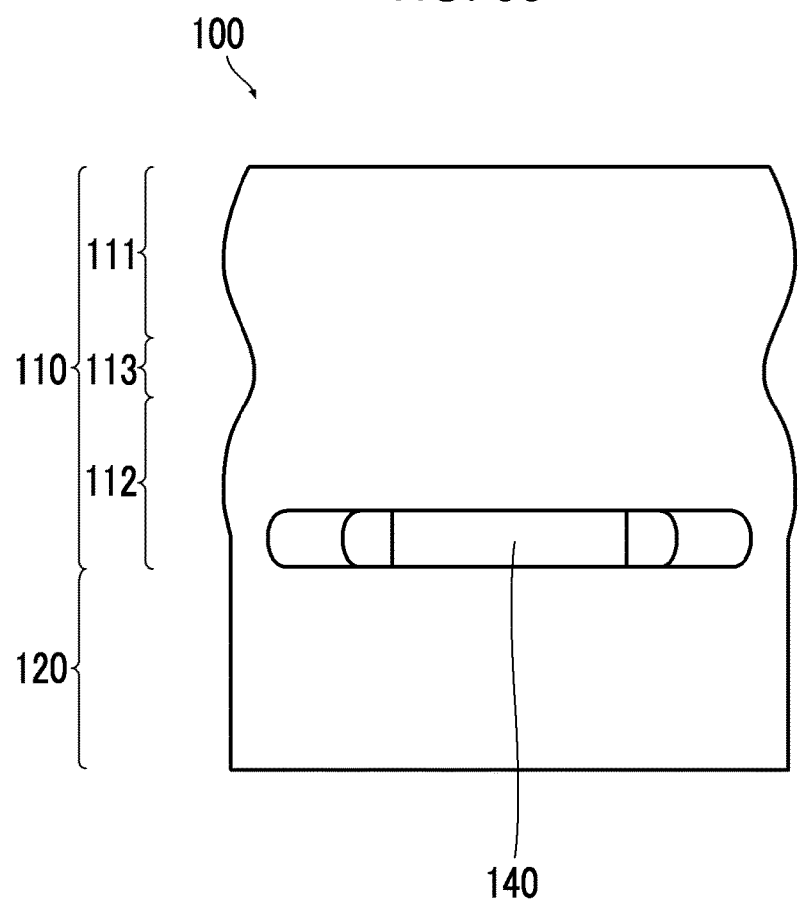

FIG. 65 is a right side view of the cam follower shown in FIG. 61.

Figure 66:
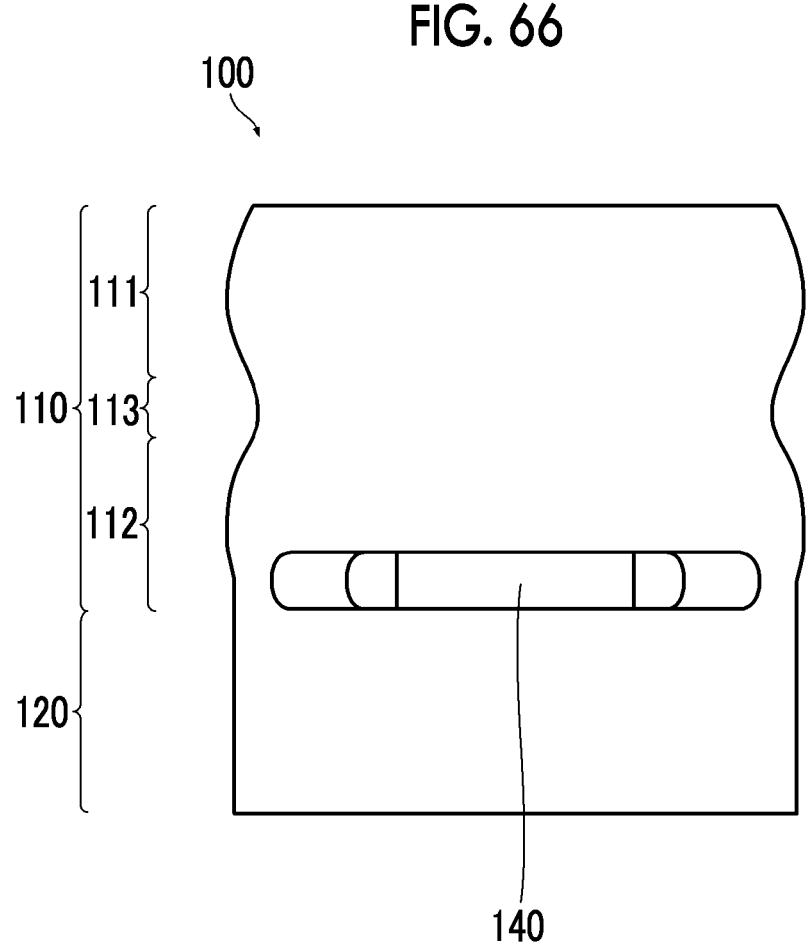

FIG. 66 is a left side view of the cam follower shown in FIG. 61.

Figure 67:
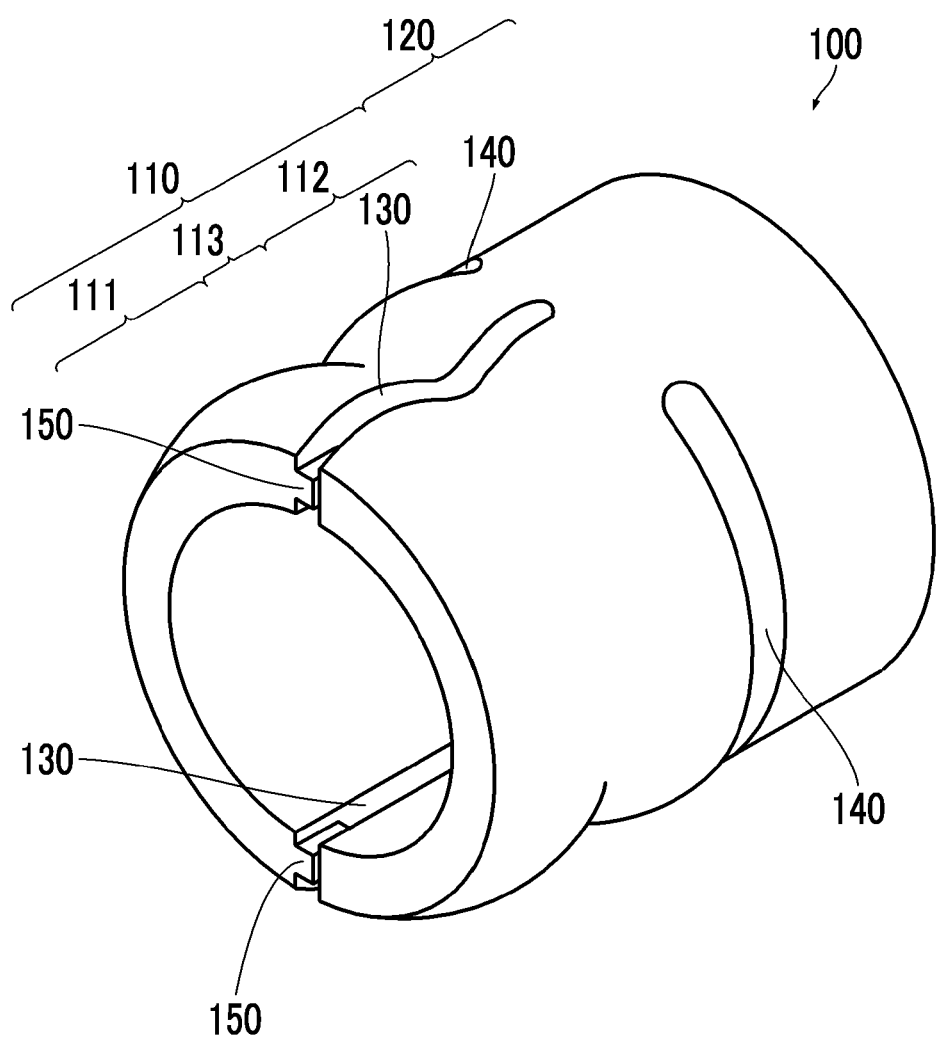

FIG. 67 is a perspective view of the cam follower shown in FIG. 61 that is viewed from a surface side.

Figure 68:
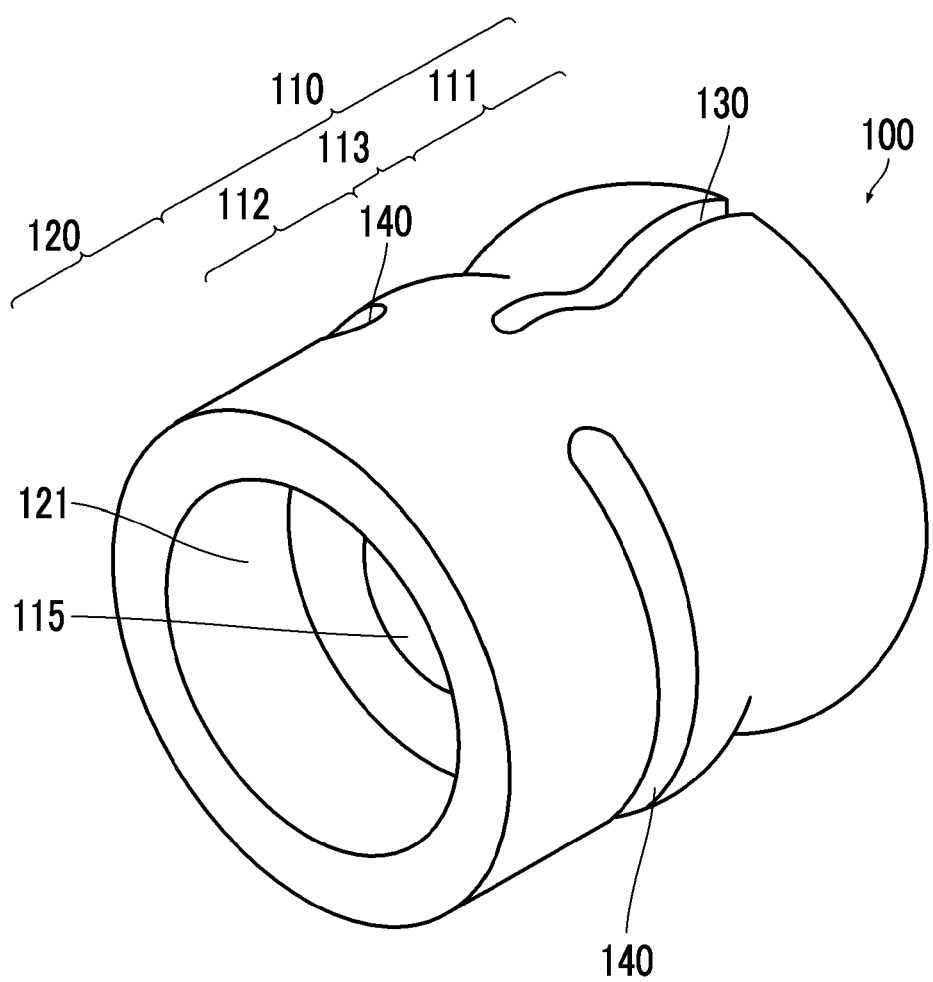

FIG. 68 is a perspective view of the cam follower shown in FIG. 61 that is viewed from a bottom side.

Figure 69:
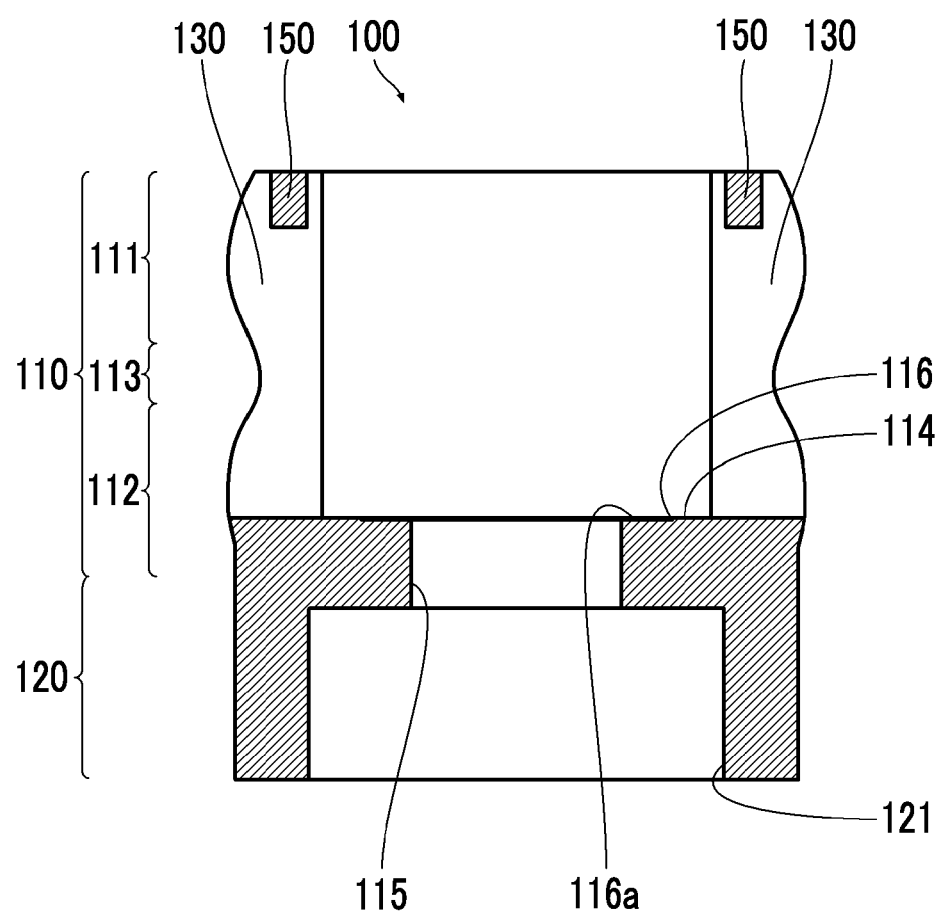

FIG. 69 is a cross-sectional view taken along line 69-69 of FIG. 63.

Figure 70:
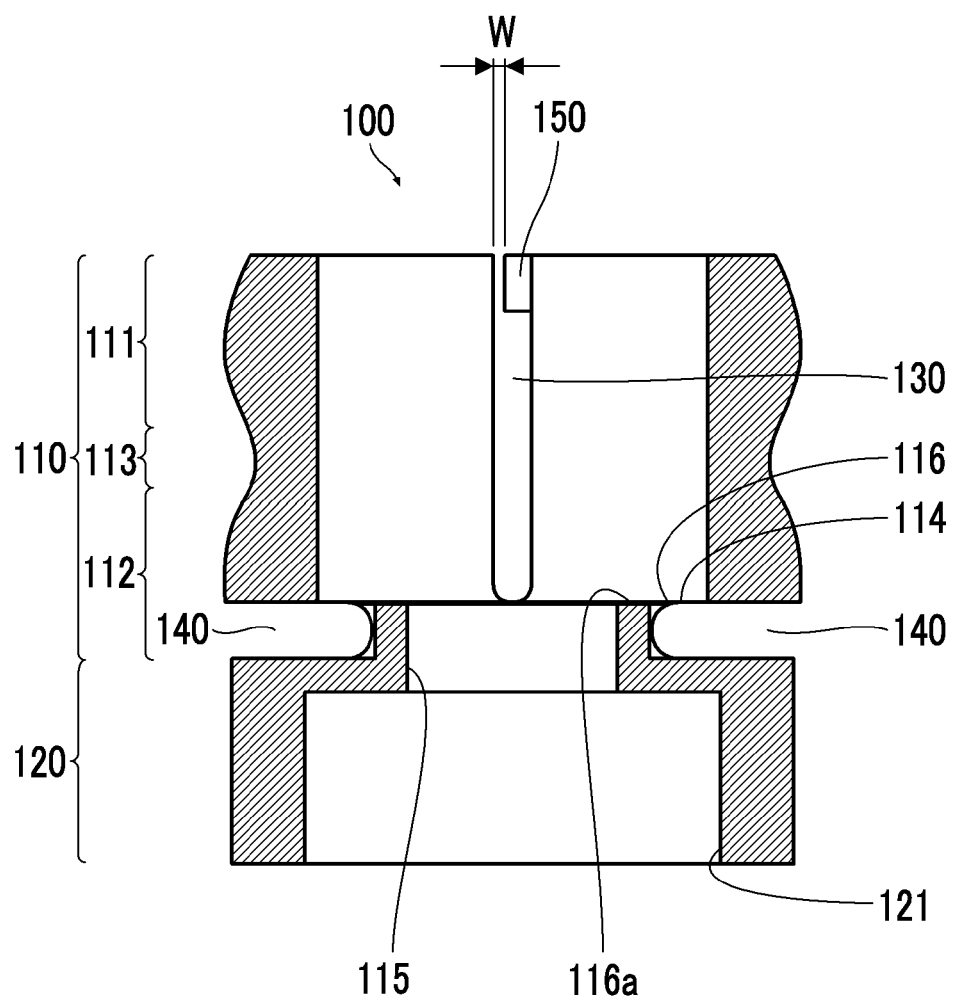

FIG. 70 is a cross-sectional view taken along line 70-70 of FIG. 63.

Figure 71:
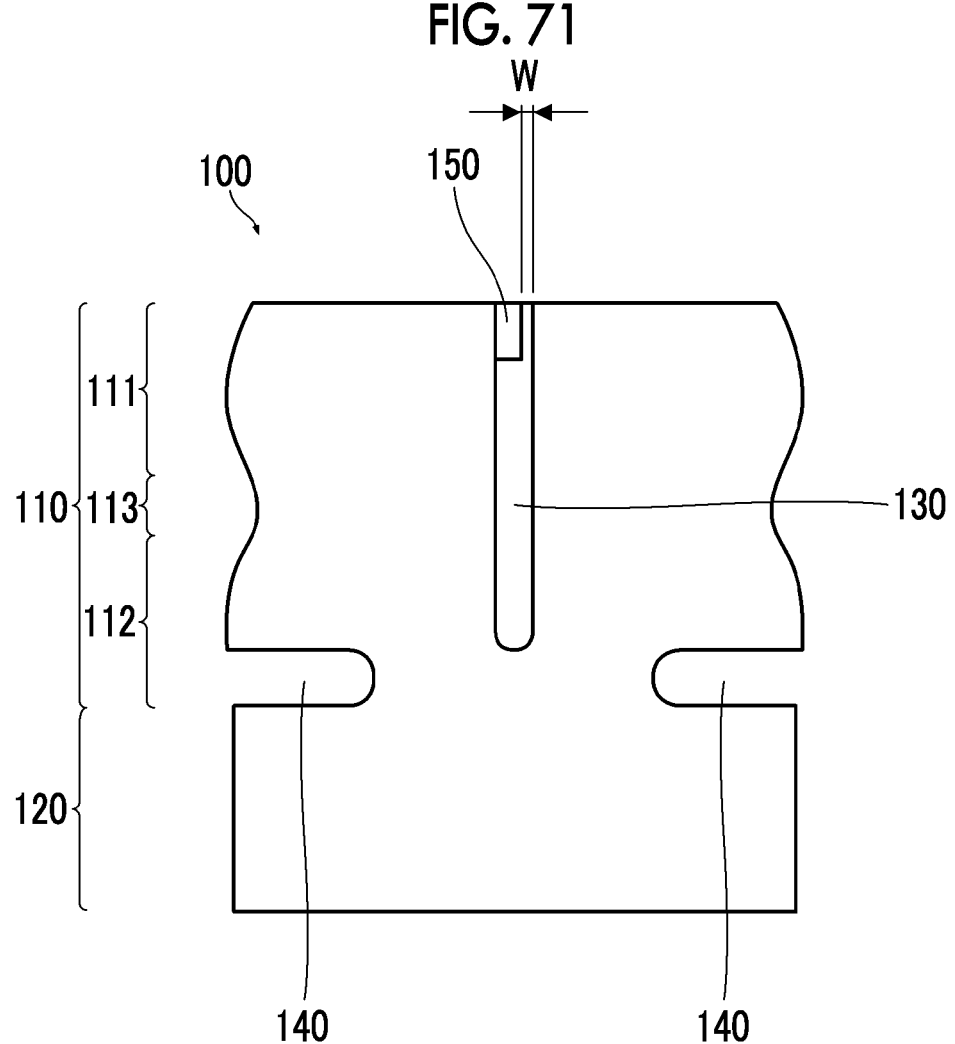

FIG. 71 is a front view of a fourth modification example of the cam follower.

Figure 72:
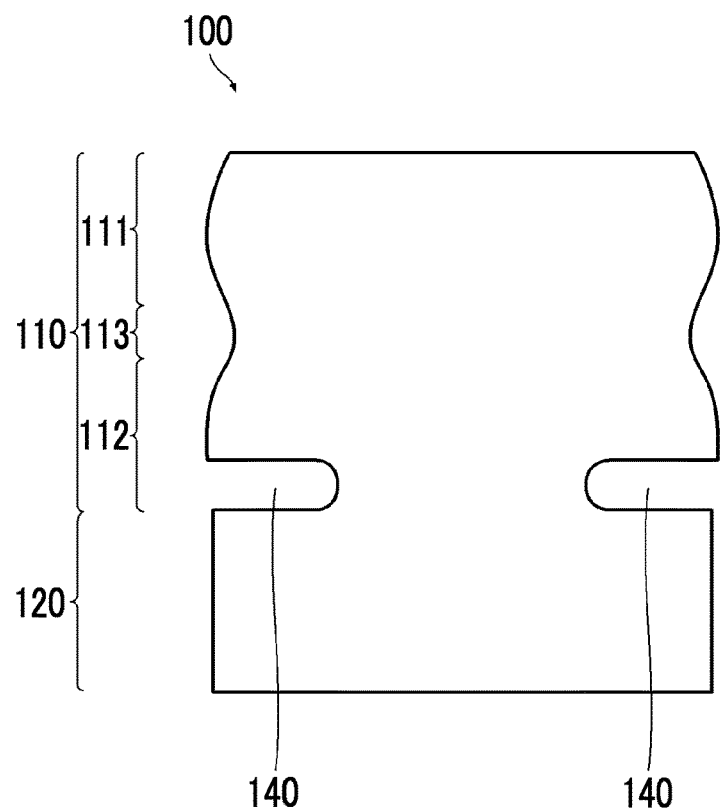

FIG. 72 is a back view of the cam follower shown in FIG. 71.

Figure 73:
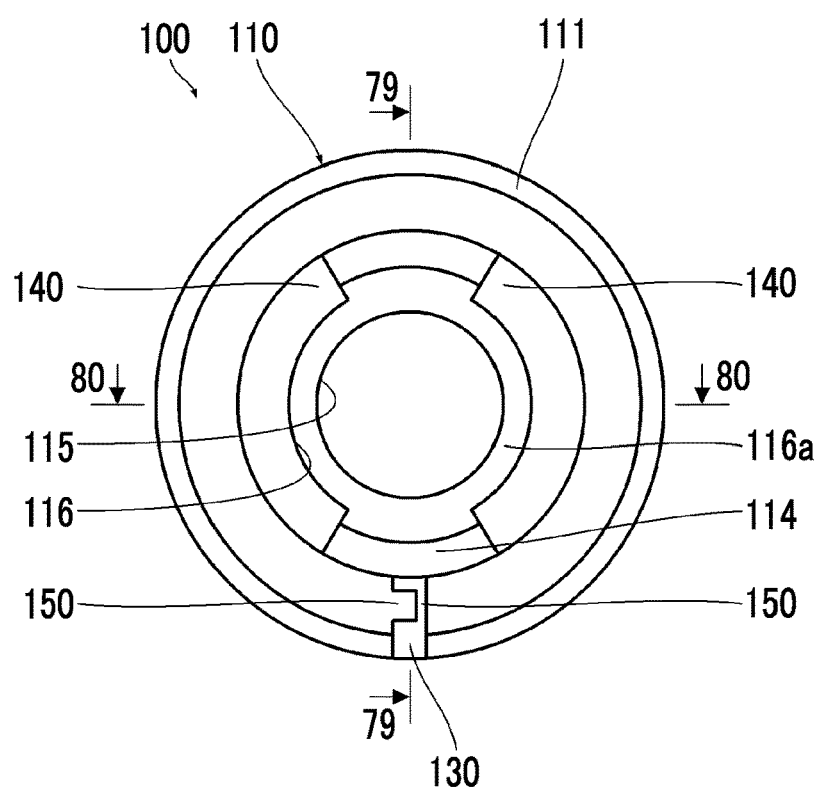

FIG. 73 is a plan view of the cam follower shown in FIG. 71.

Figure 74:
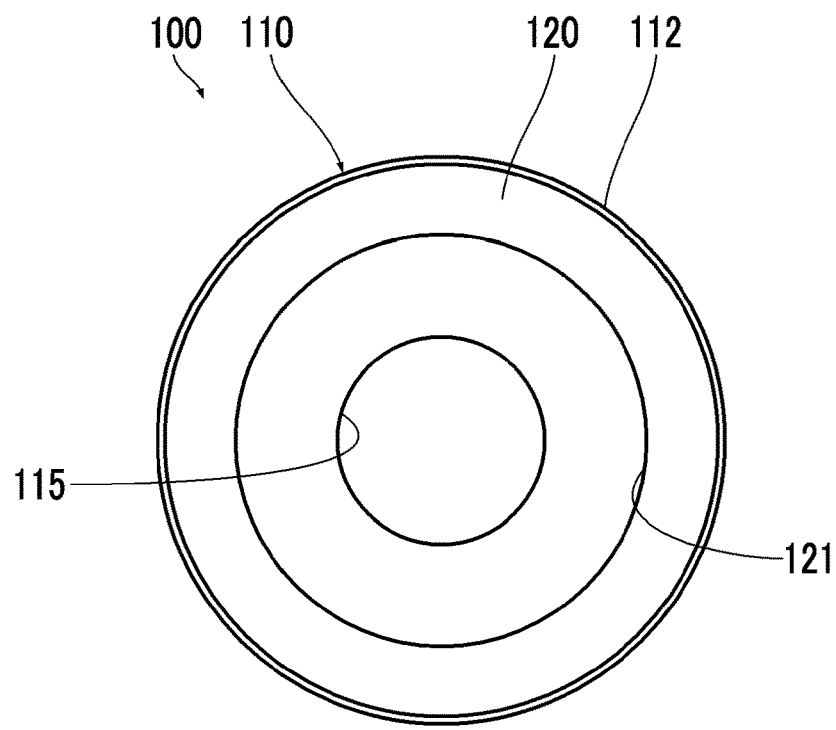

FIG. 74 is a bottom view of the cam follower shown in FIG. 71.

Figure 75:
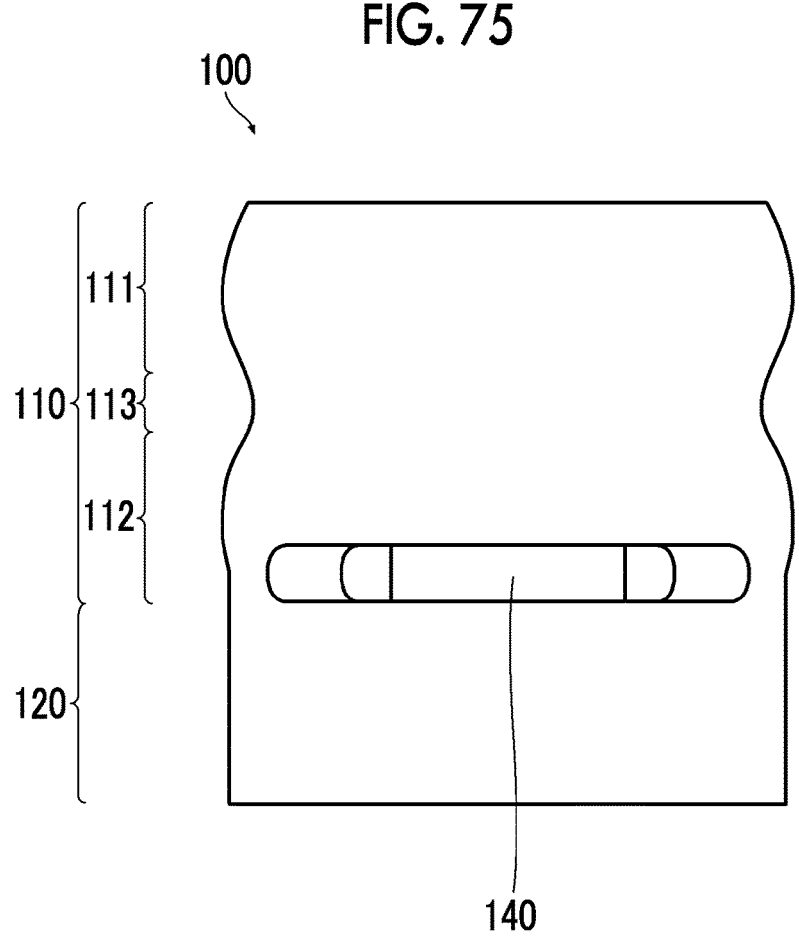

FIG. 75 is a right side view of the cam follower shown in FIG. 71.

Figure 76:
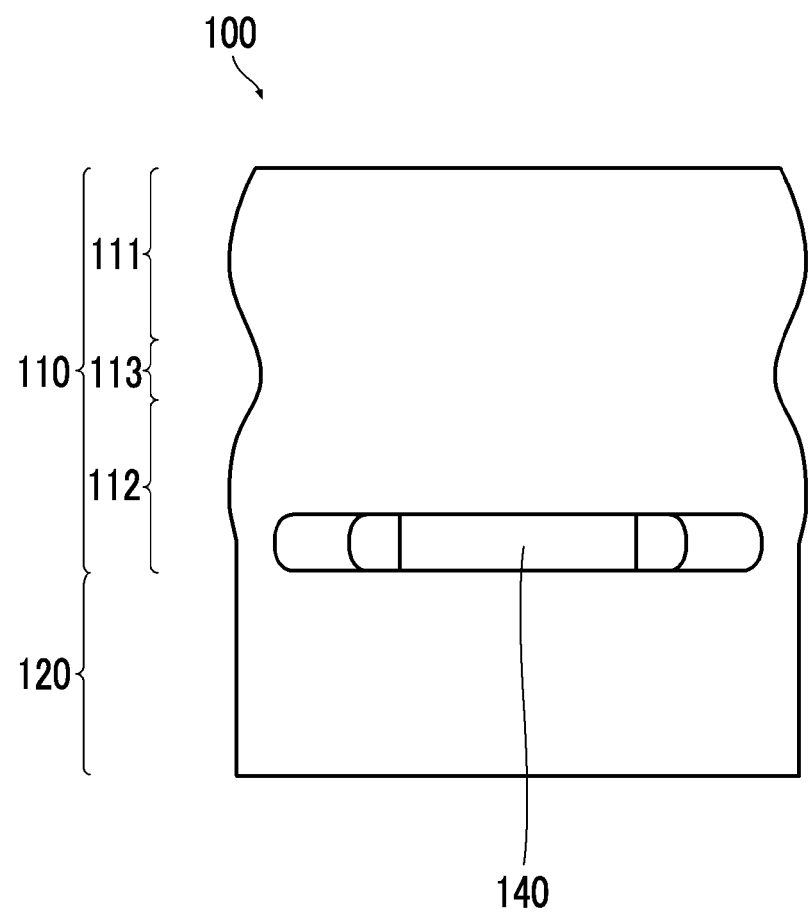

FIG. 76 is a left side view of the cam follower shown in FIG. 71.

Figure 77:
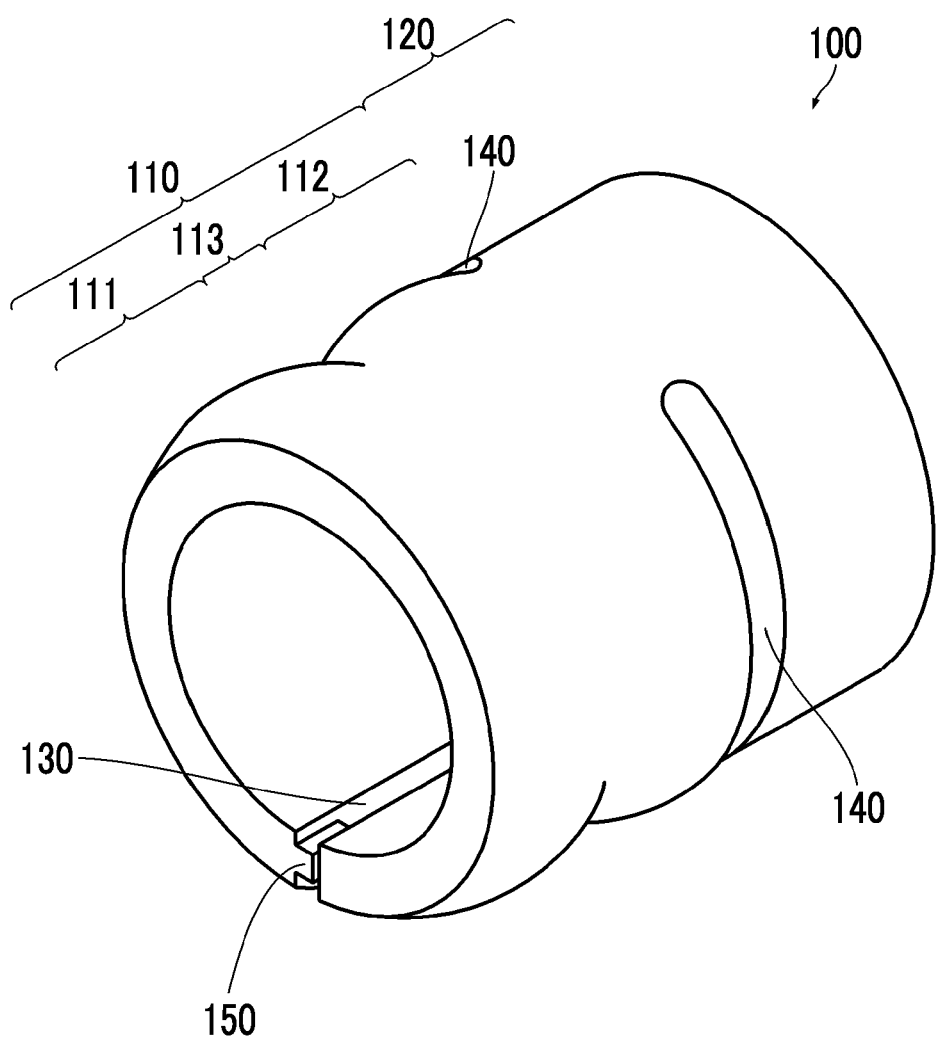

FIG. 77 is a perspective view of the cam follower shown in FIG. 71 that is viewed from a surface side.

Figure 78:
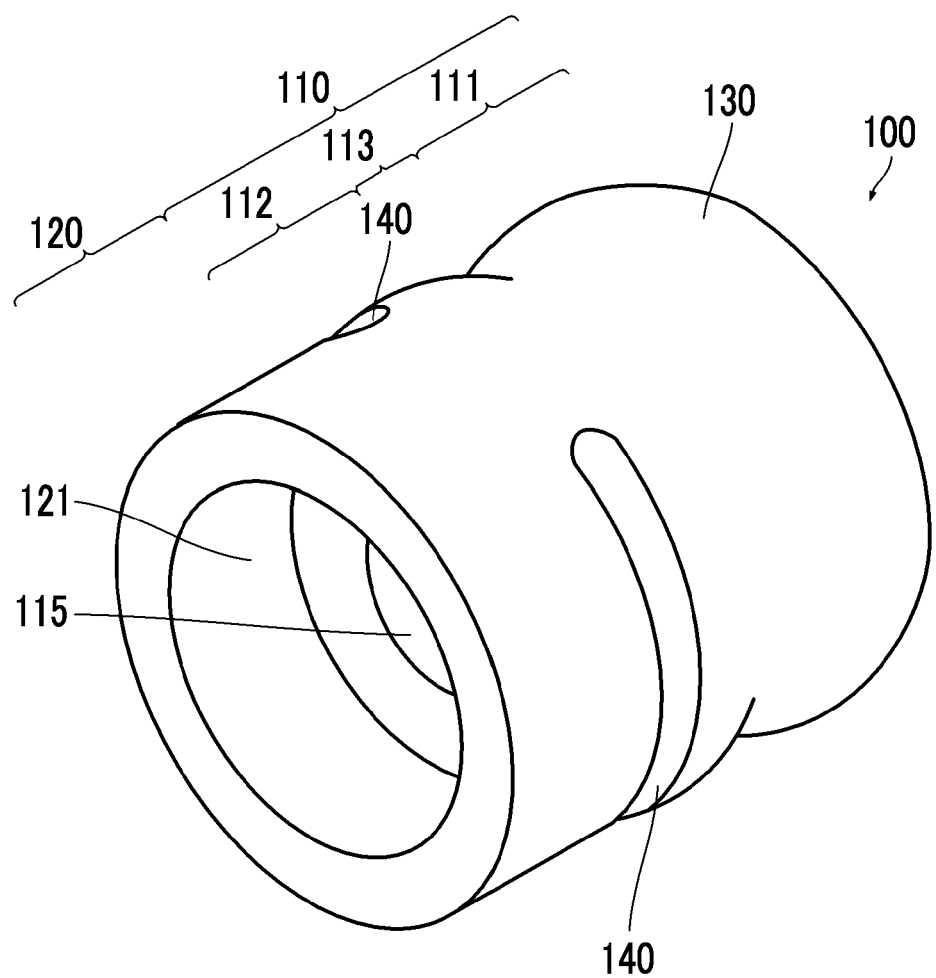

FIG. 78 is a perspective view of the cam follower shown in FIG. 71 that is viewed from a bottom side.

Figure 79:
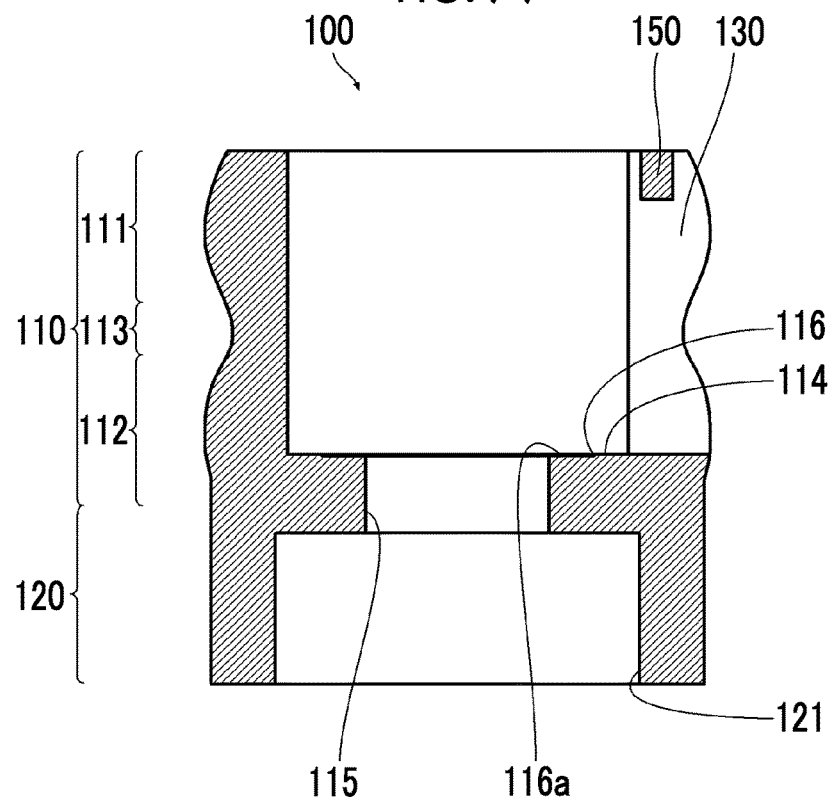

FIG. 79 is a cross-sectional view taken along line 79-79 of FIG. 73.

Figure 80:
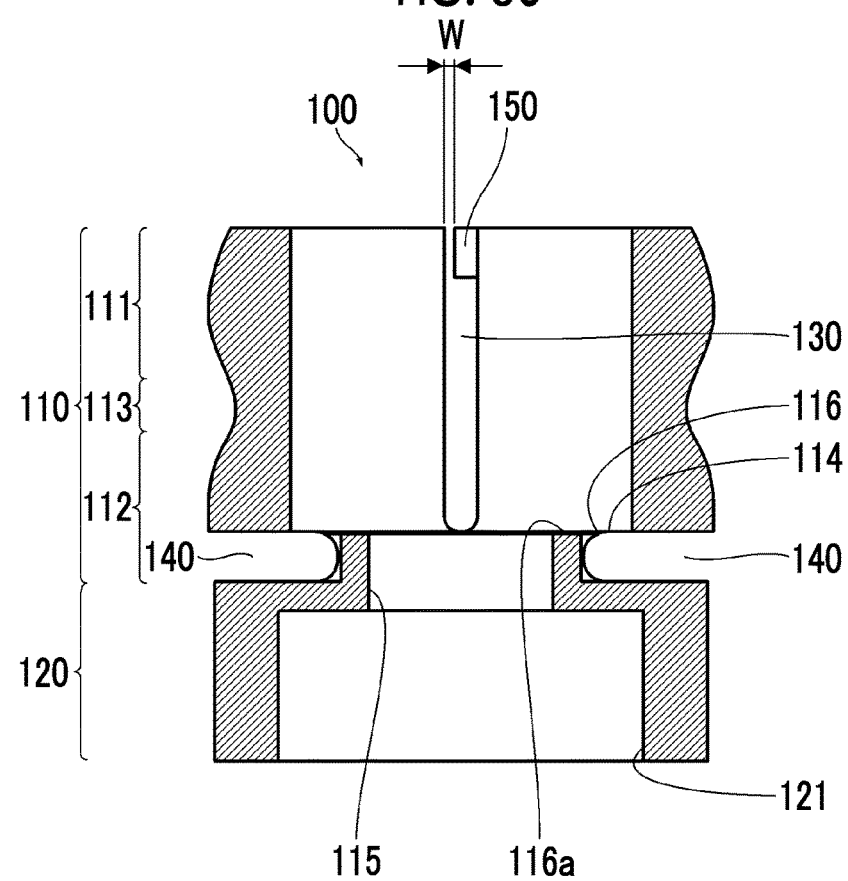

FIG. 80 is a cross-sectional view taken along line 80-80 of FIG. 73.

Figure 81:
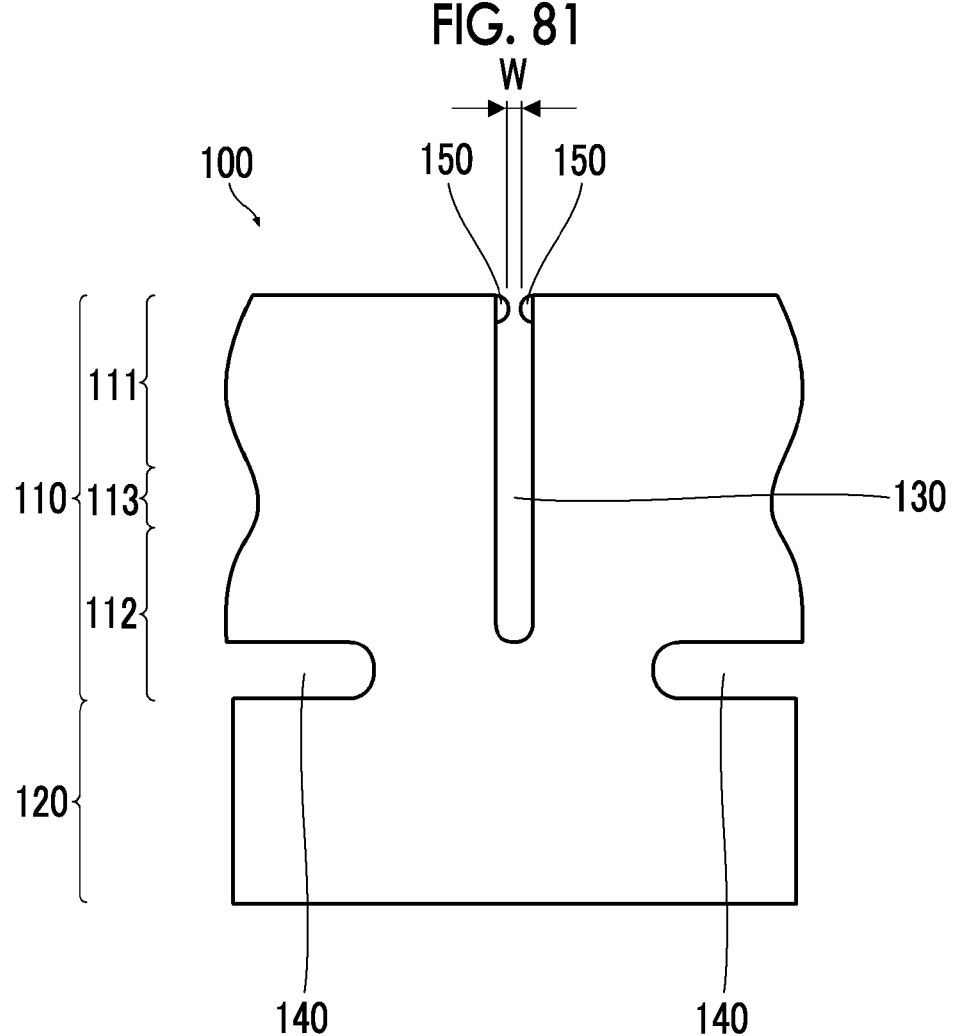

FIG. 81 is a front view of a fifth modification example of the cam follower.

Figure 82:
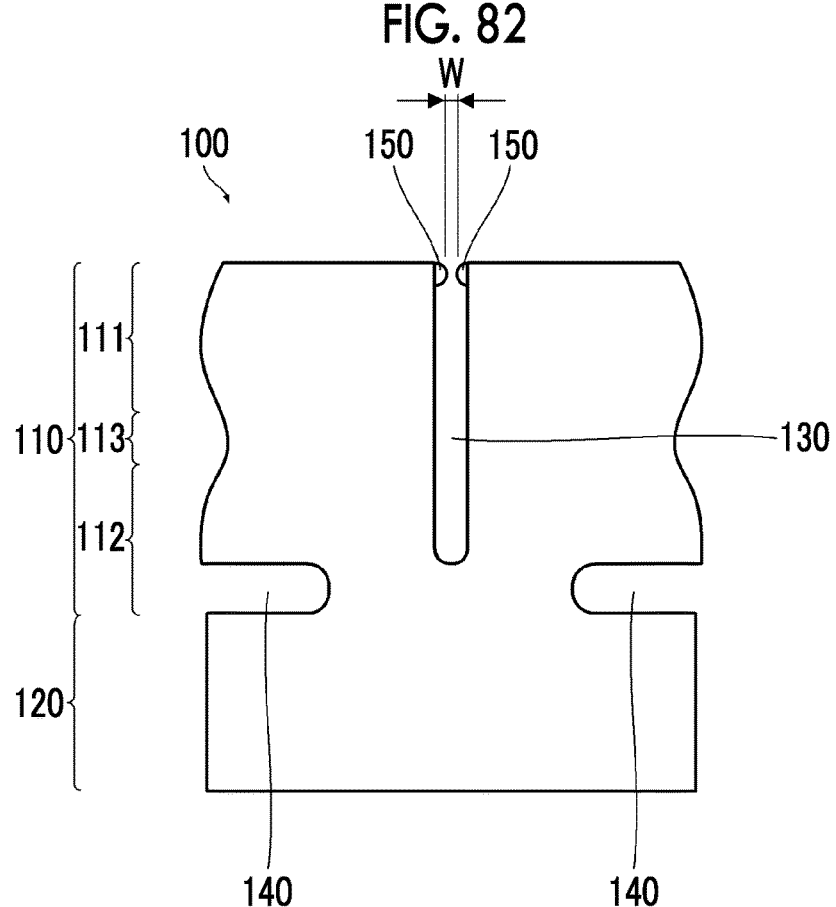

FIG. 82 is a back view of the cam follower shown in FIG. 81.

Figure 83:
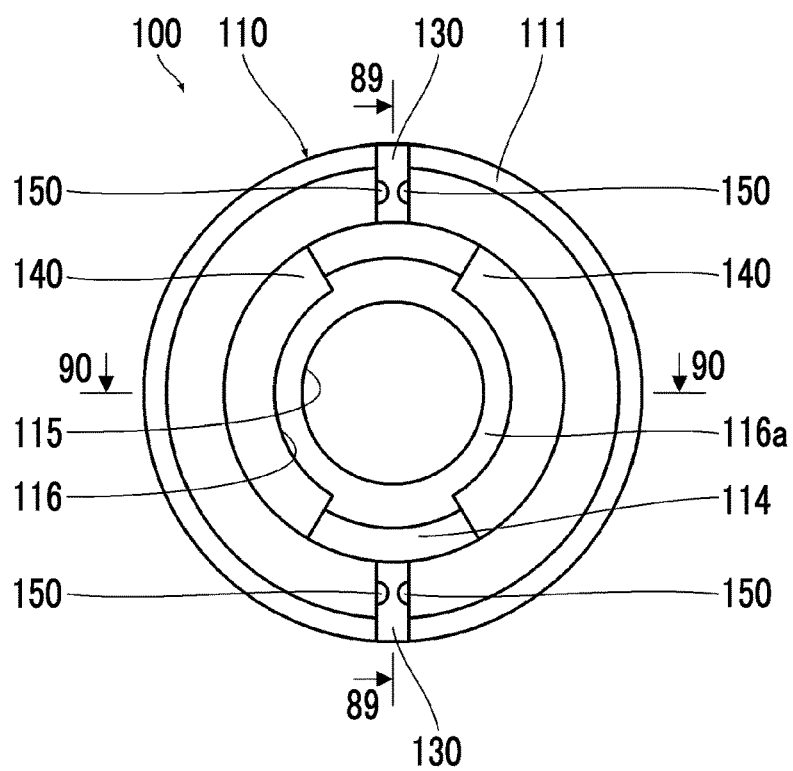

FIG. 83 is a plan view of the cam follower shown in FIG. 81.

Figure 84:
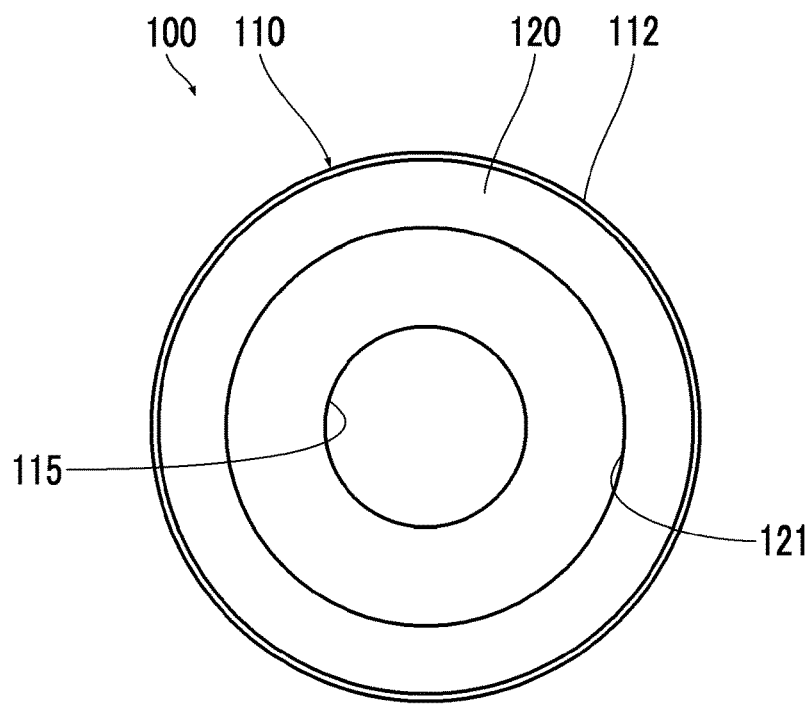

FIG. 84 is a bottom view of the cam follower shown in FIG. 81.

Figure 85:
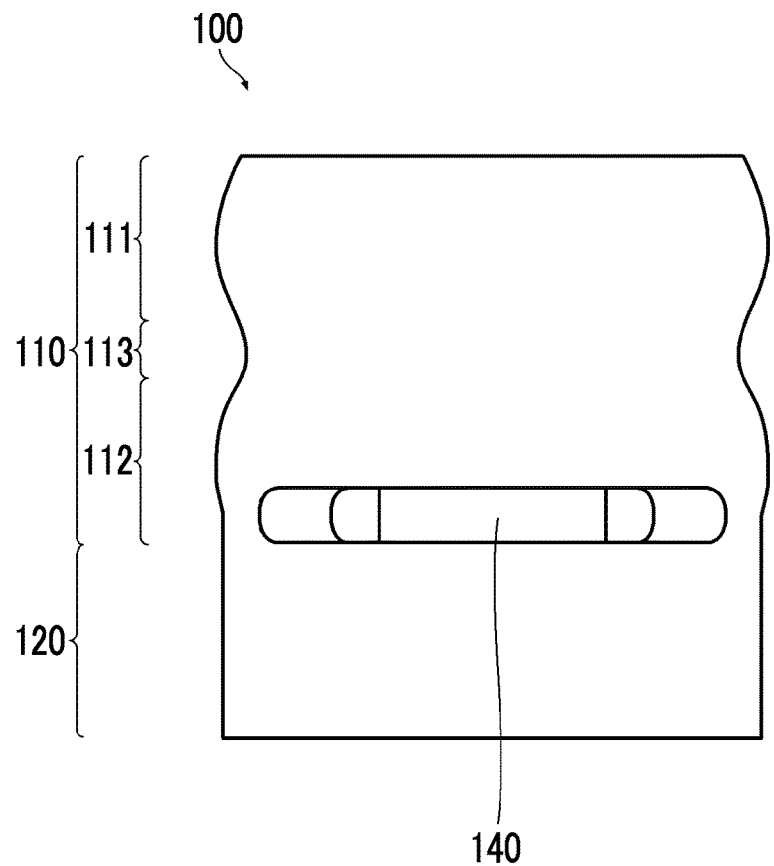

FIG. 85 is a right side view of the cam follower shown in FIG. 81.

Figure 86:
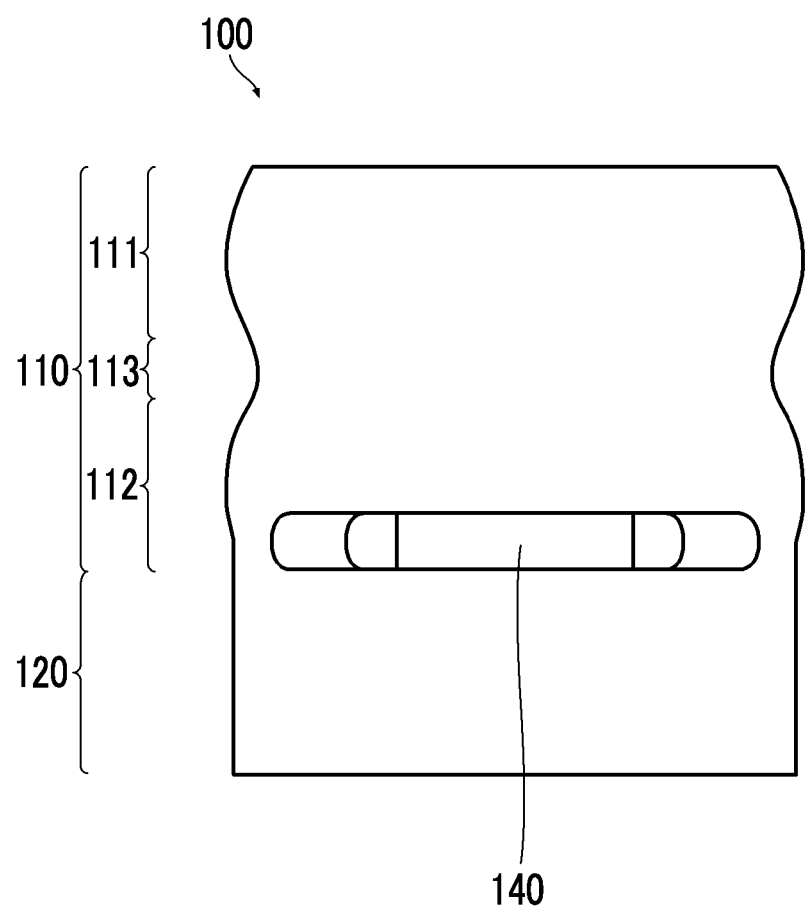

FIG. 86 is a left side view of the cam follower shown in FIG. 81.

Figure 87:
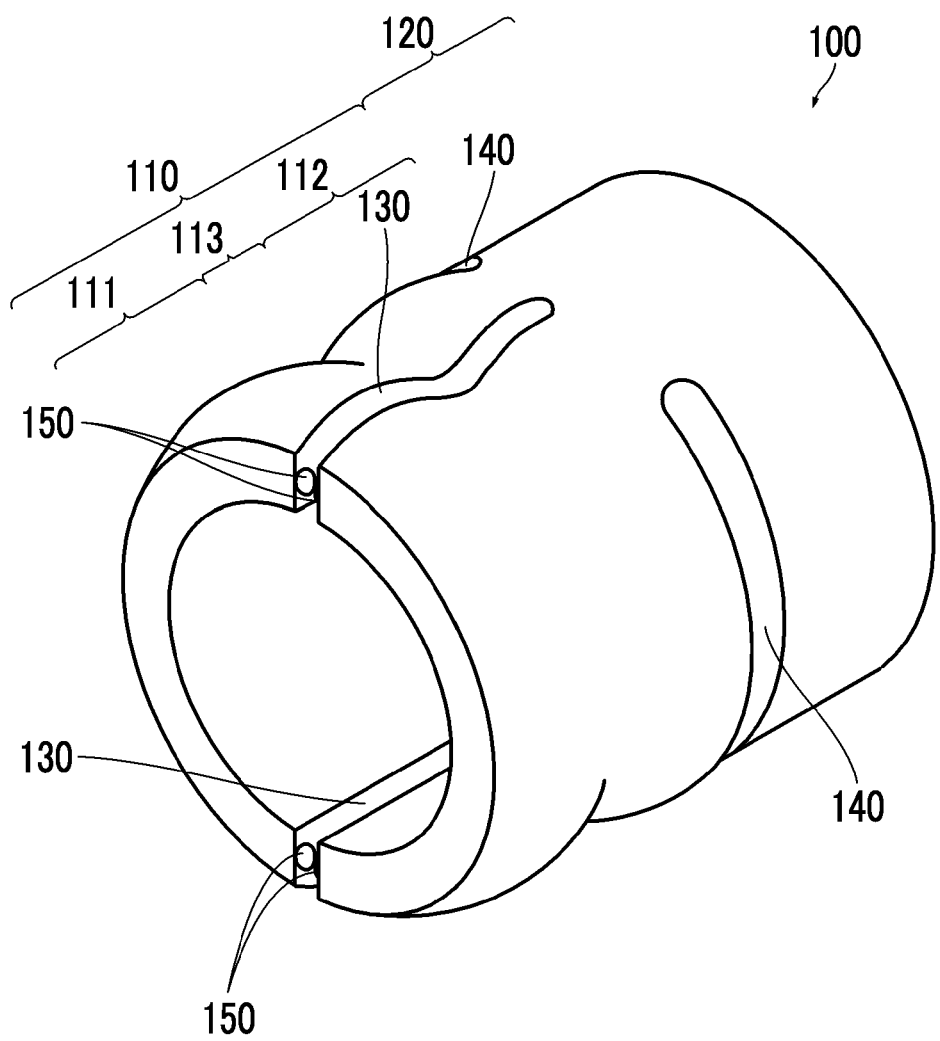

FIG. 87 is a perspective view of the cam follower shown in FIG. 81 that is viewed from a surface side.

Figure 88:
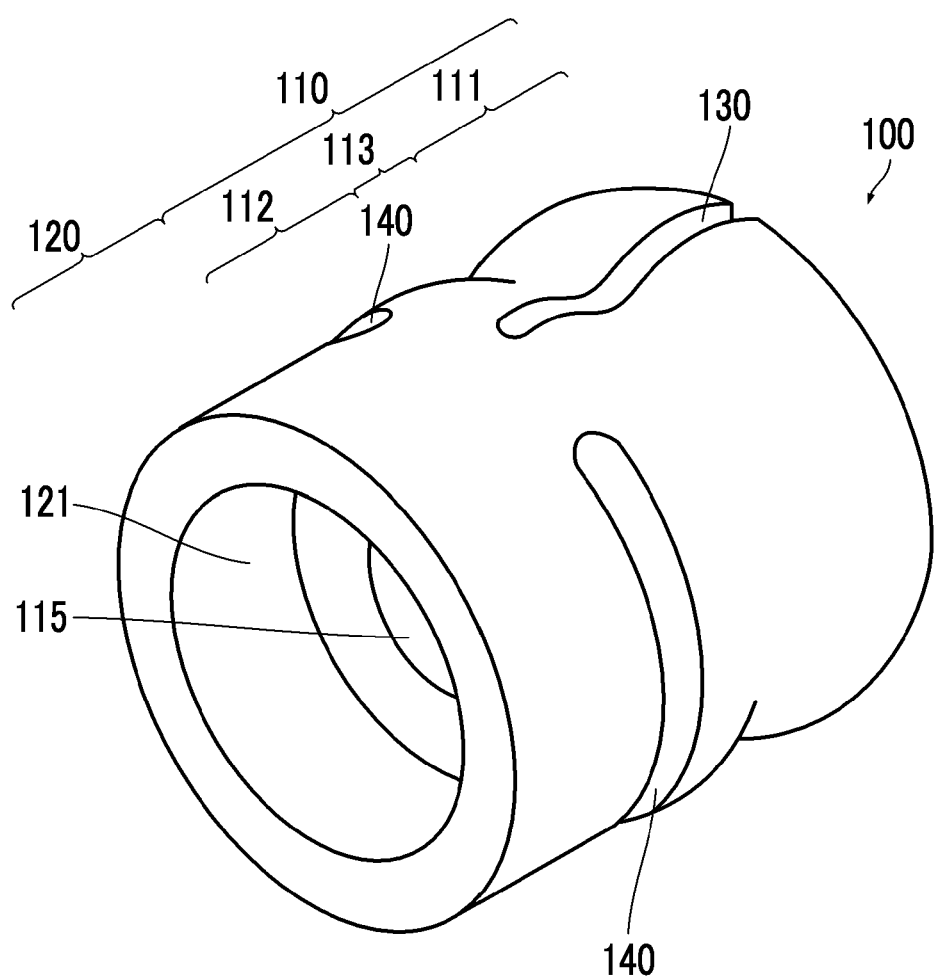

FIG. 88 is a perspective view of the cam follower shown in FIG. 81 that is viewed from a bottom side.

Figure 89:
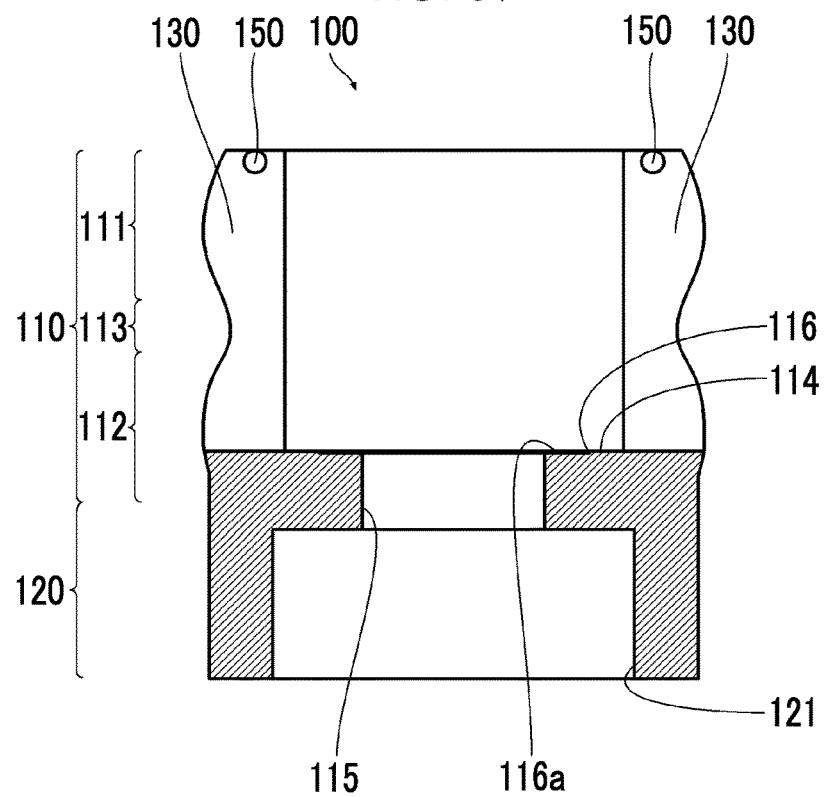

FIG. 89 is a cross-sectional view taken along line 89-89 of FIG. 83.

Figure 90:
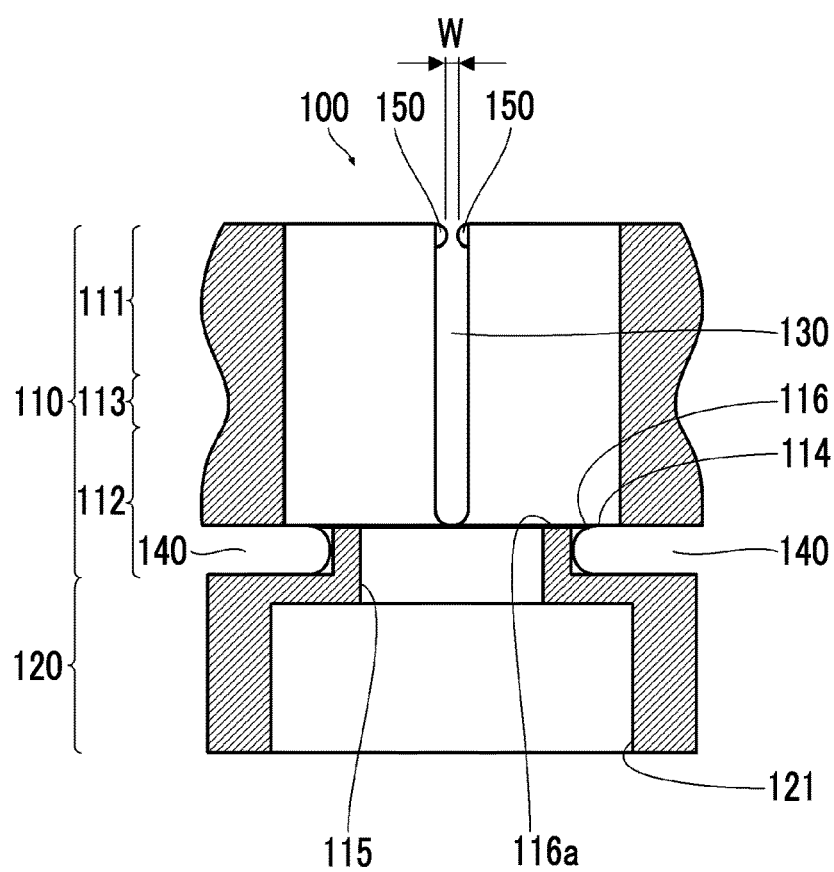

FIG. 90 is a cross-sectional view taken along line 90-90 of FIG. 83.

Figure 91:
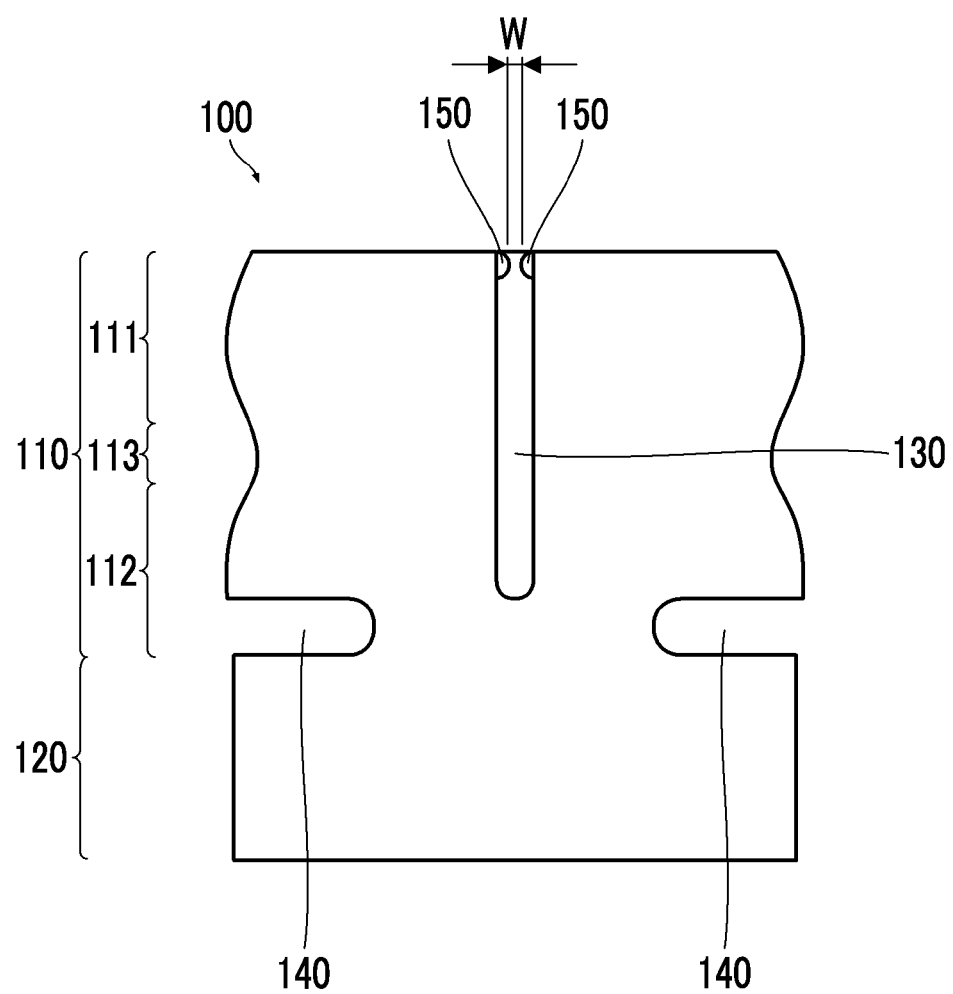

FIG. 91 is a front view of a sixth modification example of the cam follower.

Figure 92:
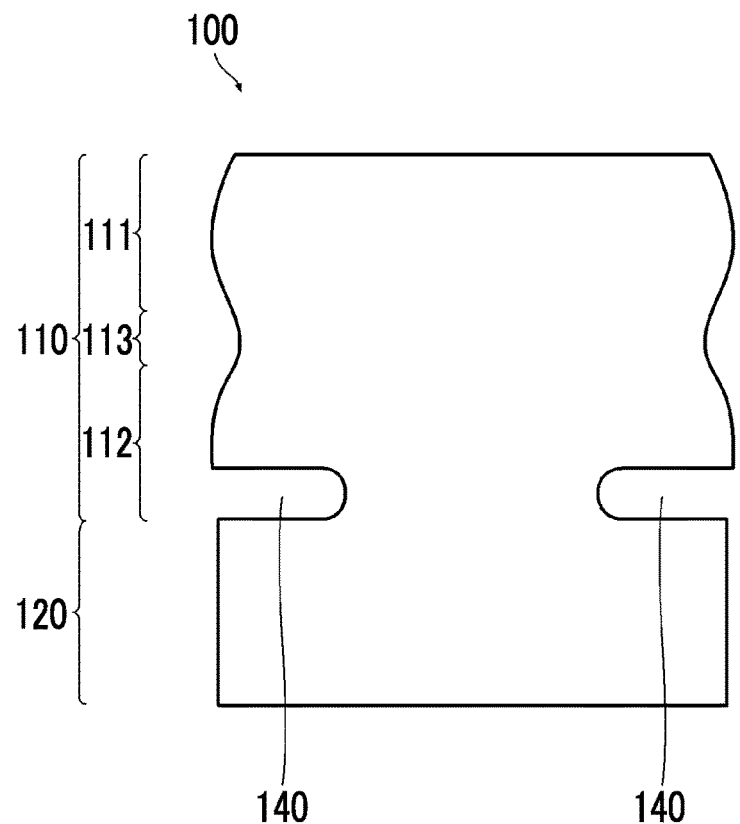

FIG. 92 is a back view of the cam follower shown in FIG. 91.

Figure 93:
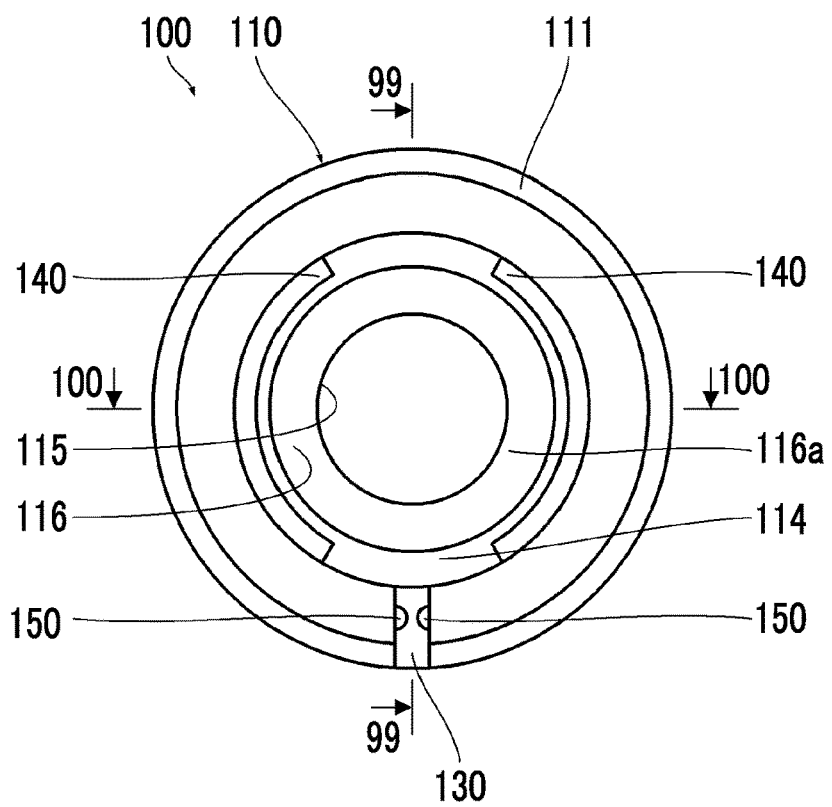

FIG. 93 is a plan view of the cam follower shown in FIG. 91.

Figure 94:
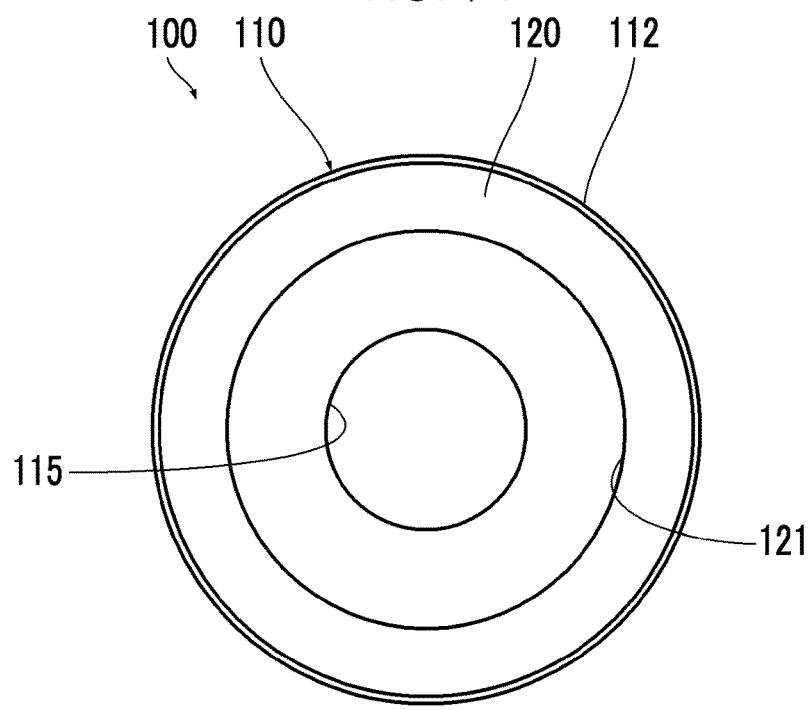

FIG. 94 is a bottom view of the cam follower shown in FIG. 91.

Figure 95:
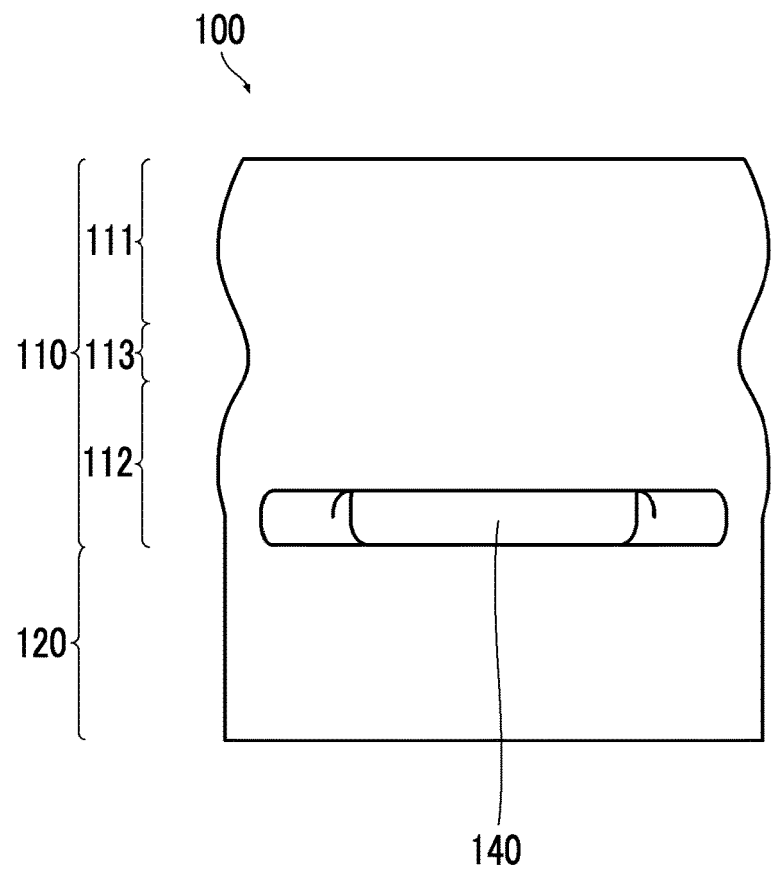

FIG. 95 is a right side view of the cam follower shown in FIG. 91.

Figure 96:
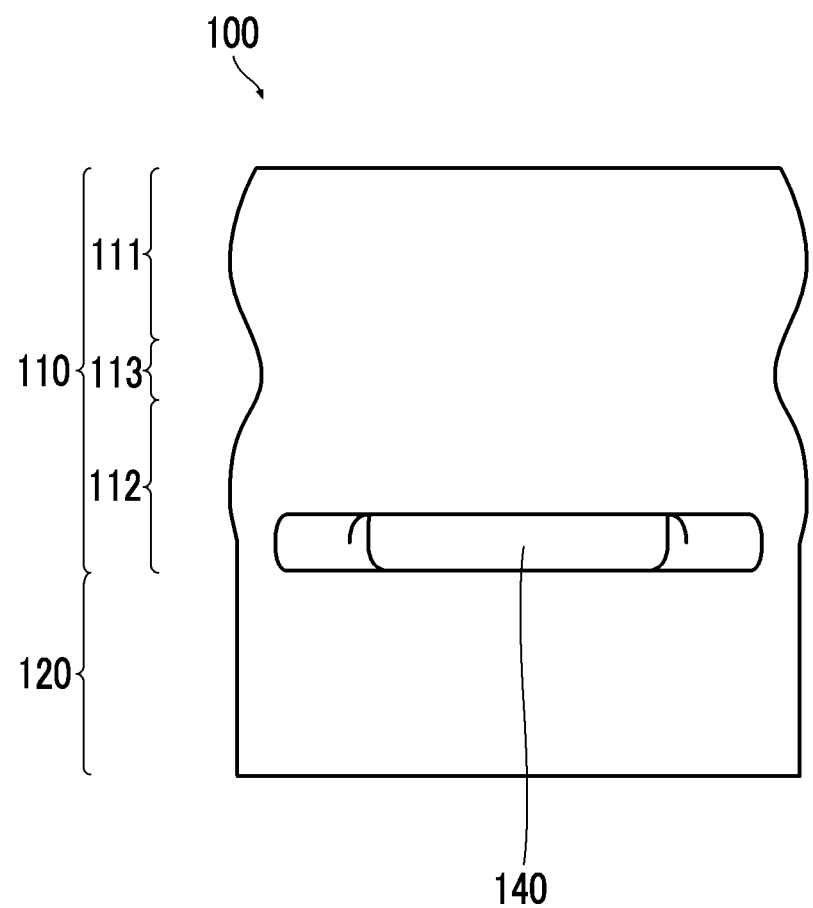

FIG. 96 is a left side view of the cam follower shown in FIG. 91.

Figure 97:
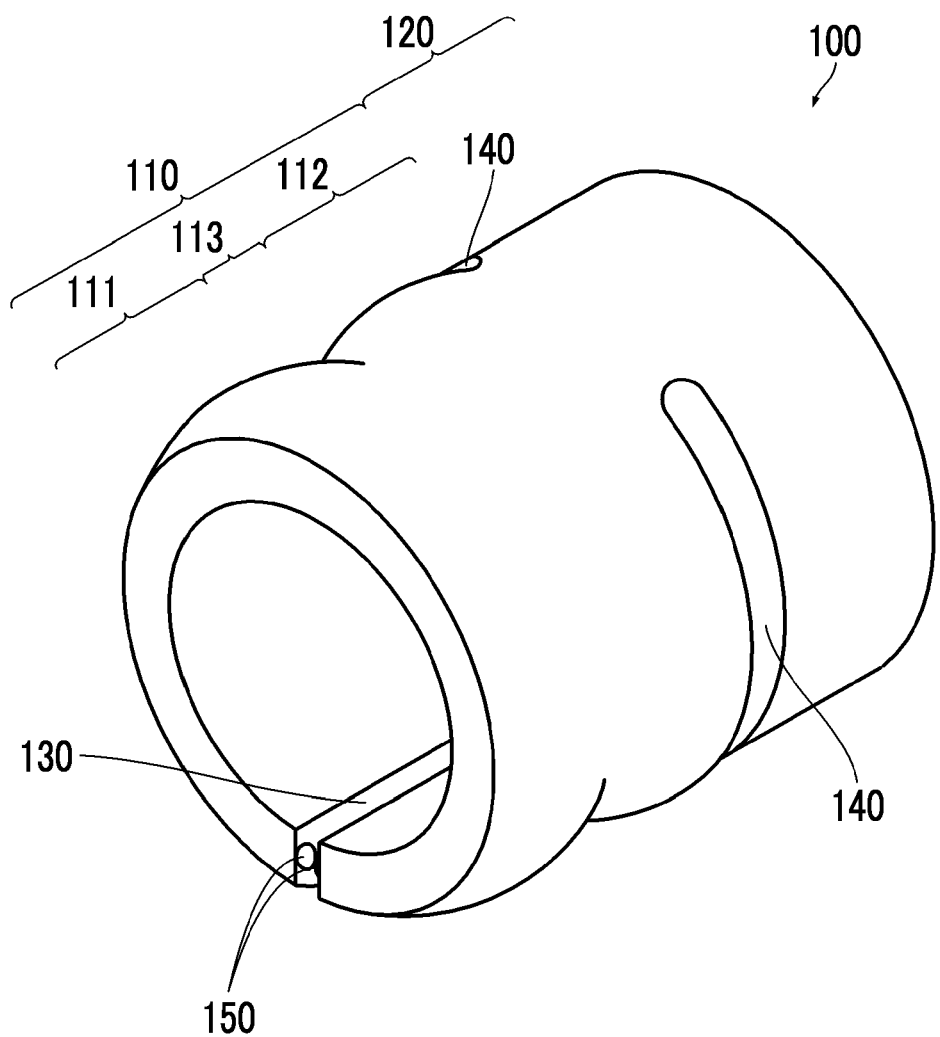

FIG. 97 is a perspective view of the cam follower shown in FIG. 91 that is viewed from a surface side.

Figure 98:
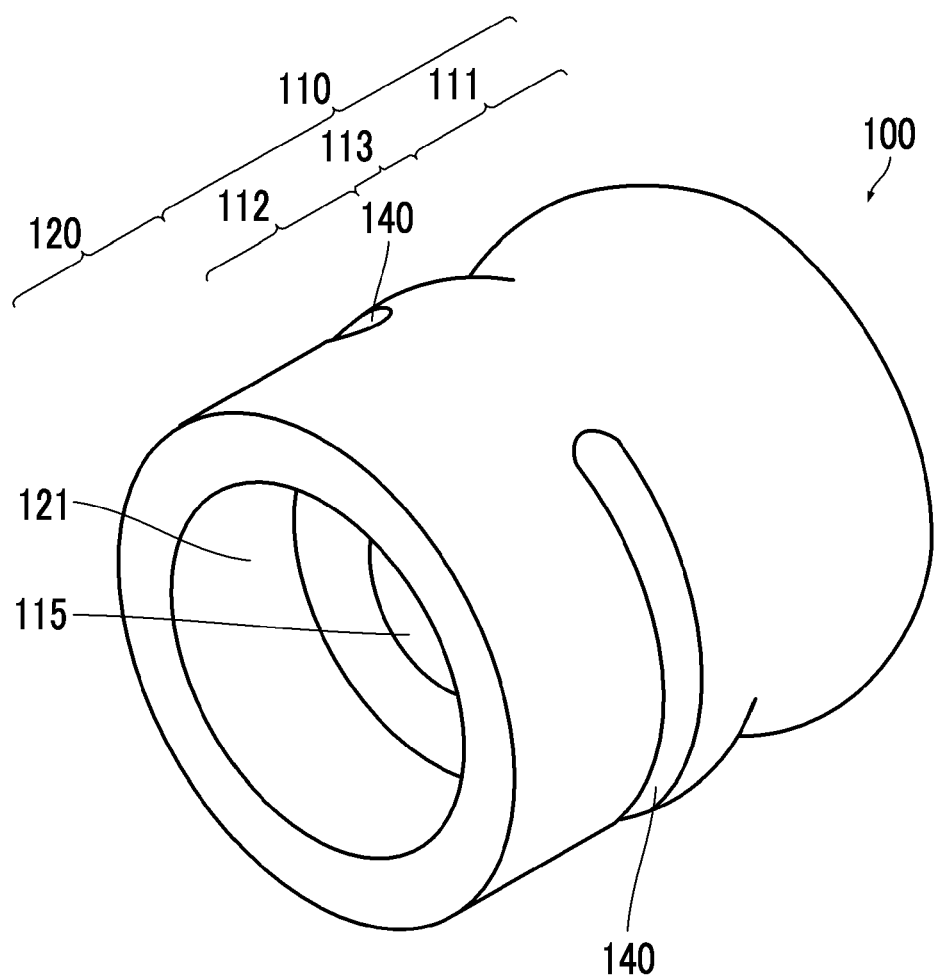

FIG. 98 is a perspective view of the cam follower shown in FIG. 91 that is viewed from a bottom side.

Figure 99:
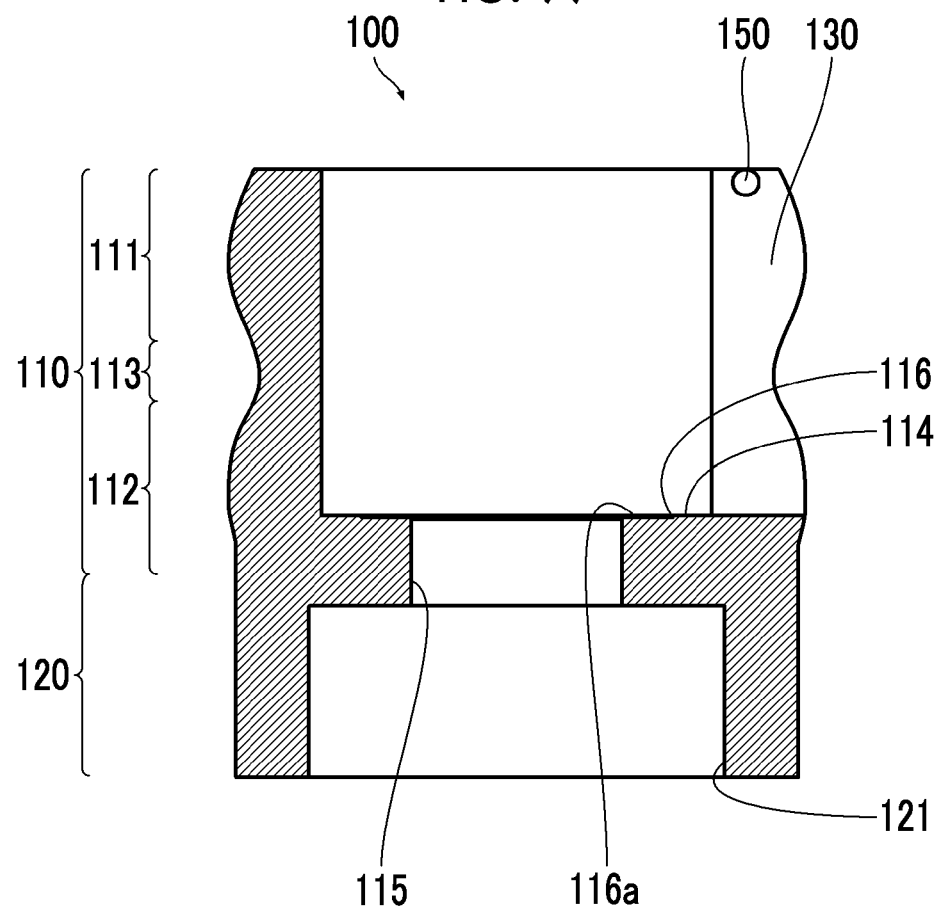

FIG. 99 is a cross-sectional view taken along line 99-99 of FIG. 93.

Figure 100:
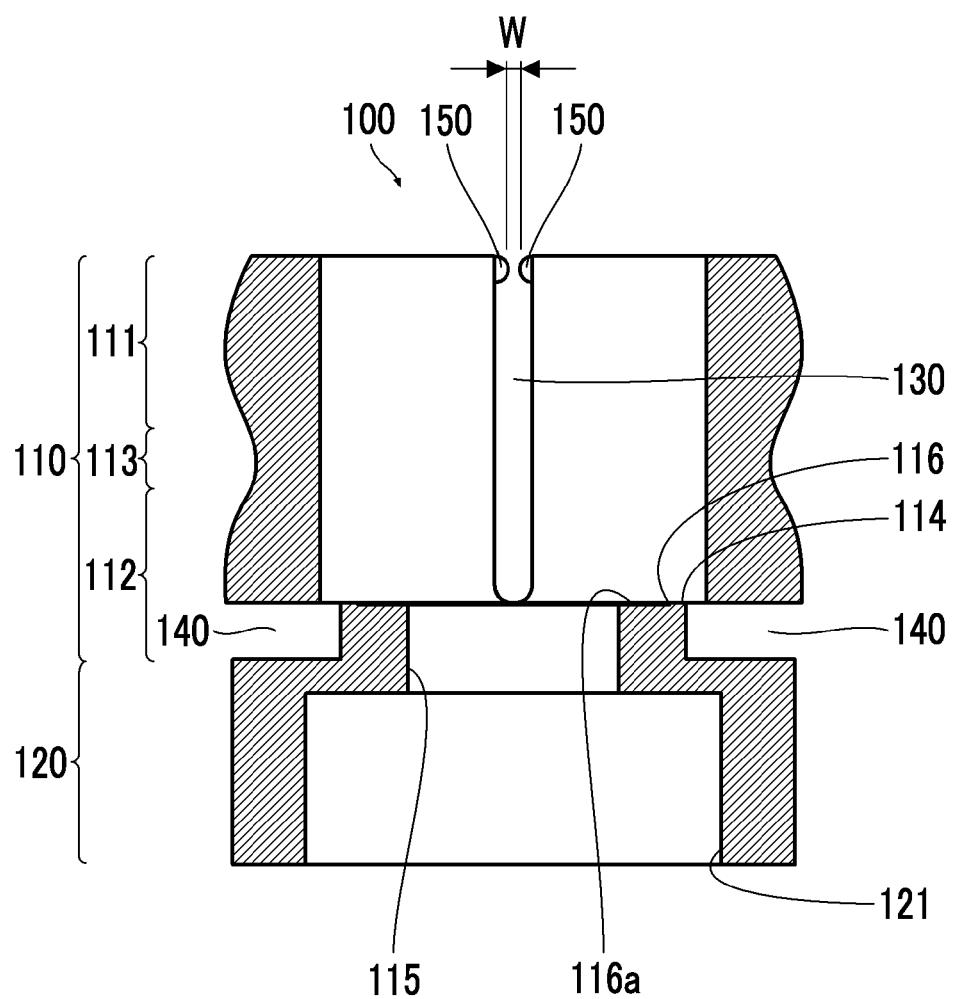

FIG. 100 is a cross-sectional view taken along line 100-100 of FIG. 93.

Figure 101:
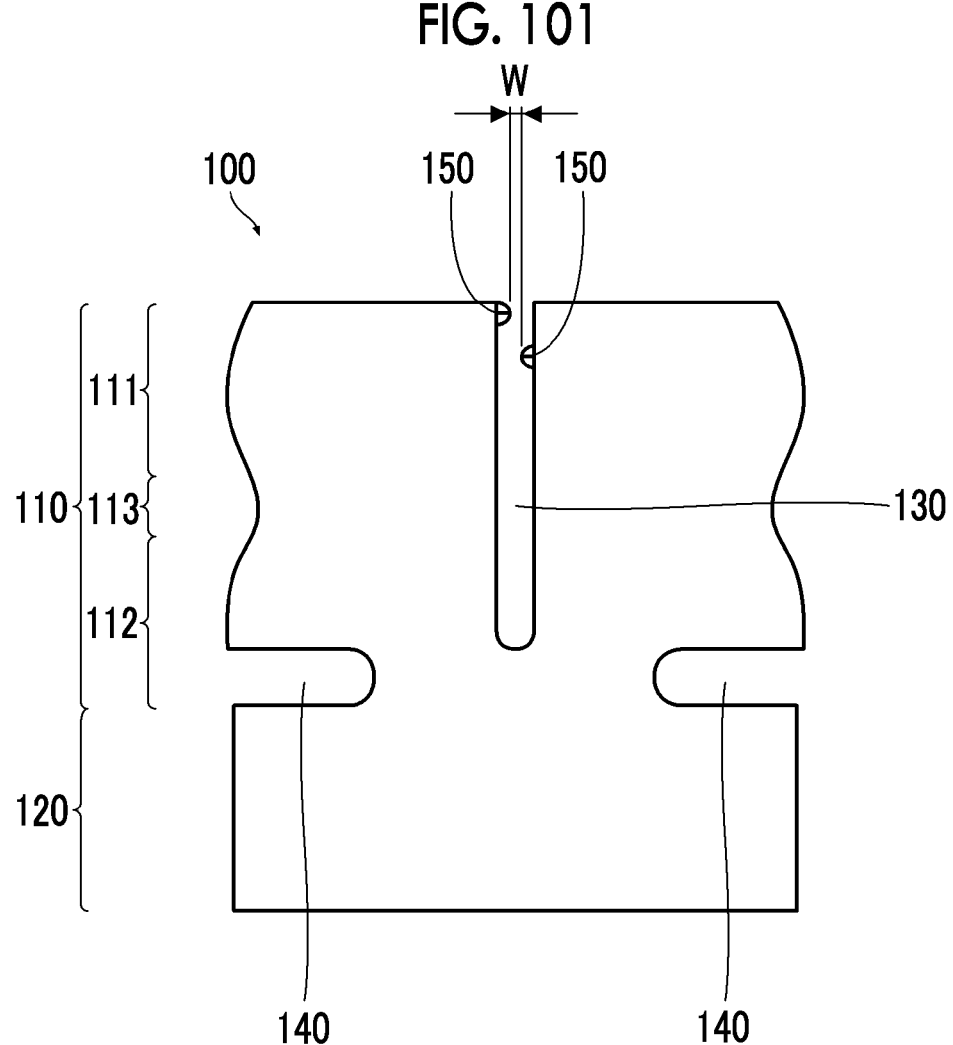

FIG. 101 is a front view of a seventh modification example of the cam follower.

Figure 102:
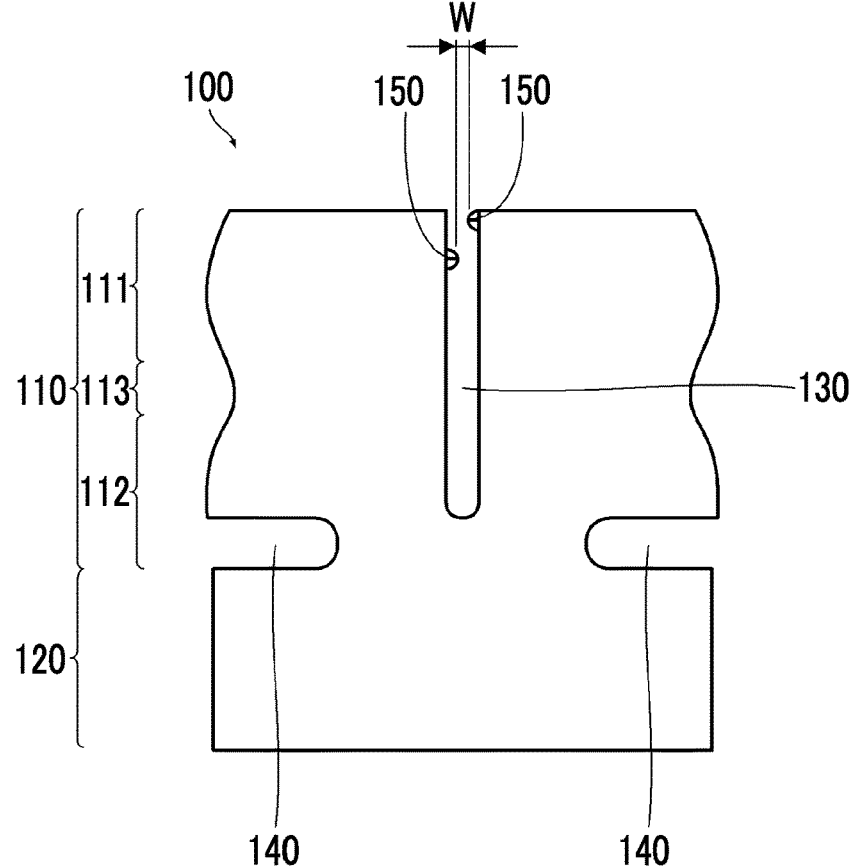

FIG. 102 is a back view of the cam follower shown in FIG. 101.

Figure 103:
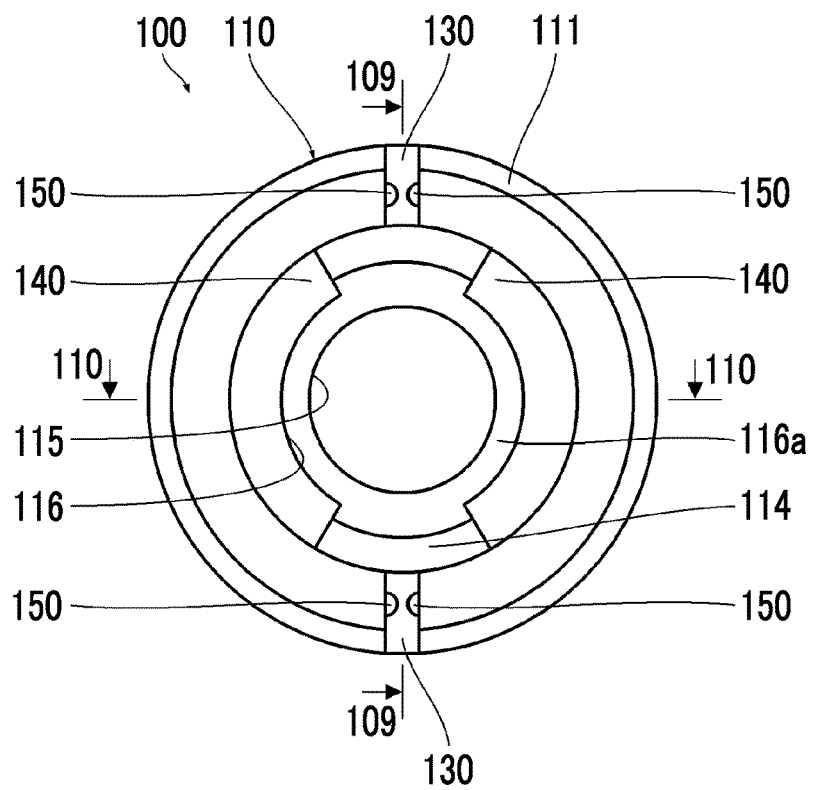

FIG. 103 is a plan view of the cam follower shown in FIG. 101.

Figure 104:
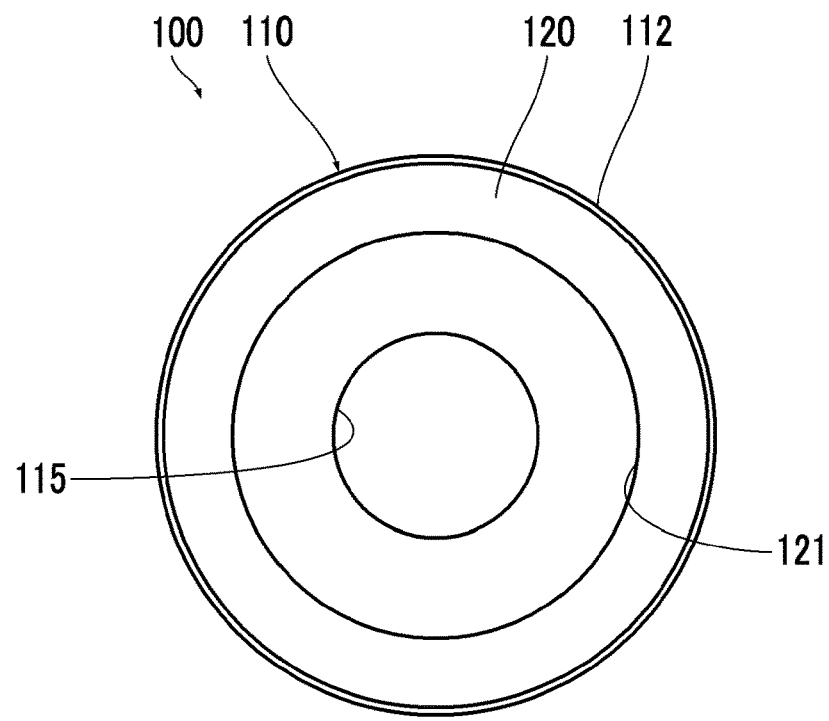

FIG. 104 is a bottom view of the cam follower shown in FIG. 101.

Figure 105:
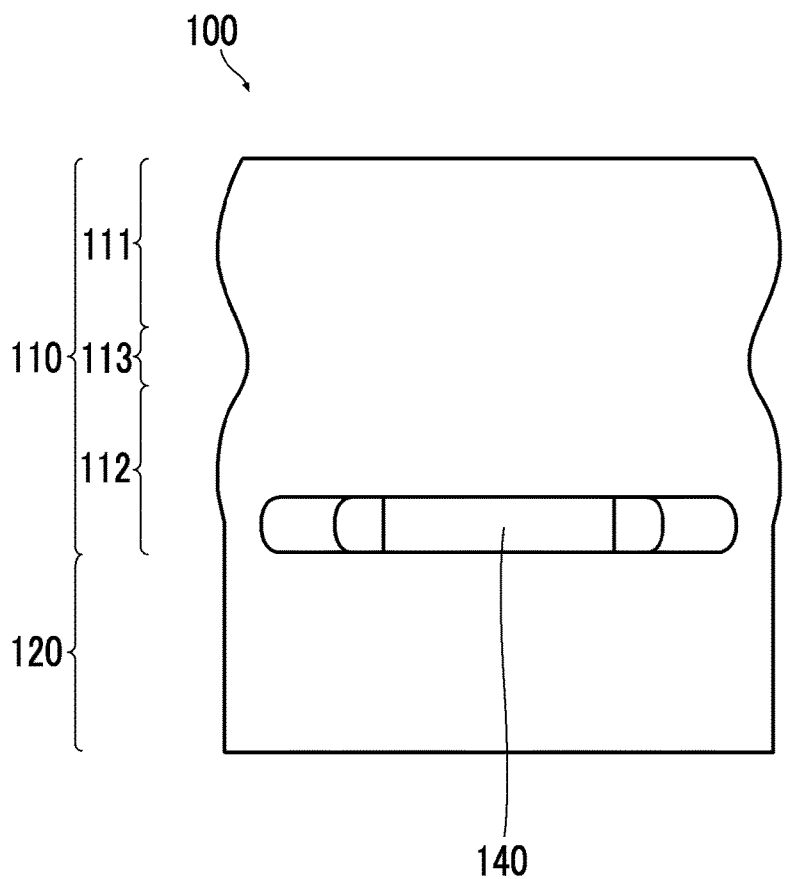

FIG. 105 is a right side view of the cam follower shown in FIG. 101.

Figure 106:
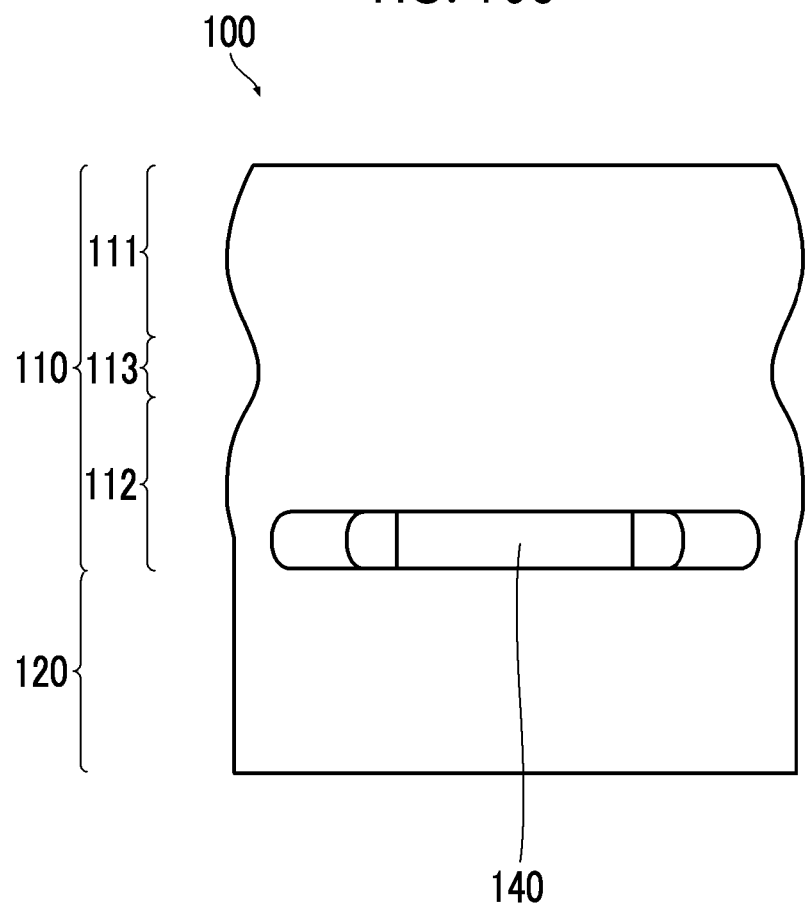

FIG. 106 is a left side view of the cam follower shown in FIG. 101.

Figure 107:
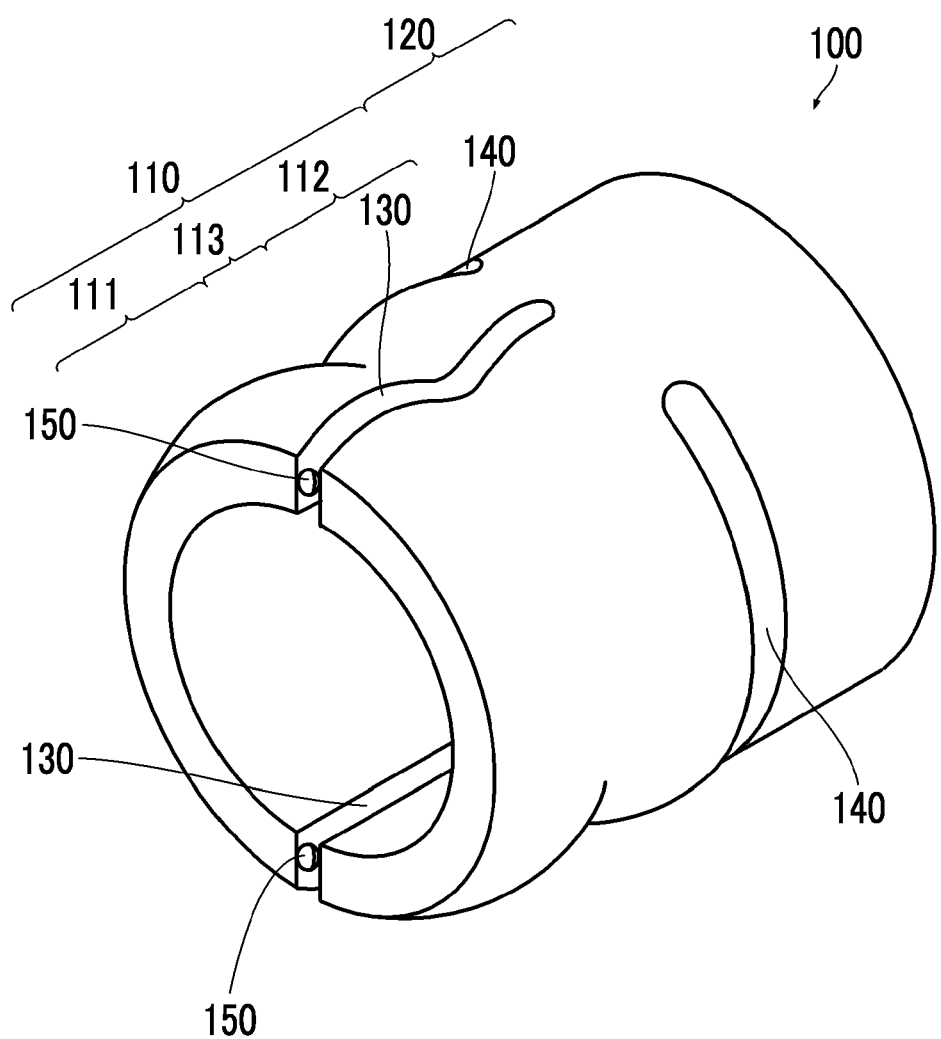

FIG. 107 is a perspective view of the cam follower shown in FIG. 101 that is viewed from a surface side.

Figure 108:
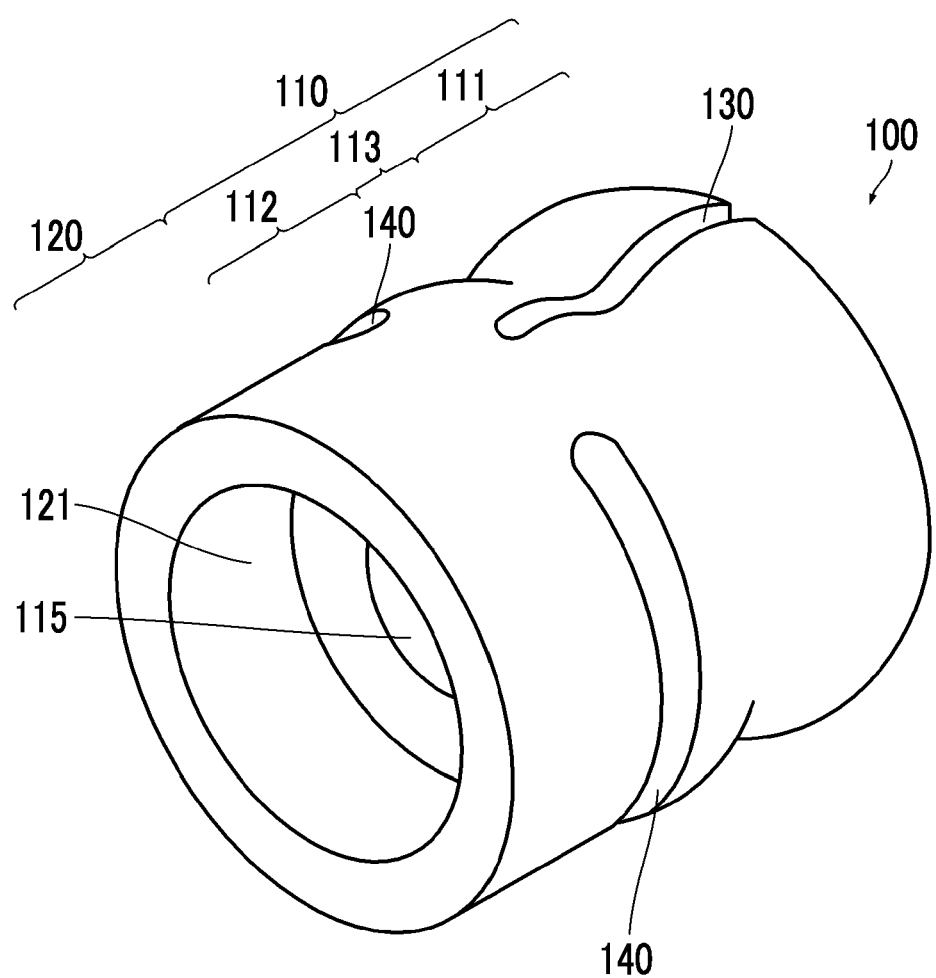

FIG. 108 is a perspective view of the cam follower shown in FIG. 101 that is viewed from a bottom side.

Figure 109:
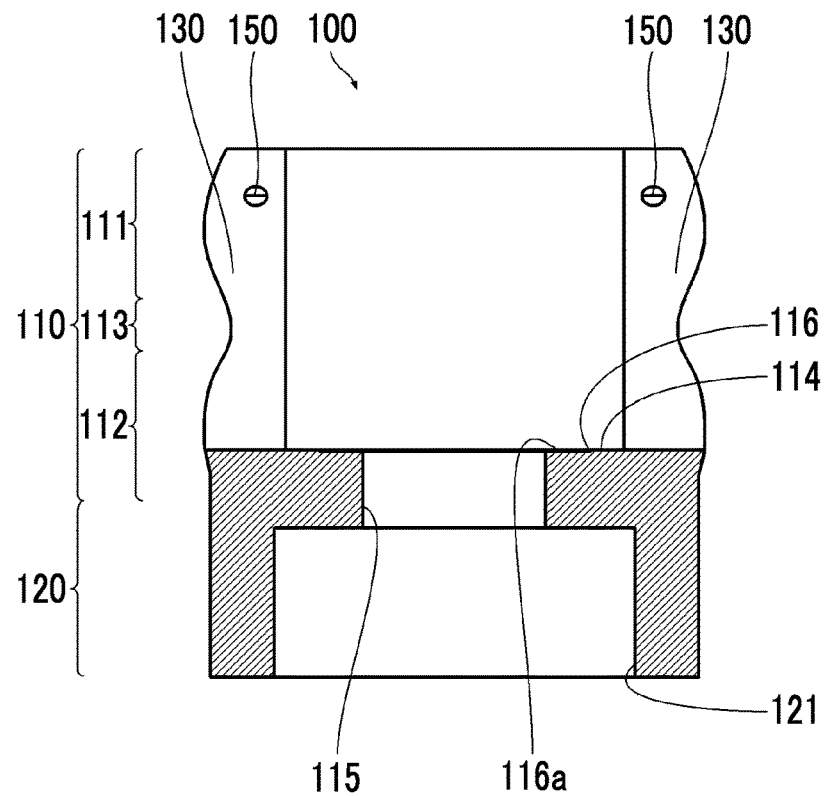

FIG. 109 is a cross-sectional view taken along line 109-109 of FIG. 103.

Figure 110:
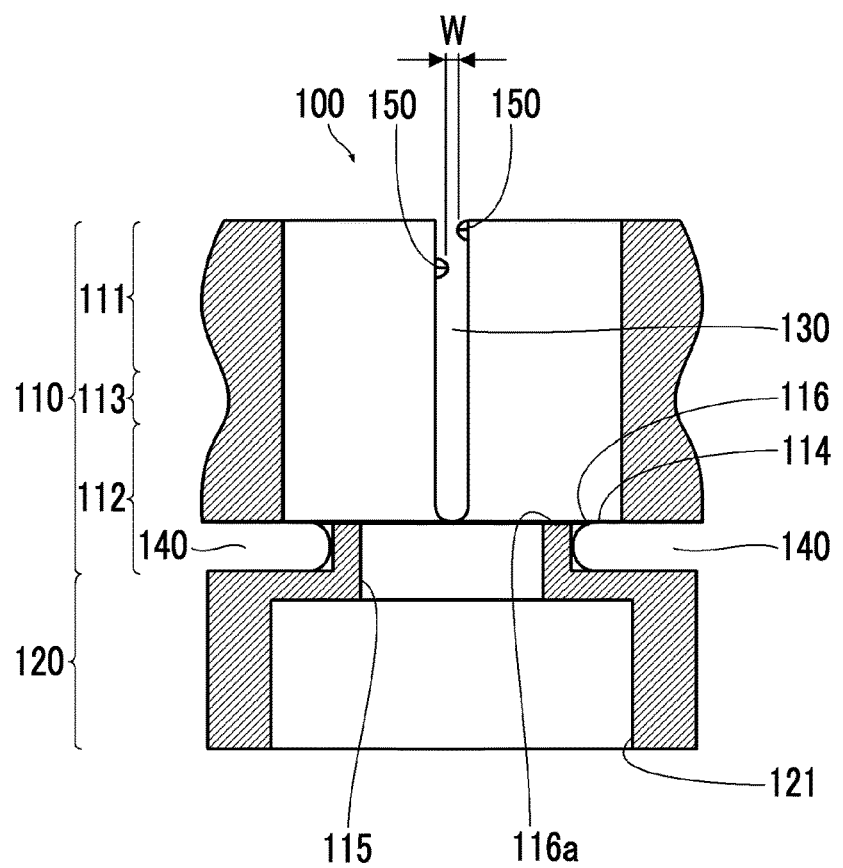

FIG. 110 is a cross-sectional view taken along line 110-110 of FIG. 103.

Figure 111:
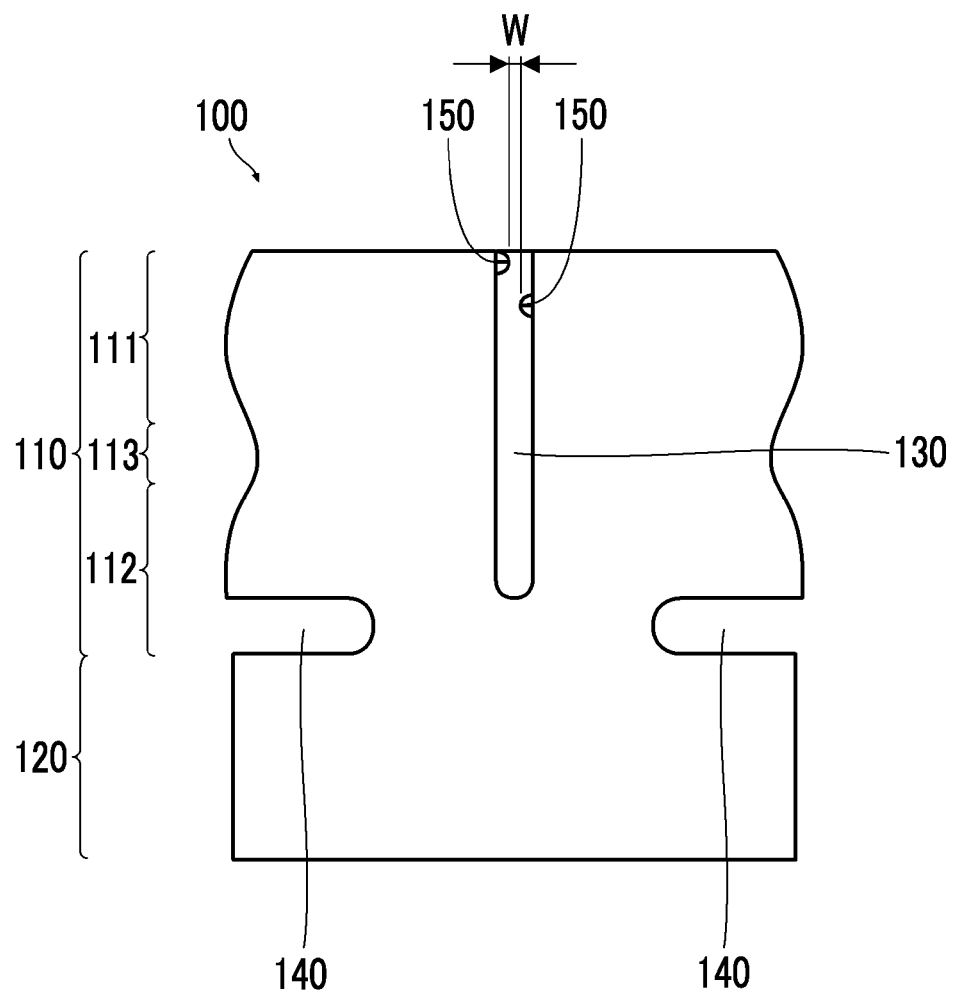

FIG. 111 is a front view of an eighth modification example of the cam follower.

Figure 112:
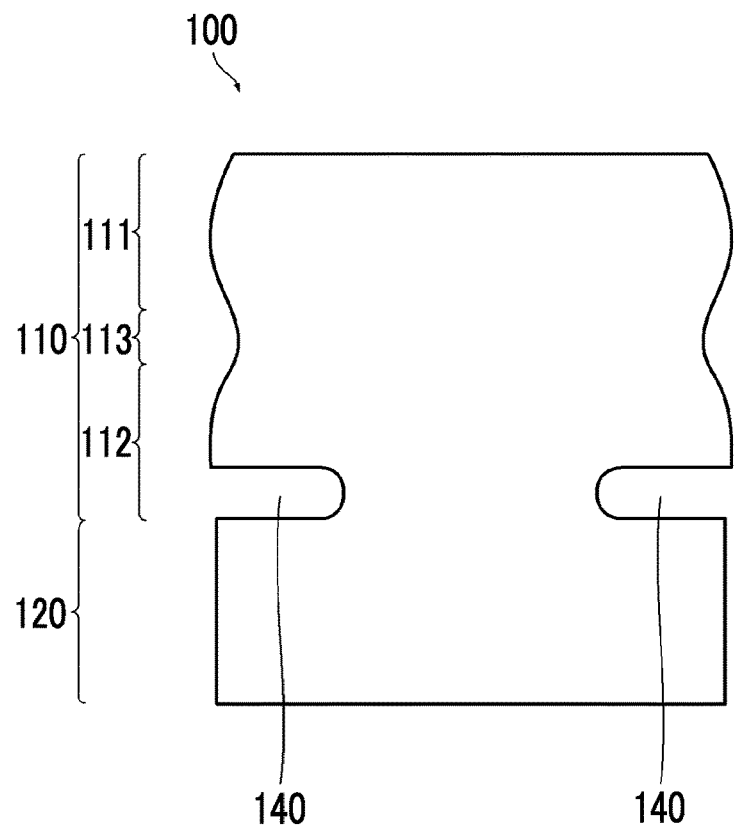

FIG. 112 is a back view of the cam follower shown in FIG. 111.

Figure 113:
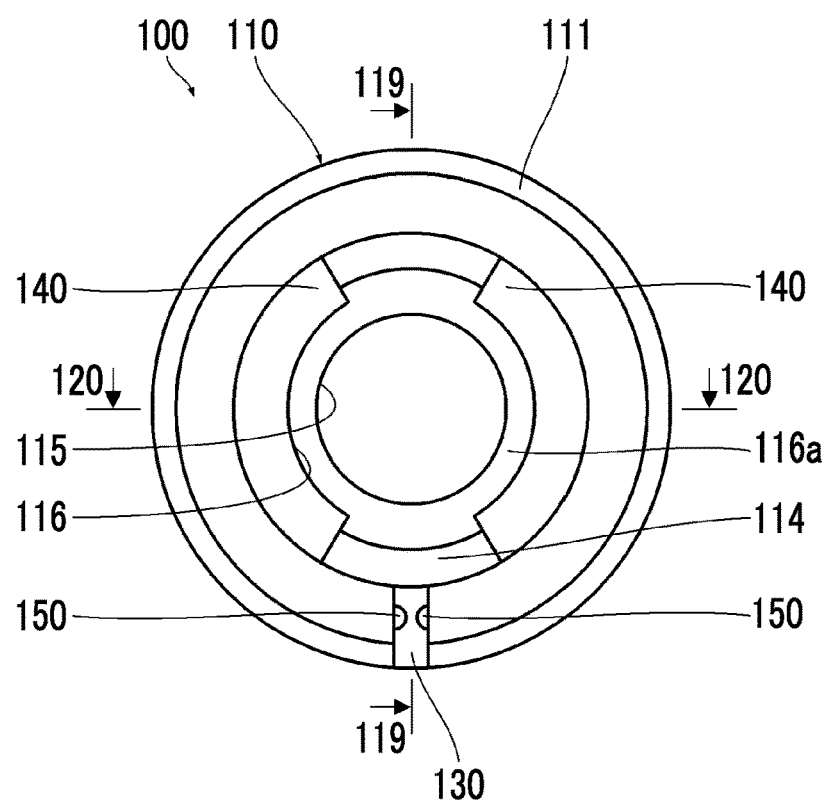

FIG. 113 is a plan view of the cam follower shown in FIG. 111.

Figure 114:
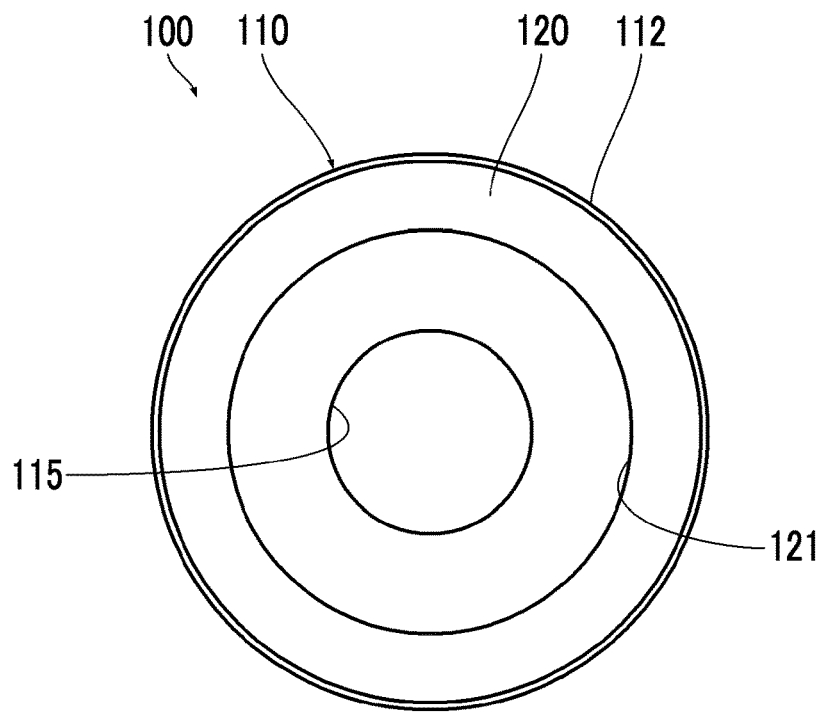

FIG. 114 is a bottom view of the cam follower shown in FIG. 111.

Figure 115:
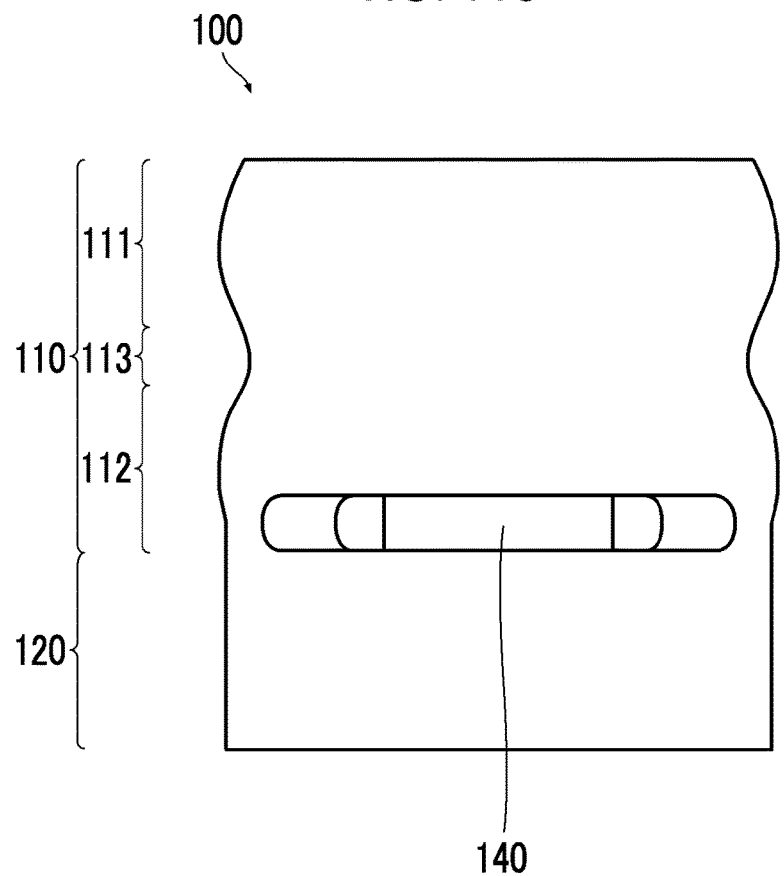

FIG. 115 is a right side view of the cam follower shown in FIG. 111.

Figure 116:
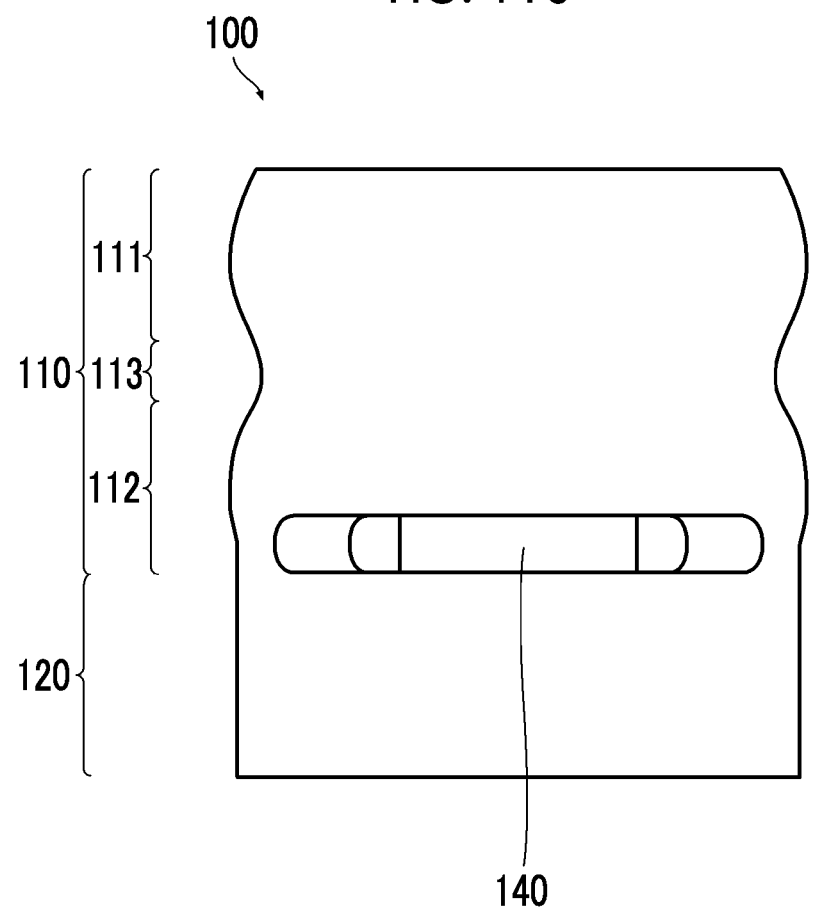

FIG. 116 is a left side view of the cam follower shown in FIG. 111.

Figure 117:
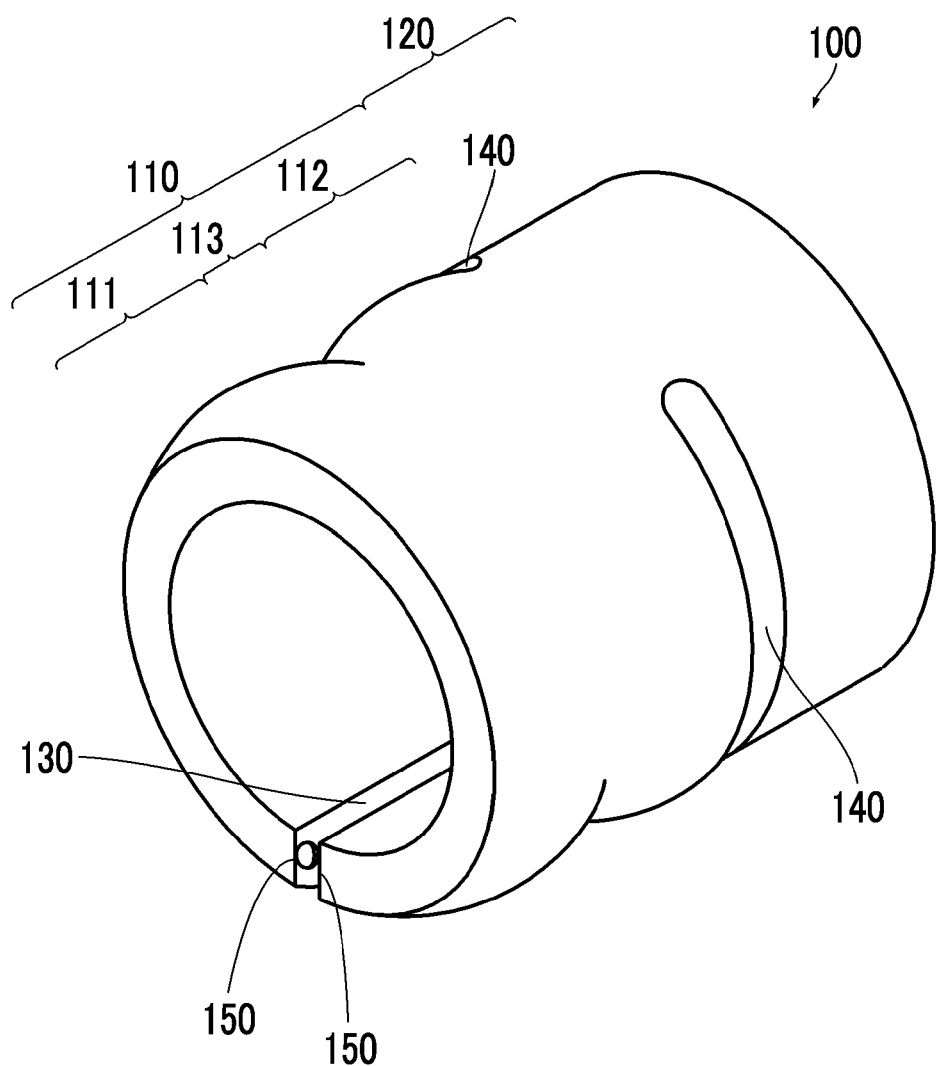

FIG. 117 is a perspective view of the cam follower shown in FIG. 111 that is viewed from a surface side.

Figure 118:
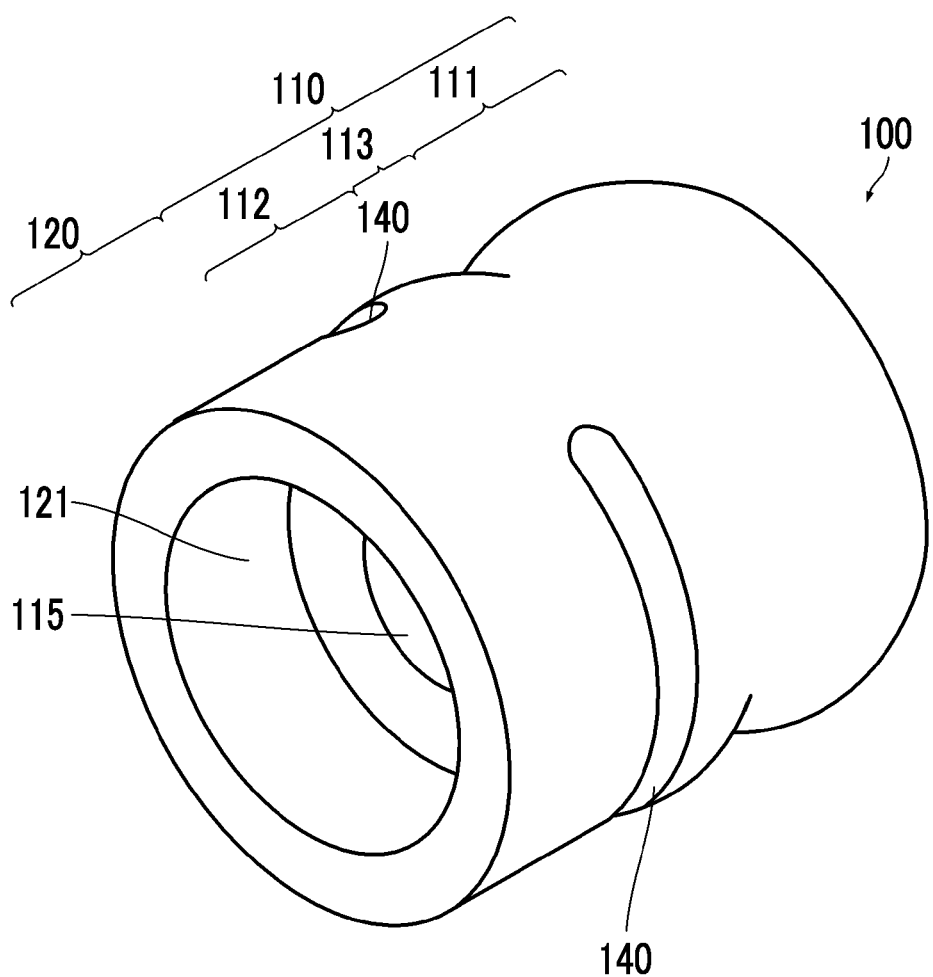

FIG. 118 is a perspective view of the cam follower shown in FIG. 111 that is viewed from a bottom side.

Figure 119:
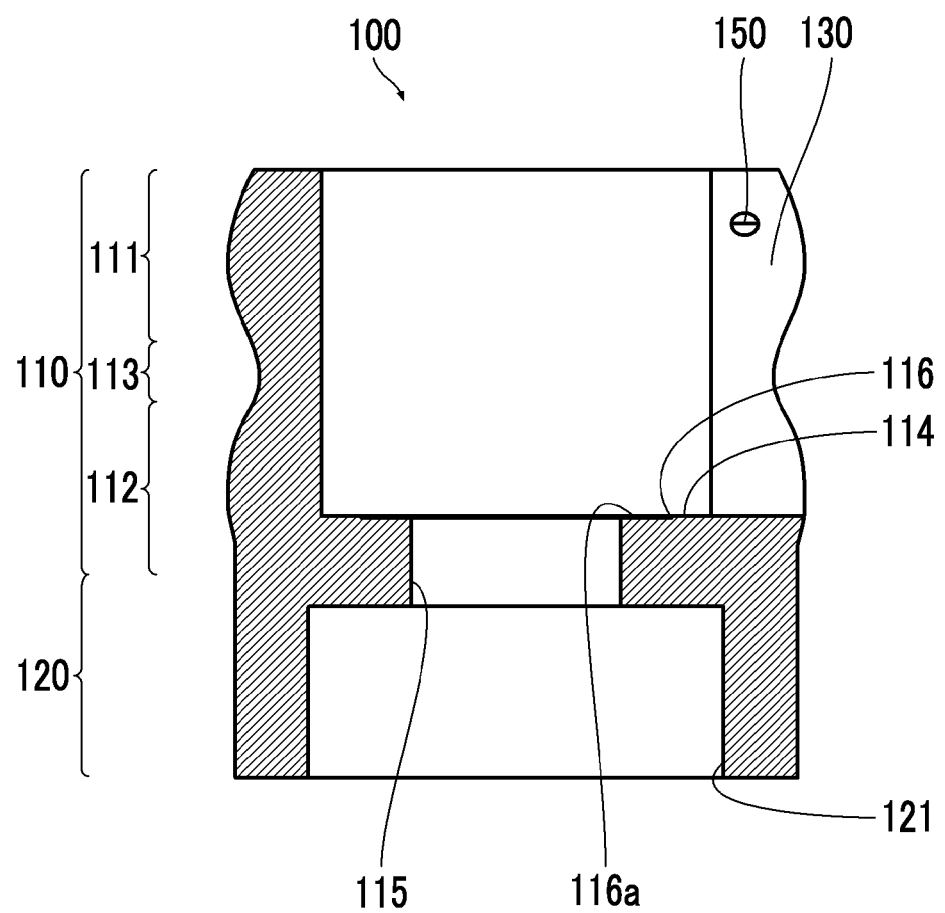

FIG. 119 is a cross-sectional view taken along line 119-119 of FIG. 113.

Figure 120:
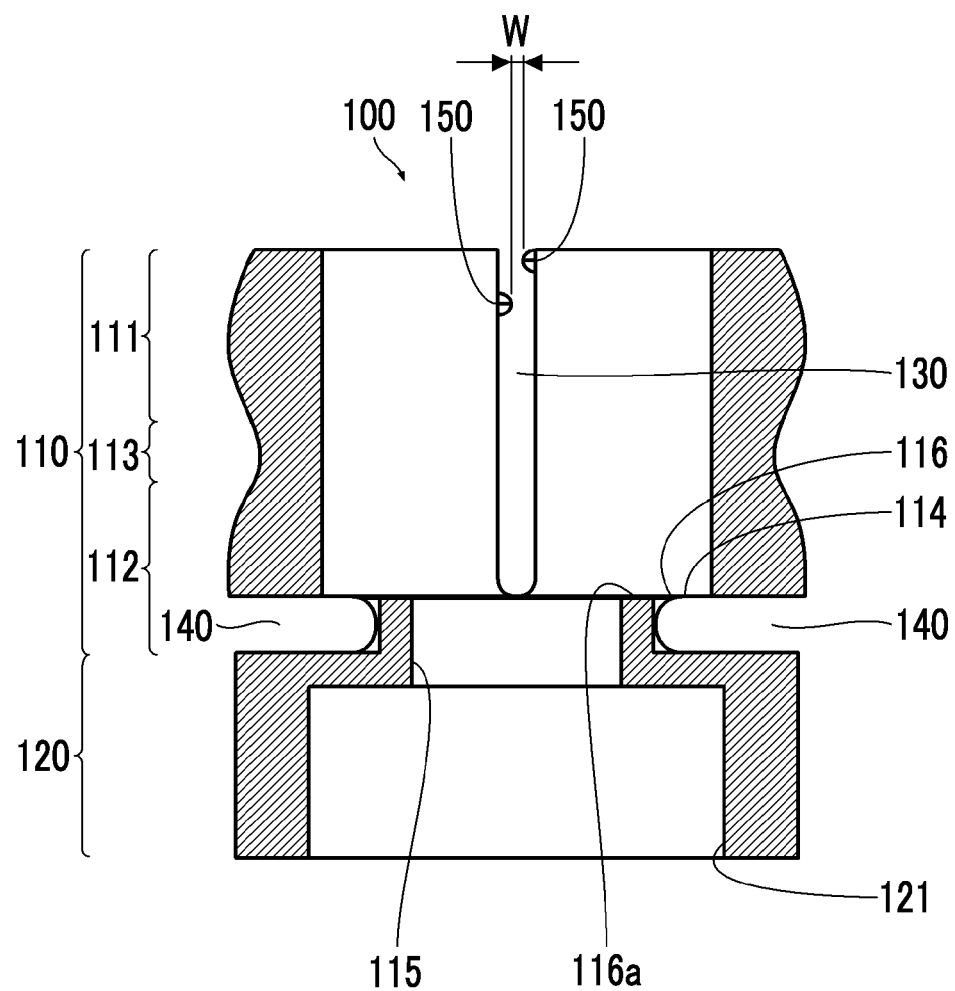

FIG. 120 is a cross-sectional view taken along line 120-120 of FIG. 113.

Figure 121:
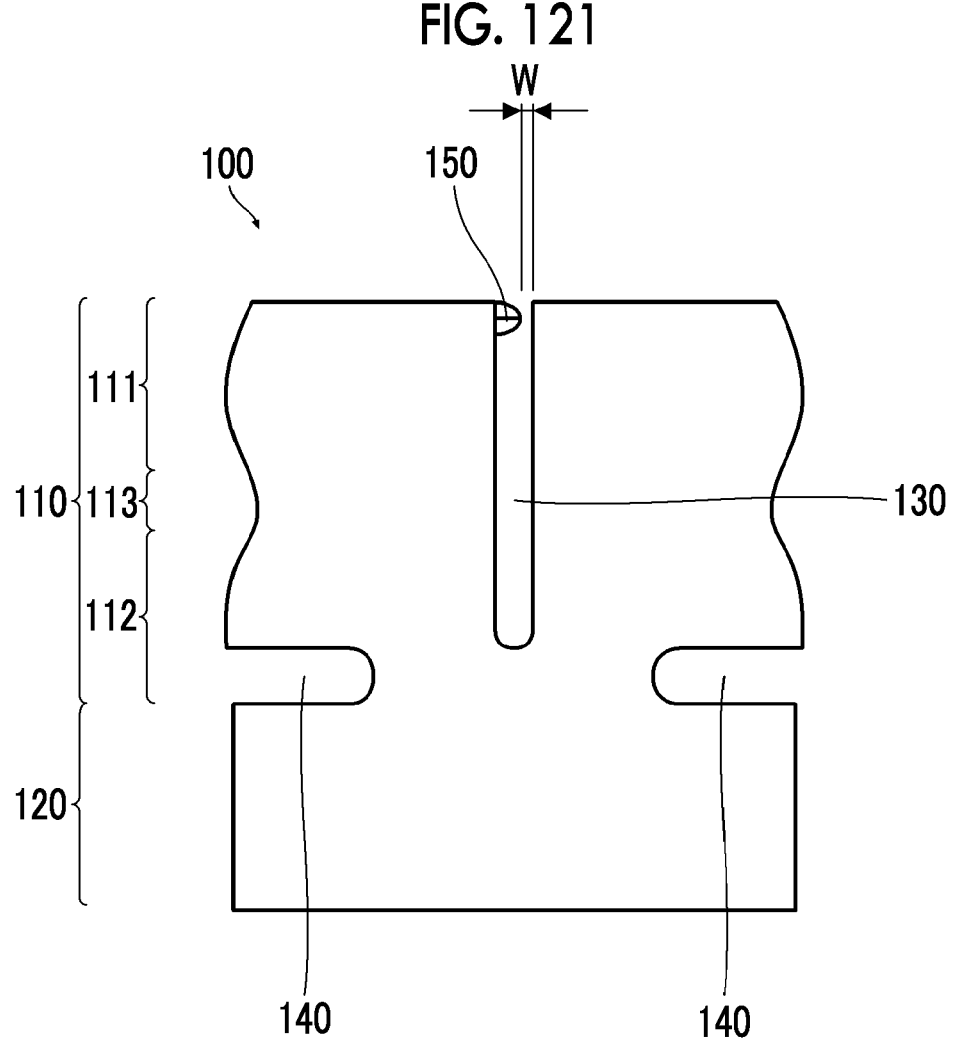

FIG. 121 is a front view of a ninth modification example of the cam follower.

Figure 122:
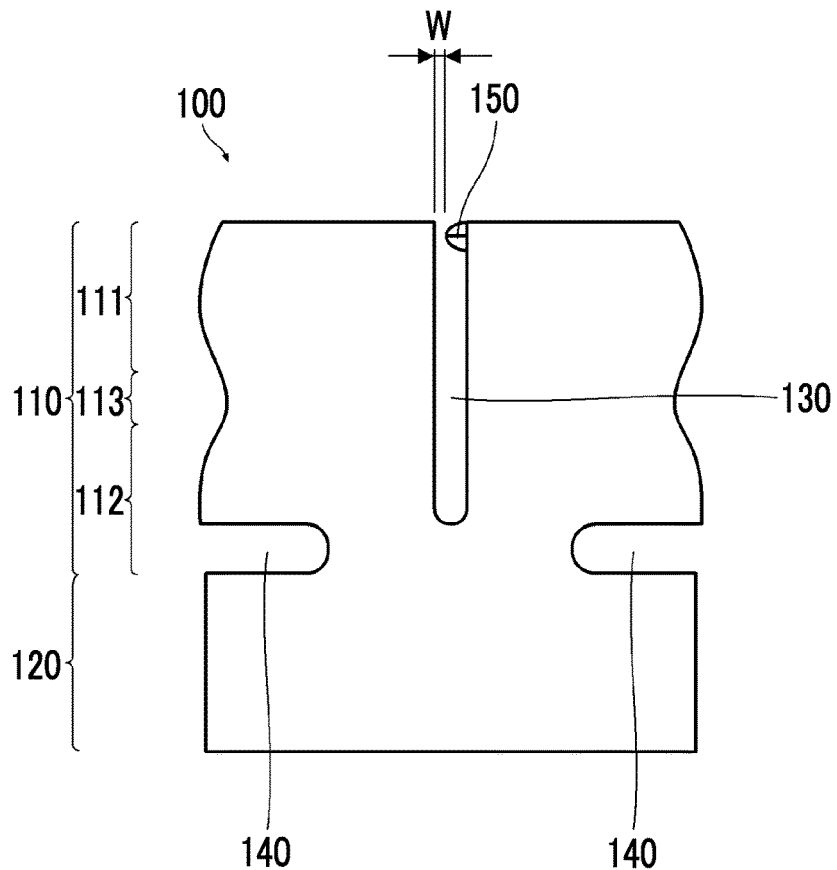

FIG. 122 is a back view of the cam follower shown in FIG. 121.

Figure 123:
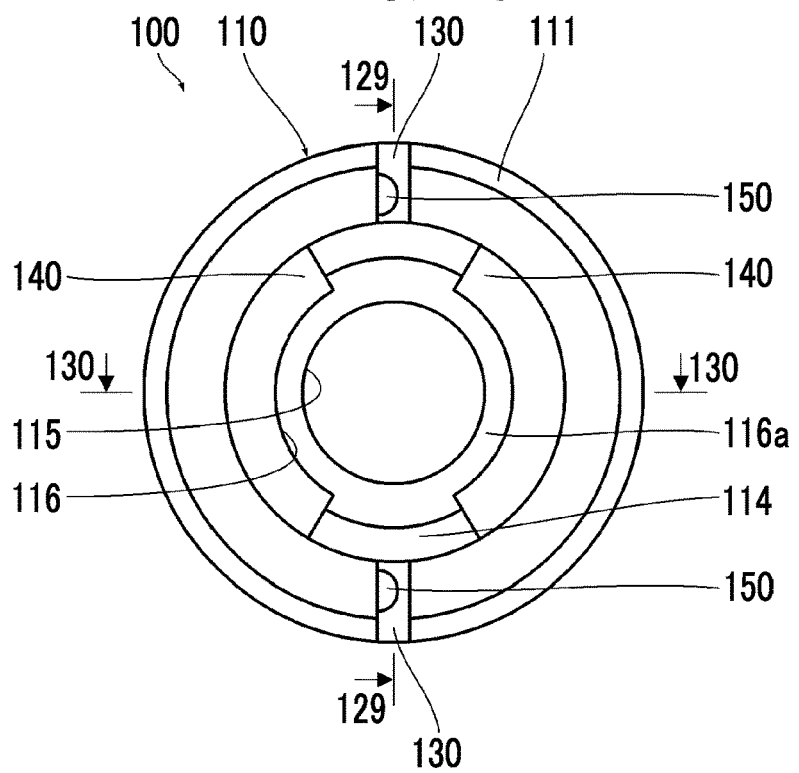

FIG. 123 is a plan view of the cam follower shown in FIG. 121.

Figure 124:
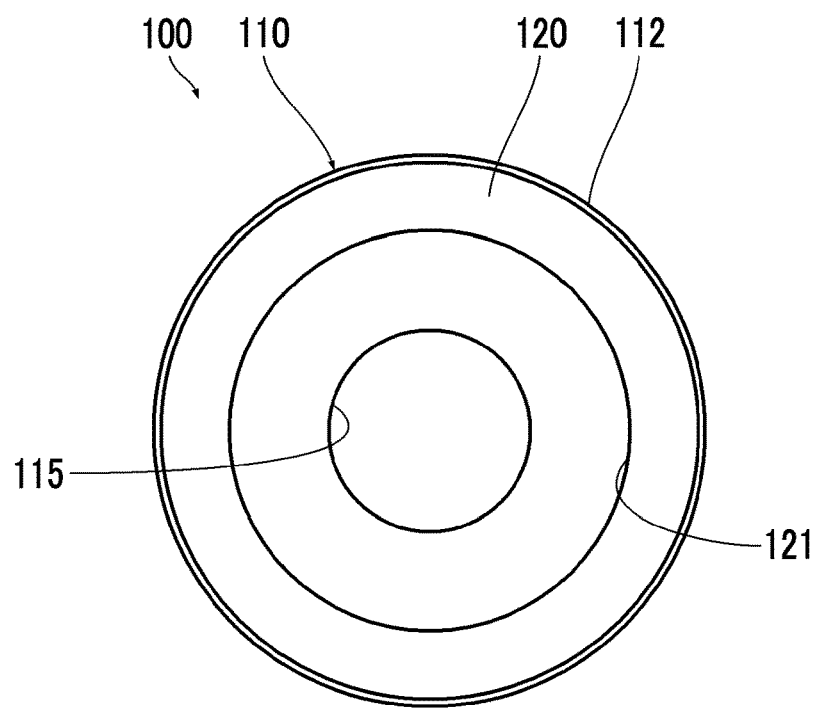

FIG. 124 is a bottom view of the cam follower shown in FIG. 121.

Figure 125:
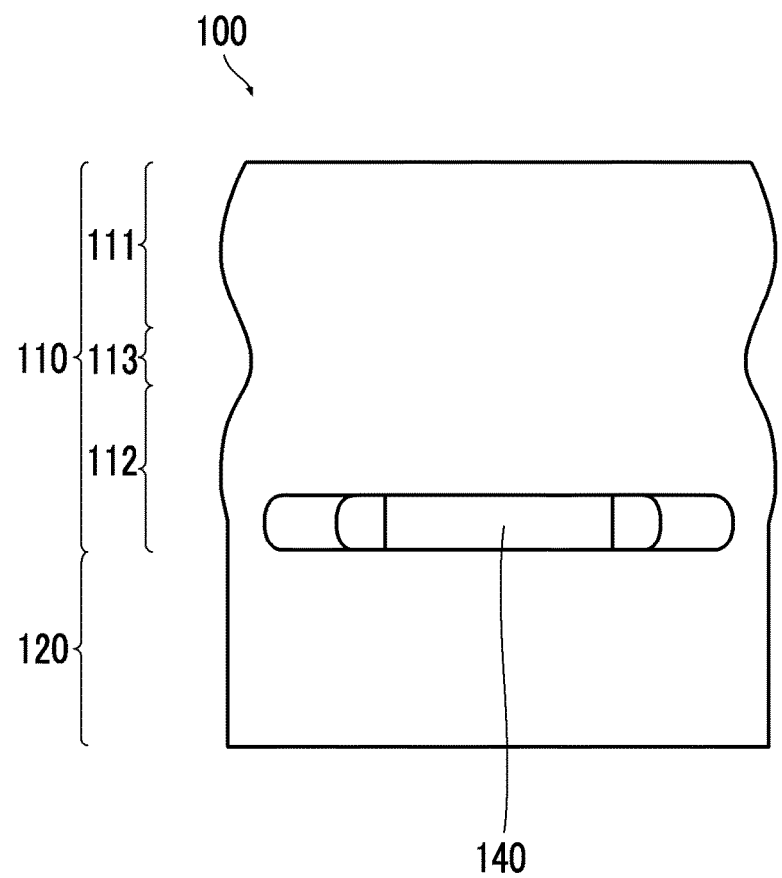

FIG. 125 is a right side view of the cam follower shown in FIG. 121.

Figure 126:
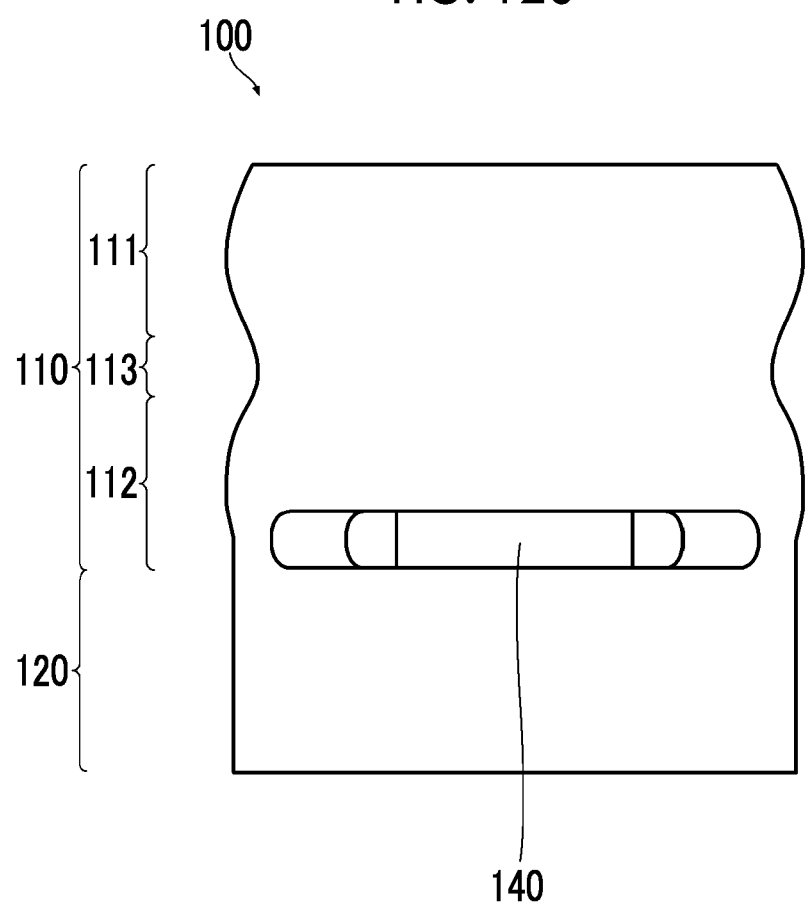

FIG. 126 is a left side view of the cam follower shown in FIG. 121.

Figure 127:
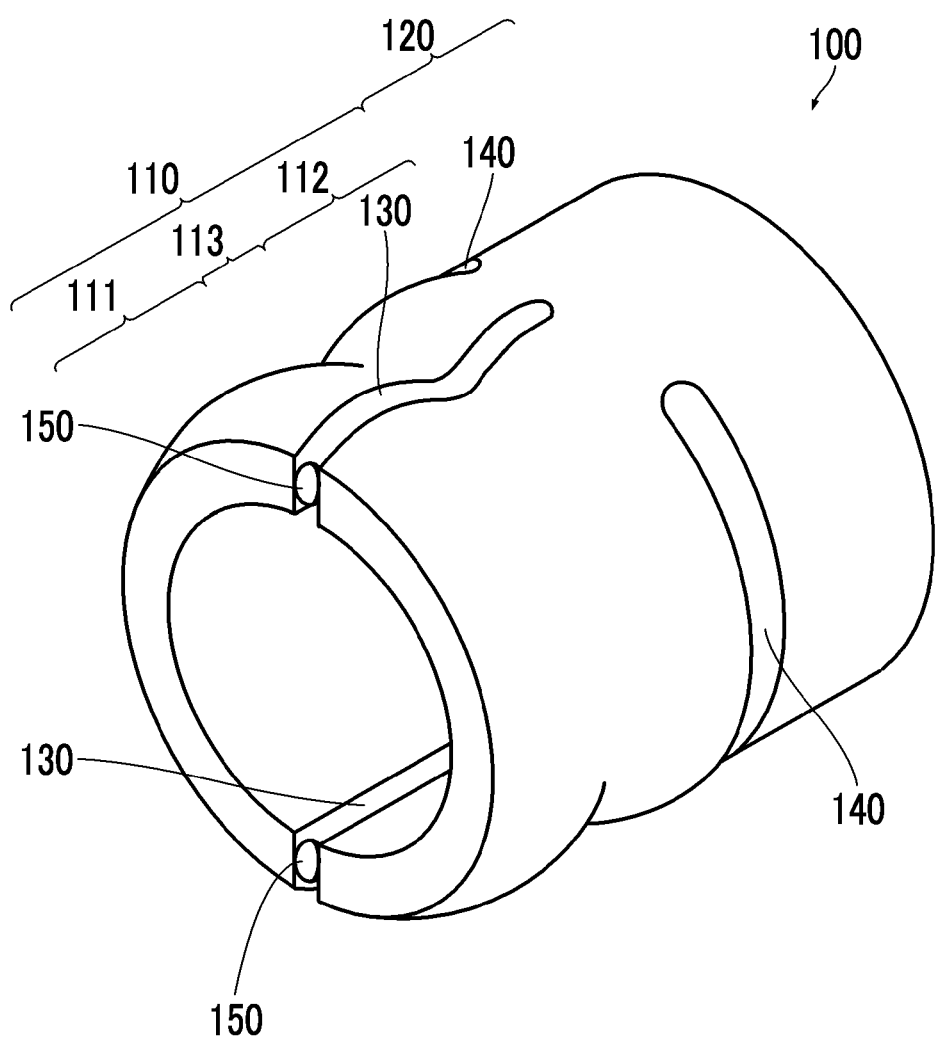

FIG. 127 is a perspective view of the cam follower shown in FIG. 121 that is viewed from a surface side.

Figure 128:
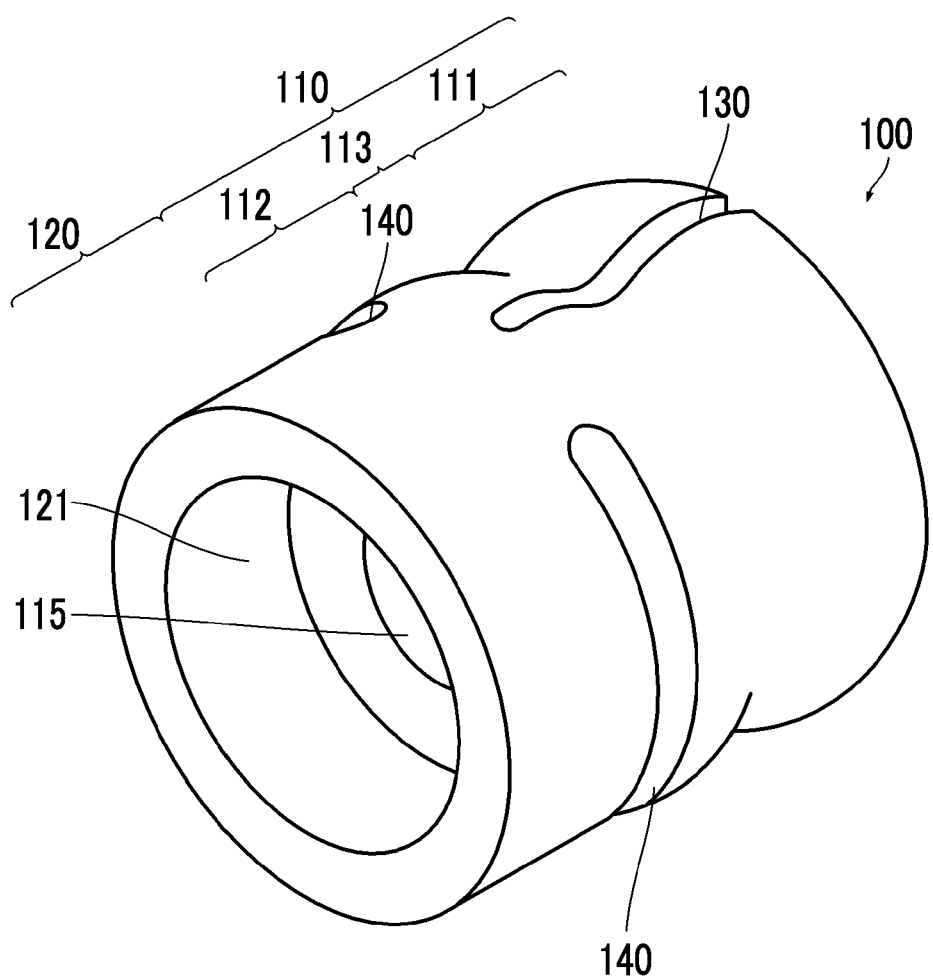

FIG. 128 is a perspective view of the cam follower shown in FIG. 121 that is viewed from a bottom side.

Figure 129:
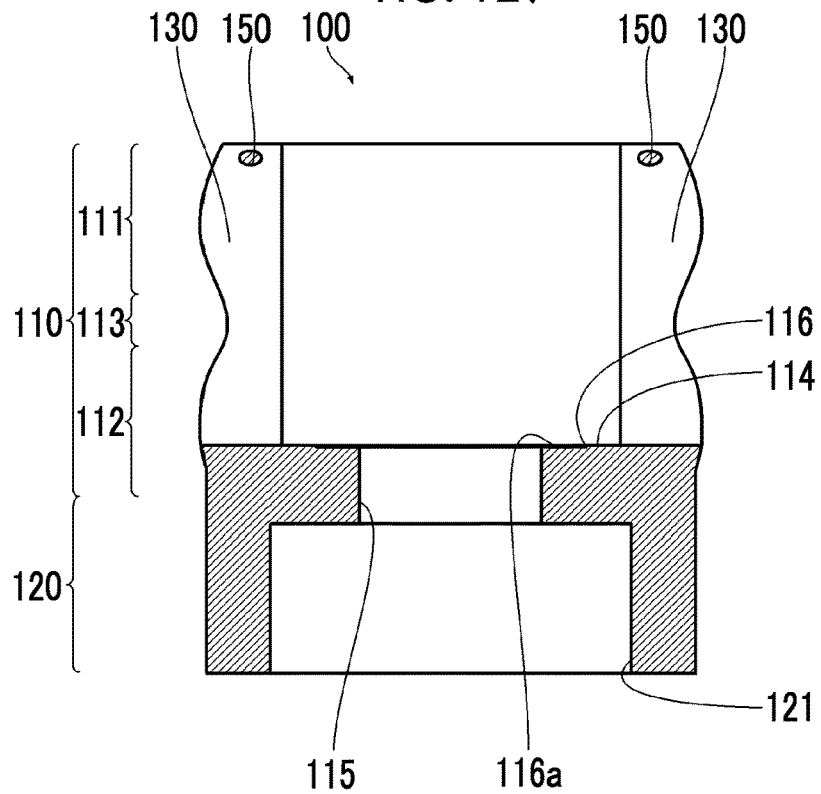

FIG. 129 is a cross-sectional view taken along line 129-129 of FIG. 123.

Figure 130:
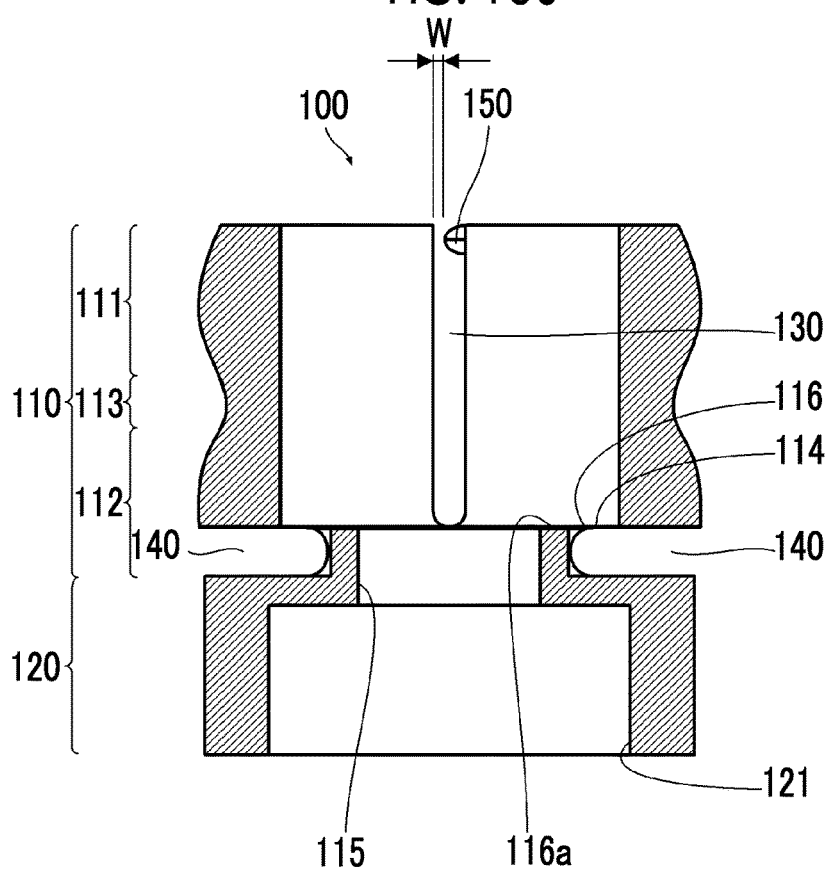

FIG. 130 is a cross-sectional view taken along line 130-130 of FIG. 123.

Figure 131:
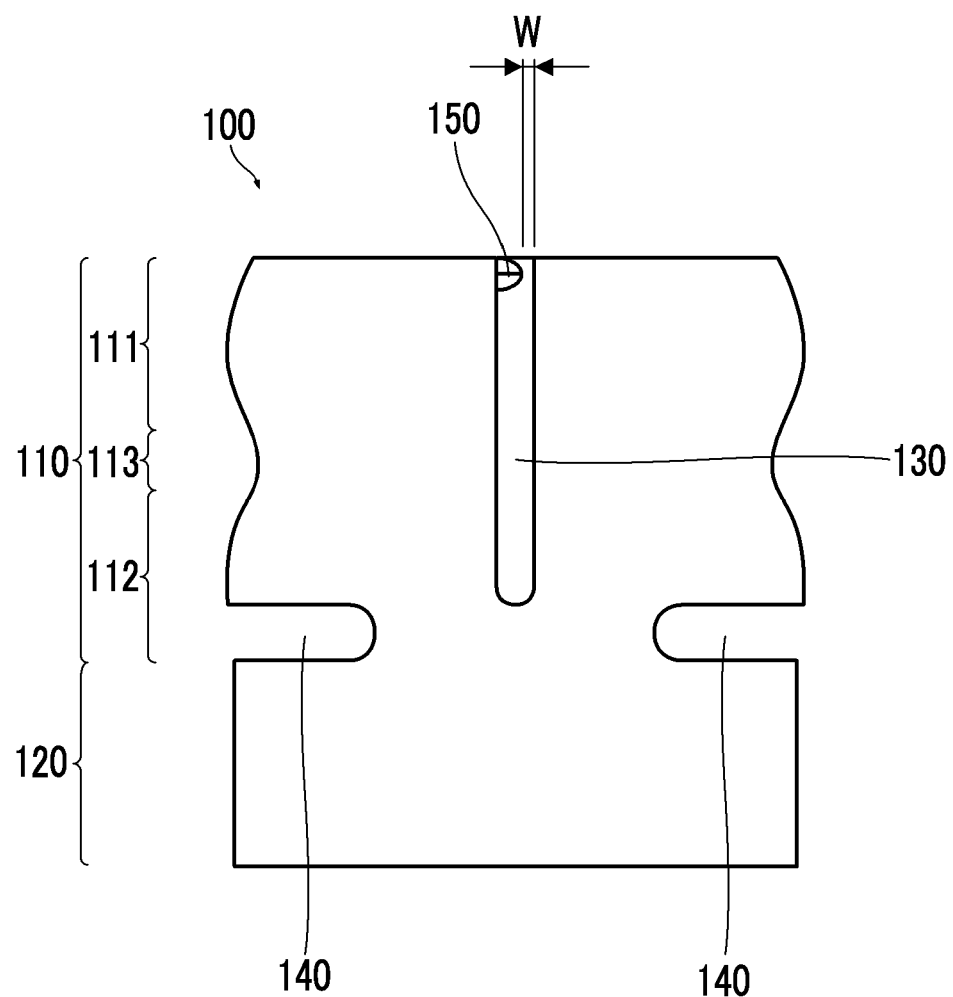

FIG. 131 is a front view of a tenth modification example of the cam follower.

Figure 132:
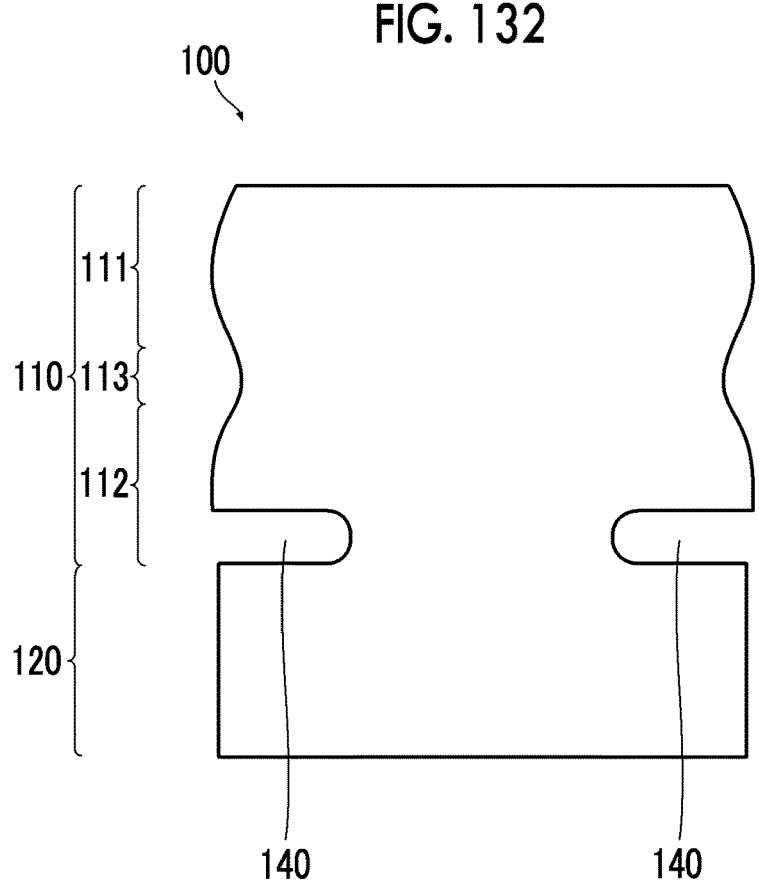

FIG. 132 is a back view of the cam follower shown in FIG. 131.

Figure 133:
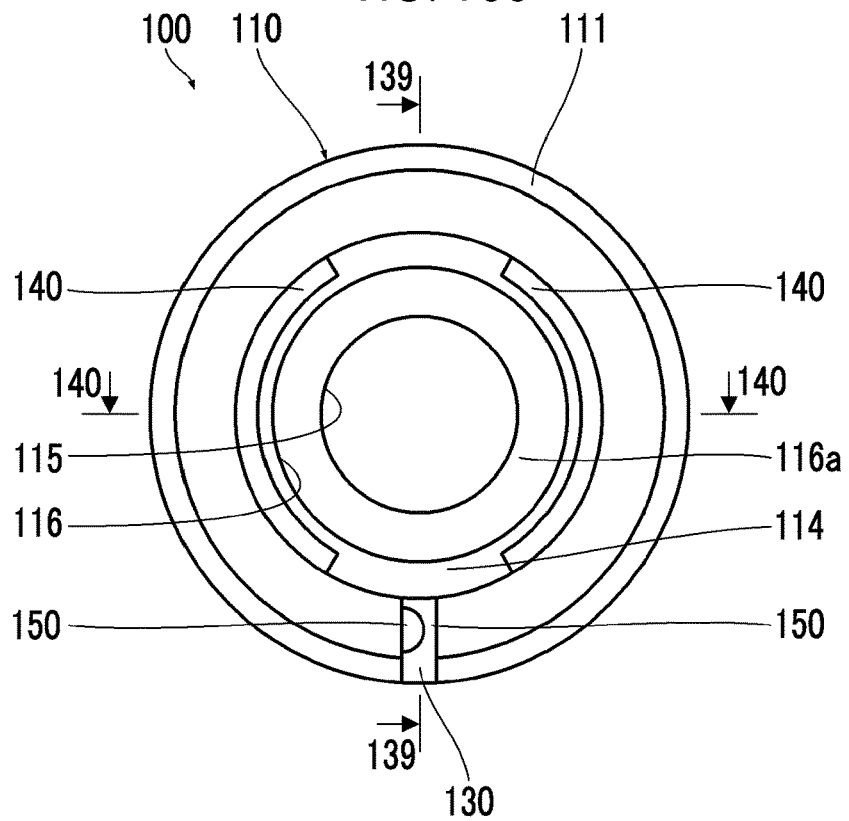

FIG. 133 is a plan view of the cam follower shown in FIG. 131.

Figure 134:
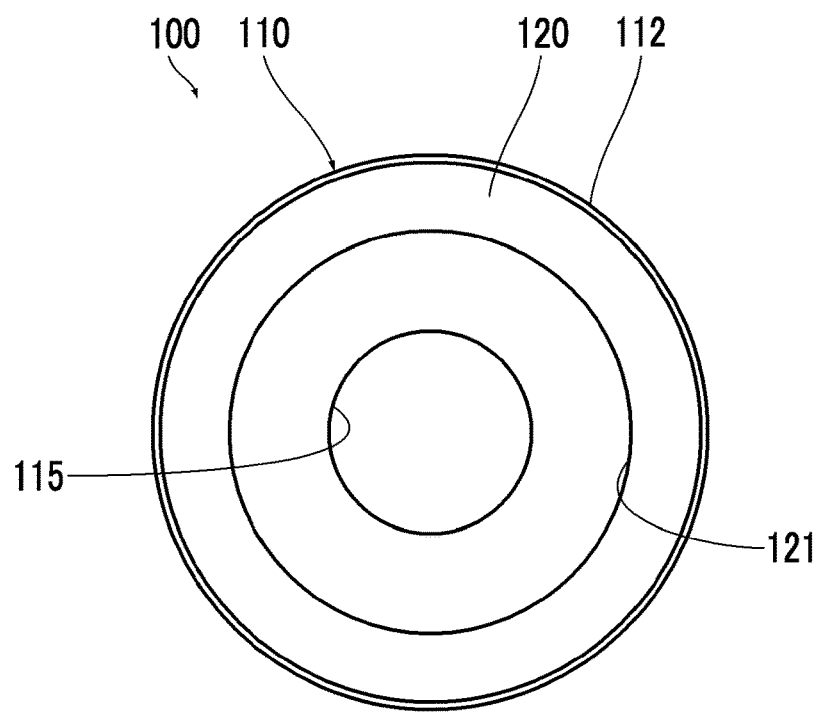

FIG. 134 is a bottom view of the cam follower shown in FIG. 131.

Figure 135:
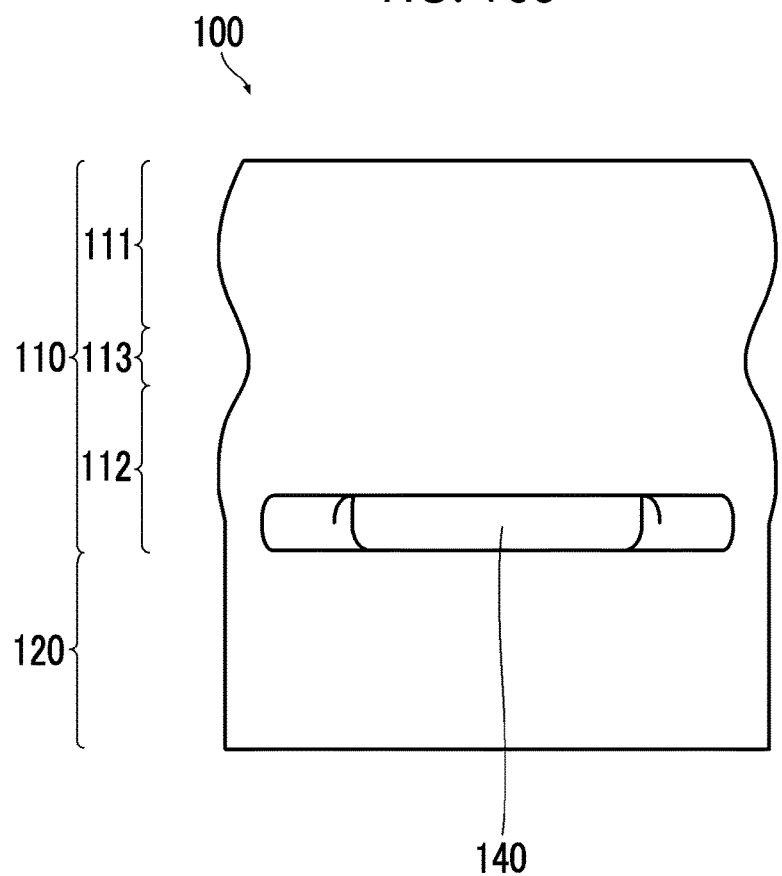

FIG. 135 is a right side view of the cam follower shown in FIG. 131.

Figure 136:
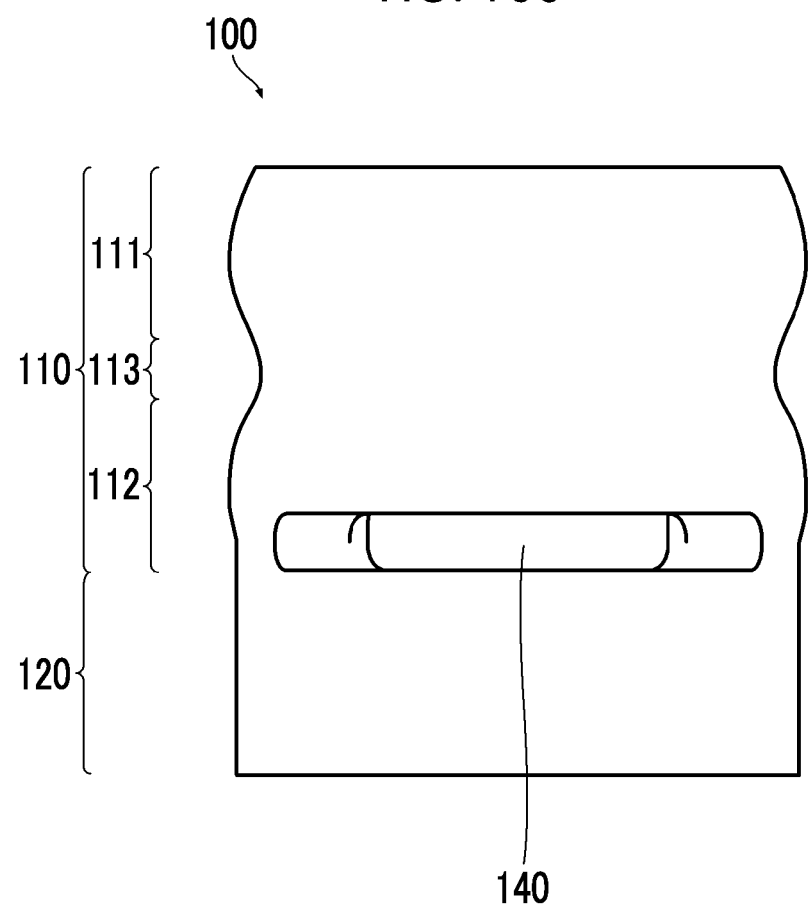

FIG. 136 is a left side view of the cam follower shown in FIG. 131.

Figure 137:
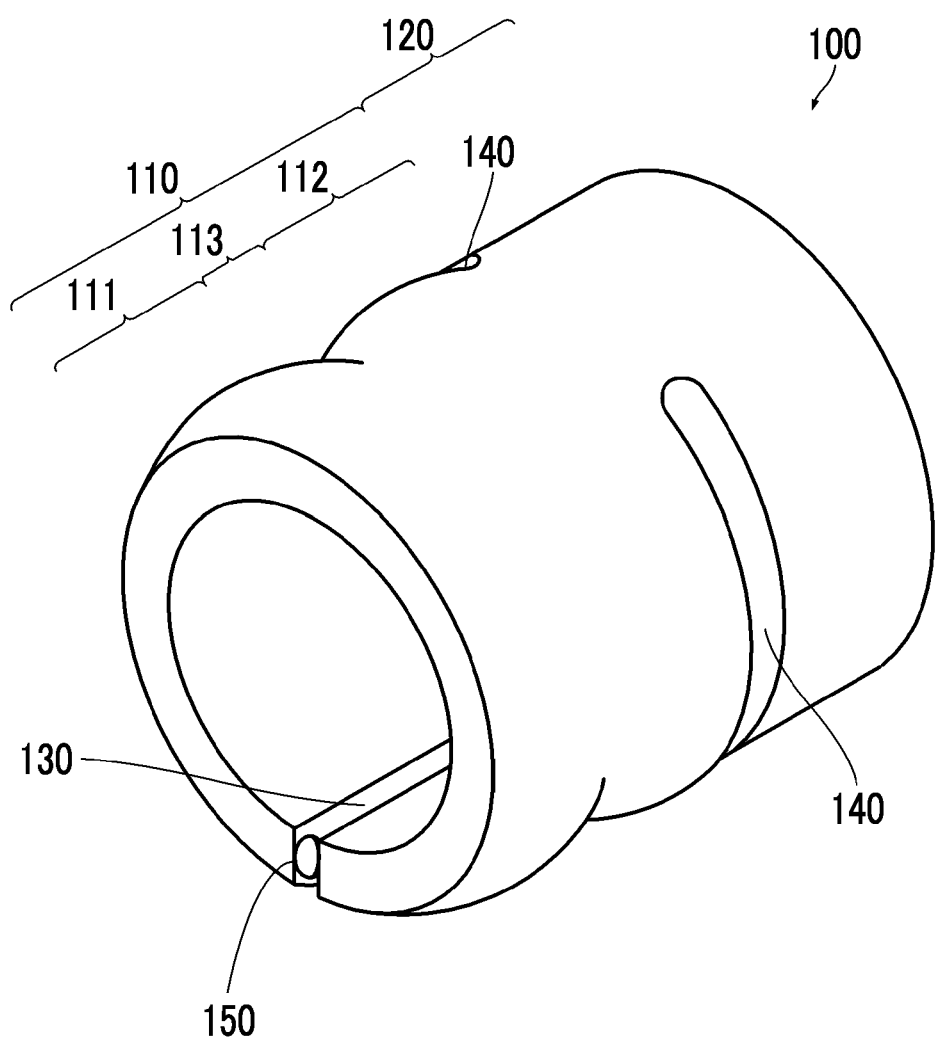

FIG. 137 is a perspective view of the cam follower shown in FIG. 131 that is viewed from a surface side.

Figure 138:
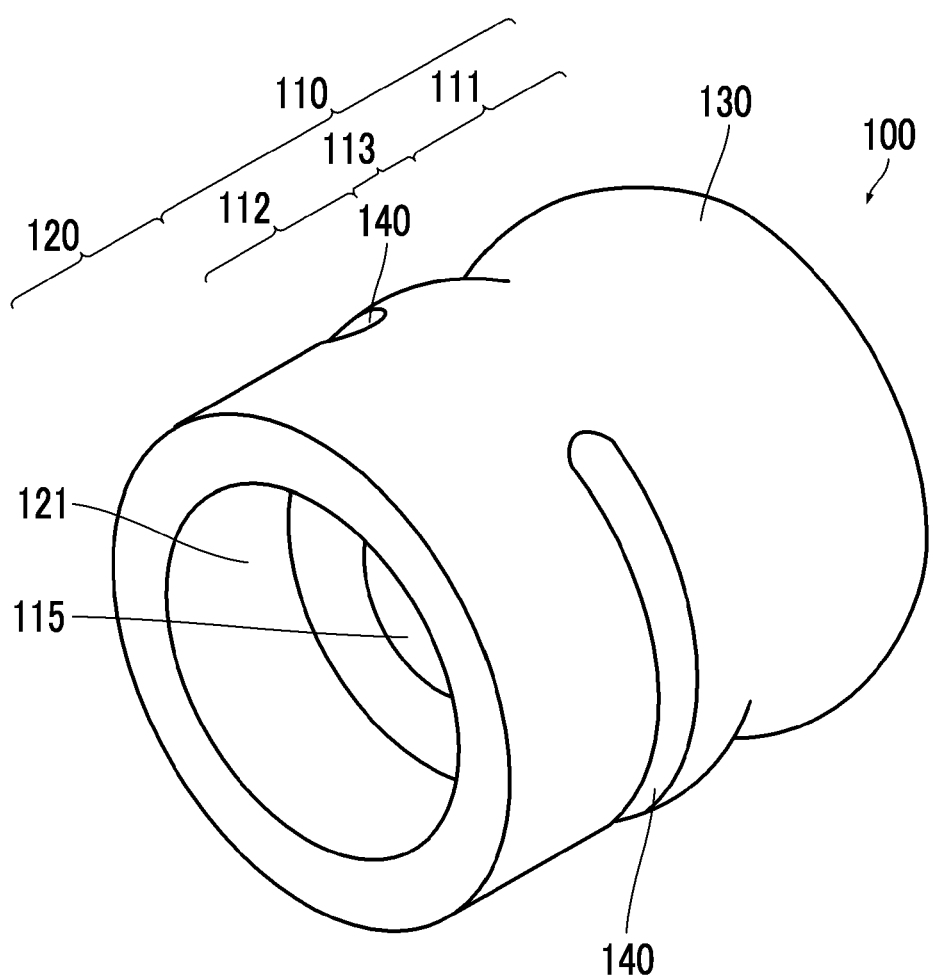

FIG. 138 is a perspective view of the cam follower shown in FIG. 131 that is viewed from a bottom side.

Figure 139:
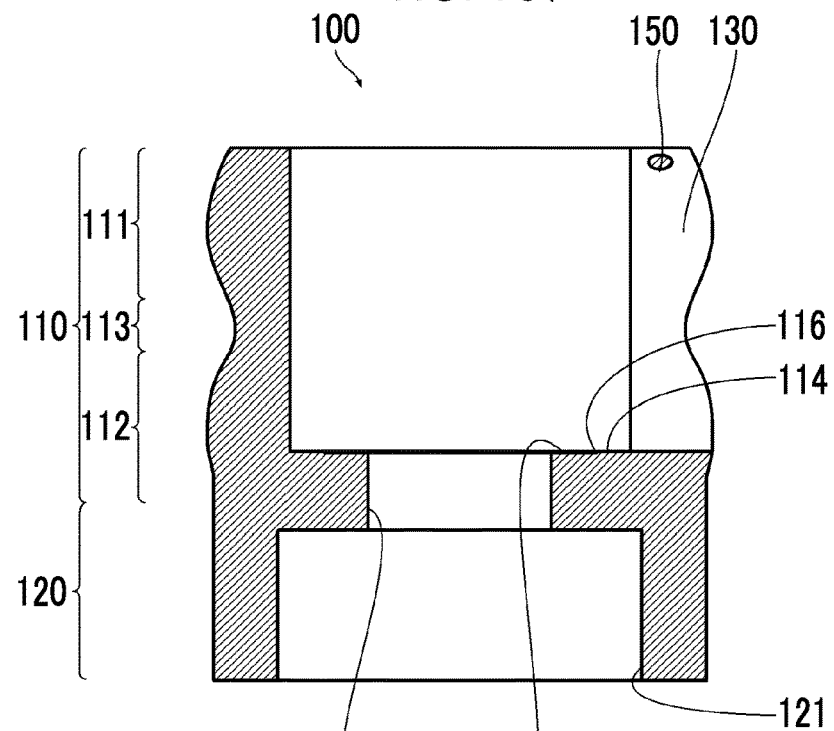

FIG. 139 is a cross-sectional view taken along line 139-139 of FIG. 133.

Figure 140:
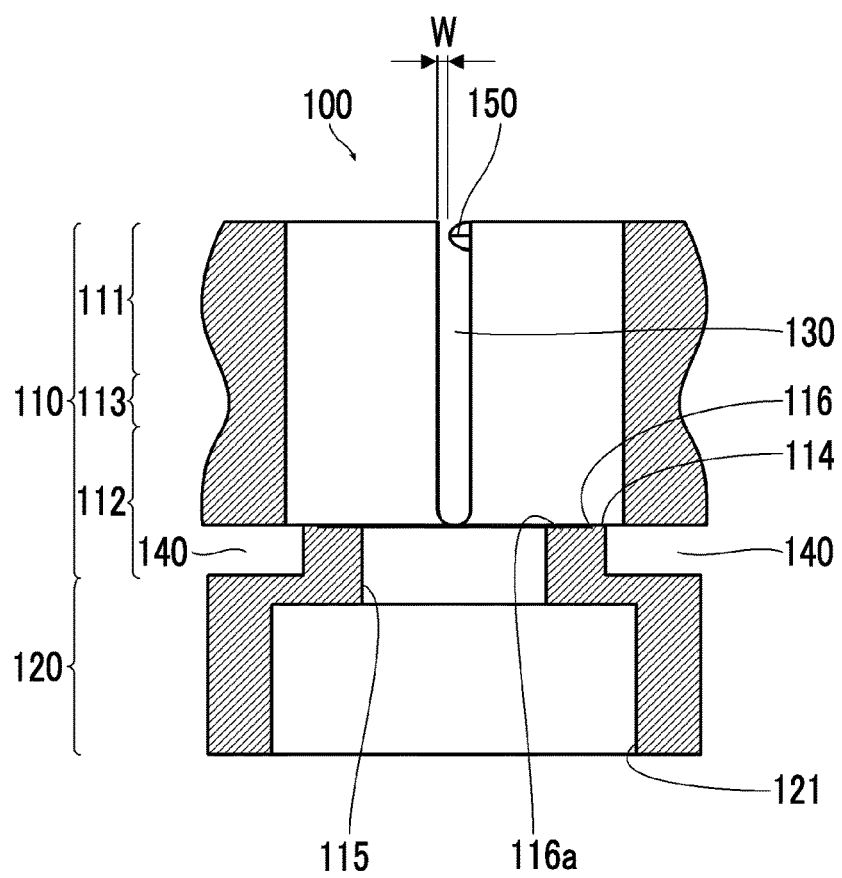

FIG. 140 is a cross-sectional view taken along line 140-140 of FIG. 133.

Figure 141:
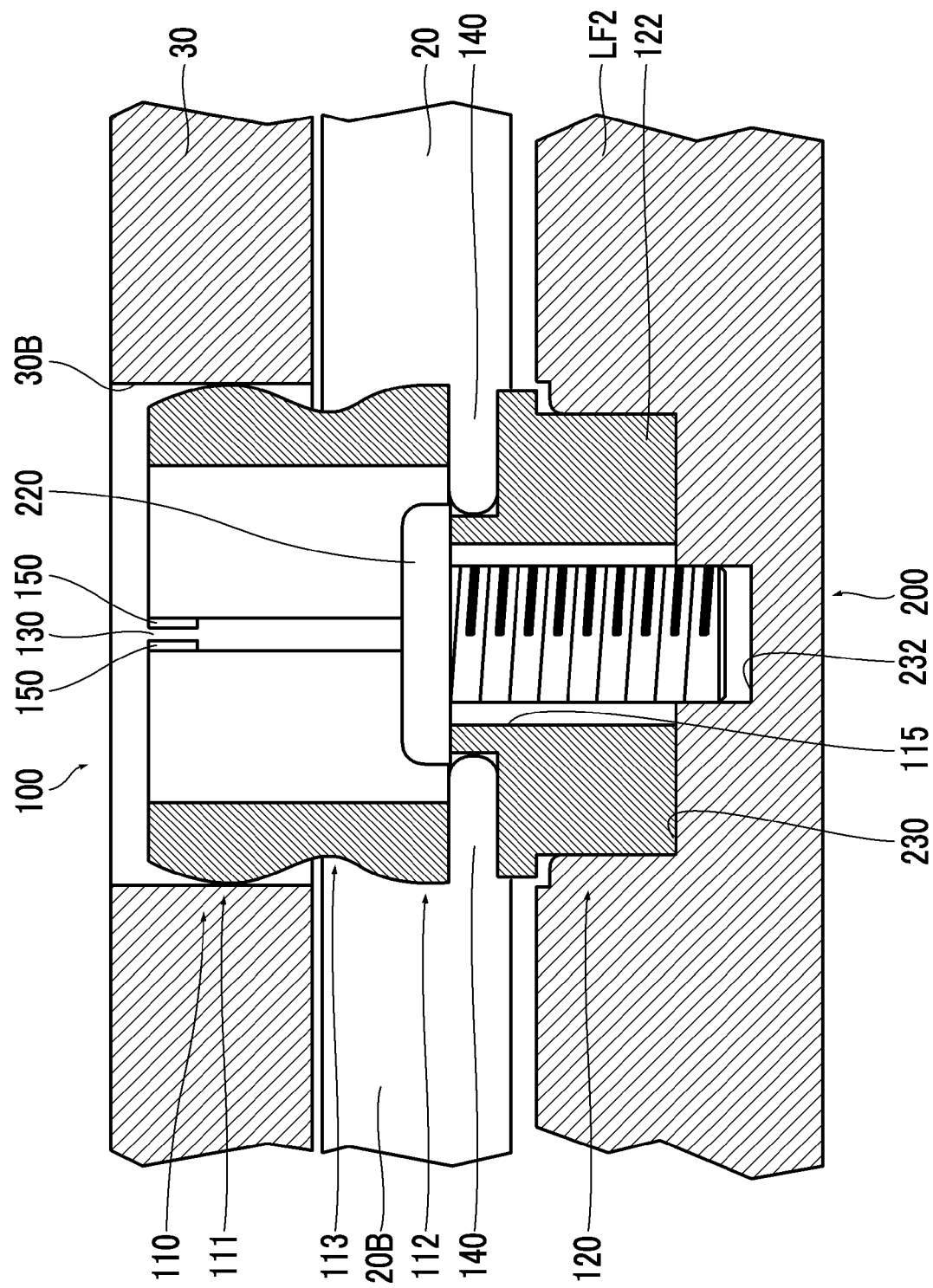

FIG. 141 is a cross-sectional view showing the configuration of a cam follower of which a press-fitting portion is formed of a protruding portion and the configuration of a mounting portion for the cam follower.

Figure 142:
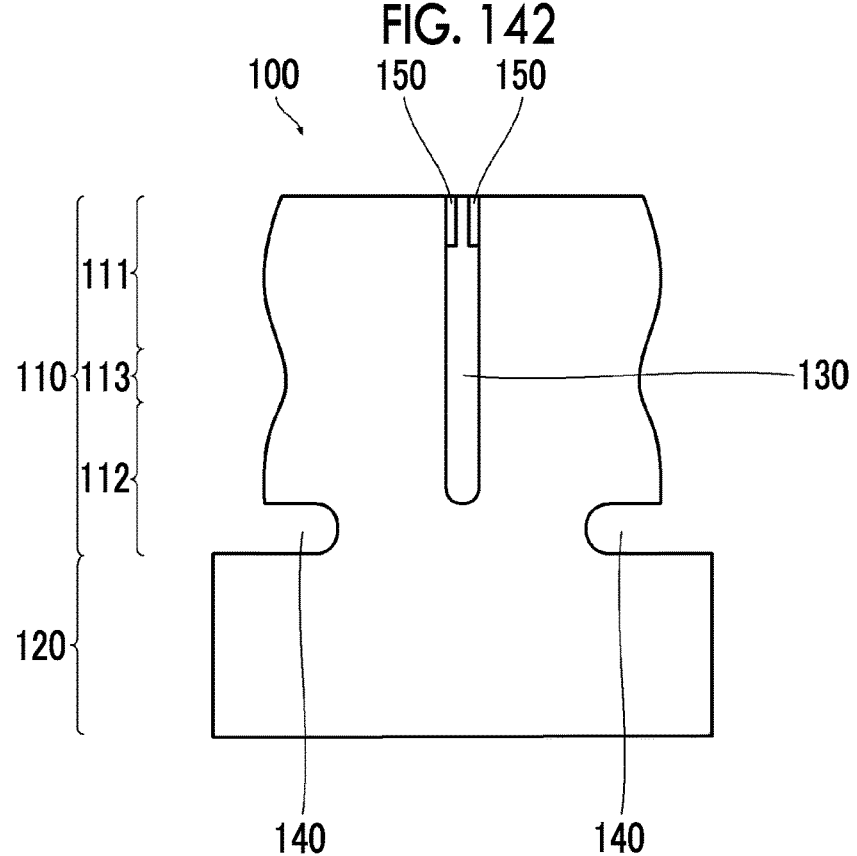

FIG. 142 is a front view of another example of a cam follower body.

Figure 143:
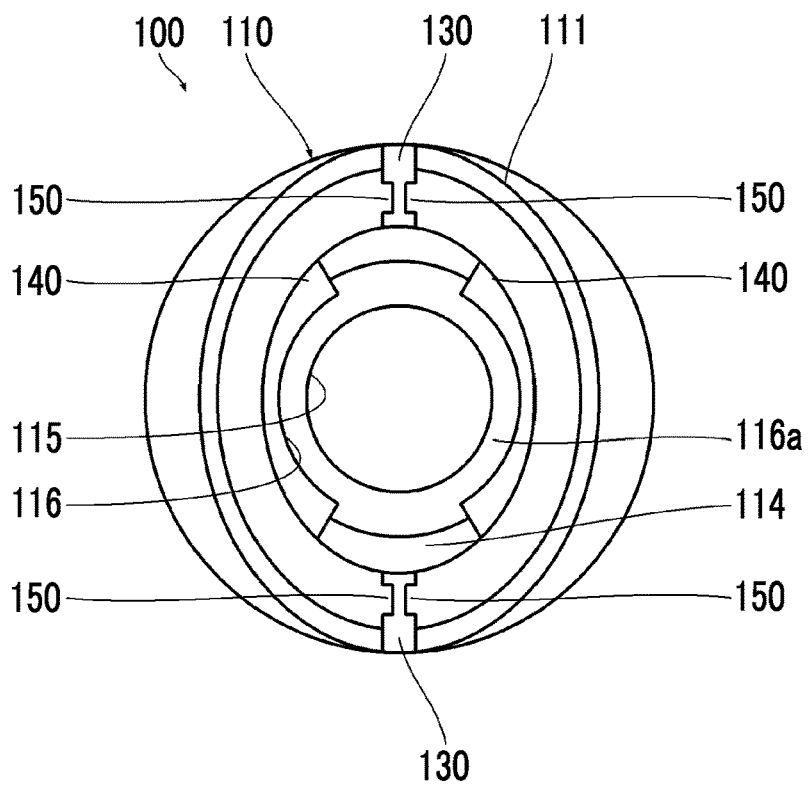

FIG. 143 is a plan view of another example of the cam follower body.

FIG. 144 is a front view of another example of the cam follower body.

DESCRIPTION OF THE PREFERRED EMBODIMENTS

Preferred embodiments of the invention will be described in detail below with reference to the accompanying drawings.

Here, a case where the invention is applied to an interchangeable lens for a lens-interchangeable camera will be described by way of example. Particularly, a case where the invention is applied to an interchangeable lens having a function to zoom in and out an object by moving a lens group with a cam mechanism will be described by way of example.

[Configuration of Interchangeable Lens]

Figure 2:
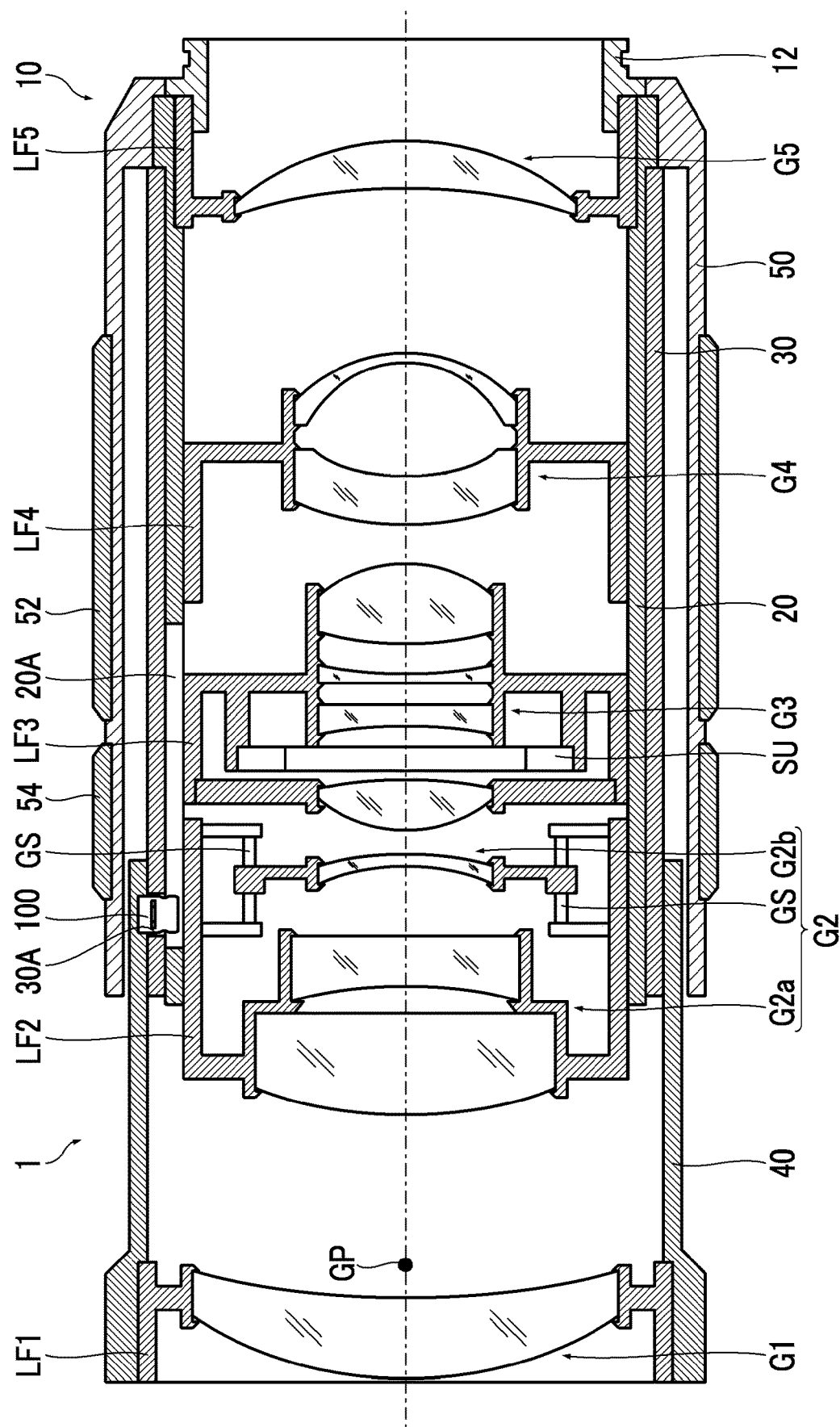
FIG. 2 is a cross-sectional view showing the schematic configuration of the interchangeable lens to which the invention is applied (telephoto end).

FIGS. 1 and 2 are cross-sectional views showing the schematic configuration of an interchangeable lens to which the invention is applied. FIG. 1 shows the state of a wide-angle end, and FIG. 2 shows the state of a telephoto end.

The interchangeable lens 1 comprises a mount 12 at a proximal end portion (an end portion close to an image side) of a lens barrel 10 thereof. The interchangeable lens 1 is attachably and detachably mounted on a cameral body through the mount 12. A plurality of lens groups are arranged in the lens barrel 10.

<<Configuration of Lens>>

(A) and (B) of FIG. 3 are diagrams showing the movement states of the respective lens groups in a case where an operation for changing a magnification is performed. (A) of FIG. 3 shows the arrangement of lenses at the wide-angle end, and (B) of FIG. 3 shows the arrangement of lenses at the telephoto end.

The lens barrel 10 comprises a first lens group G1, a second lens group G2, a third lens group G3, a fourth lens group G4, and a fifth lens group G5 therein in this order from an object side. Each lens group is composed of at least one lens. Further, the respective lens groups are arranged along an optical axis Z.

Among the first lens group G1 to the fifth lens group G5, the first lens group G1, the second lens group G2, the third lens group G3, and the fourth lens group G4 are lens groups that are to be moved in a case where a magnification is to be changed. On the other hand, the fifth lens group G5 is a stationary lens group in a case where a magnification is to be changed.

The second lens group G2 comprises a front second lens group G2a and a rear second lens group G2b in this order from the object side. The rear second lens group G2b forms a focus lens group, and is moved independently. The rear second lens group G2b is moved along the optical axis Z, so that focusing is performed.

The third lens group G3 includes a stop St. The stop St is composed of, for example, an iris stop. The amount of aperture of the stop St is adjusted, so that the amount of light is adjusted.

<<Configuration of Lens Barrel>>

The lens barrel 10 comprises a stationary barrel 20, a cam barrel 30, a movable barrel 40, and an exterior barrel 50. Further, the lens barrel 10 comprises a first lens holding frame LF1 that holds the first lens group G1, a second lens holding frame LF2 that holds the second lens group G2, a third lens holding frame LF3 that holds the third lens group G3, a fourth lens holding frame LF4 that holds the fourth lens group G4, and a fifth lens holding frame LF5 that holds the fifth lens group G5.

The stationary barrel 20, the cam barrel 30, and the movable barrel 40 are fitted in the order of the stationary barrel 20, the cam barrel 30, and the movable barrel 40 from the inside to form a barrel body having a multiple structure. Specifically, the cam barrel 30 is fitted on the outer periphery of the stationary barrel 20 and the movable barrel 40 is fitted on the outer periphery of the cam barrel 30, so that a barrel body having a multiple structure is formed.

<Stationary Barrel>

The stationary barrel 20 is formed of a cylindrical barrel body and is made of, for example, metal, such as aluminum. The stationary barrel 20 comprises a mount 12 at the proximal end portion (an end portion close to an image side) thereof. Accordingly, in a case where the interchangeable lens 1 is mounted on the cameral body, the stationary barrel 20 is fixed to the cameral body. The stationary barrel 20 is provided with a plurality of straight grooves that extend along the optical axis Z.

<Cam Barrel>

The cam barrel 30 is formed of a cylindrical barrel body and is made of, for example, metal, such as aluminum. The cam barrel 30 is fitted on the outer periphery of the stationary barrel 20, so that the outer periphery of the stationary barrel 20 is held to be rotatable in a circumferential direction. The stationary barrel 20 is an example of a second barrel and the cam barrel 30 is an example of a third barrel. The cam barrel 30 is provided with a plurality of cam grooves. For convenience, only one cam groove (a first cam groove 30A for driving the movable barrel 40) is shown in FIGS. 1 and 2.

<Movable Barrel>

The movable barrel 40 is formed of a cylindrical barrel body. The movable barrel 40 is an example of a first barrel. The movable barrel 40 is fitted on the outer periphery of the cam barrel 30, so that the outer periphery of the cam barrel 30 is held to be movable along the optical axis. A mechanism for moving the movable barrel 40 will be described later.

<Exterior Barrel>

The exterior barrel 50 is formed of a cylindrical barrel body. The exterior barrel 50 forms the exterior of the interchangeable lens 1. The exterior barrel 50 is fixed to the stationary barrel 20 at the proximal end portion thereof. Accordingly, in a case where the interchangeable lens 1 is mounted on the cameral body, the exterior barrel 50 is also fixed to the cameral body.

The exterior barrel 50 is provided with a zoom ring 52 as an operation unit for zooming. The zoom ring 52 is provided on the outer periphery of the exterior barrel 50 so as to be rotatable in the circumferential direction. The zoom ring 52 is connected to the cam barrel 30 through a connecting member (not shown), and the rotation of the zoom ring 52 is transmitted to the cam barrel 30. Accordingly, the cam barrel 30 is rotated in a case where the zoom ring 52 is rotated.

Further, the exterior barrel 50 is provided with a focus ring 54 as an operation unit for focusing. The focus ring 54 is provided on the outer periphery of the exterior barrel 50 so as to be rotatable in the circumferential direction. The amount of rotation of the focus ring 54 is detected by a sensor (not shown).

<First Lens Holding Frame>

The first lens holding frame LF1 is formed of a cylindrical barrel body. The first lens holding frame LF1 holds the first lens group G1 so that the first lens group G1 is coaxial with the inner peripheral portion of the first lens holding frame LF1.

The first lens holding frame LF1 is disposed coaxially with the inner peripheral portion of the movable barrel 40, and is held integrally with the movable barrel 40. Accordingly, the first lens holding frame LF1 is moved together with the movable barrel 40. The first lens holding frame LF1 is held at a distal end portion (an end portion close to the object side) that is one end portion of the movable barrel 40.

<Second Lens Holding Frame>

The second lens holding frame LF2 is formed of a cylindrical barrel body. The second lens holding frame LF2 holds the second lens group G2 so that the second lens group G2 is coaxial with the inner peripheral portion of the second lens holding frame LF2. The second lens holding frame LF2 is an example of the first barrel.

The second lens group G2 comprises the front second lens group G2a and the rear second lens group G2b as described above. The front second lens group G2a is held integrally and coaxially with the second lens holding frame LF2. On the other hand, the rear second lens group G2b is movably supported by a pair of guide shafts GS that is provided on the inner periphery of the second lens holding frame LF2. The pair of guide shafts GS is disposed along the optical axis Z. Accordingly, the rear second lens group G2b is held so as to be movable independently. The second lens holding frame LF2 is provided with a linear motor (not shown) as a drive unit for the rear second lens group G2b. The rear second lens group G2b is driven and moved by the linear motor.

The second lens holding frame LF2 is disposed coaxially with the inner peripheral portion of the stationary barrel 20. The second lens holding frame LF2 is held on the inner peripheral portion of the stationary barrel 20 so as to be movable along the optical axis Z. A mechanism for moving the second lens holding frame LF2 will be described later.

<Third Lens Holding Frame>

The third lens holding frame LF3 is formed of a cylindrical barrel body. The third lens holding frame LF3 holds the third lens group G3 so that the third lens group G3 is coaxial with the inner peripheral portion of the third lens holding frame LF3. Further, the third lens holding frame LF3 holds a stop unit SU so that the stop unit SU is coaxial with the inner peripheral portion of the third lens holding frame LF3. The third lens holding frame LF3 is an example of the first barrel.

The third lens holding frame LF3 is disposed coaxially with the inner peripheral portion of the stationary barrel 20. The third lens holding frame LF3 is held on the inner peripheral portion of the stationary barrel 20 so as to be movable along the optical axis Z. A mechanism for moving the third lens holding frame LF3 will be described later.

<Fourth Lens Holding Frame>

The fourth lens holding frame LF4 is formed of a cylindrical barrel body. The fourth lens holding frame LF4 holds the fourth lens group G4 so that the fourth lens group G4 is coaxial with the inner peripheral portion of the fourth lens holding frame LF4. The fourth lens holding frame LF4 is an example of the first barrel.

The fourth lens holding frame LF4 is disposed coaxially with the inner peripheral portion of the stationary barrel 20. The fourth lens holding frame LF4 is held on the inner peripheral portion of the stationary barrel 20 so as to be movable along the optical axis Z. A mechanism for moving the fourth lens holding frame LF4 will be described later.

<Fifth Lens Holding Frame>

The fifth lens holding frame LF5 is formed of a cylindrical barrel body. The fifth lens holding frame LF5 holds the fifth lens group G5 so that the fifth lens group G5 is coaxial with the inner peripheral portion of the fifth lens holding frame LF5.

The fifth lens holding frame LF5 is disposed coaxially with the inner peripheral portion of the stationary barrel 20. The fifth lens holding frame LF5 is held integrally with the stationary barrel 20.

<<Drive Mechanism for Movable Barrel>>

FIG. 4 is a cross-sectional view taken along line 4-4 of FIG. 1.

The movable barrel 40 comprises three cam followers 100 on the inner periphery of the proximal end portion (an end portion close to an image side) thereof. The three cam followers 100 are arranged on the same circumference on the inner peripheral portion of the movable barrel 40, and are arranged at regular intervals. The cam follower 100 comprises first and second slits, and is adapted to be elastically deformable in a radial direction. The details of the cam follower 100 will be described later.

The cam barrel 30 comprises three first cam grooves 30A having predetermined trajectories. The three first cam grooves 30A are arranged at regular intervals so as to correspond to the three cam followers 100.

The stationary barrel 20 comprises three first straight grooves 20A that extend along the optical axis Z. The three first straight grooves 20A are arranged at regular intervals so as to correspond to the three cam followers 100.

The three cam followers 100 of the movable barrel 40 are fitted to the three first cam grooves 30A and the three first straight grooves 20A, respectively. Accordingly, the movable barrel 40 is moved along the optical axis Z by the action of cams in a case where the cam barrel 30 is rotated.

<<Drive Mechanism for Second Lens Holding Frame>>

FIG. 5 is a cross-sectional view showing configuration relating to the drive of the second lens holding frame. Further, FIG. 6 is a cross-sectional view taken along line 6-6 of FIG. 5.

The second lens holding frame LF2 comprises three cam followers 100 on the outer peripheral portion thereof. The three cam followers 100 are arranged on the same circumference on the outer peripheral portion of the second lens holding frame LF2, and are arranged at regular intervals. The configuration of the cam follower 100 is the same as that of the cam follower 100 of the movable barrel 40. The details of the cam follower 100 will be described later.

The cam barrel 30 comprises three second cam grooves 30B having predetermined trajectories. The three second cam grooves 30B are arranged at regular intervals so as to correspond to the three cam followers 100. For convenience, only the second cam groove 30B is shown in FIG. 5.

The stationary barrel 20 comprises three second straight grooves 20B that extend along the optical axis Z. The three second straight grooves 20B are arranged at regular intervals so as to correspond to the three cam followers 100.

The three cam followers 100 of the second lens holding frame LF2 are fitted to the three second cam grooves 30B and the three second straight grooves 20B, respectively. Accordingly, the second lens holding frame LF2 is moved along the optical axis Z by the action of cams in a case where the cam barrel 30 is rotated.

<<Drive Mechanisms for Third and Fourth Lens Holding Frames>>

FIG. 7 is a cross-sectional view showing configuration relating to the drive of the third lens holding frame and the fourth lens holding frame. Further, FIG. 8 is a cross-sectional view taken along line 8-8 of FIG. 7 and FIG. 9 is a cross-sectional view taken along line 9-9 of FIG. 7.

The third lens holding frame LF3 comprises three cam followers 100 on the outer peripheral portion thereof. The three cam followers 100 are arranged on the same circumference on the outer peripheral portion of the third lens holding frame LF3, and are arranged at regular intervals. The configuration of the cam follower 100 is the same as that of the cam follower 100 of the movable barrel 40. The details of the cam follower 100 will be described later.

Further, the fourth lens holding frame LF4 comprises three cam followers 100 on the outer peripheral portion thereof. The three cam followers 100 are arranged on the same circumference on the outer peripheral portion of the fourth lens holding frame LF4, and are arranged at regular intervals. The configuration of the cam follower 100 is the same as that of the cam follower 100 of the movable barrel 40. The details of the cam follower 100 will be described later.

The cam barrel 30 comprises three third cam grooves 30C and three fourth cam grooves 30D having predetermined trajectories. The three third cam grooves 30C are arranged at regular intervals so as to correspond to the three cam followers 100. Further, the three fourth cam grooves 30D are arranged at regular intervals so as to correspond to the three cam followers 100. For convenience, only the third and fourth cam grooves 30C and 30D are shown in FIG. 7.

The stationary barrel 20 comprises three common straight grooves 20CD that extend along the optical axis Z. The three common straight grooves 20CD are arranged at regular intervals so as to correspond to the three cam followers 100 and the three cam followers 100.

The three cam followers 100 of the third lens holding frame LF3 are fitted to the three third cam grooves 30C and the three common straight grooves 20CD, respectively. Further, the three cam followers 100 of the fourth lens holding frame LF4 are fitted to the three fourth cam grooves 30D and the three common straight grooves 20CD, respectively. Accordingly, the third and fourth lens holding frames LF3 and LF4 are moved along the optical axis Z by the action of cams in a case where the cam barrel 30 is rotated.

[Action of Interchangeable Lens]

With regard to the interchangeable lens 1 having the above-mentioned configuration, the cam barrel 30 is rotated relative to the stationary barrel 20 by an operation for rotating the zoom ring 52. The movable barrel 40, the second lens holding frame LF2, the third lens holding frame LF3, and the fourth lens holding frame LF4 are moved along the optical axis Z by the action of cams in a case where the cam barrel 30 is rotated. As a result, the first lens group G1, the second lens group G2, the third lens group G3, and the fourth lens group G4 are moved along the optical axis Z, so that a focal length is changed. That is, zooming is performed.

[Configuration of Cam Follower]

FIG. 10 is a front view of the cam follower, FIG. 11 is a back view of the cam follower, FIG. 12 is a plan view of the cam follower, FIG. 13 is a bottom view of the cam follower, FIG. 14 is a right side view of the cam follower, and FIG. 15 is a left side view of the cam follower. Further, FIG. 16 is a perspective view of the cam follower that is viewed from a surface side and FIG. 17 is a perspective view of the cam follower that is viewed from a bottom side. Furthermore, FIG. 18 is a cross-sectional view taken along line 18-18 of FIG. 12 and FIG. 19 is a cross-sectional view taken along line 19-19 of FIG. 12.

The cam follower 100 comprises a cam follower body 110, a base portion 120 that is provided coaxially with the proximal end portion of the cam follower body 110, first slits 130 that are provided at the cam follower body 110, second slits 140 that are provided at the cam follower body 110, and protruding portions 150 that are provided in the first slits 130.

The cam follower 100 is formed by injection molding with a resin using a predetermined mold, and is formed as an integrated molding. For example, the cam follower 100 is formed by injection molding with a resin such as polyoxymethylene or polyacetal (POM) and is formed as an integrated molding.

<<Cam Follower Body>>

The cam follower body 110 is a portion to be fitted to the grooves (the cam groove and the straight groove) and has a hollow shape where the distal end of the cam follower body is open.

<Outer Peripheral Portion of Cam Follower Body>

The cam follower body 110 includes a first fitting portion 111 and a second fitting portion 112 on the outer peripheral portion thereof in this order from a distal end side. Each of the first and second fitting portions 111 and 112 is a portion to be fitted to the grooves (the cam groove and the straight groove). For example, in the case of the cam followers 100 mounted on the second lens holding frame LF2, the first fitting portion 111 is fitted to the second cam groove 30B and the second fitting portion 112 is fitted to the second straight groove 20B. Further, in the case of the cam follower 100 of the movable barrel 40, the first fitting portion 111 is fitted to the first straight groove 20A and the second fitting portion 112 is fitted to the first cam groove 30A.

The first fitting portion 111 has a shape that bulges outward in a spherical shape. That is, the first fitting portion 111 has a shape where the outer diameter is gradually reduced toward both end portions from the middle portion thereof in an axial direction. As a result, the cross section of the outer periphery of the first fitting portion 111 has the shape of an arc that is convex outward. In a case where the first fitting portion 111 having this configuration is fitted to the groove (the cam groove or the straight groove), the first fitting portion 111 is in point contact with the inner wall surface of the groove. A portion to be in contact is a portion of the first fitting portion 111 of which the outer diameter is the maximum. This portion is a substantially middle portion in the axial direction.

The second fitting portion 112 has a shape that bulges outward in a spherical shape. That is, the second fitting portion 112 has a shape where the outer diameter is gradually reduced toward both end portions from the middle portion thereof in the axial direction. As a result, the cross section of the outer periphery of the second fitting portion 112 has the shape of an arc that is convex outward. In a case where the second fitting portion 112 having this configuration is fitted to the groove (the cam groove or the straight groove), the second fitting portion 112 is in point contact with the inner wall surface of the groove. A portion to be in contact is a portion of the second fitting portion 112 of which the outer diameter is the maximum. This portion is a substantially middle portion in the axial direction.

A region between the first and second fitting portions 111 and 112 is formed as a constricted portion 113, and has a shape that is constricted inward in the shape of an arc. The cross section of the outer periphery of the constricted portion 113 has the shape of an arc that is concave inward.

<Inner Peripheral Portion of Cam Follower Body>

The inner peripheral portion of the cam follower body 110 is formed as a circular recessed portion including a bottom. The inner peripheral portion includes a screw insertion hole 115 at the center of a bottom 114. The screw insertion hole 115 is formed of a through-hole and has a diameter that allows a screw to be inserted.

Further, the inner peripheral portion includes a screw receiving portion 116 on the bottom 114. The screw receiving portion 116 is formed of a circular recessed portion, and is disposed concentrically with the screw insertion hole 115. The bottom of the screw receiving portion 116 functions as a seat surface 116a for a screw. That is, the bottom of the screw receiving portion 116 functions as a surface that receives the head portion of a screw for fixing the cam follower 100. The position of the seat surface 116a is closer to the proximal end than an inner wall surface 140a of the second slit 140 that is close to the distal end.

<<Base Portion>>

The base portion 120 has a cylindrical shape, and is provided coaxially with the proximal end portion of the cam follower body 110. The base portion 120 includes a press-fitting portion 121 at the bottom thereof. The press-fitting portion 121 is formed of a circular recessed portion, and is disposed coaxially with the axis of the cam follower 100. The cam follower 100 is mounted on a mounting target (the movable barrel 40 or the like) through the press-fitting portion 121. The mounting of the cam follower 100 will be described later.

<<First Slit>>

Each of the first slits 130 is formed of a groove that is cut toward the proximal end from the distal end of the cam follower body 110 in parallel to the axis and has a constant width (except for the protruding portions 150). The first slits 130 are cut up to the bottom 114 of the inner peripheral portion.

The first slits 130 are provided at two positions on the peripheral surface of the cam follower body 110. The two first slits 130 are arranged at regular intervals. The cam follower body 110 is divided into two equal portions in the circumferential direction by the two first slits 130.

Since the first slits 130 are provided, the cam follower body 110 is adapted to be elastically deformable in the radial direction.

The end portions of the first slits 130 have an R shape (the shape of an arc). Since the end portions have an R shape, the concentration of stress can be prevented. Accordingly, a reduction in strength can be prevented even in a case where repeated stress acts. Further, since the end portions have an R shape, the moduli of elasticity can be made uniform.

<<Second Slit>>

Each of the second slits 140 is formed of a groove that is cut toward the inner peripheral portion from the outer peripheral portion of the cam follower body 110 so as to be orthogonal to the axis and has a constant width. The second slits 140 are provided at two positions on the peripheral surface of the cam follower body 110. The two second slits 140 are provided at positions having the same height. The positions where the second slits 140 are provided are closer to the proximal end than a portion of the second fitting portion 112, which is to be in contact with the inner wall surface of the groove (the cam groove or the straight groove), and are closer to the distal end than the press-fitting portion 121. Further, the two second slits 140 are arranged so as to be symmetric with respect to a straight line passing through the first slits 130 and the center of the cam follower body 110.

Since the second slits 140 are provided, the elastic deformation of the first and second fitting portions 111 and 112 can be made appropriate. For example, even in a case where the first fitting portion 111 close to the distal end is elastically deformed inward, the outward expansion of the second fitting portion 112 caused by the influence of the elastic deformation of the first fitting portion 111 can be prevented. That is, since the second slits 140 are provided, only a necessary portion can be made to be elastically deformed. Accordingly, even in a case where there is a variation in the machining accuracy of the cam grooves and the straight grooves, the cam follower 100 can be made to appropriately be in pressure contact with each groove. As a result, the occurrence of backlash can be prevented.

Further, since the second slits 140 are provided, the influence of the deformation of each fitting portion on the shape of the press-fitting portion 121 can be reduced. Accordingly, the cam follower 100 can be mounted with high accuracy.

The second slits 140 are provided in a predetermined angular range. It is preferable that the angular range is set in consideration of the strength of the cam follower 100. That is, in a case where the angular range in which the second slits 140 are provided is too narrow, an effect to be obtained from the second slits 140 cannot be sufficiently obtained. In a case where the angular range in which the second slits 140 are provided is too wide, the strength of the cam follower 100 is reduced. Accordingly, it is preferable that the second slits 140 are provided in an angular range where a sufficient effect is obtained while required strength is ensured.

Both the end portions of the second slits 140 have an R shape (the shape of an arc). Since both the end portions have an R shape, the concentration of stress can be prevented. Accordingly, a reduction in strength can be prevented even in a case where repeated stress acts. Further, since both the end portions have an R shape, the moduli of elasticity can be made uniform.

As described above, the seat surface 116a for a screw is provided closer to the proximal end than the inner wall surface 140a of the second slit 140 that is close to the distal end. This will be described.

FIG. 20 is a cross-sectional perspective view of the cam follower.

As shown in FIG. 20, the seat surface 116a for a screw is disposed at a position away from the position of the inner wall surface 140a of the second slit 140, which is close to the distal end, toward the proximal end by a distance d. Accordingly, in a case where the cam follower 100 is fixed by a screw, the transmission of a force, which is received from the screw, to the first and second fitting portions 111 and 112 can be prevented. Therefore, the deformation of the first and second fitting portions 111 and 112 can be prevented. That is, in a case where the cam follower 100 is fixed by a screw, the seat surface receives a torsional force from the screw. Since the position of the seat surface is closer to the proximal end than the inner wall surface of the second slit 140 close to the distal end, the transmission of the force, which is received from the screw, to the first and second fitting portions 111 and 112 can be prevented. Accordingly, the torsion and deformation of the first and second fitting portions 111 and 112 can be prevented.

<<Protruding Portion>>

The protruding portions 150 are provided on both inner wall surfaces of each first slit 130. The respective protruding portions 150 are arranged at the distal end portion of each first slit 130 so as to face each other. Each protruding portion 150 has a rectangular parallelepiped shape, and is provided to protrude from each of the inner wall surfaces of the first slits 130 in a convex shape.

In a case where the cam follower body 110 is elastically deformed inward in the radial direction, the protruding portions 150 are in contact with each other and have a function to restrict excessive crush and deformation of the cam follower body 110.

The amount of deformation of the cam follower body 110 is restricted to the width W of the first slit 130 at the position of the protruding portion 150. The width W of the first slit 130 at the position of the protruding portion 150 is the width of the first slit 130 at a position where the protruding portions 150 are provided. In the cam follower 100 of this embodiment, the protruding portions 150 are arranged on both inner wall surfaces of each first slit 130 so as to face each other. Accordingly, the width of a gap between the two protruding portions 150 is the width W of the first slit 130 at the position of the protruding portion 150. The width W is the width of the narrowest portion in the width of the first slit 130.

The amount of deformation restricted by the protruding portions 150 is defined as follows.

The cam follower 100 absorbs a variation in the machining accuracy of the respective grooves (the cam groove and the straight groove) by being elastically deformed. Accordingly, the cam follower 100 needs to be deformed so as to be capable of absorbing a variation in the machining accuracy of at least the grooves.

The grooves are machined on the basis of tolerances. Accordingly, the sum of the respective tolerances is the maximum amount of variation. A positional tolerance and a width tolerance are generally known as the tolerances of the cam groove of the lens barrel. The "positional tolerance" is the tolerance of each of the arrangement positions of the cam grooves that are arranged at regular intervals on the peripheral surface of the cam barrel (the positional tolerance is also referred to as an angular tolerance or a difference). Further, the "width tolerance" is the tolerance of the width of the cam groove.

Accordingly, in a case where the cam follower 100 ensures the sum of the positional tolerance and the width tolerance of the cam groove as the amount of deformation thereof, the cam follower 100 can appropriately absorb a variation in the machining accuracy of each groove. On the other hand, in a case where the cam follower 100 allows deformation equal to or larger than the necessary amount of deformation, the cam follower 100 is excessively deformed in a case where the cam follower 100 receives a load. For this reason, there is a problem that the tilt of the optical axis of the lens is caused.

Accordingly, the deformation of the cam follower 100 is restricted so that the cam follower 100 is not deformed more than the sum of the positional tolerance and the width tolerance of the cam groove. That is, the sum of the positional tolerance and the width tolerance of the cam groove is defined as the defined amount of deformation.

For the restriction of deformation equal to or larger than the sum of the positional tolerance and the width tolerance of the cam groove, the width W of the first slit 130 at the position of the protruding portion 150 is set to a width equal to the sum of the positional tolerance and the width tolerance of the cam groove. Accordingly, deformation equal to or larger than the sum of the positional tolerance and the width tolerance of the cam groove, that is, deformation equal to or larger than the defined amount of deformation can be restricted.

[Mounting of Cam Follower]

<<Cam Follower-Mounting Portion>>

Each of the movable barrel 40, the second lens holding frame LF2, the third lens holding frame LF3, and the fourth lens holding frame LF4, which are targets on which the cam follower 100 is to be mounted, includes cam follower-mounting portions 200 at positions where the cam followers 100 are to be mounted.

FIG. 21 is a cross-sectional view showing the configuration of the cam follower-mounting portion. FIG. 21 shows the configuration of the cam follower-mounting portion of the second lens holding frame LF2. The cam follower-mounting portions of the movable barrel 40, the second lens holding frame LF2, and the third lens holding frame LF3 also have the same configuration.

The cam follower-mounting portion 200 comprises a recessed portion 210 in which the base portion 120 of the cam follower 100 is to be housed, a boss 212 that is provided in the recessed portion 210, and a screw hole 214 that is provided in the boss 212.

The recessed portion 210 has a shape corresponding to the shape of the outer periphery of the base portion 120 of the cam follower 100. In this embodiment, the recessed portion 210 has a circular shape. The recessed portion 210 is provided along the radial direction of the second lens holding frame LF2. The recessed portion 210 has an inner diameter that is slightly larger than the outer diameter of the proximal end portion of the cam follower 100.

The boss 212 has a shape corresponding to the shape of the press-fitting portion 121. In this embodiment, the boss 212 has a columnar shape. The boss 212 is provided coaxially with the recessed portion 210. The boss 212 has an outer diameter slightly larger than the inner diameter of the press-fitting portion 121.

The screw hole 214 is provided coaxially with the boss 212. A screw 220 fixing the cam follower 100 is mounted in the screw hole 214. The screw 220 is an example of a fastening member.

<<Mounting of Cam Follower>>

The mounting of the cam follower 100 is performed by the following procedure. First, the base portion 120 of the cam follower 100 is fitted to the recessed portion 210 of the cam follower-mounting portion 200. In this case, the boss 212 is fitted to the press-fitting portion 121 of the base portion 120. As described above, the boss 212 has an outer diameter slightly larger than the inner diameter of the press-fitting portion 121. As a result, the cam follower 100 is fixed to the boss 212 by so-called interference-fit. After that, the screw 220 is inserted into the screw insertion hole 115 of the inner peripheral portion of the cam follower body 110 and is screwed with the screw hole 214 provided in the boss 212, so that the cam follower 100 is fixed to the boss 212 by the screw 220.

In a case where the cam follower 100 is fixed by the screw 220, the cam follower 100 receives a torsional force from the screw 220 through the seat surface 116a. However, since the seat surface 116a is positioned closer to the proximal end than the inner wall surface 140a of the second slit 140 close to the distal end, the transmission of the force to the first and second fitting portions 111 and 112 can be prevented. Accordingly, the deformation of the first and second fitting portions 111 and 112 can be prevented.

FIG. 22 is a plan view showing the mounting attitude of the cam follower. FIG. 22 shows the mounting attitude of the cam follower mounted on the second lens holding frame LF2. The cam followers of the movable barrel 40, the second lens holding frame LF2, and the third lens holding frame LF3 are also mounted in the same mounting attitude.

As shown in FIG. 22, the cam follower 100 is positioned and mounted so that the first slits 130 are positioned substantially in the middle of the width of the cam groove (second cam groove 30B). In this case, the cam follower 100 is mounted so that a straight line passing through the two first slits 130 is substantially parallel to the trajectory of the cam groove (second cam groove 30B).

Since the cam follower 100 is mounted as described above, the elasticity of the cam follower 100 can be efficiently used. That is, the cam follower 100 can be substantially uniformly bent against both the inner wall surfaces of the cam groove. Accordingly, even though a user rotates the cam barrel 30 in any direction, the user can rotate the cam barrel 30 with the same force.

[Action of Cam Follower]

According to the cam follower 100 having the above-mentioned configuration, since the first slits 130 are provided, the cam follower 100 is adapted to be elastically deformable in the radial direction. Accordingly, even though there is a variation in the machining accuracy of the respective grooves (the cam groove and the straight groove), the cam follower 100 can be made to appropriately be in pressure contact with each groove. Therefore, the occurrence of backlash can be prevented.

Moreover, since the cam follower 100 comprises the second slits 140 in addition to the first slits 130, the first and second fitting portions 111 and 112 can be made to appropriately be in pressure contact with each groove. Further, the influence of the deformation of the first and second fitting portions 111 and 112 on the shape of the press-fitting portion 121 can be reduced. Accordingly, the cam follower 100 can be mounted with high accuracy.

Moreover, since the first slits 130 are provided with the protruding portions 150, the excessive deformation of the cam follower 100 can be prevented. Accordingly, even in a case where a load acts on the cam follower 100, the lens groups can be stably held. For example, the movable barrel 40 has a structure where the first lens group G1 is held on the distal end side of the movable barrel 40 as shown in FIG. 2. In this case, the centroid GP of the movable barrel 40 is positioned close to the distal end on the optical axis. On the other hand, the cam followers 100 of the movable barrel 40 are arranged close to the proximal end of the movable barrel 40. In a case where the cam followers 100 are arranged at positions significantly away from the centroid GP of the movable barrel 40 on the optical axis as described above, large moment acts on the cam followers 100. Further, in a case where large moment acts on the cam followers 100, the cam followers 100 are excessively bent and the held lens groups are caused to be tilted.

According to the cam follower 100 of this embodiment, since the first slits 130 are provided with the protruding portions 150, the excessive deformation can be restricted. Therefore, even in a case where a large load acts, the lens groups can be stably held. Particularly, since the cam follower 100 of this embodiment is adapted so that deformation equal to or larger than the sum of the positional tolerance and the width tolerance of the cam groove is restricted, the cam follower 100 can be deformed only as much as the necessary amount of deformation. Accordingly, the lens groups can be more stably held.

Generally, in the case of a lens barrel for a camera, the necessary amount of deformation, that is, the sum of the positional tolerance and the width tolerance of the cam groove is about 0.06 mm or less.

Meanwhile, in a case where the cam follower 100 is formed by injection molding with a resin, it is difficult to form a slit of which the width is 0.06 mm or less over the entire length. However, since only the protruding portions 150 need to be formed in the cam follower 100 of this embodiment, the cam follower 100 can be stably manufactured even in a case where the cam follower 100 is formed by injection molding with a resin.

Further, according to the cam follower 100 of this embodiment, the outer peripheries of the first and second fitting portions 111 and 112 have the shape of an arc that is convex outward. Accordingly, the cam follower 100 is in contact with the inner wall surfaces of the each groove in the state of a point contact or a state close to a point contact. Therefore, the elasticity of the cam follower 100 can be efficiently used. In addition, since the sliding resistance of the cam follower against the inner wall surfaces of the each groove can be reduced, the cam follower can be smoothly operated.

[Modification Example of Cam Follower]

<<Modification Example of First Slit>>

The cam follower 100 of the embodiment comprises the first slits 130 at two positions on the peripheral surface of the cam follower body 110, but the number of the first slits 130 provided at the cam follower body 110 is not limited thereto. The first slits 130 may be provided in at least one position on the peripheral surface of the cam follower body 110.

FIG. 23 is a front view of a cam follower that comprises one first slit. FIGS. 24 to 28 are a back view, a plan view, a bottom view, a right side view, and a left side view of the cam follower shown in FIG. 23. Further, FIG. 29 is a perspective view of the cam follower shown in FIG. 23 that is viewed from a surface side and FIG. 30 is a perspective view of the cam follower shown in FIG. 23 that is viewed from a bottom side. Furthermore, FIG. 31 is a cross-sectional view taken along line 31-31 of FIG. 25 and FIG. 32 is a cross-sectional view taken along line 32-32 of FIG. 25.

The configuration of the cam follower is the same as that of the cam follower 100 of the embodiment except that a cam follower body 110 is provided with one first slit 130. Accordingly, second slits 140 are provided at two positions on the peripheral surface of the cam follower body 110, and are arranged so as to be symmetric with respect to a straight line passing through the center of the cam follower 100 and the first slit 130.

Even in a case where the cam follower comprises one first slit 130, the first and second fitting portions 111 and 112 can be elastically deformed in the radial direction.

In a case where the cam follower comprises a plurality of first slits 130, it is preferable that the respective first slits 130 are arranged at regular intervals. For example, in a case where the cam follower comprises four first slits 130, it is preferable that the first slits 130 are arranged in a cross shape.

<<Modification Example of Second Slit>>

The cam follower body 110 may be adapted to be provided with only first slits 130. That is, second slits 140 may be omitted.

FIG. 33 is a front view of a cam follower that comprises only first slits. FIGS. 34 to 38 are a back view, a plan view, a bottom view, a right side view, and a left side view of the cam follower shown in FIG. 23. Further, FIG. 39 is a cross-sectional view taken along line 39-39 of FIG. 35 and FIG. 40 is a cross-sectional view taken along line 40-40 of FIG. 35.

The configuration of the cam follower is the same as that of the cam follower 100 of the embodiment except that a cam follower body 110 is provided with only first slits 130. As described above, the cam follower body 110 may be adapted to be provided with only first slits 130.

Since the cam follower 100 comprises the second slits 140 in addition to the first slits 130, the first and second fitting portions 111 and 112 can be made to appropriately be in pressure contact with each groove as described above. Further, the influence of the deformation of the first and second fitting portions 111 and 112 on the shape of the press-fitting portion 121 can be reduced.

In a case where the cam follower comprises a plurality of first slits 130, it is preferable that each second slit 140 is disposed between the adjacent first slits 130. Accordingly, each region, which is divided in the circumferential direction by the first slits 130, can be made to be appropriately elastically deformed. Further, the influence of each divided region on the press-fitting portion 121 can be appropriately reduced.

In a case where the first slits 130 are cut up to the bottom 114 of the inner peripheral portion as in the cam follower 100 of the embodiment, the first slits 130 may be disposed close to the second slits 140. In this case, it is preferable that the second slits 140 are arranged as follows. That is, the second slits 140 are arranged so that a distance in the circumferential direction between the end portion of the second slit 140 and the first slit 130 at a position where the second slits 140 are arranged is in the range of 10% to 20% of the entire circumference (the length of the circumference at the position where the second slits 140 are arranged). Generally, the outer diameter of a cam follower used for a lens barrel for a camera is in the range of 3 mm to 10 mm. In a case where the cam follower having this size is formed by injection molding with a resin and the above-mentioned condition is satisfied, sufficient strength can be ensured even though the cam follower comprises the first slits 130 and the second slits 140.

<<Modification Example of Protruding Portion>>

<First Modification Example>

FIG. 41 is a front view of a first modification example of the cam follower. FIGS. 42 to 46 are a back view, a plan view, a bottom view, a right side view, and a left side view of the cam follower shown in FIG. 41. Further, FIG. 47 is a perspective view of the cam follower shown in FIG. 41 that is viewed from a surface side and FIG. 48 is a perspective view of the cam follower shown in FIG. 41 that is viewed from a bottom side. Furthermore, FIG. 49 is a cross-sectional view taken along line 49-49 of FIG. 43 and FIG. 50 is a cross-sectional view taken along line 50-50 of FIG. 43.

The cam follower of the first modification example is the same as the cam follower 100 of the embodiment except for the form of protruding portions 150. Accordingly, a cam follower body 110 comprises first slits 130 and two second slits 140 at two positions on the peripheral surface thereof.

The cam follower 100 of this example is common to the cam follower 100 of the embodiment in that protruding portions 150 have a rectangular parallelepiped shape and the protruding portions 150 are provided on both inner wall surfaces of each first slit 130.

On the other hand, the cam follower 100 of this example is different from the cam follower 100 of the embodiment in that the protruding portions 150 of each first slit 130 are alternately disposed at the distal end portion of the first slit 130. That is, in a case where the cam follower body 110 is deformed in the radial direction, both the protruding portions 150 are arranged to be shifted from each other so that the protruding portions 150 do not bump into each other.

In a case where the cam follower body 110 of the cam follower 100 of this example is deformed in the radial direction, both the protruding portions 150 are in contact with the inner wall surfaces of each first slit 130 facing themselves. Accordingly, the amount of deformation of the cam follower 100 of this example is restricted by the width W of a gap formed between each protruding portion 150 and the inner wall surface of the first slit 130.

<Second Modification Example>

FIG. 51 is a front view of a second modification example of the cam follower. FIGS. 52 to 56 are a back view, a plan view, a bottom view, a right side view, and a left side view of the cam follower shown in FIG. 51. Further, FIG. 57 is a perspective view of the cam follower shown in FIG. 51 that is viewed from a surface side and FIG. 58 is a perspective view of the cam follower shown in FIG. 51 that is viewed from a bottom side. Furthermore, FIG. 59 is a cross-sectional view taken along line 59-59 of FIG. 53 and FIG. 60 is a cross-sectional view taken along line 60-60 of FIG. 53.

The configuration of the cam follower of the second modification example is the same as that of the cam follower 100 of the first modification example except that a cam follower body 110 is provided with one first slit 130.

<Third Modification Example>

FIG. 61 is a front view of a third modification example of the cam follower. FIGS. 62 to 66 are a back view, a plan view, a bottom view, a right side view, and a left side view of the cam follower shown in FIG. 61. Further, FIG. 67 is a perspective view of the cam follower shown in FIG. 61 that is viewed from a surface side and FIG. 68 is a perspective view of the cam follower shown in FIG. 61 that is viewed from a bottom side. Furthermore, FIG. 69 is a cross-sectional view taken along line 69-69 of FIG. 63 and FIG. 70 is a cross-sectional view taken along line 70-70 of FIG. 63.

The cam follower of the third modification example is the same as the cam follower 100 of the embodiment except for the form of protruding portions 150. Accordingly, a cam follower body 110 comprises first slits 130 and two second slits 140 at two positions on the peripheral surface thereof.

The cam follower 100 of this example is common to the cam follower 100 of the embodiment in that protruding portions 150 have a rectangular parallelepiped shape.

On the other hand, the cam follower 100 of this example is different from the cam follower 100 of the embodiment in that the protruding portion 150 is provided on only one inner wall surface of each first slit 130.

In a case where the cam follower body 110 of the cam follower 100 of this example is deformed in the radial direction, the protruding portion 150 is in contact with the inner wall surface of each first slit 130 facing itself. Accordingly, the amount of deformation of the cam follower 100 of this example is restricted by the width W of a gap formed between the protruding portion 150 and the inner wall surface of the first slit 130.

<Fourth Modification Example>

FIG. 71 is a front view of a fourth modification example of the cam follower. FIGS. 72 to 76 are a back view, a plan view, a bottom view, a right side view, and a left side view of the cam follower shown in FIG. 71. Further, FIG. 77 is a perspective view of the cam follower shown in FIG. 71 that is viewed from a surface side and FIG. 78 is a perspective view of the cam follower shown in FIG. 71 that is viewed from a bottom side. Furthermore, FIG. 79 is a cross-sectional view taken along line 79-79 of FIG. 73 and FIG. 80 is a cross-sectional view taken along line 80-80 of FIG. 73.

The configuration of the cam follower of the fourth modification example is the same as that of the cam follower 100 of the third modification example except that a cam follower body 110 is provided with one first slit 130.

<Fifth Modification Example>

FIG. 81 is a front view of a fifth modification example of the cam follower. FIGS. 82 to 86 are a back view, a plan view, a bottom view, a right side view, and a left side view of the cam follower shown in FIG. 81. Further, FIG. 87 is a perspective view of the cam follower shown in FIG. 81 that is viewed from a surface side and FIG. 88 is a perspective view of the cam follower shown in FIG. 81 that is viewed from a bottom side. Furthermore, FIG. 89 is a cross-sectional view taken along line 89-89 of FIG. 83 and FIG. 90 is a cross-sectional view taken along line 90-90 of FIG. 83.

The cam follower of the fifth modification example is the same as the cam follower 100 of the embodiment except for the form of protruding portions 150. Accordingly, a cam follower body 110 comprises first slits 130 and two second slits 140 at two positions on the peripheral surface thereof.

The cam follower 100 of this example is different from the cam follower 100 of the embodiment in that protruding portions 150 have a hemispherical shape. The protruding portions 150 are provided on both inner wall surfaces of each first slit 130 and are arranged so as to face each other. In a case where the cam follower body 110 of the cam follower 100 of this example is deformed in the radial direction, both the protruding portions 150 are in contact with each other. Accordingly, the amount of deformation of the cam follower 100 of this example is restricted by the width W of a gap formed between the protruding portions 150.

Since distal ends of the protruding portions 150 are formed in the shape of an arc as in the cam follower 100 of this example, the protruding portions 150 can come into contact with each other at a point.

<Sixth Modification Example>

FIG. 91 is a front view of a sixth modification example of the cam follower. FIGS. 92 to 96 are a back view, a plan view, a bottom view, a right side view, and a left side view of the cam follower shown in FIG. 91. Further, FIG. 97 is a perspective view of the cam follower shown in FIG. 91 that is viewed from a surface side and FIG. 98 is a perspective view of the cam follower shown in FIG. 91 that is viewed from a bottom side. Furthermore, FIG. 99 is a cross-sectional view taken along line 99-99 of FIG. 93 and FIG. 100 is a cross-sectional view taken along line 100-100 of FIG. 93.

The configuration of the cam follower of the sixth modification example is the same as that of the cam follower 100 of the fifth modification example except that a cam follower body 110 is provided with one first slit 130.

<Seventh Modification Example>

FIG. 101 is a front view of a seventh modification example of the cam follower. FIGS. 102 to 106 are a back view, a plan view, a bottom view, a right side view, and a left side view of the cam follower shown in FIG. 101. Further, FIG. 107 is a perspective view of the cam follower shown in FIG. 101 that is viewed from a surface side and FIG. 108 is a perspective view of the cam follower shown in FIG. 101 that is viewed from a bottom side. Furthermore, FIG. 109 is a cross-sectional view taken along line 109-109 of FIG. 103 and FIG. 110 is a cross-sectional view taken along line 110-110 of FIG. 103.

The cam follower of the seventh modification example is the same as the cam follower 100 of the embodiment except for the form of protruding portions 150. Accordingly, a cam follower body 110 comprises first slits 130 and two second slits 140 at two positions on the peripheral surface thereof.

Hemispherical protruding portions 150 of the cam follower 100 of this example are alternately disposed on both inner wall surfaces of each first slit 130. More specifically, in a case where the cam follower body 110 is deformed in the radial direction, both the protruding portions 150 are arranged to be shifted from each other so that the protruding portions 150 do not bump into each other.

In a case where the cam follower body 110 of the cam follower 100 of this example is deformed in the radial direction, both the protruding portions 150 are in contact with the inner wall surfaces of each first slit 130 facing themselves. Accordingly, the amount of deformation of the cam follower 100 of this example is restricted by the width W of a gap formed between each protruding portion 150 and the inner wall surface of the first slit 130.

The protruding portions 150 of the cam follower 100 of this example do not have a complete hemispherical shape but have a hemispherical shape that is pressed and crushed in the axial direction of the cam follower 100 (so-called long hemispherical shape). That is, the protruding portions 150 have a shape that is combined with an ellipse.

Even in the cam follower 100 of this example, the protruding portions 150 come into point contact with the inner wall surfaces of each first slit 130 facing themselves.

<Eighth Modification Example>

FIG. 111 is a front view of an eighth modification example of the cam follower. FIGS. 112 to 116 are a back view, a plan view, a bottom view, a right side view, and a left side view of the cam follower shown in FIG. 111. Further, FIG. 117 is a perspective view of the cam follower shown in FIG. 111 that is viewed from a surface side and FIG. 118 is a perspective view of the cam follower shown in FIG. 111 that is viewed from a bottom side. Furthermore, FIG. 119 is a cross-sectional view taken along line 119-119 of FIG. 113 and FIG. 120 is a cross-sectional view taken along line 120-120 of FIG. 113.

The configuration of the cam follower of the eighth modification example is the same as that of the cam follower 100 of the seventh modification example except that a cam follower body 110 is provided with one first slit 130.

<Ninth Modification Example>

FIG. 121 is a front view of a ninth modification example of the cam follower. FIGS. 122 to 126 are a back view, a plan view, a bottom view, a right side view, and a left side view of the cam follower shown in FIG. 121. Further, FIG. 127 is a perspective view of the cam follower shown in FIG. 121 that is viewed from a surface side and FIG. 128 is a perspective view of the cam follower shown in FIG. 121 that is viewed from a bottom side. Furthermore, FIG. 129 is a cross-sectional view taken along line 129-129 of FIG. 123 and FIG. 130 is a cross-sectional view taken along line 130-130 of FIG. 123.

The cam follower of the ninth modification example is the same as the cam follower 100 of the embodiment except for the form of a protruding portion 150. Accordingly, a cam follower body 110 comprises first slits 130 and two second slits 140 at two positions on the peripheral surface thereof.

In the cam follower 100 of this example, a hemispherical protruding portion 150 is provided on only one inner wall surface of each first slit 130.

In a case where the cam follower body 110 of the cam follower 100 of this example is deformed in the radial direction, the protruding portion 150 is in contact with the inner wall surface of each first slit 130 facing itself. Accordingly, the amount of deformation of the cam follower 100 of this example is restricted by the width W of a gap formed between the protruding portion 150 and the inner wall surface of the first slit 130.

The protruding portions 150 of the cam follower 100 of this example do not have a complete hemispherical shape but have a hemispherical shape that is pressed and crushed in the axial direction of the cam follower 100 (so-called long hemispherical shape). That is, the protruding portions 150 have a shape that is combined with an ellipse.

Even in the cam follower 100 of this example, the protruding portion 150 comes into point contact with the inner wall surface of each first slit 130 facing itself <Tenth Modification Example>

FIG. 131 is a front view of a tenth modification example of the cam follower. FIGS. 132 to 136 are a back view, a plan view, a bottom view, a right side view, and a left side view of the cam follower shown in FIG. 131. Further, FIG. 137 is a perspective view of the cam follower shown in FIG. 131 that is viewed from a surface side and FIG. 138 is a perspective view of the cam follower shown in FIG. 131 that is viewed from a bottom side. Furthermore, FIG. 139 is a cross-sectional view taken along line 139-139 of FIG. 133 and FIG. 140 is a cross-sectional view taken along line 140-140 of FIG. 133.

The configuration of the cam follower of the tenth modification example is the same as that of the cam follower 100 of the ninth modification example except that a cam follower body 110 is provided with one first slit 130.

<<Modification Example of Base Portion>>

A recessed portion is provided at the bottom of the base portion 120 as the press-fitting portion 121 in the embodiment, but the press-fitting portion can also be formed of a protruding portion.

FIG. 141 is a cross-sectional view showing the configuration of a cam follower of which a press-fitting portion is formed of a protruding portion and the configuration of a mounting portion for the cam follower.

As shown in FIG. 141, the cam follower 100 of this example includes a columnar press-fitting portion 122 at a base portion 120 thereof. The press-fitting portion 122 is provided coaxially with a cam follower body 110.

A cam follower-mounting portion 200 includes a recessed portion 230 to which the press-fitting portion 122 is to be press-fitted. The recessed portion 230 has a shape corresponding to the shape of the outer periphery of the press-fitting portion 122. In this example, the recessed portion 230 has a circular shape. The inner diameter of the recessed portion 230 is slightly smaller than the outer diameter of the press-fitting portion 122. Accordingly, in a case where the press-fitting portion 122 is fitted to the recessed portion 230, the cam follower 100 is fixed to the cam follower-mounting portion 200 by so-called interference-fit.

The press-fitting portion 122 is formed to have a diameter smaller than the diameter of each of the first and second fitting portions 111 and 112 in the example shown in FIG. 141, but can also be formed to have a diameter larger than the diameter of each of the first and second fitting portions 111 and 112. Further, the press-fitting portion 122 can also be formed to have substantially the same diameter as the diameter of each of the first and second fitting portions 111 and 112.

Furthermore, the press-fitting portion 122 does not necessarily need to have a columnar shape, and may have a prismatic shape or the like. The same applies to a case where the press-fitting portion is formed of a recessed portion.

Further, the cam follower 100 is adapted to be fixed by the screw 220 after being mounted by press-fitting in the embodiment, but may be adapted to be mounted by only press-fitting.

<<Modification Example of Outer Shape of Cam Follower Body>>

In the embodiment, the cam follower body 110 may have a hollow shape where at least the distal end of the cam follower body is open. Accordingly, since the first slits 130 are provided, the cam follower body 110 can be adapted to be elastically deformable in the radial direction.

FIG. 142 is a front view of another example of the cam follower body. FIG. 143 is a plan view thereof.

A cam follower body 110 of a cam follower 100 shown in FIGS. 142 and 143 has the shape of an ellipse in plan view. As described above, the cross section of the cam follower body 110 does not need to have a circular shape and may have an elliptical shape. In the example shown in FIGS. 142 and 143, first slits 130 are provided along the major axis of the ellipse.

FIG. 144 is a front view showing another example of the cam follower body.

The outer shape of a cam follower body 110 of a cam follower 100 shown in FIG. 144 is the shape of a straight cylinder. As described above, the outer shape of the cam follower body 110 may be a general straight shape.

<<Manufacture of Cam Follower>>

It is preferable that the entire cam follower including the first slits and the second slits is manufactured by injection molding with a resin. Accordingly, the cam follower can be manufactured at a low cost.

On the other hand, the first slits, the second slits, and the protruding portions can also be machined in post-processes in a case where cost is not considered. For example, the first slits and the second slits may be machined after the cam follower is formed by injection molding or the like. Further, the protruding portions may be formed of separate members.

Furthermore, the protruding portions may be manufactured separately from the cam follower body and may be mounted by adhesion or the like. Moreover, the protruding portions may be formed using so-called two-color molding or the like.

<<Modification Example of Lens Barrel>>

The cam barrel is disposed outside the stationary barrel in the embodiment, but the cam barrel may be disposed inside the stationary barrel.

Further, the cam barrel is adapted to be rotated relative to the stationary barrel, but the barrel (second barrel) including the cam grooves and the barrel (third barrel) including the straight grooves have only to be adapted to be rotated relative to each other.

Furthermore, the cam barrel is adapted to be manually rotated in the embodiment, but can also be adapted to be rotated by a motor.

<<Application to Other Lens Devices>>

A case where the invention is applied to an interchangeable lens for a lens-interchangeable camera has been described in the embodiment by way of example, but the application of the invention is not limited thereto. In addition, the invention can also be applied to a lens barrel for a projector, a lens barrel for a microscope, and the like. Further, in a case where the invention is applied to a lens device for a camera, the type of the camera is also not particularly limited. The invention can be applied to various cameras, such as a silver-salt camera, a digital camera, a television camera, a cinema camera, and a security camera.

Generally, the outer diameter of a cam follower used for a lens barrel for a camera is in the range of 3 mm to 10 mm. The invention is suitable for a cam follower having this size.

Further, a case where the invention is applied to a lens device (interchangeable lens) for moving a lens group for zooming by a cam mechanism has been described in the embodiment by way of example, but the invention can also be applied to a lens device for moving a lens group for focusing by a cam mechanism likewise.

EXPLANATION OF REFERENCES

1: interchangeable lens
10: lens barrel
12: mount
20: stationary barrel
20A: first straight groove
20B: second straight groove
20CD: common straight groove
30: cam barrel
30A: first cam groove
30B: second cam groove
30C: third cam groove
30D: fourth cam groove
40: movable barrel
50: exterior barrel
52: zoom ring
54: focus ring
100: cam follower
110: cam follower body
111: first fitting portion
112: second fitting portion
113: constricted portion
114: bottom
115: screw insertion hole
116: screw receiving portion
116a: seat surface
120: base portion
121: press-fitting portion
122: press-fitting portion
130: first slit
140: second slit
140a: inner wall surface
150: protruding portion
200: cam follower-mounting portion
210: recessed portion
212: boss
214: screw hole
220: screw
230: recessed portion
G1: first lens group
G2: second lens group
G2a: front second lens group
G2b: rear second lens group
G3: third lens group
G4: fourth lens group
G5: fifth lens group
GP: centroid
GS: guide shaft
LF1: first lens holding frame
LF2: second lens holding frame LF3: third lens holding frame
LF4: fourth lens holding frame
LF5: fifth lens holding frame
SU: stop unit
St: stop
Z: optical axis

What is claimed is:

1. A cam follower that is to be fitted into a straight groove and a cam groove, comprising:
   a hollow cam follower body of which a distal end is open;
   a first slit that is cut toward a proximal end from the distal end of the cam follower body; and
   a protruding portion that is provided on at least one inner wall surface of the first slit and restricts deformation of the cam follower body equal to or larger than a defined amount of deformation in a radial direction,
   wherein the protruding portion restricts deformation equal to or larger than a sum of a positional tolerance and a width tolerance of the cam groove.

2. The cam follower according to claim 1,
   wherein the protruding portion is provided on one inner wall surface of the first slit.

3. The cam follower according to claim 1,
   wherein the protruding portions are provided on both inner wall surfaces of the first slit.

4. The cam follower according to claim 3,
   wherein the protruding portions are provided on both the inner wall surfaces of the first slit so as to face each other.

5. The cam follower according to claim 1,
   wherein a distal end of the protruding portion has a shape of an arc.

6. The cam follower according to claim 1,
   wherein the first slit has a width equal to the sum of the positional tolerance and the width tolerance of the cam groove at a position of the protruding portion.

7. The cam follower according to claim 6,
   wherein the first slit has a width of 0.06 mm or less at the position of the protruding portion.

8. The cam follower according to claim 1,
   wherein the first slits are provided at a plurality of positions at regular intervals in a circumferential direction of the cam follower body.

9. The cam follower according to claim 1,
   wherein a surface of the cam follower body to be in contact with an inner wall surface of the cam groove and a surface of the cam follower body to be in contact with an inner wall surface of the straight groove have a shape of an arc that is convex outward.

10. The cam follower according to claim 1,
    wherein the cam follower is an integrated molding made of a resin.

11. A lens barrel comprising:
    a first barrel that holds a lens;
    a second barrel that includes a cam groove;
    a third barrel that includes a straight groove; and
    the cam follower according to claim 1 that is provided on the first barrel and is to be fitted into the straight groove and the cam groove,
    wherein the first barrel is moved along an optical axis by relative rotation of the second and third barrels.

12. The lens barrel according to claim 11,
    wherein the cam follower is provided at a position away from a centroid of the first barrel.

13. The lens barrel according to claim 12,
    wherein the lens is held at one end portion of the first barrel, and
    the cam follower is provided at the other end portion of the first barrel.

14. A cam follower that is to be fitted into a straight groove and a cam groove, comprising:
    a hollow cam follower body of which a distal end is open;
    a first slit that is cut toward a proximal end from the distal end of the cam follower body;
    a protruding portion that is provided on at least one inner wall surface of the first slit and restricts deformation of the cam follower body equal to or larger than a defined amount of deformation in a radial direction; and
    a second slit that is cut toward an inner peripheral portion from an outer peripheral portion of the cam follower body in a direction orthogonal to an axis.

15. The cam follower according to claim 14,
    wherein the cam follower is an integrated molding made of a resin.

16. A lens barrel comprising:
    a first barrel that holds a lens;
    a second barrel that includes a cam groove;
    a third barrel that includes a straight groove; and
    the cam follower according to claim 11 that is provided on the first barrel and is to be fitted into the straight groove and the cam groove,
    wherein the first barrel is moved along an optical axis by relative rotation of the second and third barrels.

17. The lens barrel according to claim 16,
    wherein the cam follower is provided at a position away from a centroid of the first barrel.

18. The lens barrel according to claim 17,
    wherein the lens is held at one end portion of the first barrel, and
    the cam follower is provided at the other end portion of the first barrel.

* * * * *